(12) United States Patent
Alda et al.

(10) Patent No.: US 7,478,163 B2
(45) Date of Patent: Jan. 13, 2009

(54) METHOD AND APPARATUS FOR PRESENTING MULTIMEDIA CONTENT AND FOR FACILITATING THIRD PARTY REPRESENTATION OF AN OBJECT

(76) Inventors: Anthony Arthur J. Alda, 200-1311 Howe Street, Vancouver (CA) V6Z 2P3; Brent Richard Bysouth, 200-1311 Howe Street, Vancouver (CA) V6Z 2P3; Ricardo J. Rosado, 200-1311 Howe Street, Vancouver (CA) V6Z 2P3; Zubin Adi Balsara, #6-2590 Panorama Drive, Coquitlam (CA) V3E 2W9; Carla Maureen Ulrich, 731 East 15th Avenue, Vancouver (CA) V5T 2R8; Lloyd Clayton Dwayne Bell, 1215 Lansdowne Drive, Coquitlam (CA) V3E 2P2; Ryan Michael Christiansen, 303-1399 Fountain Way, Vancouver (CA) V6H 3T3; Andrew Viewkko Poystila, 2083 North End Road, Salt Spring Island (CA) V8K 1E1; David Brett Rudd, 3316 West 15th Avenue, Vancouver (CA) V6R 2Y8; Shazron Abdullah, 29270 Ruskin Crescent, Mission (CA) V4S 1B4

(*) Notice: Subject to any disclaimer, the term of this patent is extended or adjusted under 35 U.S.C. 154(b) by 907 days.

(21) Appl. No.: 10/771,742

(22) Filed: Feb. 4, 2004

(65) Prior Publication Data
US 2005/0021754 A1    Jan. 27, 2005

Related U.S. Application Data

(60) Provisional application No. 60/444,672, filed on Feb. 4, 2003.

(51) Int. Cl.
*G06F 15/16* (2006.01)

(52) U.S. Cl. .................. 709/229; 709/225; 709/246
(58) Field of Classification Search .................. None
See application file for complete search history.

(56) References Cited

U.S. PATENT DOCUMENTS

| 5,132,992 | A | 7/1992 | Yurt et al. |
| 5,253,275 | A | 10/1993 | Yurt et al. |
| 5,511,186 | A | 4/1996 | Carhart et al. |

(Continued)

FOREIGN PATENT DOCUMENTS

WO    WO 00/20960 A1 *   4/2000

(Continued)

*Primary Examiner*—Patrice Winder
(74) *Attorney, Agent, or Firm*—George N. Chaclas; Edwards Angell Palmer & Dodge LLP

(57) ABSTRACT

A mapping method for converting objects in order to optimize utilization of a programming environment on an associated platform includes the steps of identifying a strongly typed object and a type of conversion. A name of a weakly typed object is based upon an attribute associated with a target object and reflection is used on the strongly typed object to obtain properties of the object input parameter. Default names are assigned and stored based upon the obtained properties in a dictionary cache. The dictionary cache is used to complete attributes associated with new object for use in the programming environment.

32 Claims, 161 Drawing Sheets

U.S. PATENT DOCUMENTS

| | | | |
|---|---|---|---|
| 5,530,235 A | 6/1996 | Stefik et al. | |
| 5,550,863 A | 8/1996 | Yurt et al. | |
| 5,629,980 A | 5/1997 | Stefik et al. | |
| 5,634,012 A | 5/1997 | Stefik et al. | |
| 5,638,443 A | 6/1997 | Stefik et al. | |
| 5,715,403 A | 2/1998 | Stefik | |
| 5,892,900 A | 4/1999 | Ginter et al. | |
| 5,920,861 A | 7/1999 | Hall et al. | |
| 5,923,846 A * | 7/1999 | Gage et al. | 709/213 |
| 5,943,422 A | 8/1999 | Van Wie et al. | |
| 6,002,720 A | 12/1999 | Yurt et al. | |
| 6,112,181 A | 8/2000 | Shear et al. | |
| 6,138,119 A | 10/2000 | Hall et al. | |
| 6,144,702 A | 11/2000 | Yurt et al. | |
| 6,185,683 B1 | 2/2001 | Ginter et al. | |
| 6,233,684 B1 | 5/2001 | Stefik et al. | |
| 6,236,971 B1 | 5/2001 | Stefik et al. | |
| 6,240,185 B1 | 5/2001 | Van Wie et al. | |
| 6,275,599 B1 | 8/2001 | Adler et al. | |
| 6,385,596 B1 | 5/2002 | Wiser et al. | |
| 6,489,980 B1 * | 12/2002 | Scott et al. | 715/854 |
| 6,519,700 B1 | 2/2003 | Ram et al. | |
| 6,578,057 B1 | 6/2003 | Hori | |
| 6,665,405 B1 | 12/2003 | Lenstra | |
| 6,708,157 B2 | 3/2004 | Stefik et al. | |
| 6,714,921 B2 | 3/2004 | Stefik | |
| 6,718,038 B1 | 4/2004 | Cusmario | |
| 6,754,642 B2 | 6/2004 | Tadayon et al. | |
| 6,763,464 B2 | 7/2004 | Wang et al. | |
| 7,069,310 B1 * | 6/2006 | Bartholomew | 709/219 |
| 2002/0078241 A1 * | 6/2002 | Vidal et al. | 709/231 |
| 2002/0078454 A1 * | 6/2002 | Auberger | 725/49 |
| 2002/0193966 A1 | 12/2002 | Buote et al. | |
| 2004/0107365 A1 * | 6/2004 | Hogg | 713/201 |

FOREIGN PATENT DOCUMENTS

WO     WO 01/54369 A2 *   7/2001

* cited by examiner

Auto Parameter

```
[ReelActionScript(Auto = true)]
public class MyClass
{
        // these fields are not exposed to conversion
        private int _MyValue;
        private string _MyValue2;
        private double _MyValue3;

// this property is automatically exposed to conversion, because it is public
        public int MyValue
        {
                get { return _MyValue; }
                set { _MyValue = value; }
        }

// this property is not exposed to conversion, because it is not public
        protected string MyValue2
        {
                get { return _MyValue2; }
        }

// this property is exposed to conversion, but in only one direction (from
        // .NET object to ASObject) because it is read-only
        public double MyValue3
        {
                get { return _MyValue3; }
        }
}
```

FIG. 2A

Name Parameter Applied to a Class

```
[ReelActionScript(Name = "MyRenamedClass")]
public class MyClass
{
        // field, property and method declarations go here
}
```

FIG. 2B

Name Parameter Applied to a Property or Field

```
[ReelActionScript]
public class MyClass
{
        // this field would be represented under the "myValue" name in
        // ActionScript (not "_MyValue")
        [ReelActionScript(Name="myValue")]
        private int _MyValue;
}
```

FIG. 2C

Access Mode parameter Applied to a Property or Field

```
[ReelActionScript]
public class MyClass
{
    // use this value to convert from the myValue ActionScript field to the .NET object
    [ReelActionScript(Name = "myValue", Access = ReelActionScript.AccessMode.Write)]
    private int _MyValue;

// use this value to convert from the .NET object to the myValue ActionScript field
    [ReelActionScript(Access = ReelActionScript.AccessMode.Read)]
    public int MyValue
    {
        get { return _MyValue; }
    }
}
```

FIG. 2D

```
Sample conversion code
// Given the following .NET class declaration:
[ReelActionScript(Auto = true)]
public class MyClass
{
        private int _MyValue;
        private string _MyValue2;
        private double _MyValue3;
        private Decimal _MyValue4;
        public int MyValue
        {
                get { return _MyValue; }
                set { _MyValue = value; }
        }
        protected string MyValue2
        {
                get { return _MyValue2; }
        }
        public double MyValue3
        {
                get { return _MyValue3; }
        }
        public Decimal MyValue4
        {
                get { return _MyValue4; }
                set { _MyValue = value; }
        }
}
// You would not need to have manual conversion code; just use the ASConverter
   class to do the conversion:
ASConverter converter = new ASConverter();
ASObject converted = convert.ToASObject(myObject);
// and back:
convert.FromASObject(converted, myObject);
```

FIG. 2G

Welcome

Recording Your IP: 207.35.236.194

Required Microsoft Internet Explorer 5.0 or later
Flash Player 6
JavaScript Enabled enter

FIG. 4

```
// Set field Colors for input fields
_global.colorTextbox = function (arg){
            arg.backgroundColor = globalStyleFormat.background;
            arg.borderColor = globalStyleFormat.highlight;
            arg.textColor = globalStyleFormat.textColor;
            arg.background = true;
            arg.border = true;
            arg.onSetFocus = _global.handleFieldFocus;
            arg.onKillFocus = _global.handleFieldBlur;
}
```

FIG. 9C

```
_global.handleFieldFocus = function () {
        //this.borderColor = 0xFFCC00;
        this.borderColor = 0xFFFFFF;
}
```

FIG. 9D

```
_global.handleFieldBlur = function() {
        //this.backgroundColor = 0x333333;
        this.borderColor = globalStyleFormat.highlight;
}
```

FIG. 9E

```
_global.formatInputFields = function(target)
{
        var index = 200;
        for (name in target)
        {
                if ( target[name].type = = "input" )
                {
                        colorTextbox(target[name]);
                }
        }
}
```

Bobbie Bysouth ← 464

Height: 5' 10.5"  
Weight: 130 lbs  
Hair: Reddish Blonde  
Eyes: Blue

466 {
Union: UBCP 10115  
Vancouver Talent Management  
150 - 220 Cambie Street  
Vancouver BC V6B 2M9  
Tel: (604) 668-3667 or (604) 668-0261
}

Television & Film:
Background Work Available On Request

Commercials

| | | |
|---|---|---|
| Emmentauer Cheese | Principal | Sez Who/Economia |
| Molson X | Principal | Voodoo House |
| Macy's | Principal | Arthur Lang Productions |
| Western Canada Lotteries | Principal | Rave Films |
| Royal Bank of Canada | SOC | |
| Telus "Gigarange" | Principal | Circle Productions |
| Telus "In Chords" | Principal | Circle Productions |
| Telus "Blast Off" | Principal | Circle Productions |
| Keri Lotion | SOC | "The Moment" Incorporated |
| Winterthur Taxi | Principal | Circle Productions |
| Arby's | SOC | WB Doner & Company |

⎫ 474

Special Skills
Piano (Level 8 Advanced)
Horseback Riding (Western/English, Experienced)
Modern Dance (Beginner)
Self Defense (Aikido)

| Main Agency Profile | |
|---|---|
| Agency reel-ID: [ ] | Edit |
| Agency Initials: [ ] | |
| External website: [ ] | |
| Primary email: [ ] | View Agent Directory |

Primary Agent Information ◀ Next  Back ▶

| Role - Title: [ ] | Name - Agent: [ ] | ○ Online |
|---|---|---|
| Role - Title: [ ] | Name - Agent: [ ] | ○ Online |
| Role - Title: [ ] | Name - Agent: [ ] | ○ Online |
| Role - Title: [ ] | Name - Agent: [ ] | ○ Online |
| Role - Title: [ ] | Name - Agent: [ ] | ○ Online |

Business Information

| In Business Since: [ ] |
|---|
| Business License-Registration: [ ] |
| RGN Certification: [ ] |
| RGN Member Since: [ ] |
| Total Member Represented: [ ] |
| Affiliations: [ ] |

Summary-History Information

[ ]

[ Representation ]

| Main Agency Profile | |
|---|---|
| Agency reel-ID: [ ] | [Save] [Cancel] |
| Agency Initials: [ ] | 504  506 |
| External website: [ ] | |
| Primary email: [ ] | |

Primary Agent Information ◀ Next  Back ▶

| Role - Title: [ ] | Name - Agent: [ ] | ○ Online |
|---|---|---|
| Role - Title: [ ] | Name - Agent: [ ] | ○ Online |
| Role - Title: [ ] | Name - Agent: [ ] | ○ Online |
| Role - Title: [ ] | Name - Agent: [ ] | ○ Online |
| Role - Title: [ ] | Name - Agent: [ ] | ○ Online |

Business Information

| In Business Since: | [ ] |
|---|---|
| Business License-Registration: | [ ] |
| RGN Certification: | [ ] |
| RGN Member Since: | [ ] |
| Total Member Represented: | [ ] |
| Affiliations: | [ ] |

Summary-History Information

[ ]

[Representation]
501

Main Search

Main Roster Search
You can select a single or all available categories for search

Main Search

Search By:                                                                 *702*
- Reel ID: [ ]   Name: [ ]   Last: [ ]
- CID Project Number: [ ]   Agency: [ ]
- CID Project Name: [ ]

Detailed Talent Search

- Client Status: [ ]
- Gender: [ ]
- Ethnicity: [ ]
- Hair Type: [ ]
- Eye Colour: [ ]
- Age Range: [ ]
- Height: [ ]
- Weight Range: [ ]

- Jacket: [ ]
- Dress: [ ]
- Waist: [ ]
- Shoe: [ ]
- Wardrobe Avail: [ ]
- Skills: [ ]
- Contact Search: [ ]

- Background: [ ]
- Animals: [ ]

- Musicians/Bands: [ ]
- Properties: [ ]
- Writers: [ ]

[ Start Selected Search ]
*704*

Reel Indie-Publishing Breakdown

820 {
- Casting: [        ]    Casting Status [▼]
- Agency: [        ]
- Reel-ID: [        ]

822 — Send To: [        ]  [Add Contacts] — 824

826 — Priority: [Normal ▼]

Note: Information marked with an asterisk (*) is required.

828 — CID Number: [        ]

830 {
- Project Title: [        ]
- Project Class: [Select One ▼]
- Markets: [Select One ▼]
- Episode: [        ] ☐ N/A
- Network: [        ] ☐ N/A
- Cities for Response: [        ] ☐ N/A
- Production Co: [        ]
- Exec Producer: [        ]
- Co-Exec Producer: [        ] ☐ N/A
- Producer(s): [        ]
- Director: [        ]
- Casting Director: [        ]
- Casting Assoc: [        ] ☐ N/A
- Casting Asst: [        ] ☐ N/A

[Next] [Save Project] [Reset] [Cancel]
 832      834       836     838

FIG. 45

Reel Indie - Publishing Breakdown — 840

Audition Location(s) — 842
- Studio:
- Address or Intersection:
- City:
- Country:
- State:
- Zip Code:

Click to Enlarge

- Shooting Location(s):
- Script Availability: Select One
- Production Office:
- Contact Info:

— 844

Key Dates, Rates and Union — 846
- Submissions Deadline: Day | Month | Date | 2002
- Auditions: Day | Month | Date | 2002
- From: Time   To: Time
- Call Backs:
- Shooting Starts: Day | Month | Date | 2002
- Shooting Finishes: Day | Month | Date | 2002
- Rates & Union:

848 | Back | Next | Save Project | Reset | Cancel 850  832  834  836  838

FIG. 46

```
                                            ← 860
┌─────────────────────────────────────────────────┐
│ (?)         Casting Breakdown Manager      − ☒ │
├─────────────────────────────────────────────────┤
│ Project Name: [          ]  Casting ID: [     ] │
│      Send To: [                               ] │
│                                                 │
│  Project Class: [        ]    Rate: [         ] │
│  Project Media: [        ]    Markets: [      ] │
│ Shooting Dates: [        ]    Coverage: [     ] │
│  Production Co: [        ]    RC Room: [      ] │
│  Audition Dates:[        ]    CallBack Dates:[ ]│
│      Locations: [        ]    Casting Status:[ ]│
│  Sub. Deadline: [        ]    Deadline: [     ] │
│        Director:[        ]    Reel ID: [      ] │
│Casting Director:[        ]    Reel ID: [      ] │
│  Casting Assist.:[       ]    Reel ID: [      ] │
│   Contact Info: [       ] [                  ]  │
│    Auditions at: [⊕ Map This]  City: [         ]│
│  Key Notes Info:[                              ]│
├─────────────────────────────────────────────────┤
│ Project Name:                                   │
│ Storyline:                                      │
│ [                                          ▲]   │
│ [                                           ]   │
│ [                                          ▼]   │
├─────────────────────────────────────────────────┤
│ Character Description:                          │
│ ┌Name (Role)──────────┐ ┌Gender─┐ ┌Age Range─┐ │
│ │                    ▲│ │       │ │          │ │
│ │       866           │ │       │ │          │ │
│ │              870    │ │       │    868     │ │
│ │                    ▼│ │       │ │          │ │
│ └─────────────────────┘ └───────┘ └──────────┘ │
│ [Script Breakdown (PDF) Pages:] [Edit]  Accept☐ Decline☐│
│ [Download][Select Format▼][Print][Save][Select Submission Method▼][Post Audition]│
└─────────────────────────────────────────────────┘
  /        /         /    /              /          /   \
 872      874       876  878           880        882   864
```

Casting Breakdown Manager

| | |
|---|---|
| Project Name: | Casting ID: |
| Send To: | |
| Project Class: | Rate: |
| Project Media: | Markets: |
| Shooting Dates: | Coverage: |
| Production Co: | RC Room: |
| Audition Dates: | CallBack Dates: |
| Locations: | Casting Status: |
| Sub. Deadline: | Deadline: |
| Director: | Reel ID: |
| Casting Director: | Reel ID: |
| Casting Assist.: | Reel ID: |
| Contact Info: | |
| Auditions at: [Map This] | City: |
| Key Notes Info: | |

Project Name:
Storyline:

Character Description:

| Name (Role) | Gender | Age Range |
|---|---|---|
| | | |

Accept ☐   Decline ☐

Script Breakdown (PDF) Pages:         View Submissions:

| | 1218 | 1220 | |
|---|---|---|---|

Good Afternoon ⊞ Recording Your IP ⊞ writeLoginStatus(); ? > ⊞ ⊞ Friday, January 17, 2003 12:56:54 PM writeLoginLogout()? >

Global Network

☐ Production Room ☐ Main Profile Area ☐ Access Date ☐ Friday, January 17, 2003 12:56:54 PM Search Member by Reel-ID ↑

Enter Project Number ↑

Login Required

[Edit] [✗] Summary-History Information

A research project from the University of British Columbia based in the use of documentary techniques and multimedia tools to enhance the learning experience.

[Edit] [✗] Contact Information

Our online work is constantly under construction because we update the site accordingly with the new developments of the research.

Contact us and learn how you can participate!

Member since January, 2002

[Edit] ☐ RGN Events

⊞ Conference Rooms
⊞ On Location
⊞ Rumors & Lies
⊞ Showcase Galleries
⊞ Sponsored Events
⊞ This Week in ET isLoggedIn(){? >

Copyright © 1999-2002 CanOnline Global Media Inc. (USA) All Rights Reserved. All other trademarks, images and other indications of intellectual property rights are the property of their respective rightful owners.

[Publish]

Figure 86:
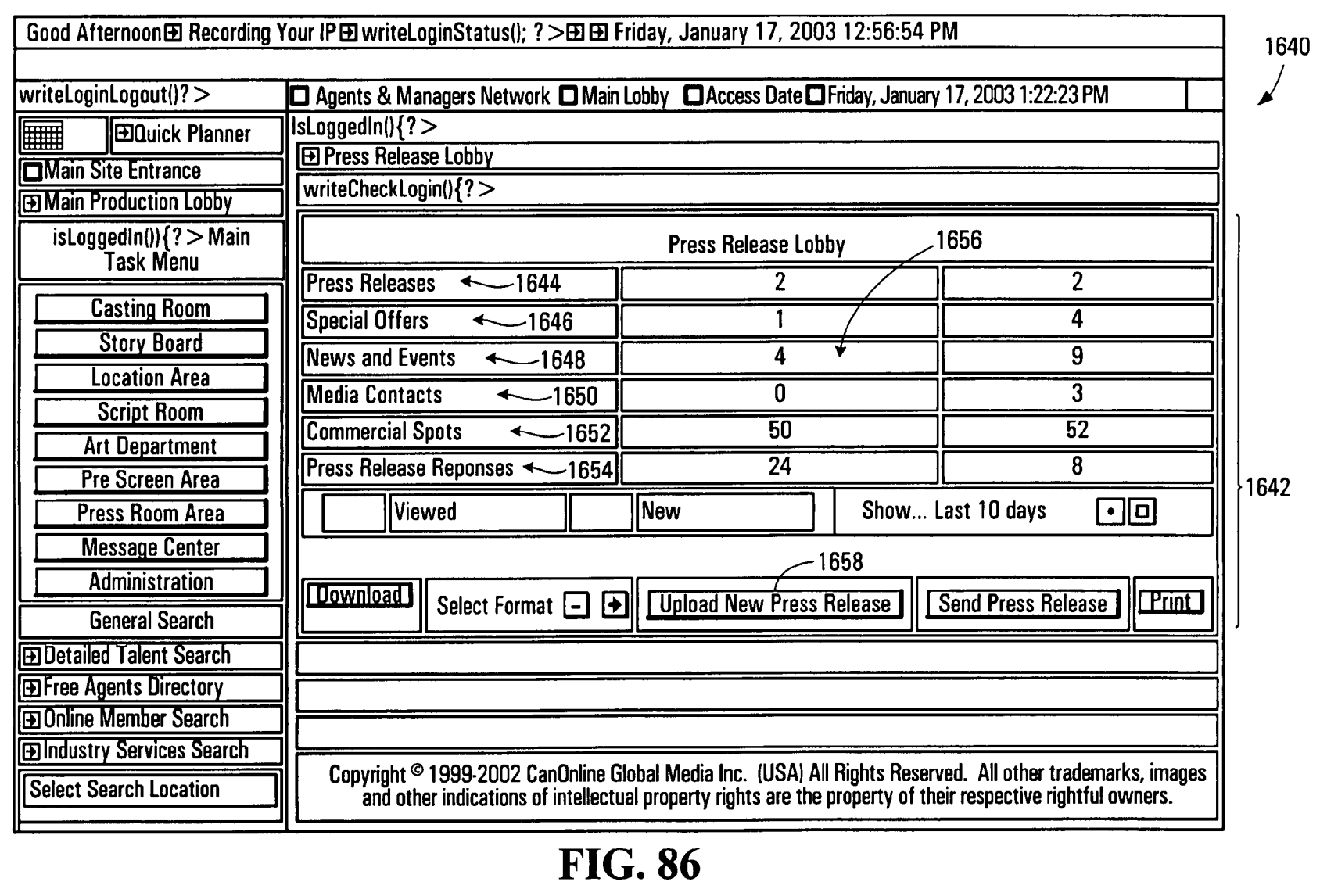

| | Press Release Lobby 1656 | |
|---|---|---|
| Press Releases — 1644 | 2 | 2 |
| Special Offers — 1646 | 1 | 4 |
| News and Events — 1648 | 4 | 9 |
| Media Contacts — 1650 | 0 | 3 |
| Commercial Spots — 1652 | 50 | 52 |
| Press Release Reponses — 1654 | 24 | 8 |

| Contact Name | | Occupation |
|---|---|---|
| Owen Jorta | General Info | Director |
| Darryl Landa | Directors Unit | Writer |
| Trent Spinder | Writers Unit | Narrator |
| Dan Deman | Cast | Supporting Actor |
| Brian J. Ellis | Cast | Unit Production Manager |
| Anne McCaffrey | Production Staff | Assistant Production Manager |
| Diane Hughes | Production Staff | Production Designer |
| Michael E. Allegretto | Art Director | Set Decorator |
| Bob Berry | Set Decoration | Director of Photography |
| Susan A. Campbell | Camera Operations | Camera Operator |

FIG. 88B

Good Afternoon⊕ Recording Your IP ⊕ writeLoginStatus(); ? > ⊕ ⊕ Friday, January 17, 2003 12:56:54 PM writeLoginLogout()? >

- ⊕ Products & Merchandising
- ⊕ Rumors & Lies
- ⊕ Reelbuilder Web Creator
- ⊕ Site Conference Rooms
- ⊕ Showcase Galleries
- ⊕ Travel Arrangements
- Registration Services
- ⊕ General Information Area ☐ Industry Services Directory    ☐ Search Engine    ☐ Results Displayed Summary - History Information                                                            ⎫
                                                                                          ⎬ 1690
- The Fourth Largest City in America - with the second largest port in the country,      ⎭
  Houston offers a vast selection of locations from small farming towns to heavy industry
  to ultramodern metropolis.
- State Sales Tax Exemptions - Anything used directly in the process of film production,
  purchases or rentals, are exempt from state and local sales tax.
- Hotel Tax Exemptions - Any production stay in a hotel for 30 consecutive days or more
  is exempt from state and local sales tax.
- Moderate Weather - Houston boasts very mild winters which makes shooting winter for
  summer a breeze.
- Permit Free - Houston does not require permits for filming, just a quick and easy registration.
- Location Photos - We provide location scouting services to find the locations your film
  project requires.
- Houston Production Guide - Our printed and online resource directory for the film/video
  industry in Houston.
- Production Hotline - 713-227-1407. 24hr. Recording of productions in Houston.
- Feature Productions - Pearl Harbour, Space Cowboys, Arlington Road, Rushmore, Rocket Man,
  Evening Star, Tin Cup, Lolita, Powder, Apollo 13 and many more.

Member since    March 2002 member last updated    Wednesday, May 29, 2002 4:41PM Copyright © 1999-2002 CanOnline Global Media Inc. (USA) All Rights Reserved. All other trademarks, images and other indications of intellectual property rights are the property of their respective rightful owners.

Good Afternoon ⊞ Recording Your IP ⊞ writeLoginStatus(); ? > ⊞ Friday, January 17, 2003 12:56:54 PM
writeLoginLogout()? >   ☐ Showcase Gallery  ☐ Gallery Area  ☐ Access Date  ☐ Thursday, January 16, 2003 9:10:18 AM ⊞ Quick Planner         ⊞ Main Profile Area
☐ Main Site Entrance
⊞ Main Showcase Gallery
isLoggedIn()? > Main    1708   writeCheckLogin(){? >
Task Menu                      Task Function Menu
  Film Gallery          ▶ Profile Administration  ▶ My Video Gallery  ▶ Invitations  ▶ Sub Function Controls
  TV Gallery            ▶ Message Center          ▶ My Photo Gallery  ▶ Contacts     ▶ Sub Function Controls
  Music Gallery
  Arts & Entertainment                          Production reel-ID  10066
  Animation Gallery                             Project initials     explorers
        General Search                          External website    www.merlin.ubc.ca
⊞ Edit  ⊞ Main Showcase Lobby                   Primary email       merlinlab@reelindie.com
⊞ Industry Services Search
Select Search Location        University of British Columbia Media Explorers    Edit x Project Information
Global Network ☐              Research Project MERLin Lab
Search Member by Reel-ID ⬆                                                      ▶Online   In Research Since    April, 2001
                              Edit x Primary Crew Information                   ▶Online   Grant Information    TLF (USA), TLC (Canada),
Enter Project Number     ⬆    Production Unit   Pat Little (admin)(20136)                                       CONACYT (Mexico)
                              Direction Unit    Owen Deman (20137)              ▶Online   Total Research Staff 12
                              Production Staff  Darryl Brown (20142)
                              Art Unit          Brenda Lebrisco (20112)         ▶Online
                              Technical Unit    Hugo Dorantes (20124)
Login Required

FIG. 99B

Good Afternoon ⊞ Recording Your IP ⊞ writeLoginStatus(); ? > ⊞ ⊞ Friday, January 17, 2003 12:56:54 PM writeLoginLogout(); ? >

| ⊞ Quick Planner | ☐ Showcase Gallery ☐ Gallery Area ☐ Access Date ☐ Thursday, January 16, 2003 9:21:30 AM |
|---|---|

☐ Main Site Entrance | ⊞ Main Profile Area
⊞ Main Showcase Gallery isLoggedIn(){? > Main — writeCheckLogin(){? >
Task Menu — Task Function Menu

| | ▲ |
|---|---|
| ▶ Profile Administration | ▶ My Video Gallery ▶ Invitations ▶ Sub Function Controls |
| ▶ Message Center 1854 | ▶ My Photo Gallery ▶ Contacts ▶ Sub Function Controls |

1852  1706

Film - Forums

| Topic Title 1860 | Created By | Latest By | Latest Posted | Replies |
|---|---|---|---|---|
| ⊞ Trends of Film Today | Jeff | Howard | 2 days ago | 3 |
| ⊞ Stay away from... ⎬1858 Bob | Jeff | 4 days ago | 1 |
| ⊞ Help Needed | John | Bob | 1 day ago | 2 |
| ⊞ Night shooting | Mark | Mary | 3 days ago | 3 |
|  1856 | | ⊞ View Entire List | | |

TV - Forums

| ⊞ New Season | Jeff | Howard | 2 days ago | 3 |
| ⊞ The correct choice | Howard | Jenny | 4 days ago | 2 |
| ⊞ Reelindie | Mark | Jill | 5 days ago | 3 |
| ⊞ Test | Steward | Mary | 2 days ago | 1 |

Film Gallery
TV Gallery
Music Gallery
Arts & Entertainment
Animation Gallery

☐ Edit | General Search
⊞ Main Showcase Lobby
⊞ Industry Services Search

Select Search Location
Global Network ☐
Search Member by Reel-ID ☐ ⬆
Enter Project Number ⬆

Login Required

Order CD Portfolio — 2162

Order CD Portfolio

Select Portfolio Options — 2164
Package type - select the CD Portfolio package you would like to order.
[View Packages] ☐ P0 ☐ P1 ☐ P2
2172

Format - Select one CD format for your Portfolio.
[View Formats] ☐ f0 ☐ f1 ☐ f2
2176

Template - Select one visual Template for your CD Portfolio.
[View Templates] ☐ t0 ☐ t1 ☐ t2 ☐ t3 ☐ t4
2180

Intro Music - Select one Music track for use in your intro animation.
[Listen] ☐ M0 ☐ M1 ☐ M2 ☐ M3 ☐ M4 ☐ M5 ☐ M6 ☐ M7 ☐ M8 ☐ M9

Select Media — 2166
[Menu Photos] [Image Gallery] [Print Gallery] [Media Gallery]

Order Additional Copies - Enter the number of additional copies you want to order for each format.
[View Pricing]   Additional CDs: [0]                               — 2168
2192            Additional MiniCDs: [0]
                Additional BizCards: [0]

Shipping Information - How would you like us to ship your order?

Shipping Method: [▼]
Other: [          ]
☐ I will include a prepaid shipping form in my source materials
Account Number: [          ]
Name of Account Holder: [          ]
Address 1: [          ]
Address 2: [          ]                                          — 2170
City: [          ]
State/Prov. (If in North America): [▼]
Other (Outside North America): [          ]
Country: [▼]
Zip/Postal Code: [          ]
Other: [          ]
Delivery Method: [▼]
Delivery Date: [          ]

[Cancel] [Next]

FIG. 123

CD Portfolio Packages

| Features | Packages | | |
|---|---|---|---|
| | CD Compcard | CD Portfolio | CD Portfolio Pro |
| Custom CD Label/Cover | Label | Label | Label + Cover |
| Flash-animated intro with music | Flash Intro | Flash Intro + your photos | Flash Intro + your photos + Your music |
| Printable resume/document | yes | yes | yes |
| High-resolution, printable photos | 2 | 4 | 8 |
| Expandable, viewable photos | Up to 4 | Up to 10 | Up to 16 |
| Video clips, maximum 5-minutes each | Up to 2 | Up to 5 | Up to 10 |
| Audio/voiceover clips, maximum 5-min. each | Up to 3 | Up to 5 | Up to 10 |
| 1-year membership to the reelindie global network | yes | yes | yes |
| Link from your CD to online reelindie portfolio* | yes | yes | yes |
| Web version on your CD as "Extended portfolio"** | yes | yes | yes |
| Automatic addition to your agent's online roster (if agent is member) | yes | yes | yes |
| Reelpager instant messaging | yes | yes | yes |
| Custom email (yourname@reelindie.net) | yes | yes | yes |
| # of CDs included (PC/Mac compatible)*** | 5 | 10 | 20 |
| Price: | US $89.95 CAD $135.95 | US $149.95 CAD $225.95 | US $199.95 CAD $299.95 |
| Set up fee: | included | included | included |
| Upgrade to MiniCD format, add: | US $12.95 CAD $19.95 | US $24.95 CAD $39.95 | US $49.95 CAD $79.95 |
| Upgrade to Business Card format, add: | US $19.95 CAD $29.95 | US $39.95 CAD $59.95 | US $79.95 CAD $119.95 |

*Requires user to be connected to the internet
**Web versions of media clips are limited to 30 seconds each
***Additional CD duplications available upon request
Our CD packages are customizable to suit the needs of any individual or business.
For more information call reelindie member services at 604-691-1790

CD Portfolio Pricing

Additional CD duplications

| 1 - 15  | US $3.99 CAD $5.99 each |
|---------|-------------------------|
| 16 - 25 | US $2.49 CAD $3.99 each |
| 26 - up | US $1.49 CAD $2.49 each |

Additional MiniCD duplications

| 1 - 15  | US $3.99 CAD $5.99 each |
|---------|-------------------------|
| 16 - 25 | US $3.49 CAD $5.29 each |
| 26 - up | US $1.99 CAD $2.99 each |

Additional CD business card duplications

| 1 - 15  | US $5.49 CAD $8.49 each |
|---------|-------------------------|
| 16 - 25 | US $4.99 CAD $7.49 each |
| 26 - up | US $2.99 CAD $4.49 each |

FIG. 128

METHOD AND APPARATUS FOR PRESENTING MULTIMEDIA CONTENT AND FOR FACILITATING THIRD PARTY REPRESENTATION OF AN OBJECT

CROSS-REFERENCE TO RELATED APPLICATION

This application claims priority to U.S. Provisional Patent Application No. 60/444,672, filed Feb. 4, 2003, which is incorporated herein by reference in its entirety.

BACKGROUND OF THE INVENTION

1. Field of Invention

The subject disclosure relates to methods and apparatus for converting objects in one programming environment into objects in a different environment and to modules downloaded from servers for providing multimedia functionality to clients.

In one aspect the invention relates to presenting multimedia content and more particularly to presenting multimedia content residing at a first computer, using a restricted access program executing on the first computer, the restricted access program having restricted access to the multimedia content at the first computer and having access to a resource at the second computer in communication with the first computer.

In another aspect the invention relates to methods and apparatus facilitating representation of an object by a third party, for example representation of a performer by an agent to find the performer work with a casting director.

2. Description of Related Art

Object-oriented programming (hereinafter "OOP") is a computer programming methodology that uses objects to modularize a computer program. OOP can be utilized in many computer programming languages such as C++, C#, Java, Smalltalk, Object Pascal and the like. Each object is capable of receiving messages and sending messages to other objects and the user accesses desired objects via an interface in a manner independent from the internal structure of the object. Several basic operations are typically performed by object-oriented programmers including abstraction, encapsulation, polymorphism, inheritance and the like.

In object-oriented programming, programmers concentrate on distributing responsibility over objects, which is in contrast to the view in traditional programming where programmers are focused on the steps of the process to produce certain results. The use of object-oriented programming makes programs easier to write, maintain, reuse and prove correct. Object-oriented programming is also well suited for applications that utilize a graphical user interface ("GUI") with the programmers. As a result, object-oriented programming has been the dominant programming methodology since the mid-1980s. As languages such as C++ and Java have proliferated, the use of object-oriented programming has become ubiquitous.

Object-oriented programming languages can be classified into different constructs. A strongly-typed programming language construct is one in which each type of data is either predefined as part of the programming language or explicitly defined by the programmer as a collection of predefined data types and/or other explicitly defined data types. All constants or variables defined for a given program must be described with one of the data types, and certain operations may be allowable only with certain data types as specified in the definition of the data types. During compiling, the compiler enforces the data typing and use compliance. Moreover, programmers have no language-level way to disable or evade the established type system. As a result, rules are effectively enforced upon programmers and thus results are more consistent. Many programmers desire flexibility beyond what strongly typed programming constructs afford and, therefore, some prefer weakly typed programming constructs that allow creativity in using a given data type.

There are several other features that can be used to describe strongly versus weakly typed. A language would be referred to as strongly typed if type annotations are associated with variable names, rather than with values. If types are attached to values, it is weakly typed. Other examples of indications of strongly typed include compile-time checks for type constraint violations. If checking is deferred to run time or none is done[2], the language may be referred to as weakly typed. Still further, a language may be referred to as strongly typed if conversions between different types are forbidden and if such conversions are allowed, the language may be referred to as weakly typed. A language may be referred to as strongly typed if conversions between different types must be indicated explicitly. Conversely, if implicit conversions are performed, the language may also be referred to as weakly typed.

In view of the above, programmers need to explicitly write conversion code to translate all weakly typed objects into a format that is acceptable for use in a strongly typed construct and vice versa. It is apparent that objects of weakly typed programming constructs often cannot easily be utilized with strongly typed one. It would be beneficial to allow programmers to take advantage of objects without regard to the construct in which formation occurred or having to explicitly write conversion code. Thus, there is a need for a system that converts weakly typed objects for use in a strongly typed environment and vice versa.

Recent developments in computing technology have given rise to the development of streaming technologies in which files such as multimedia files comprising audio, video or pictures, for example, are transmitted to a remote computer for presentation at such computer. Streaming files generally start executing, or are presented, in such a manner that a beginning of the file is presented before the entire file is received at the remote computer. Complete files are not downloaded and stored at the remote computer before being shown as occurs with most non-streaming file formats.

To be able to present a streaming file at a remote computer the remote computer is usually configured with a player operable to receive and present streaming material. The player, however, and the streaming file itself, often have restricted access to the computing resources of the remote computer and more particularly have restricted access to certain portions of the memory of the remote computer. Generally, these files have access to an output buffer, such as a display buffer, for example, and are not permitted to access user-defined folders or directories, for example, at the remote computer.

Current methods for representing an object by a third party include a conventional sales-representative arrangement, whereby a sales representative represents goods or services to be sold or may include a conventional talent agent relationship. Sales representatives either remember or have records specifying details of features of particular objects or services they sell. Sales representatives may solicit potential purchasers of these objects or services, in person by letter or by email, for example, in an attempt to sell the objects or services to potential purchasers. Similarly, talent agents may remember or have records of features of certain performers and may try to sell these features to casting directors, or other entertainment, advertising or media industry representatives.

To keep track of the goods or services offered by a sales representative or to keep track of the talent a talent agent represents, written records or computerized records are conventionally used. Computerized records may be of a type found in Microsoft Outlook® for example. Systems such as Microsoft Outlook® are able to keep certain fixed-form information and certain free-form information about business and personal contacts. Gathering information about contacts that satisfies a common set of requirements, however, can be time-consuming and is not well-suited for fast compilation of a group of contacts, for example, or for fast compilation of multiple groups with different requirements. Consequently the use of contact management programs for managing the marketing of goods and/or services such as talent can be time-consuming and inefficient.

SUMMARY OF THE INVENTION

In a preferred embodiment, a mapping method is disclosed for converting objects in order to optimize utilization of a programming environment on an associated platform includes the steps of identifying a strongly typed object and a type of conversion. A name of a weakly typed object is based upon an attribute associated with a target object and reflection is used on the strongly typed object to obtain properties of the object input parameter. Default names are assigned and stored based upon the obtained properties in a dictionary cache. The dictionary cache is used to complete attributes associated with new object for use in the programming environment.

In addition, the subject disclosure is directed to a method for converting objects representing structured data input. The method examines, during runtime by reflection, attributes associated with an object for runtime information about code symbols, wherein the attributes have tags that add descriptions to the code symbols, and converts the object associated with the code symbols based upon a result of the reflection, wherein the attributes include at least one attribute having a plurality of attribute parameters that specify how a conversion on the object is to be done.

The present disclosure is directed to a method for converting properties and fields of a class of methods implemented in one programming environment or framework to another. The method may involve associating custom attributes with a method in a first programming environment and using said custom attributes to control a conversion of said respective properties and fields of said method to produce a second method in a second programming environment, said second method having properties and fields derived from said properties and fields of said method in said first programming environment.

In another embodiment, a mapping method ascertaining attributes related to objects in order to optimize utilization of a programming environment on an associated platform. The mapping method includes receiving an object input parameter that identifies a strongly typed object involved in a conversion process and an iswritemode input parameter that identifies a type of conversion. An astype output parameter is set based upon an attribute associated with a target object, wherein the astype output parameter indicates a name of a weakly typed object. By using reflection on the strongly typed object, a first list that represent properties of the object input parameter is obtained. The first list is filtered to include only readable and writable properties to create a first subset of the first list. Default names are assigned and stored based upon the first subset in a dictionary cache along with a class name and the iswritemode input parameter. By using reflection on the strongly typed object, a second list of fieldinfo objects associated with the object input parameter is obtained. The second list is filtered to create a second subset of the second list based upon criteria. If the iswritemode input parameter is true, then filtering the second subset to create a third list that includes only fieldinfo objects that represent fields that have an associated ActionScript attribute with an Access property set to Write or Both. If the iswritemode input parameter is false, then filtering the second subset to create a third list that includes only those fieldinfo objects that represent fields that have an associated ActionScript attribute with the Access property set to Read or Both. Names are assigned for each FieldInfo object in the third list and stored for each FieldInfo object along with its associated FieldInfo object in a dictionary cache. The dictionary cache is used to complete attributes associated with the target object.

Another embodiment is a method for converting values associated with a weakly typed object into properties associated with a strongly typed object in accordance with a strongly typed framework. The method creates the strongly typed object and determines the properties according to the attribute parameters associated with the strongly typed object by reflection. The properties of the strongly typed object are populated based upon the values associated with the weakly typed object.

It is an object of the subject disclosure to provide a conversion mechanism between a server programming environment (such as the .NET Framework, or Java J2EE) and a Flash Remoting environment that uses a declarative programming construct (i.e., the "attribute") in order to achieve conversion.

It is an object of the subject disclosure to provide a general conversion mechanism between a strongly typed objects and a weakly typed object represented by a dictionary structure that uses a declarative programming construct in order to achieve its conversion.

It is an object of the subject disclosure to provide an ASConverter AccessMode feature that enables the conversion process to target different fields and/or properties, depending on the direction of the conversion. As a result, programmers maintain the data-hiding principle behind object-oriented programming (e.g. allowing for a property to give read-only access to a field).

It is an object of the subject disclosure to provide an ASConverter Keyword feature that enables selective conversion of fields and properties, to limit the size of the conversion output. As a result, network communication transfer rates are optimized by limiting the size of the conversion output transferred through the network.

It is an object of the subject disclosure to provide a renaming feature that allows the consumer of conversion output to use naming conventions that are natural to the consumer.

It is still another object of the subject disclosure to provide a an ASConverter AccessMode feature that enables the conversion process to target different fields and/or properties, depending on the direction of the conversion. This feature allows programmers to maintain the data-hiding principle behind object-oriented programming (e.g. allowing for a property to give read-only access to a field, while allowing the property and field to participate fully in the conversion).

In accordance with one aspect of the invention, there is provided a method of presenting multimedia content residing at a first computer, using a restricted access program executing on the first computer, the restricted access program having restricted access to the multimedia content at the first computer and having access to a resource at a second computer in communication with the first computer. The method involves using the restricted access program to request from the second computer a set of computer-readable instructions operable to cause the first computer to transmit the multimedia content to the resource at the second computer accessible by the restricted access program, receiving and executing the set of computer-readable instructions at the first computer, and causing the restricted access program to access the resource at the second computer to cause the multimedia content to be presented at the first computer.

Using the restricted access program to request from the second computer may involve producing a uniform resource locator identifying a server page at the second computer.

Producing the uniform resource locator may involve producing the uniform resource locator in response to a login ticket or producing the uniform resource locator in response to an access key.

Using the restricted access program may involve using the uniform resource locator to access a server page at the second computer.

Receiving the set of computer-readable instructions may involve receiving at the first computer a dynamic web page from the second computer.

Executing the set of computer-readable instructions may involve causing a browser executing on the first computer to display the dynamic web page.

Executing the set of computer-readable instructions may involve receiving user input to identify a memory location at the first computer, at which the multimedia content is stored.

Executing the set of computer-readable instructions may involve receiving user input to identify at least one of a create, edit and delete function.

Executing the set of computer-readable instructions may involve receiving user input to identify the multimedia content to be uploaded to the second computer.

The method may further involve receiving user input to identify a memory location at the second computer, at which identified multimedia content at the first computer is to be stored.

The method may further involve causing the first computer to transmit identified multimedia content to the resource accessible by the restricted access program at the second computer.

Causing the first computer to transmit may involve transmitting from the first computer to the second computer an HTTP request comprising a content file name, at least one of an access key and login ticket, a multipurpose internet mail extensions type and a plurality of mixed-object native and object-transformed file types.

The method may further involve compressing the multimedia content prior to transmitting.

The method may further involve communicating from the set of instructions to the restricted access program an identification of the multimedia content transmitted to the second computer.

Causing the restricted access program to access the multimedia content at the second computer may involve transmitting to the second computer a uniform resource locator identifying a location at the second computer, where the multimedia content is stored.

Causing the restricted access program to access the multimedia content may involve receiving at the first computer the multimedia content from the second computer.

The method may further involve presenting the multimedia content at the first computer and this may involve displaying the multimedia content at the first computer and/or playing the multimedia content at the first computer.

In accordance with another aspect of the invention, there is provided an apparatus for presenting multimedia content. The apparatus includes a first computer comprising a processor circuit, a memory operable to store multimedia content, and a program memory operable to store computer-readable codes for directing the processor circuit to perform functions. A first set of computer readable codes in the program memory is operable to direct the processor circuit to have access to a resource at a second computer in communication with the processor circuit, the first set of computer readable codes having restricted access to the multimedia content. The first set of computer readable codes is operable to direct the first processor circuit to request from the second computer a second set of computer-readable codes operable to cause the processor circuit to transmit the multimedia content to the resource at the second computer. The processor circuit is operable to receive and execute the second set of computer readable codes to cause the processor circuit to transmit the multimedia content to the resource at the second computer such that the first set of computer readable codes has access to the multimedia content to permit the multimedia content to be presented at the first computer while the multimedia content is stored at the resource.

The first set of computer readable codes may be operable to cause the processor circuit to produce a uniform resource locator identifying a server page at the second computer.

The first set of computer readable codes may cause the processor circuit to produce the uniform resource locator in response to a login ticket.

The first set of computer readable codes may cause the processor circuit to produce the uniform resource locator in response to an access key.

The first set of computer readable codes may cause the processor circuit to use the uniform resource locator to access a server page at the second computer.

The second set of computer-readable instructions may include a dynamic web page.

The apparatus may further include a browser executing on the processor circuit, the browser causing the processor circuit to display the dynamic web page.

The second set of computer readable codes may cause the processor circuit to receive user input to identify a memory location at the first computer, at which the multimedia content is stored.

The second set of computer readable codes may cause the processor circuit to receive user input to identify at least one of a create, edit and delete function.

The second set of computer readable codes may cause the processor circuit to receive user input to identify the multimedia content to be uploaded to the second computer.

The second set of computer readable codes may cause the processor circuit to receive user input to identify a first memory location at the second computer, at which identified multimedia content at the first computer is to be stored.

The second set of computer readable codes may cause the processor circuit to transmit identified multimedia content to the resource.

The first set of computer readable codes may cause the processor circuit to transmit from the first computer to the second computer an HTTP request, comprising a content file name, at least one of an access key and login ticket, a multipurpose internet mail extensions type and a plurality of mixed-object native and object-transformed file types.

The first set of computer readable codes may cause the processor circuit to compress the multimedia content prior to transmitting.

The second set of computer readable codes may cause the processor circuit to communicate from the second set of computer readable codes to the first set of computer readable codes an identification of the multimedia content transmitted to the second computer.

The first set of computer readable codes may cause the processor circuit to transmit to the second computer a uniform resource locator identifying the first location at the second computer, where the multimedia content is stored.

The first set of computer readable codes may cause the processor circuit to receive at the first computer the multimedia content from the second computer.

The first set of computer readable codes may cause the processor circuit to present the multimedia content at the first computer.

The first set of computer readable codes may cause the processor circuit to display the multimedia content at the first computer.

The first set of computer readable codes may cause the processor circuit to play the multimedia content at the first computer.

In accordance with another aspect of the invention, there is provided an apparatus for presenting multimedia content. The apparatus includes a first computer comprising a processor circuit, a memory operable to store multimedia content, and a program memory operable to store computer readable codes for directing the processor circuit to perform functions. The computer readable codes include a restricted access program having restricted access to the multimedia content at the first computer and having access to a resource at a second computer in communication with the processor circuit. The program memory includes provisions for causing the restricted access program to request from the second computer a set of computer readable instructions operable to cause the first computer to transmit the multimedia content to the resource at the second computer and the program memory includes provisions for receiving and executing the set of computer readable instructions at the first computer. The program memory further includes provisions for causing the restricted access program to access the resource at the second computer to cause the multimedia content to be presented at the first computer.

In accordance with another aspect of the invention, there is provided a computer readable medium comprising codes for directing a processor circuit to carry out the method and variations thereof described above.

In accordance with another aspect of the invention, there is provided a signal encoded with computer readable codes for directing a processor circuit to carry out the method and variations thereof described above.

In accordance with one aspect of the invention, there is provided a method of facilitating third party representation of an object. The method involves maintaining a database of structured and unstructured data associated with a plurality of objects, the database being accessible through a computer. The method further involves facilitating communications between the computer and a first communications appliance having a first set of access criteria to permit an operator of the first communications appliance to create, modify or delete the structured and unstructured data for at least some of the objects, facilitating communications between the computer and a second communications appliance having a second set of access criteria to permit an operator of the second communications appliance to group into a package the structured and unstructured data for at least some of the objects, and facilitating communications between the computer and a third communications appliance having a third set of access criteria to permit the structured and unstructured data for at least some of the objects in the package to be presented to an operator at the third communications appliance.

The first, second and third sets of access criteria may be different from each other.

The first set of access criteria may include an identification identifying an operator of the first communications appliance as a first type of operator, the second set of access criteria may include an identification identifying an operator of the second communications appliance as a second type of operator and the third set of access criteria may include an identification identifying an operator of the third communications appliance as a third type of operator.

Facilitating communications between the computer and the first communications appliance may involve transmitting at least one remoting environment program module from a first group of program modules to the first communications appliance. The at least one remoting environment program module from the first group may be operable to cause an object profile to be displayed at the first communications appliance and populated with structured and unstructured data from the database.

The at least one remoting environment program module from the first group may be operable to cause the first communications appliance to receive operator input and communicate the operator input to the computer to cause the computer to cause the structured and unstructured data at the database to be created, modified or deleted.

Facilitating communications between the computer and the second communications appliance may involve transmitting at least one remoting environment program module from a second group of program modules to the second communications appliance. The at least one remoting environment program module from the second group may be operable to cause the second communications appliance to receive operator input to cause the second communications appliance to communicate with the computer to cause at least some of the structured and unstructured data associated with at least one object to be presented at the second communications appliance.

The at least one remoting environment communications module from the second group may be operable to cause the second communications appliance to simultaneously display at least some of the unstructured data associated with at least two objects to permit operator-comparison of the unstructured data.

Simultaneously displaying at least some of the unstructured data may involve displaying thumbnail views of pictures defined by the unstructured data.

The at least one remoting environment communications module from the second group may be operable to cause the second communications appliance to receive operator input identifying structured and unstructured data associated with at least one object to be grouped into the package.

The at least one remoting environment communications module from the second group may be operable to cause the second communications appliance to group identified structured and unstructured data associated with at least one object into the package.

The at least one remoting environment communications module from the second group may be operable to cause the second communications appliance to transmit an identification of structured and unstructured data in the package to the third communications appliance.

The at least one remoting environment communications module from the second group may be operable to cause the second communications appliance to receive and associate with the package an expiry time after which the package is no longer presentable at the third communications appliance.

Facilitating communications between the computer and the third communications appliance may involve transmitting at least one remoting environment program module from a third group of program modules to the third communications appliance. The at least one remoting environment program module from the third group may be operable to cause the third communications appliance to receive operator input to cause the third communications appliance to receive from the computer structured and unstructured data associated with at least one object, in the package, and to cause the structured and unstructured data associated with the at least one object to be presented at the third communications appliance.

The at least one remoting environment program module from the third group may be operable to cause the third communications appliance to receive operator input identifying a list of requirements of a desired object and communicate the list of desired requirements to the computer for communication to the second communications appliance.

Facilitating communications between the computer and the second communications appliance may involve transmitting at least one remoting environment program module from a second group of program modules to the second communications appliance. The at least one remoting environment program module from the second group may be operable to cause the second communications appliance to communicate with the computer to receive and display at the second communications appliance an object profile populated with structured and unstructured data from the database.

The at least one remoting environment program module from the second group may be operable to cause the second communications appliance to receive operator input and communicate the operator input to the computer to cause the computer to cause the structured and unstructured data at the database to be created, modified or deleted.

The at least one remoting environment program module from the third group may be operable to cause the third communications appliance to facilitate selection of structured and unstructured data from a plurality of different objects from a plurality of different packages.

The method may involve associating an operator of the first communications appliance with an object and associating an operator of the second communications appliance with the object and notifying the operators of the first and second communications appliances of selection by an operator of the third communications appliance of the object with which they are associated.

In accordance with another aspect of the invention, there is provided an apparatus for facilitating third party representation of an object. The apparatus includes a computer having access to a database operable to store structured and unstructured data. The apparatus further includes first provisions for facilitating communications between the computer and a first communications appliance having a first set of access criteria to permit the structured and unstructured data for at least some of the objects to be created, modified or deleted by an operator of the first communications appliance, second provisions for facilitating communications between the computer and a second communications appliance having a second set of access criteria to permit the structured and unstructured data for at least some of the objects to be grouped into a package by an operator of the second communications appliance, and third provisions for facilitating communications between the computer and a third communications appliance having a third set of access criteria to permit the structured and unstructured data for at least some of the objects in the package to be presented to an operator of the third communications appliance.

In accordance with another aspect of the invention, there is provided an apparatus for facilitating third party representation of an object, the apparatus including a computer having access to a database operable to store structured and unstructured data. The apparatus further includes a first communications facility facilitating communications between the computer and a first communications appliance having a first set of database access criteria to permit the structured and unstructured data for at least some of the objects to be created, modified or deleted by an operator of the first communications appliance, a second communications facility facilitating communications between the computer and a second communications appliance having a second set of access criteria to permit an operator of the second communications appliance to group the structured and unstructured data for at least some of the objects into a package, and a third communications facility facilitating communications between the computer and a third communications appliance having a third set of access criteria to permit the structured and unstructured data for at least some of the objects in the package to be presented to an operator at the third communications appliance.

The first, second and third sets of access criteria may be different from each other.

The first set of access criteria may include an identification identifying an operator of the first communications appliance as a first type of operator, the second set of access criteria may include an identification identifying an operator of the second communications appliance as a second type of operator and the third set of access criteria may include an identification identifying an operator of the third communications appliance as a third type of operator.

The computer may be operable to access a first group of remoting environment program modules and the first communications facility may be operable to cause the computer to transmit at least one of the remoting environment program modules from the first group to the first communications appliance. The at least one remoting environment program module from the first group may be operable to cause the first communications appliance to display an object profile populated with structured and unstructured data from the database.

The at least one remoting environment program module from the first group may be operable to cause the first communications appliance to receive operator input and communicate the operator input to the computer to cause the computer to create, modify or delete the structured or unstructured data at the database.

The computer may have access to a second group of remoting environment program modules and the second communications facility may be operable to transmit at least one remoting environment program module from the second group of program modules to the second communications appliance. The at least one remoting environment program module from the second group may be operable to cause the second communications appliance to receive operator input and communicate the operator input to the computer to cause the computer to cause at least some of the structured and unstructured data associated with at least one object identified by the operator input to be presented at the second communications appliance.

The at least one remoting environment communications module from the second group may be operable to cause the second communications appliance to simultaneously display at least some of the unstructured data associated with at least two objects to permit operator-comparison of the unstructured data.

The at least one remoting environment communications module from the second group may be operable to cause the second communications appliance to display thumbnail views of pictures defined by the unstructured data.

The at least one remoting environment communications module from the second group may be operable to cause the second communications appliance to receive operator input identifying structured and unstructured data associated with at least one object to be grouped into the package and to cause the second communications appliance to communicate the operator input to the computer.

The at least one remoting environment communications module may be operable to cause the second communications appliance to group identified structured and unstructured data associated with at least one object into the package.

The at least one remoting environment communications module may be operable to cause the package to be transmitted from the second communications appliance to the third communications appliance.

The at least one remoting environment communications module from the second group may be operable to receive operator input specifying an expiry time after which the package is no longer presentable at the third communications appliance and to associate the expiry time with the package.

The computer may be operable to access a third group of remoting environment program modules and the third communications facility may be operable to cause at least one remoting environment program module from the third group of program modules to be transmitted from the computer to the third communications appliance. The at least one remoting environment program module from the third group may be operable to cause the third communications appliance to communicate with the database to cause the structured and unstructured data associated with the at least one object, in the package, to be presented at the third communications appliance.

The third communications facility may be operable to cause the computer to receive from the third communications appliance a list of requirements of at least one desired object and the third communications facility may be operable to cause the computer to communicate the list of requirements to the second communications appliance.

The computer may be operable to access a second group of remoting environment program modules and the second communications facility may be operable to transmit at least one remoting environment program module from the second group of program modules to the second communications appliance. The at least one remoting environment program module from the second group being operable to cause an object profile to be displayed at the second communications appliance and populated with structured and unstructured data from the database.

The at least one remoting environment program module from the second group may be operable to cause the second communications appliance to receive operator input and to communicate the operator input to the computer to cause the computer to create, modify or delete the structured and unstructured data associated with an object.

The at least one remoting environment program module from the third group may be operable to facilitate selection by an operator of the third communications appliance, of structured and unstructured data from a plurality of different objects from a plurality of different packages.

The computer may be operable to associate an operator of the first communications appliance with an object and associate an operator of the second communications appliance with the object and notify the operators of the first and second communications appliances of selection by an operator of the third communications appliance of the object with which they are associated.

In accordance with another aspect of the invention, there is provided a computer readable medium encoded with codes for directing a processor circuit to perform the process described above and variations thereof.

In accordance with another aspect of the invention, there is provided a signal encoded with codes for directing a processor circuit to perform the process described above and variations thereof.

It should be appreciated that the present invention can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the drawings wherein:

FIG. 2A is a code sample related to the Auto attribute property of a program for use in an embodiment of the subject invention.

FIG. 2B is a code sample related to the Name attribute property applied to a class for use in an embodiment of the subject invention.

FIG. 2C is a code sample related to the Name attribute property applied to a property for use in an embodiment of the subject invention.

FIG. 2D is a code sample related to the Access attribute property in an embodiment of the subject invention.

FIG. 2G is a code sample related to the ToASObject method of FIG. 2E in an embodiment of the subject invention.

FIG. 4 is an exemplary Web page during the login procedure of FIG. 3.

FIG. 9C is a code sample related to formatting related to S-modules in accordance with the subject invention.

FIG. 9d is a code sample related to applying color settings related to S-modules in accordance with the subject invention.

FIG. 9E is a code sample related to applying color settings for inactive windows related to S-modules in accordance with the subject invention.

FIG. 9F is a code sample related to putting a dark line around an input field related to S-modules in accordance with the subject invention.

FIG. 24 is a screen shot of an exemplary resume page seen at a communication appliance in response to actuation of a resume button shown in FIG. 22.

FIG. 26 is a screen shot of a main agency profile seen at a communication appliance operated by a representative of an object.

FIG. 27 is a screen shot of an editable main agency profile seen at a communication appliance operated by a person representing an object.

FIG. 39 is a screen shot of a main search window seen at a communication appliance operated by a representative of an object to facilitate searching for an object represented by such person.

FIG. 45 is a screen shot of a display seen at a communication appliance operated by a requirement specifier illustrating a as a method of specifying requirements to be satisfied by an object.

FIG. 46 is a screen shot of an alternative display at a communication appliance operated by a requirements specifier for permitting a requirements specifier to specify requirements.

FIG. 48 is a screen shot of a casting breakdown manager display seen at a communication appliance operated by a requirements specifier providing a further alternative for a requirements specifier to specify requirements.

FIG. 50 is a screen shot of a casting breakdown manager display seen at a communication appliance operated by a requirements specifier providing a further alternative for a requirements specifier to specify requirements.

FIG. 51 is a screen shot of an alternative display seen at a communication appliance operated by a requirements specifier that includes a view submissions icon for every replied role.

FIG. 65 is a screen shot of a production room display seen at any of the communication appliances for use in managing a film production.

FIG. 67 is a screen shot of a display seen at any of the communication appliances providing summary history information and contact information relating to a production.

FIG. 72 is a screen shot of a display seen at any of the communication appliances depicting storyboard and animation production information for the project.

FIG. 73B is a screen shot of a storyboard drawing review display seen at any of the communication appliances enabling comparison of scenes with the storyboard of the project.

FIG. 75 is a screen shot of a display seen at any of the communication appliances depicting location summary information for the project.

FIG. 81 is a screen shot of a display seen at any of the communication appliances showing art designs and property activity summary information for the project.

FIG. 82 is a screen shot of a display seen at any of the communication appliances showing a wardrobe design and collaboration feature.

FIG. 86 is a screen shot of a display seen at any of the communication appliances showing press release information for the project.

FIG. 88A is a screen shot of a display seen at any of the communication appliances depicting an industry services directory.

FIG. 88B is a screen shot of a display seen at any of the communication appliances depicting a message area for receiving messages by an industry participant.

FIG. 90B is a continuation of FIG. 90A.

FIG. 92B is a continuation of FIG. 92A.

FIG. 93 is a screen shot of a display seen at any of the communication appliances providing access to productions.

FIG. 94 is a screen shot depicting a display seen at any of the communication appliances showing a plurality of video clip panels.

FIG. 95 is a screen shot of a display seen at any of the communication appliances depicting information relating to a selected clip or photo of FIG. 94.

FIG. 96 is a screen shot of a display seen at any of the communication appliances depicting a video player.

FIG. 97 is a screen shot depicting a display seen at any of the communication appliances showing different categories of films.

FIG. 98 is a screen shot of a display seen at any of the communication appliances showing a plurality of different music entities.

FIG. 99A is a screen shot of a display seen at any of the communication appliances depicting information relating to a music entity of FIG. 98.

FIG. 99B is a continuation of FIG. 99A.

FIG. 100 is a screen shot of an image gallery display seen at any of the communication appliances, associated with a selected music entity selected in association with FIG. 98.

FIG. 101 is a screen shot of a display seen at any of the communication appliances depicting an invitation for inviting a recipient to a production event.

FIG. 102 is a screen shot depicting a display seen at any of the communication appliances listing a plurality of media forums such as film forums and tv forums for example.

FIG. 103 is a screen shot of a display seen at any of the communication appliances facilitating comments in a film forum selected in association with FIG. 102.

Figure 104A:
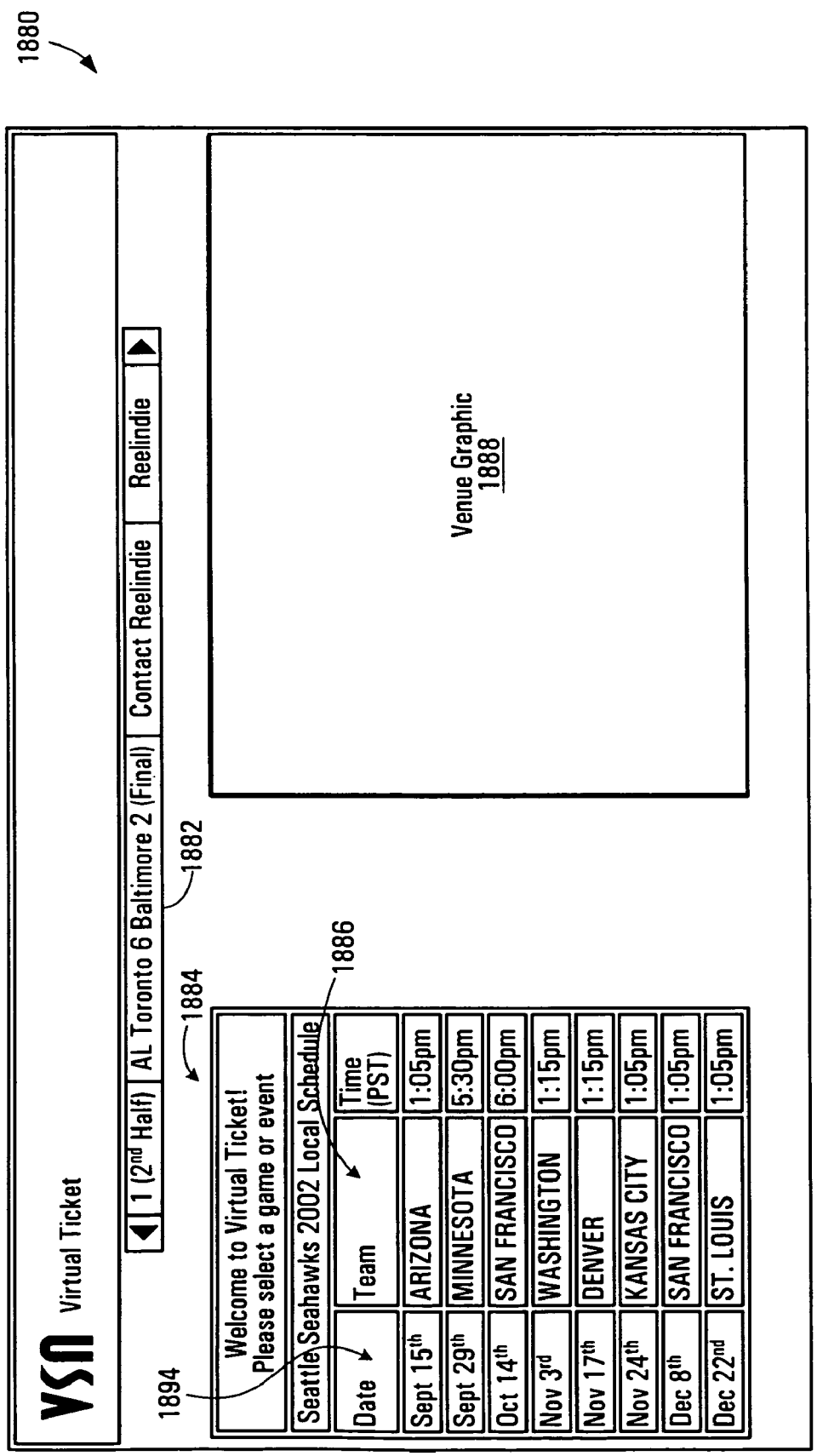

FIG. 104A is a screen shot of a display seen at any of the communication appliances relating to a ticket purchasing feature facilitating the purchase of tickets for an event.

Figure 104B:
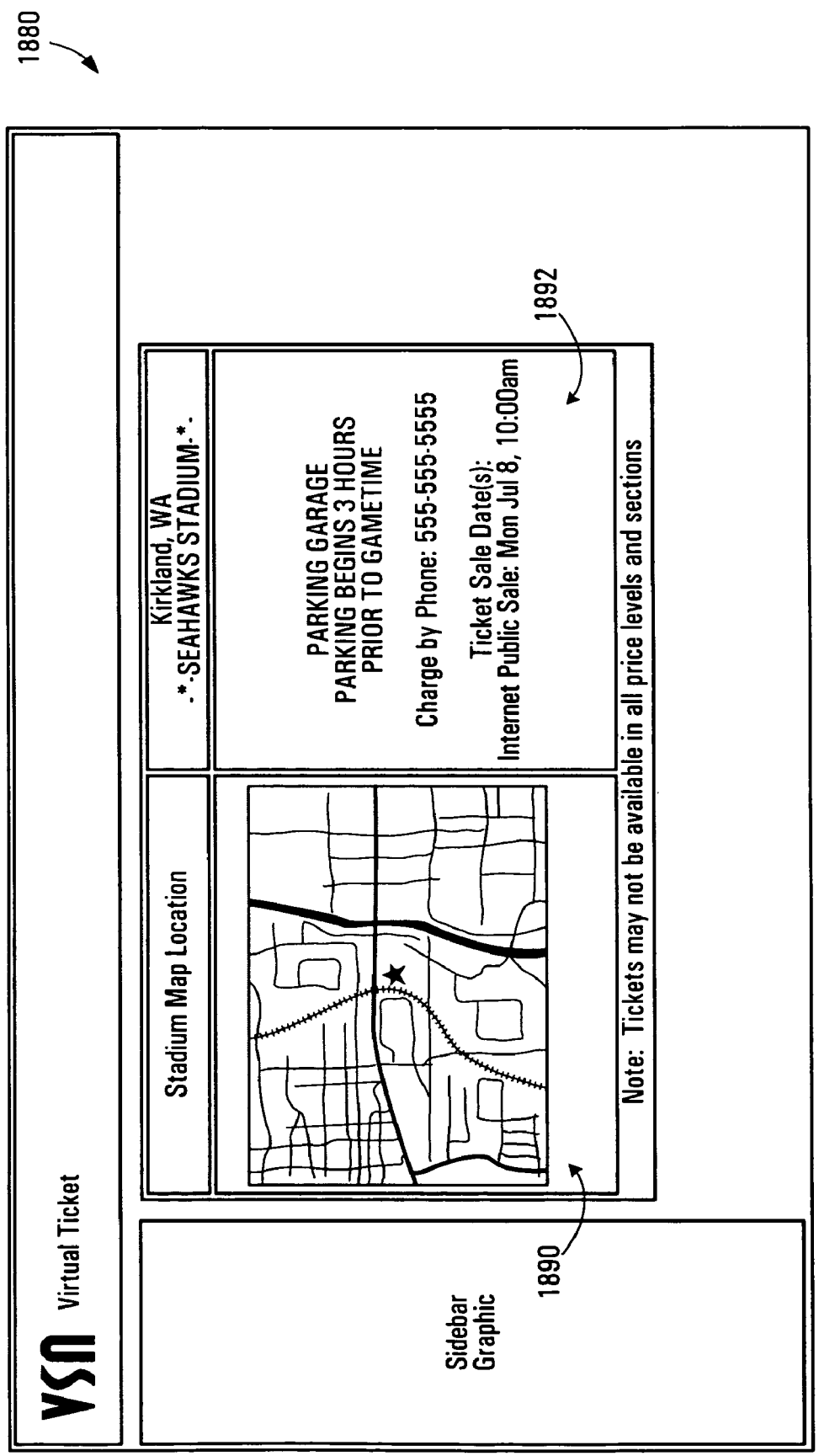

FIG. 104B is a screen shot of a display seen at any of the communication appliances depicting a geographical location of a venue for an event for which a ticket can be purchased.

Figure 105:
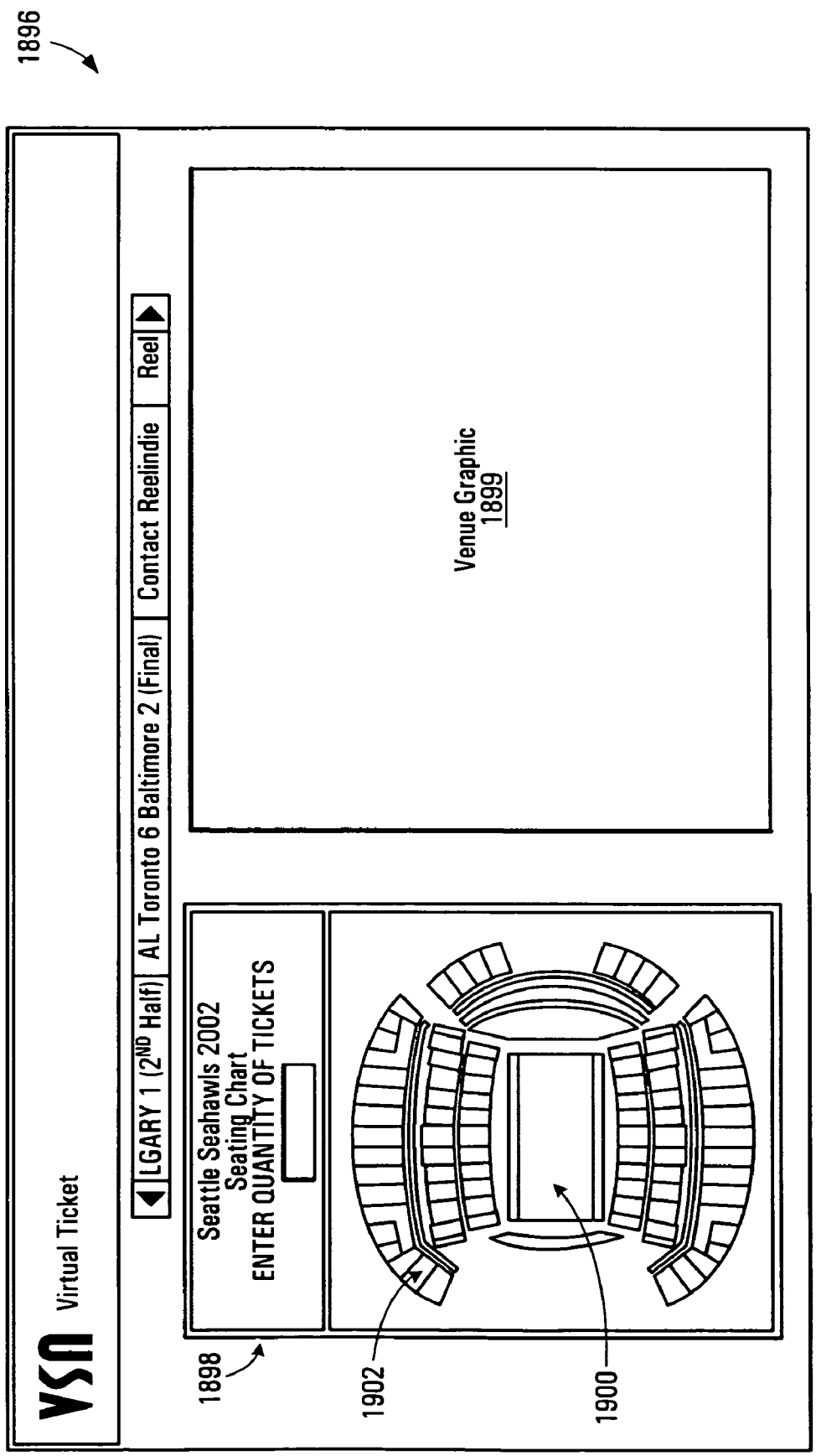

FIG. 105 is a screen shot of a display seen at any of the communication appliances showing available seats in the venue at which the event is to occur.

Figure 106A:
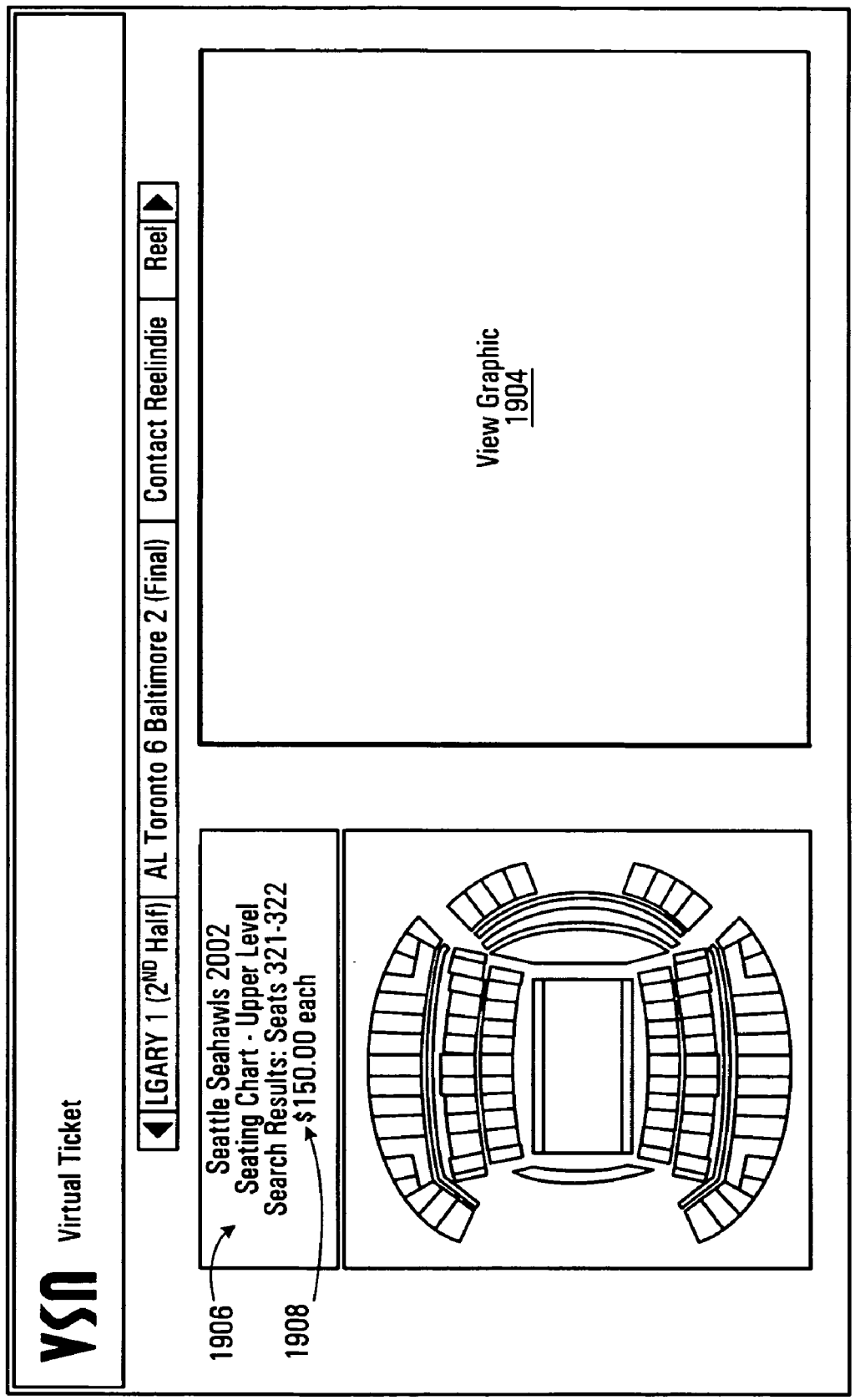

FIG. 106A is a screen shot of a display seen at any of the communication appliances depicting selected ticket information.

Figure 106B:
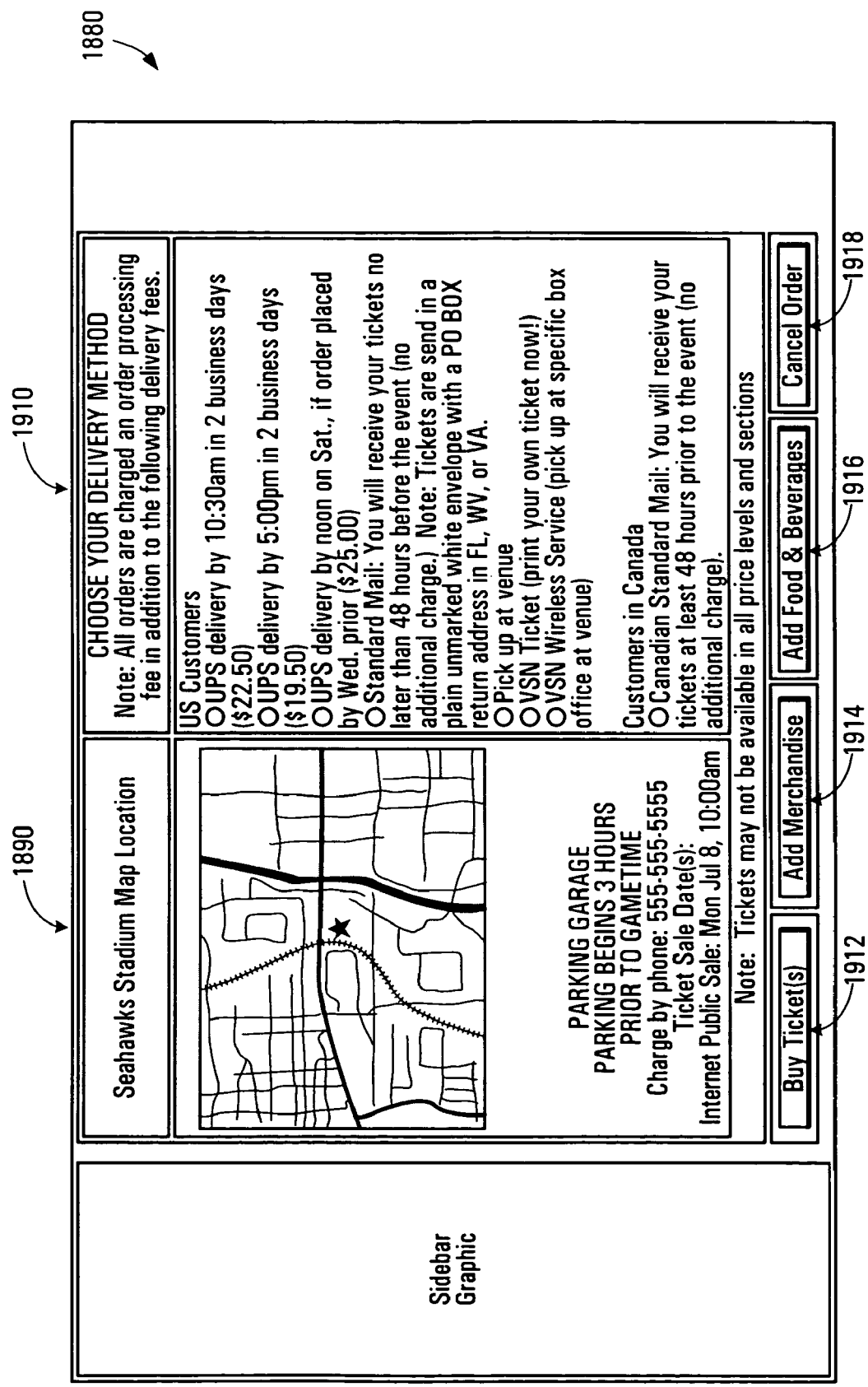

FIG. 106B is a screen shot of a display seen at any of the communication appliances showing payment terms and location information a ticket to be purchased.

Figure 107:
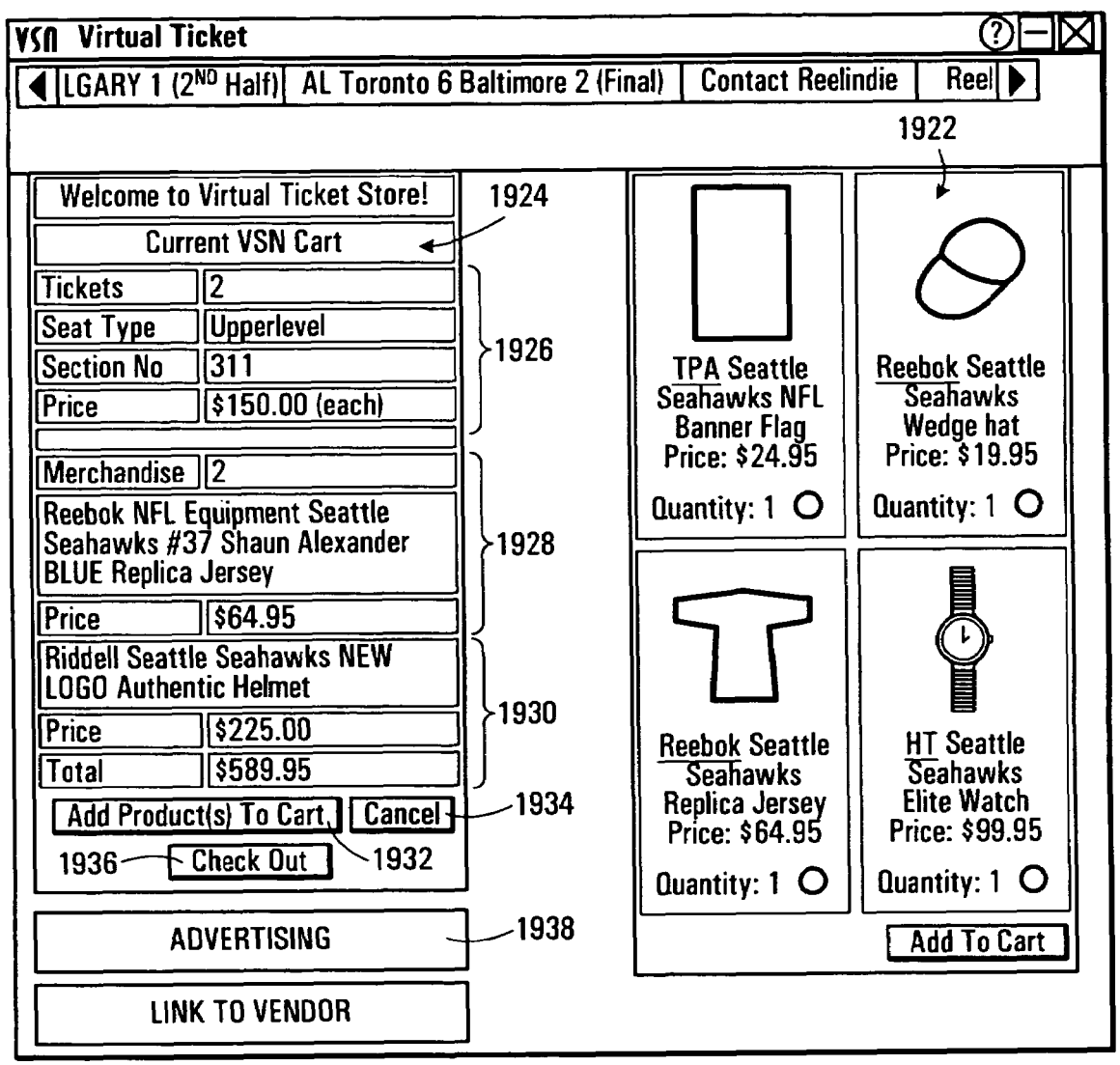

FIG. 107 is a screen shot of a display seen at any of the communication appliances offering for sale merchandise associated with the event for which a ticket is to be purchased.

Figure 108:
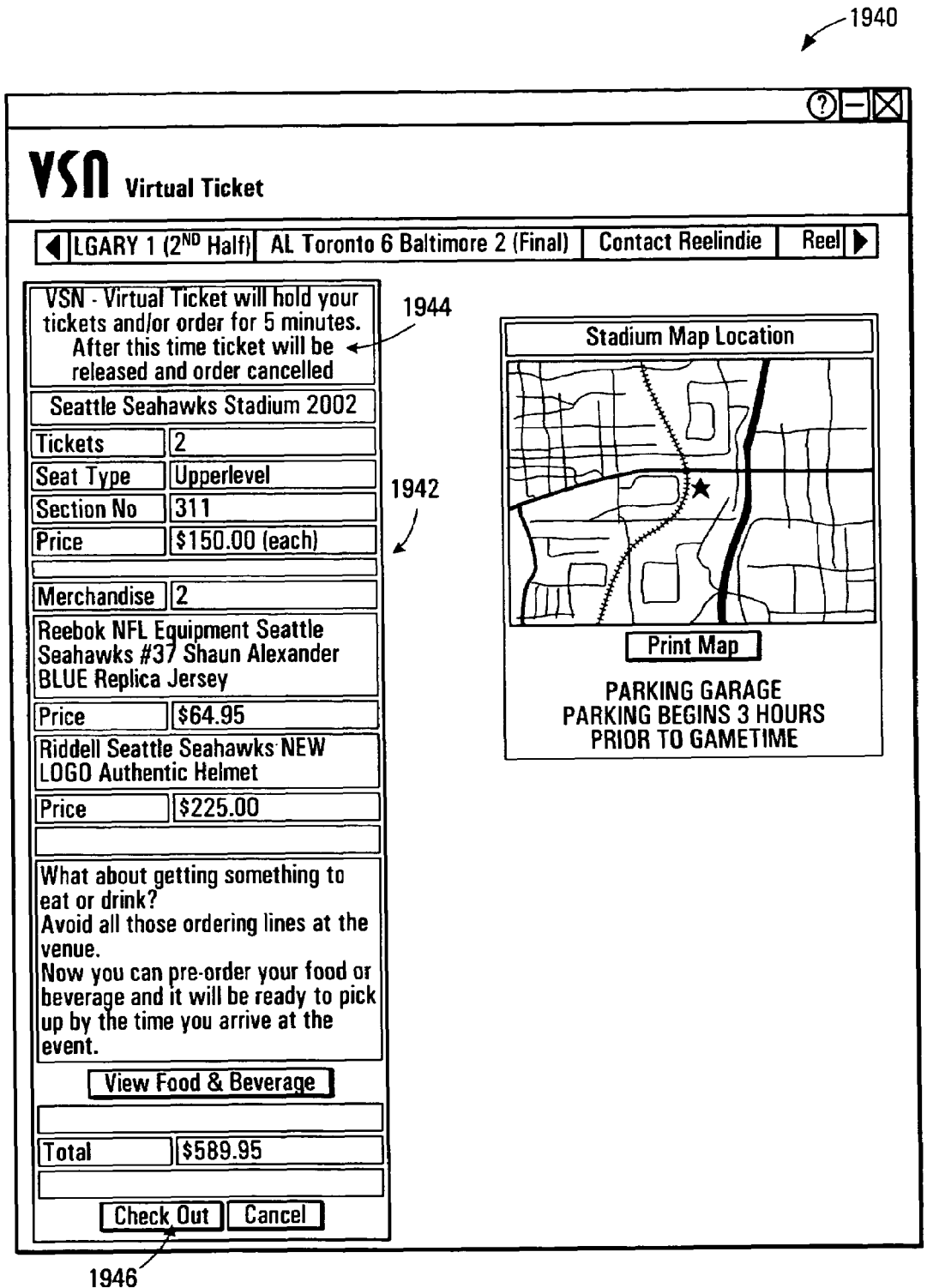

FIG. 108 is a screen shot of a display seen at any of the communication appliances providing a summary of a proposed ticket purchase, all merchandise purchased and delivery method thereof.

Figure 109:
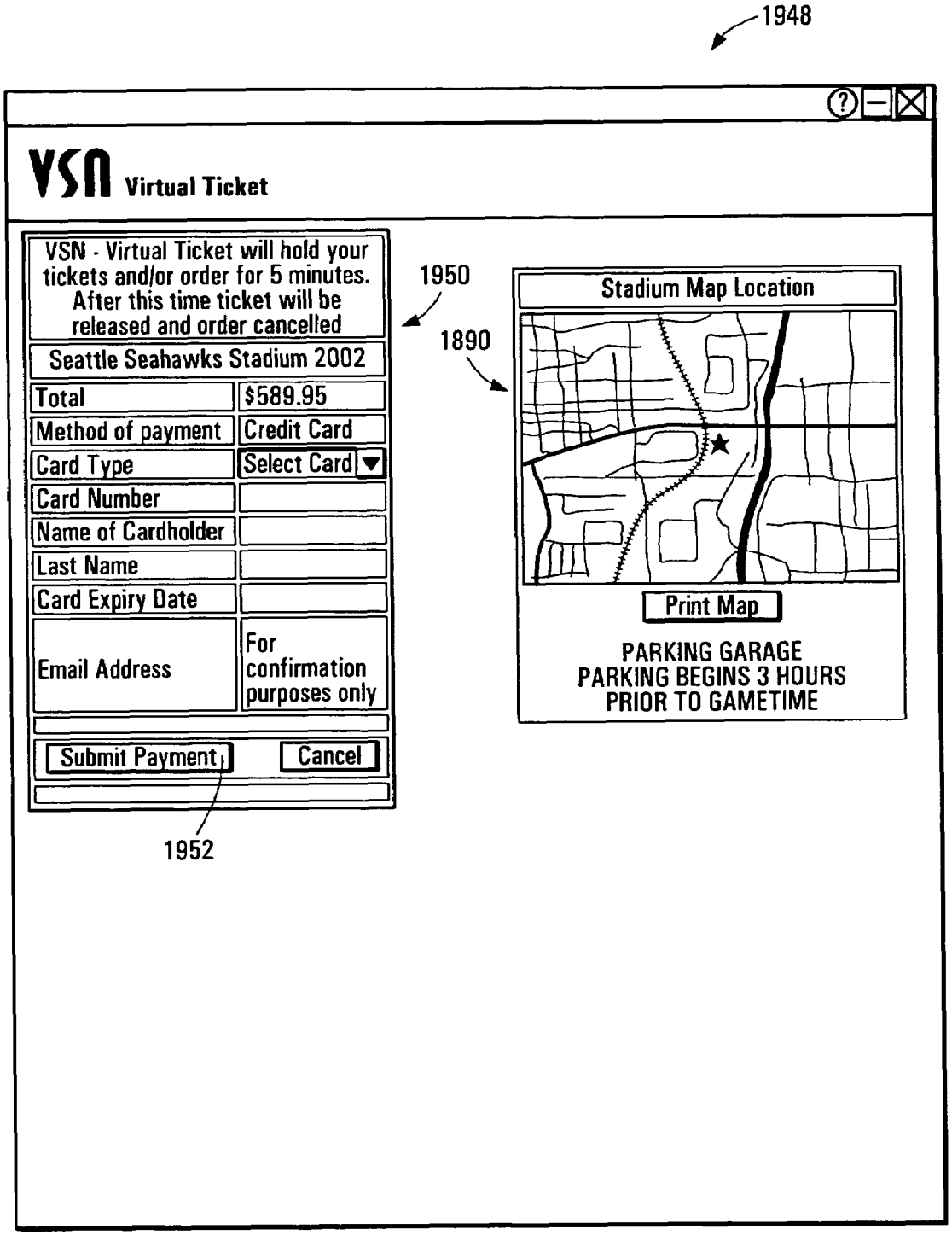

FIG. 109 is a screen shot of a display seen at any of the communication appliances showing a payment panel facilitating entry of payment information.

Figure 110:
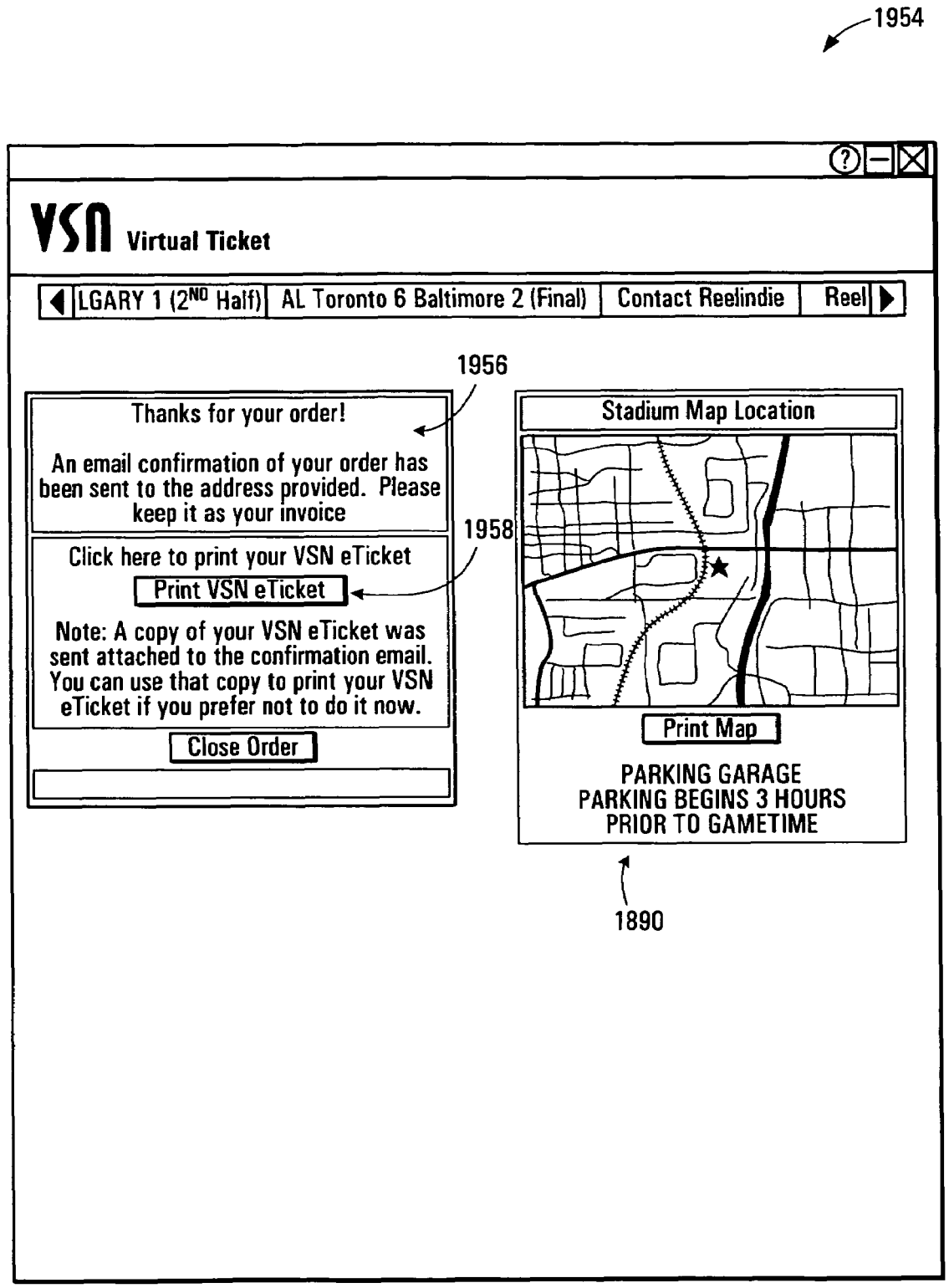

FIG. 110 is a screen shot of a display seen at any of the communication appliances facilitating printing of purchased tickets.

Figure 111:
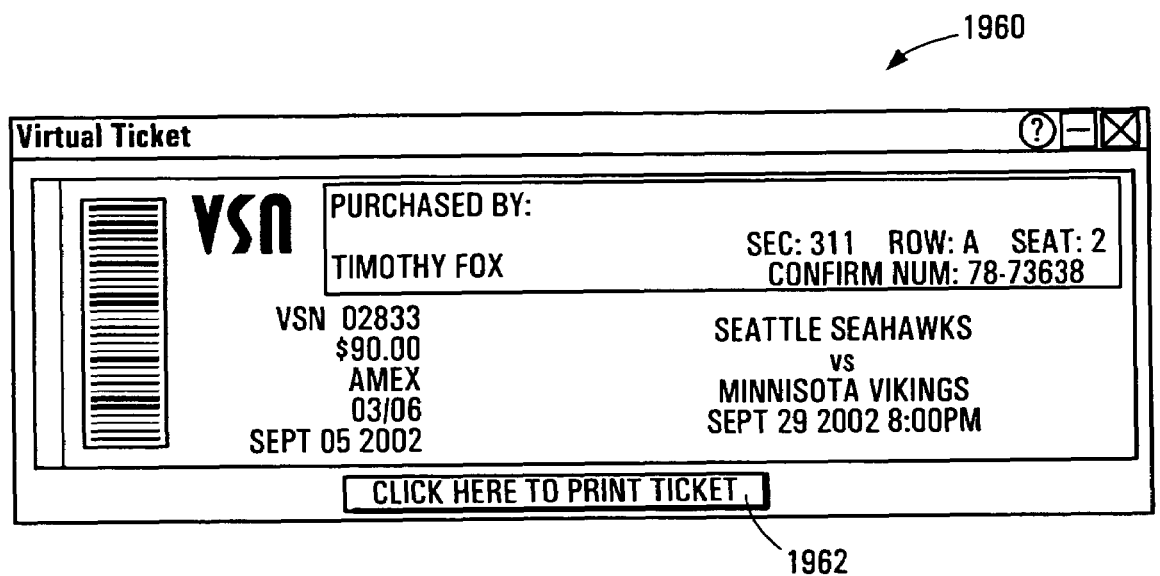

FIG. 111 is a screen shot of a display seen at any of the communication appliances, depicting virtual ticket as purchased.

Figure 112A:
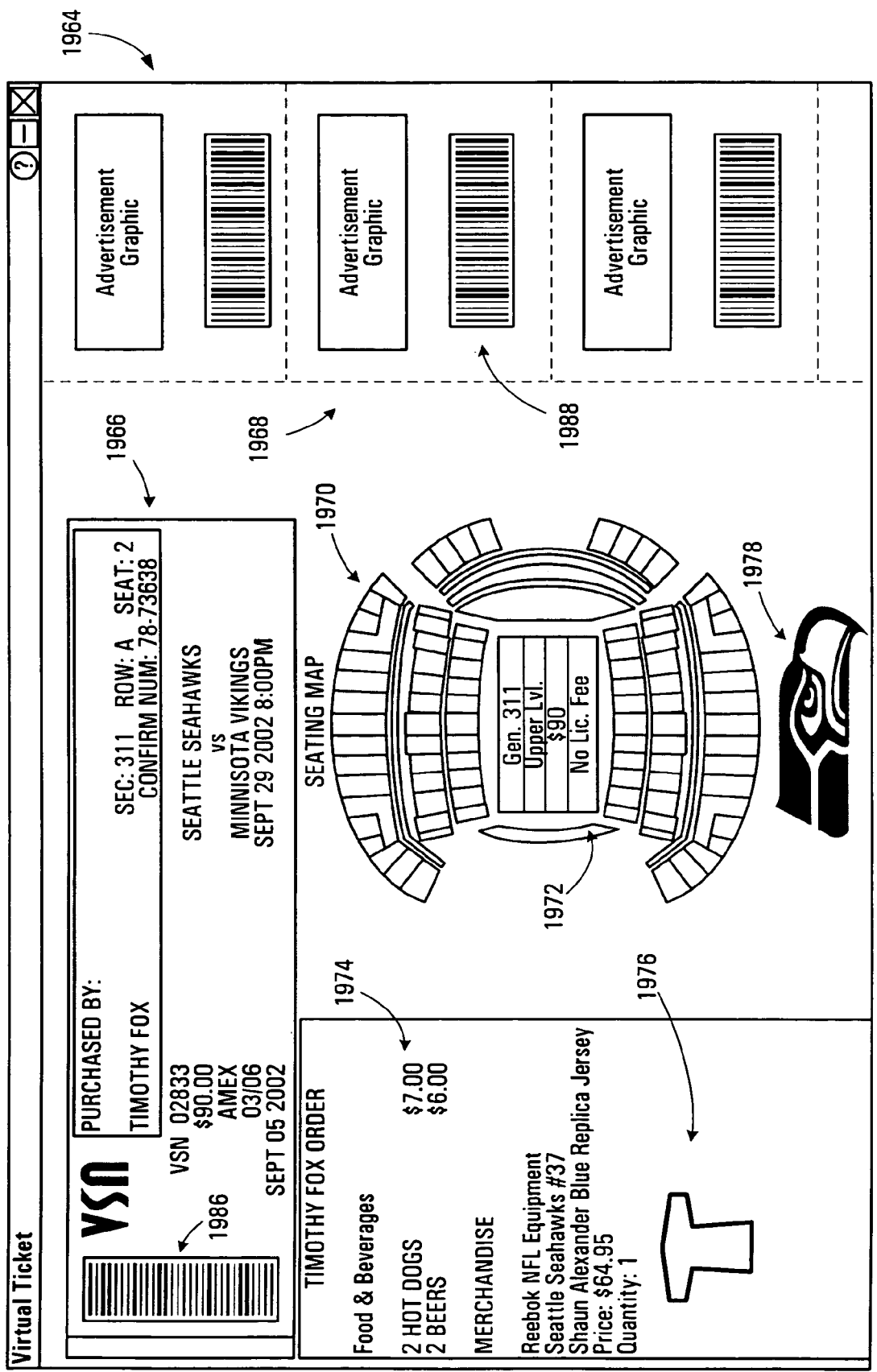

FIG. 112A is a screen shot of a display seen at any of the communication appliances depicting the ticket, information relating to merchandise, a seating map and graphic advertisements as printable at a communication appliance.

Figure 112B:
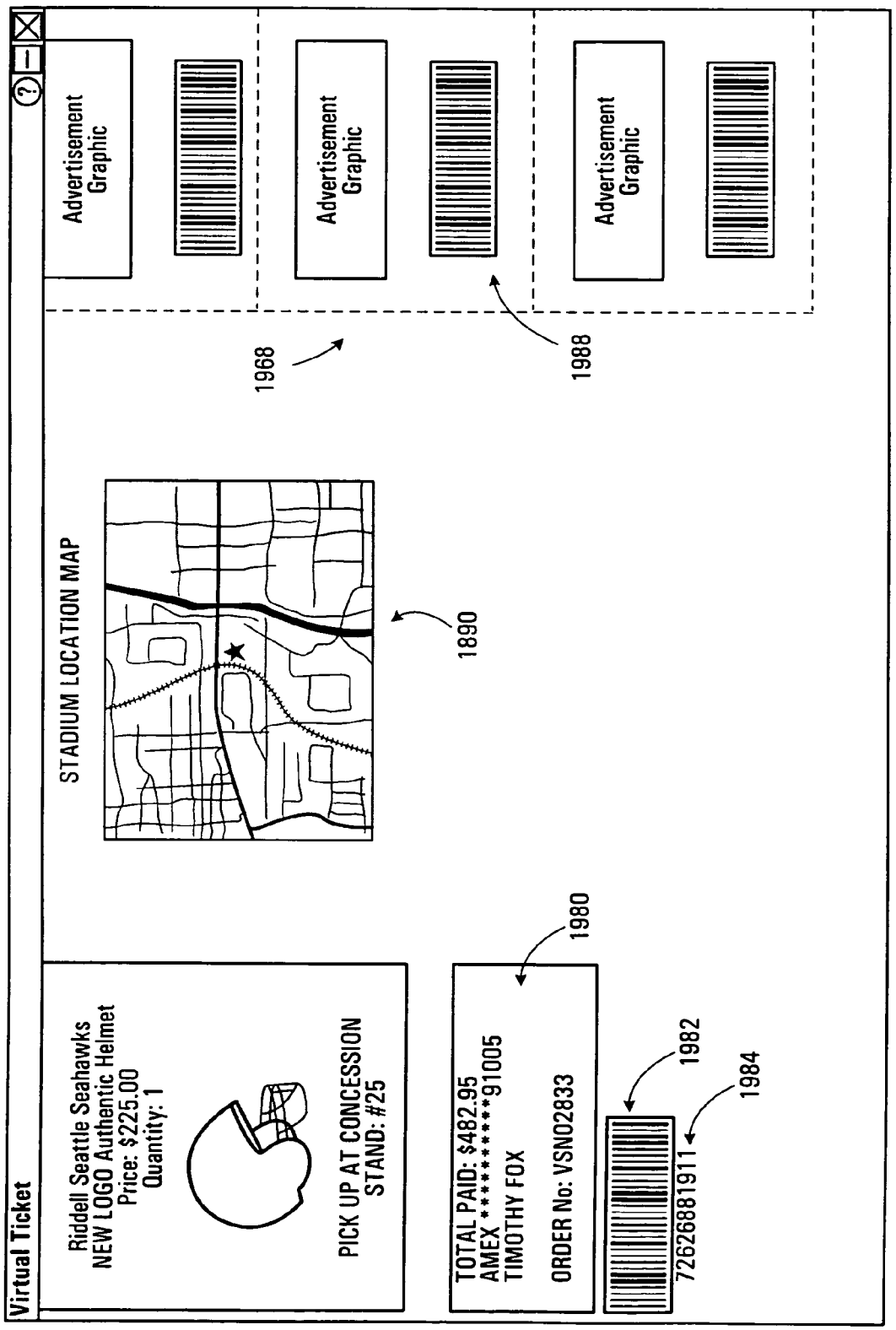

FIG. 112B is a continuation of FIG. 112A.

Figure 113:
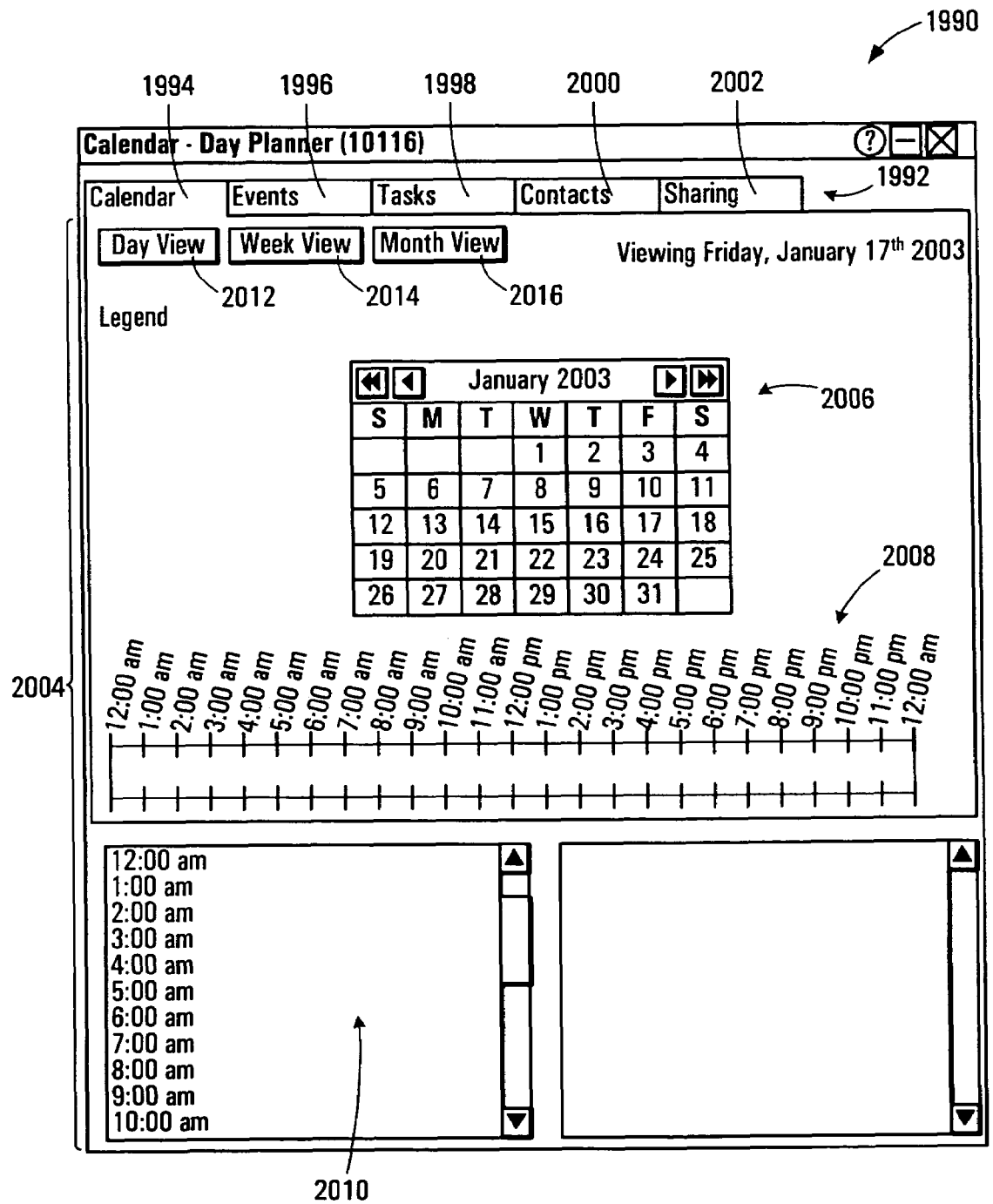

FIG. 113 is a screen shot of a display seen at any of the communication appliances depicting a day planner.

Figure 114:
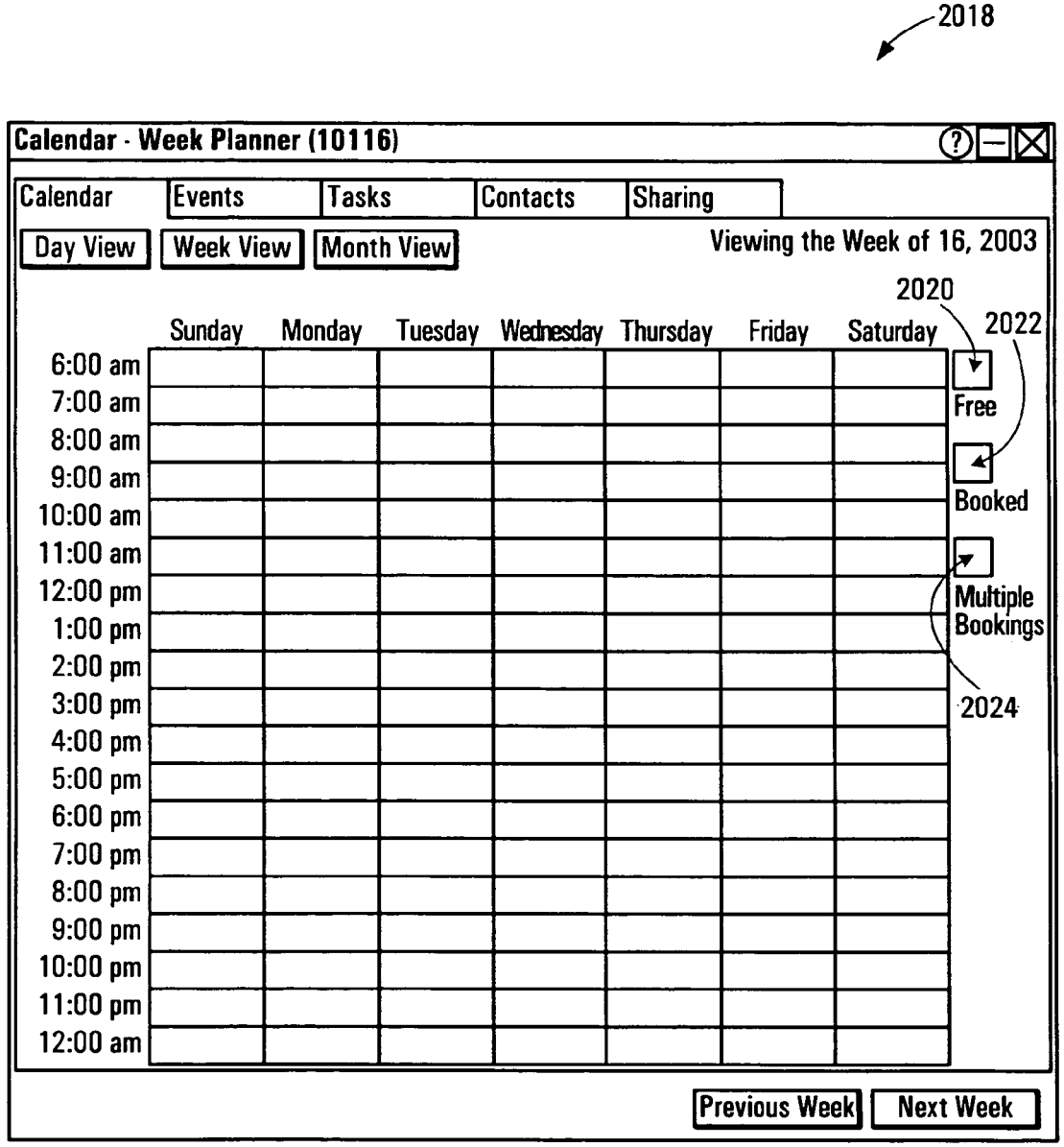

FIG. 114 is a screen shot of a display seen at any of the communication appliances showing a week planner.

Figure 115:
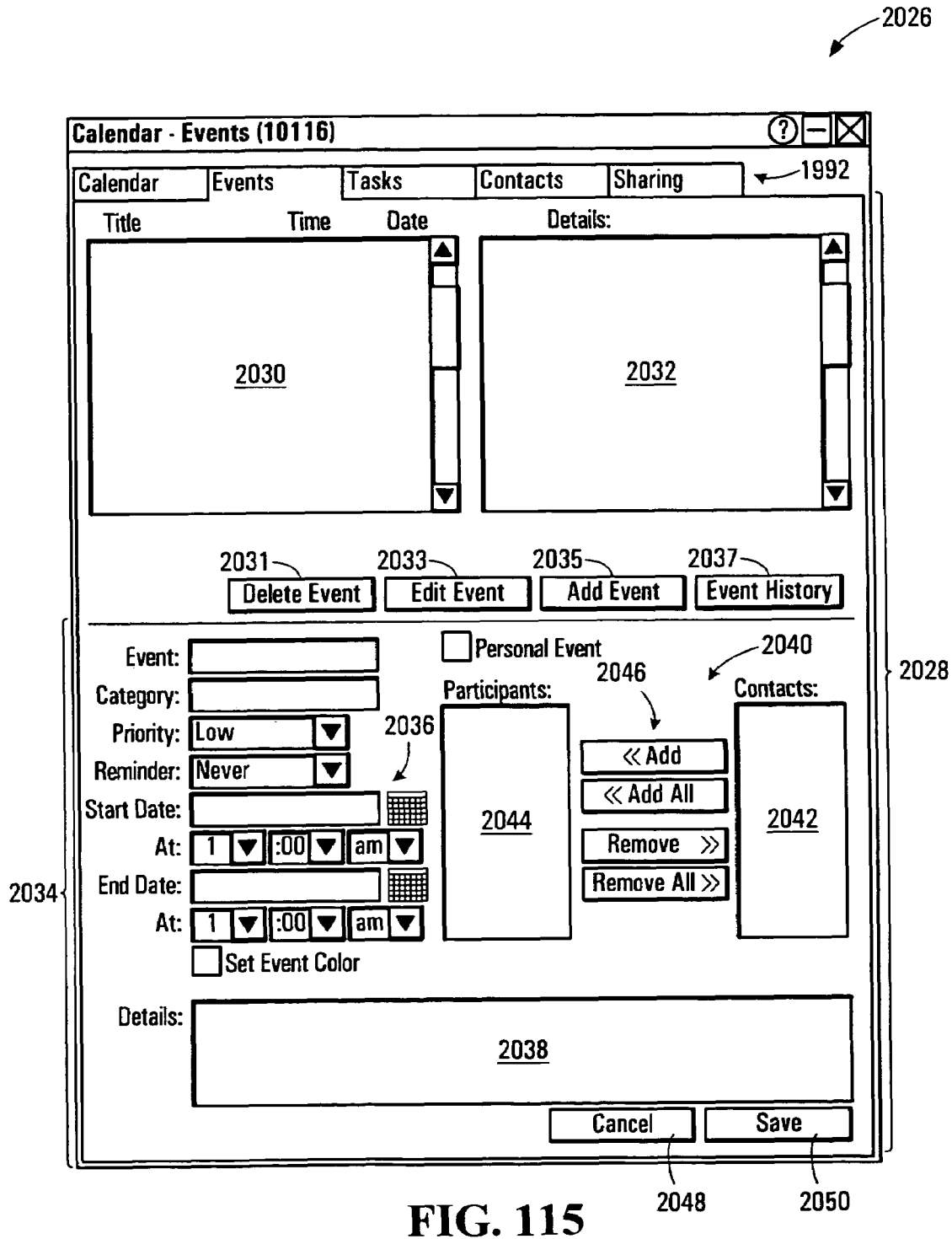

FIG. 115 is a screen shot of a display seen at any of the communication appliances showing an events calendar.

Figure 116:
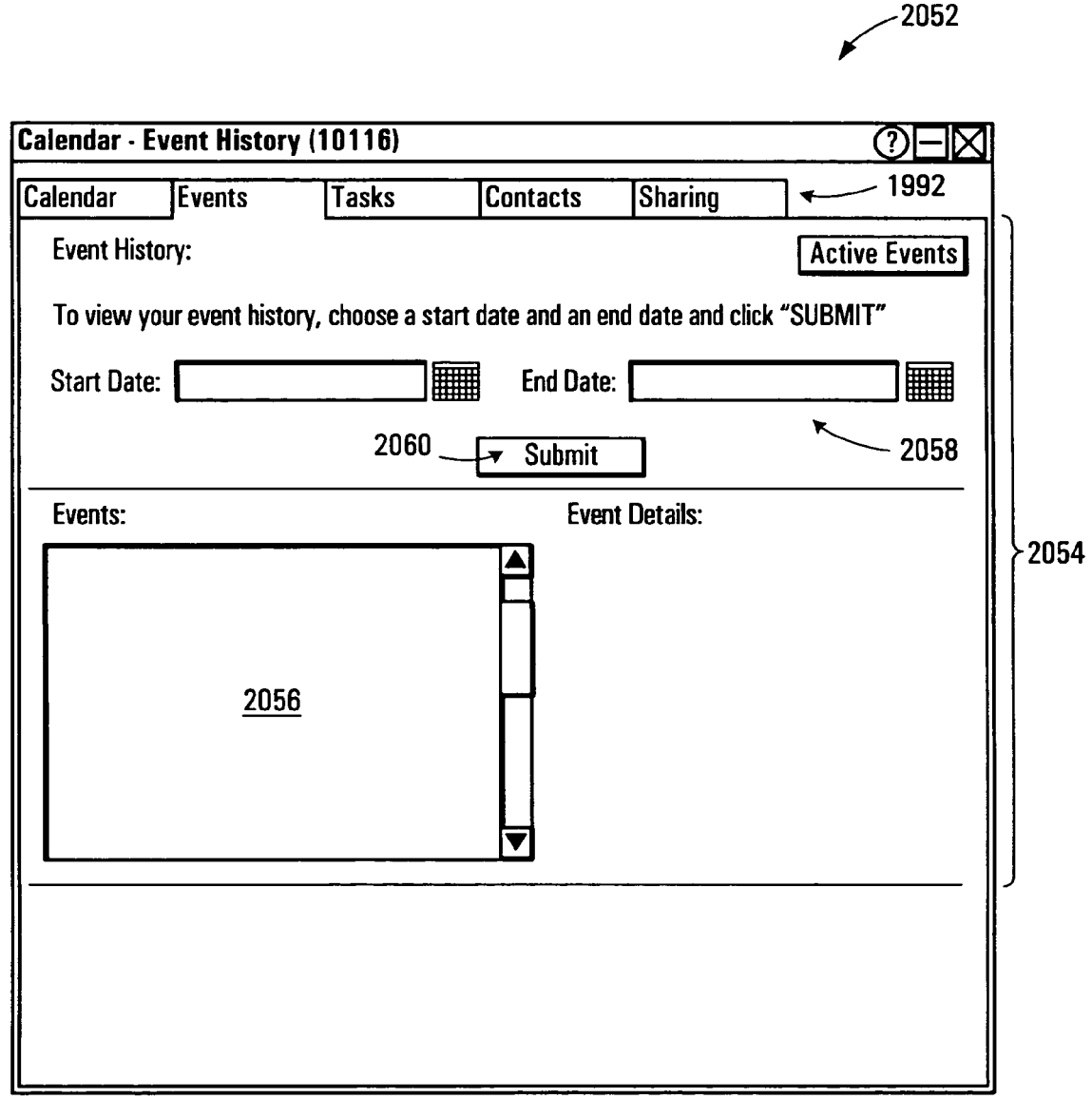

FIG. 116 is a screen shot of a display seen at any of the communication appliances showing an event history.

Figure 117:
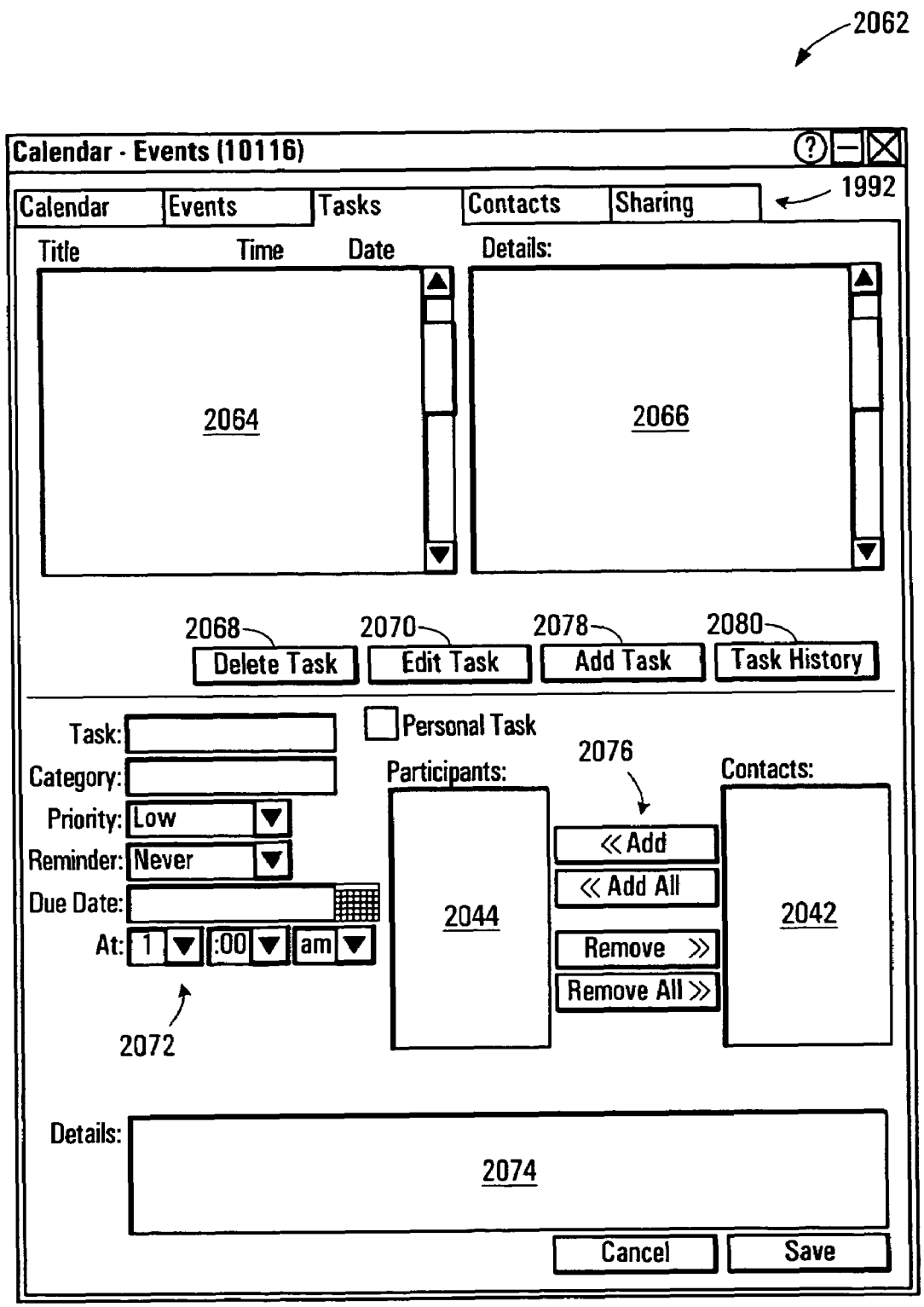

FIG. 117 is a screen shot of a display seen at any of the communication appliances showing a task management display.

Figure 118:
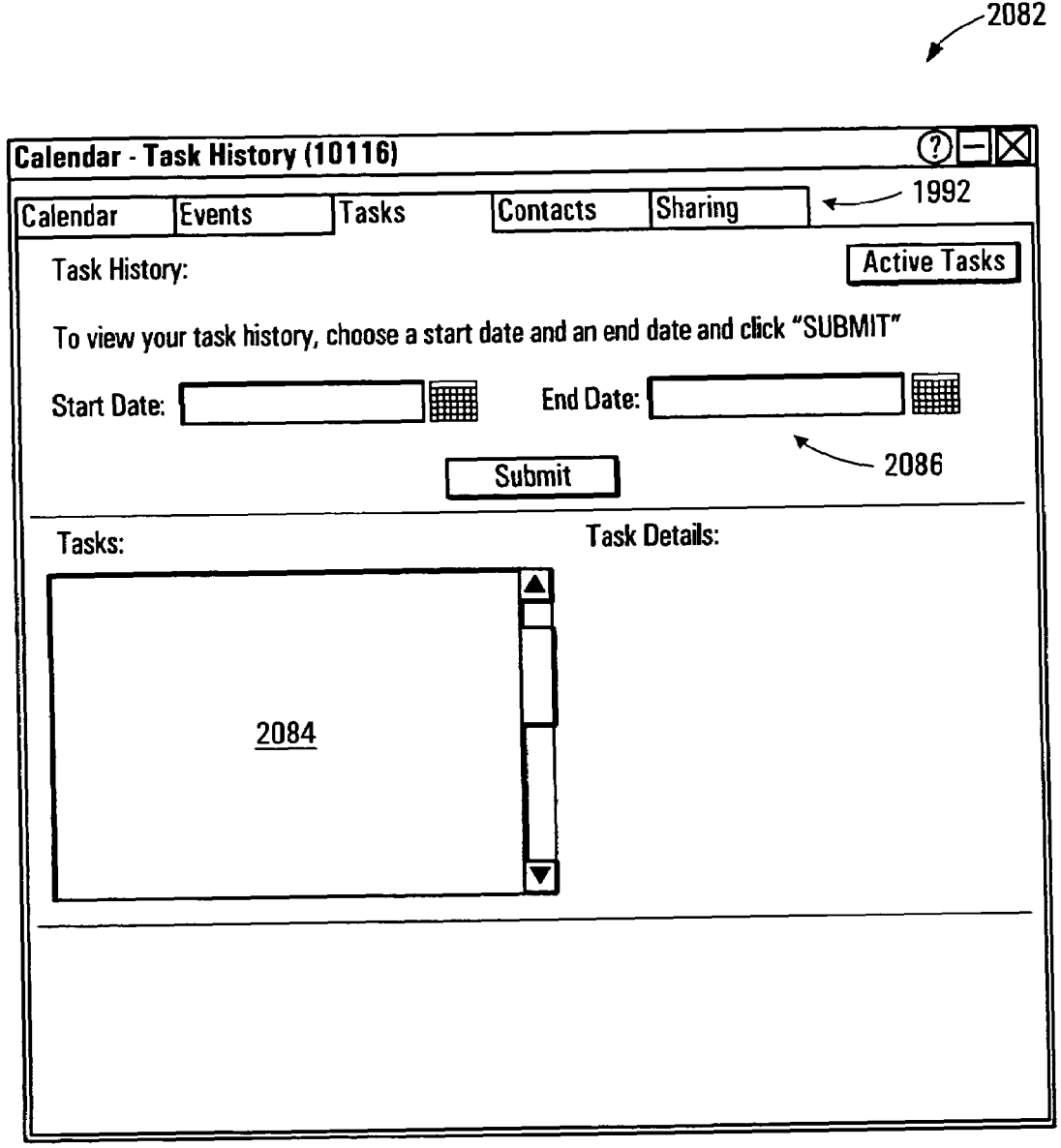

FIG. 118 is a screen shot of a task history display seen at any of the communication appliances.

Figure 119:
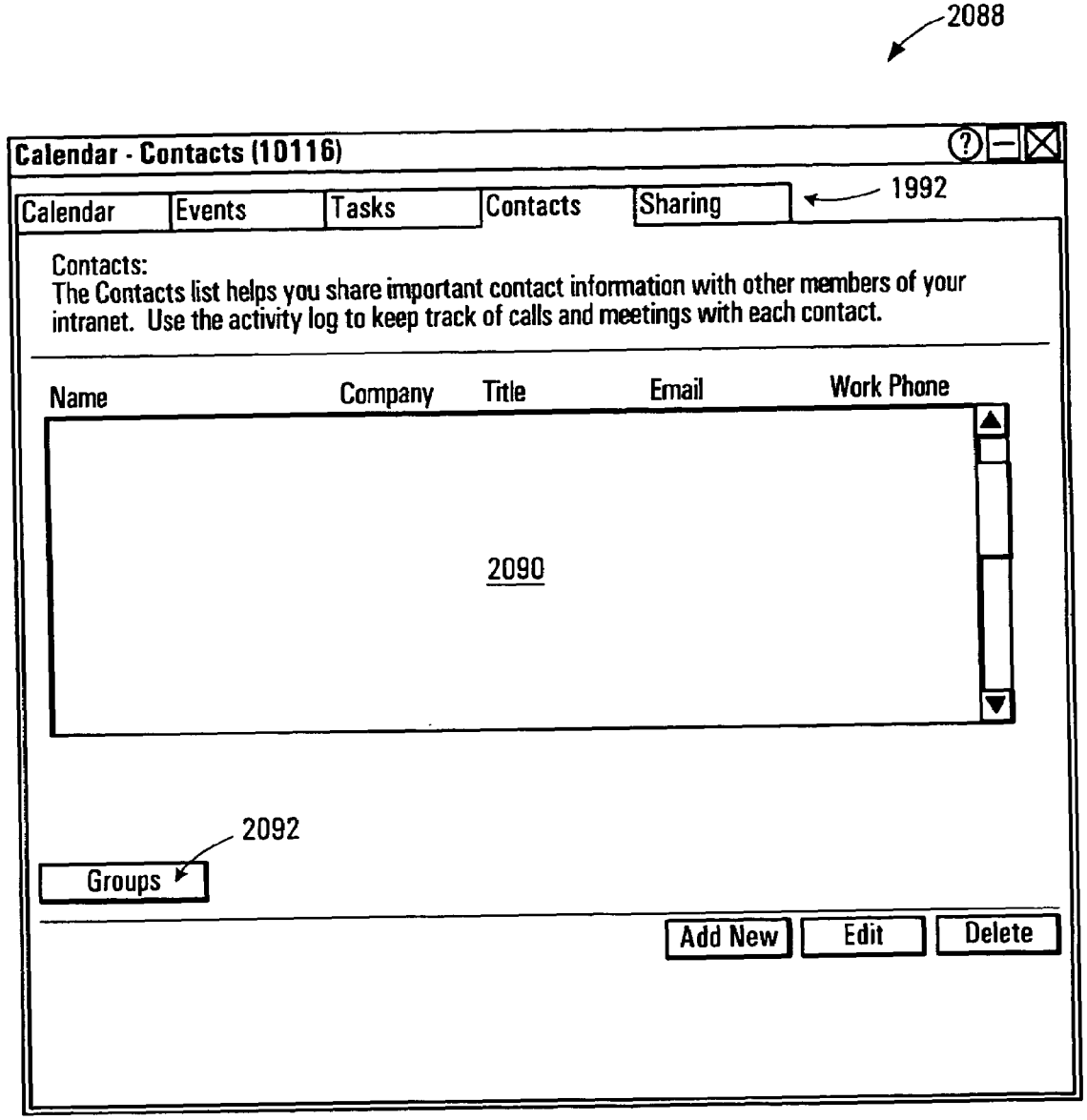

FIG. 119 is a screen shot of a contact display seen at any of the communication appliances.

Figure 120:
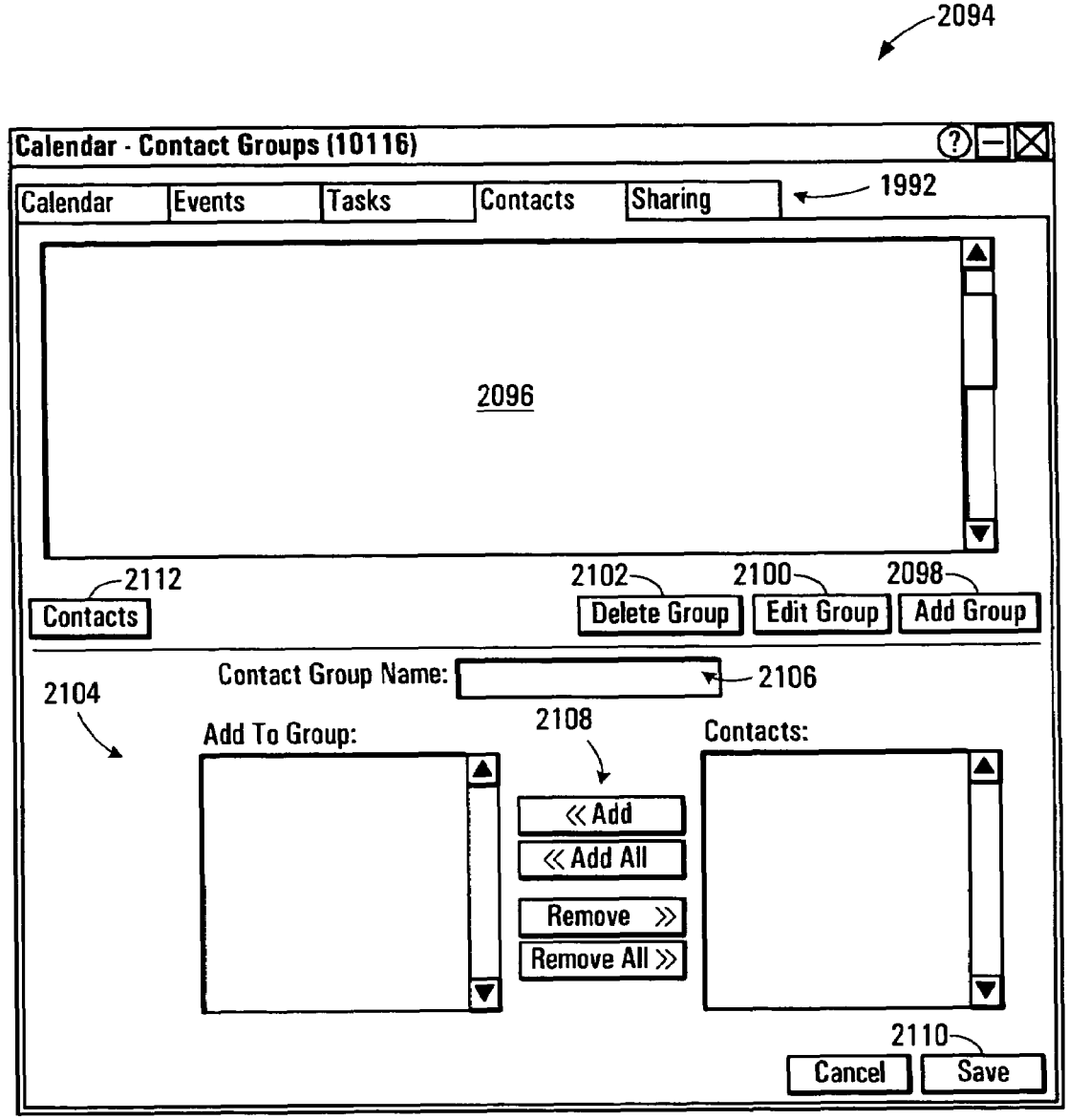

FIG. 120 is a screen shot of a contact group display seen at any of the communication appliances.

Figure 121:
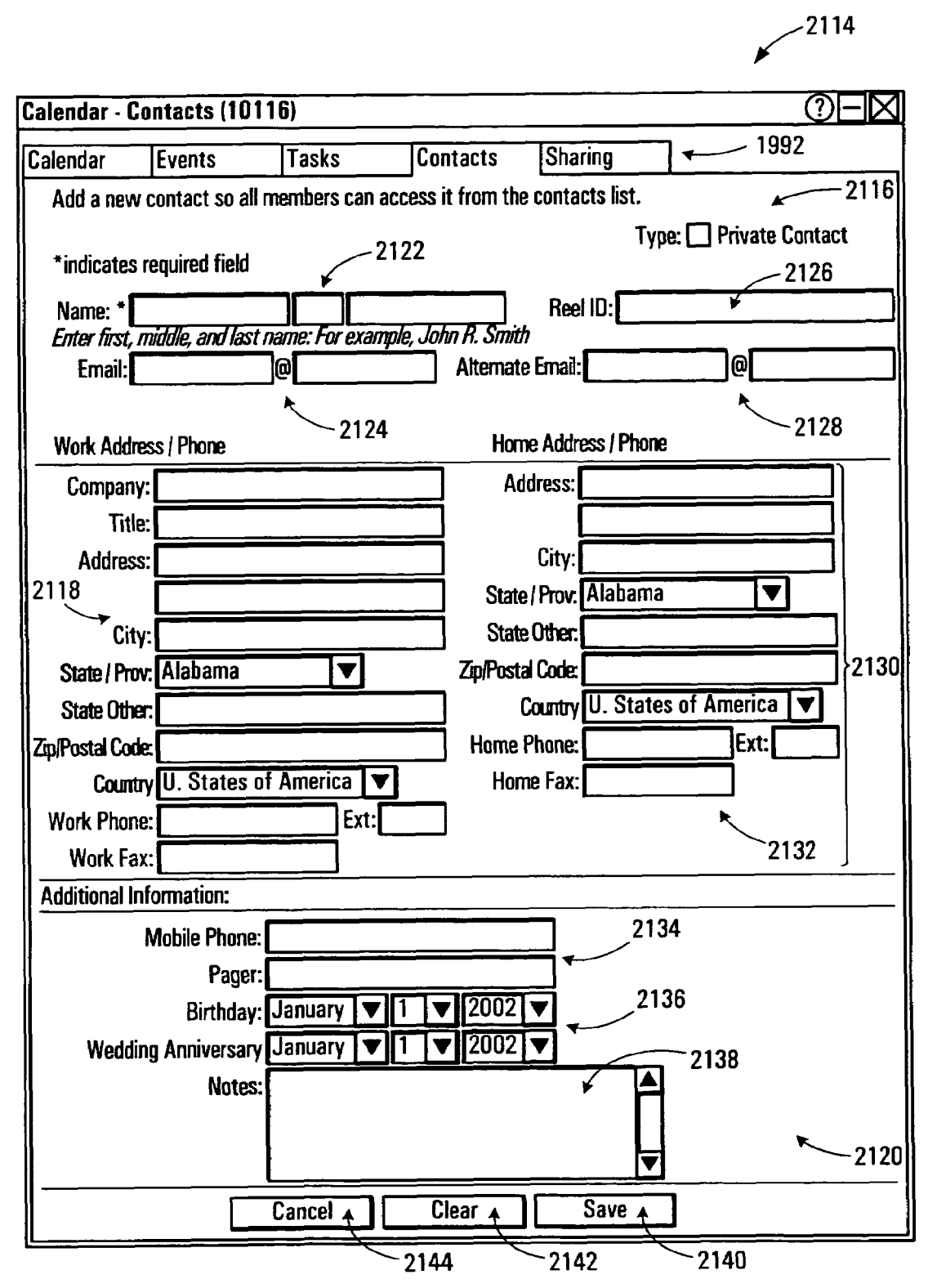

FIG. 121 is a screen shot of a display seen at any of the communication appliances depicting a data entry template for a contact.

Figure 122:
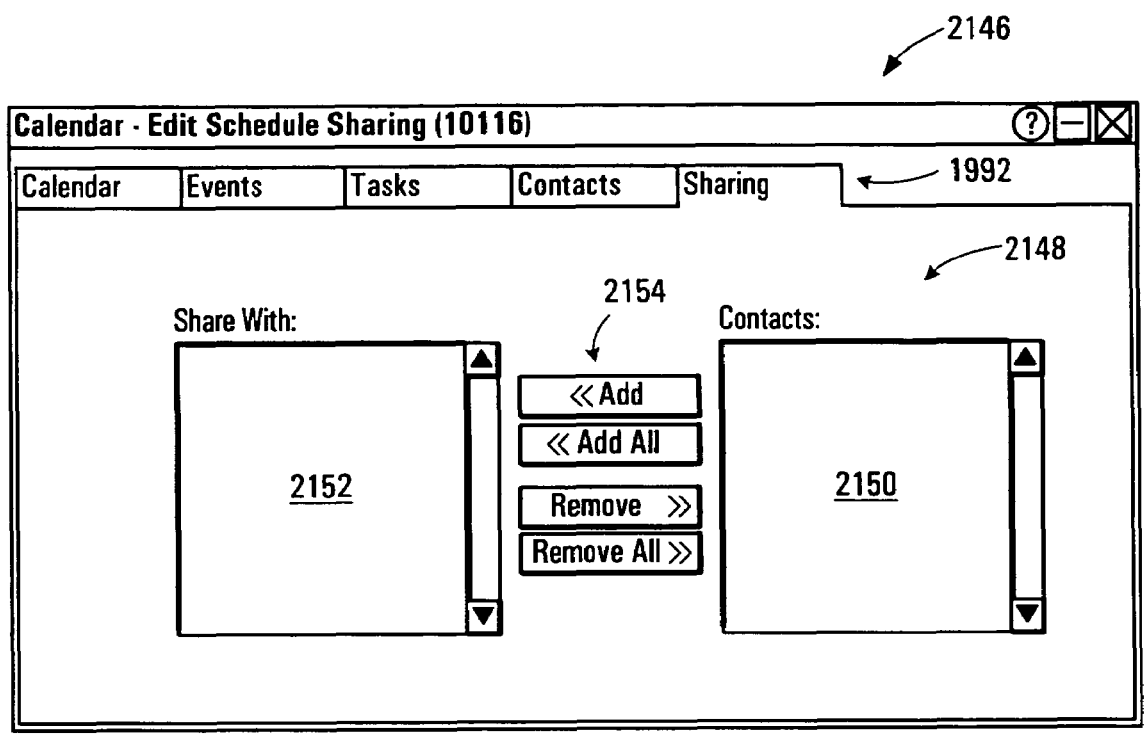

FIG. 122 is a screen shot of a display seen at any of the communication appliances for maintaining a shared edit schedule.

FIG. 123 is a screen shot of a display seen at any of the communication appliances facilitating the ordering of a compact disk (CD) including structured and unstructured information stored at the management apparatus.

FIG. 124 is a screen shot of a display seen at any of the communication appliances depicting CD ordering options.

Figure 125:
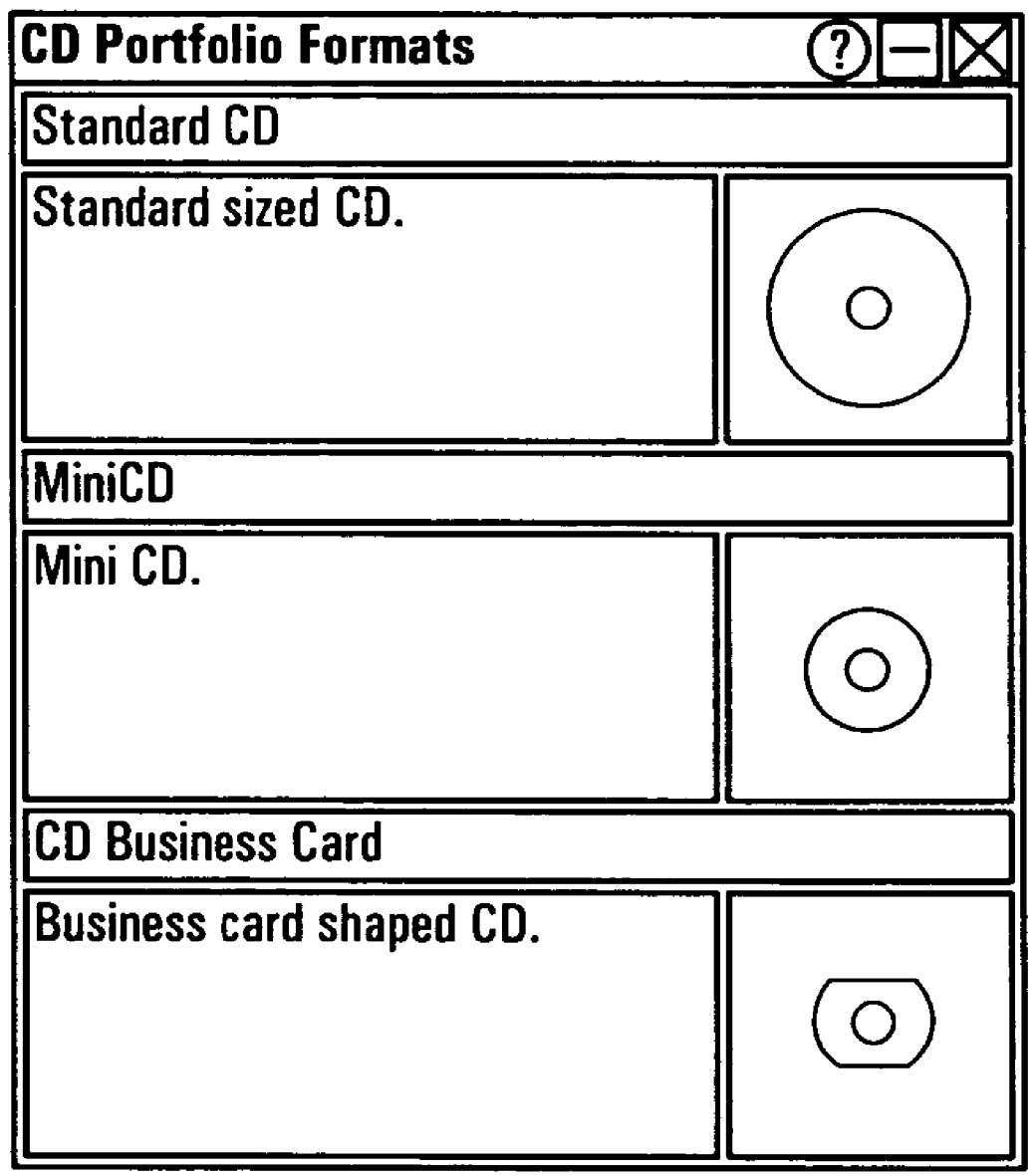

FIG. 125 is a screen shot of a display seen at any of the communication appliances facilitating selection of a CD portfolio formats.

Figure 126:
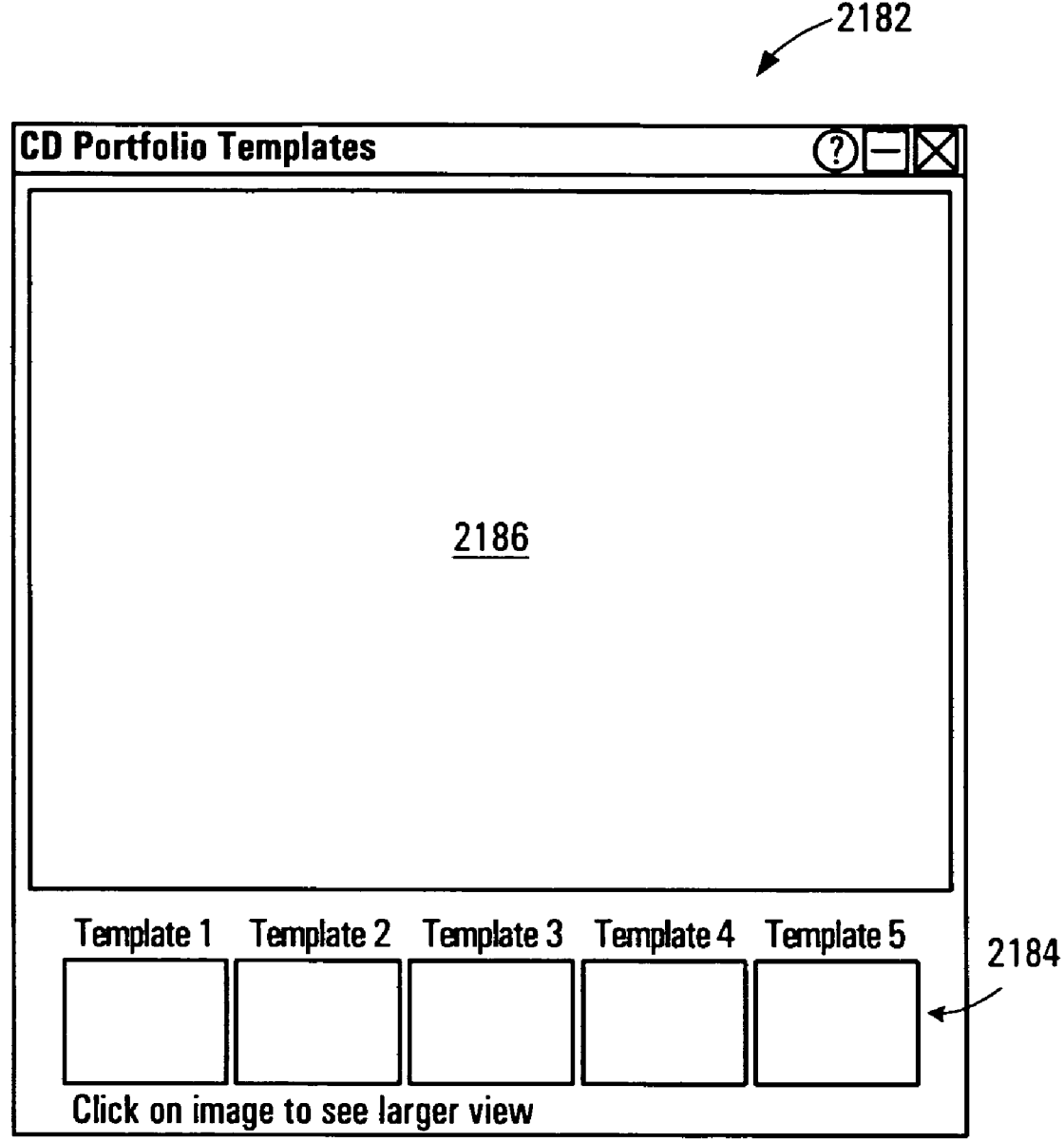

FIG. 126 is a screen shot of a display seen at any of the communication appliances depicting selectable CD portfolio templates.

Figure 127:
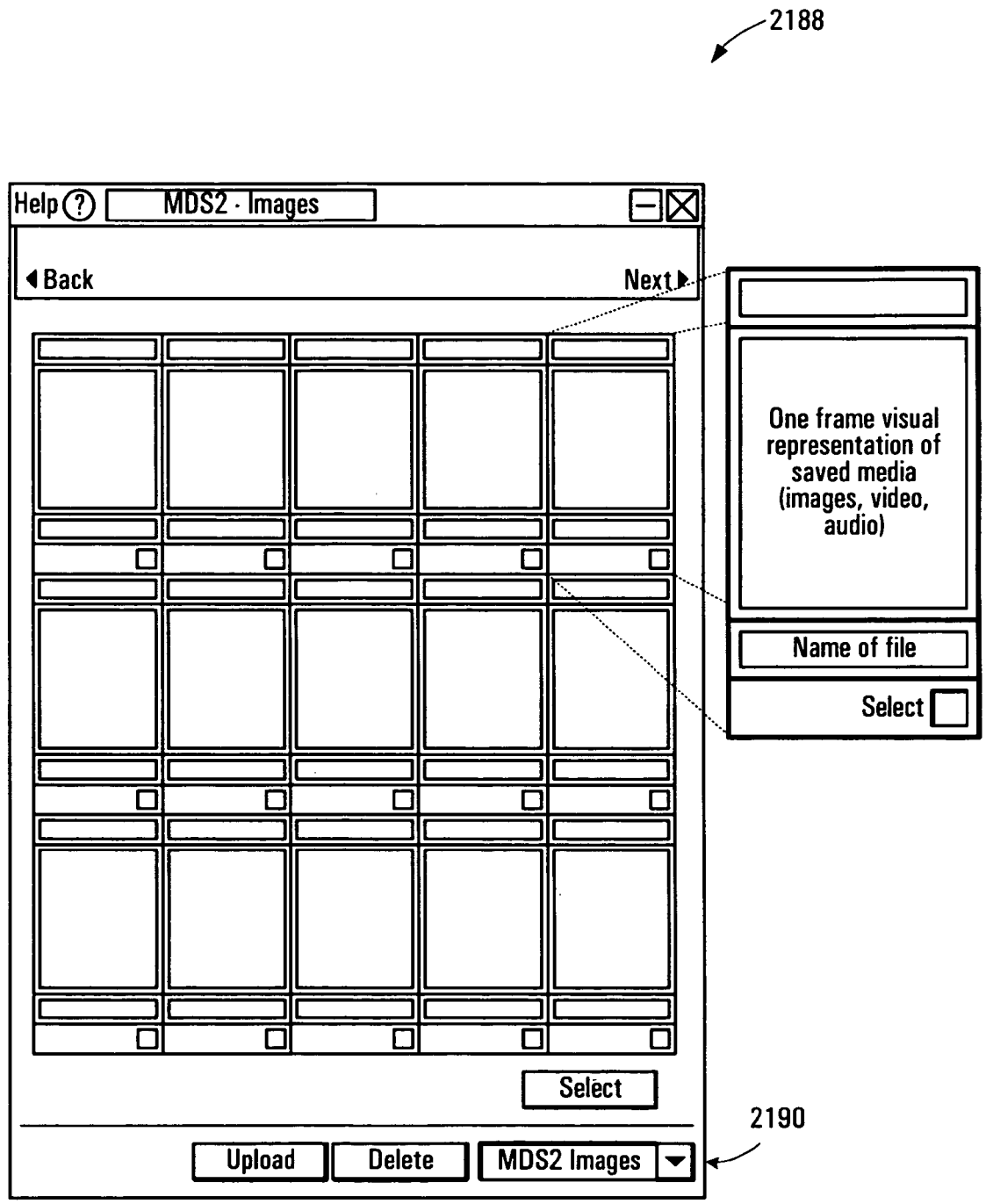

FIG. 127 is a screen shot of a display seen at any of the communication appliances facilitating a selection of content and sources of content to be included in the CD package.

FIG. 128 is a screen shot of a display seen at any of the communication appliances depicting CD portfolio pricing.

Figure 129:
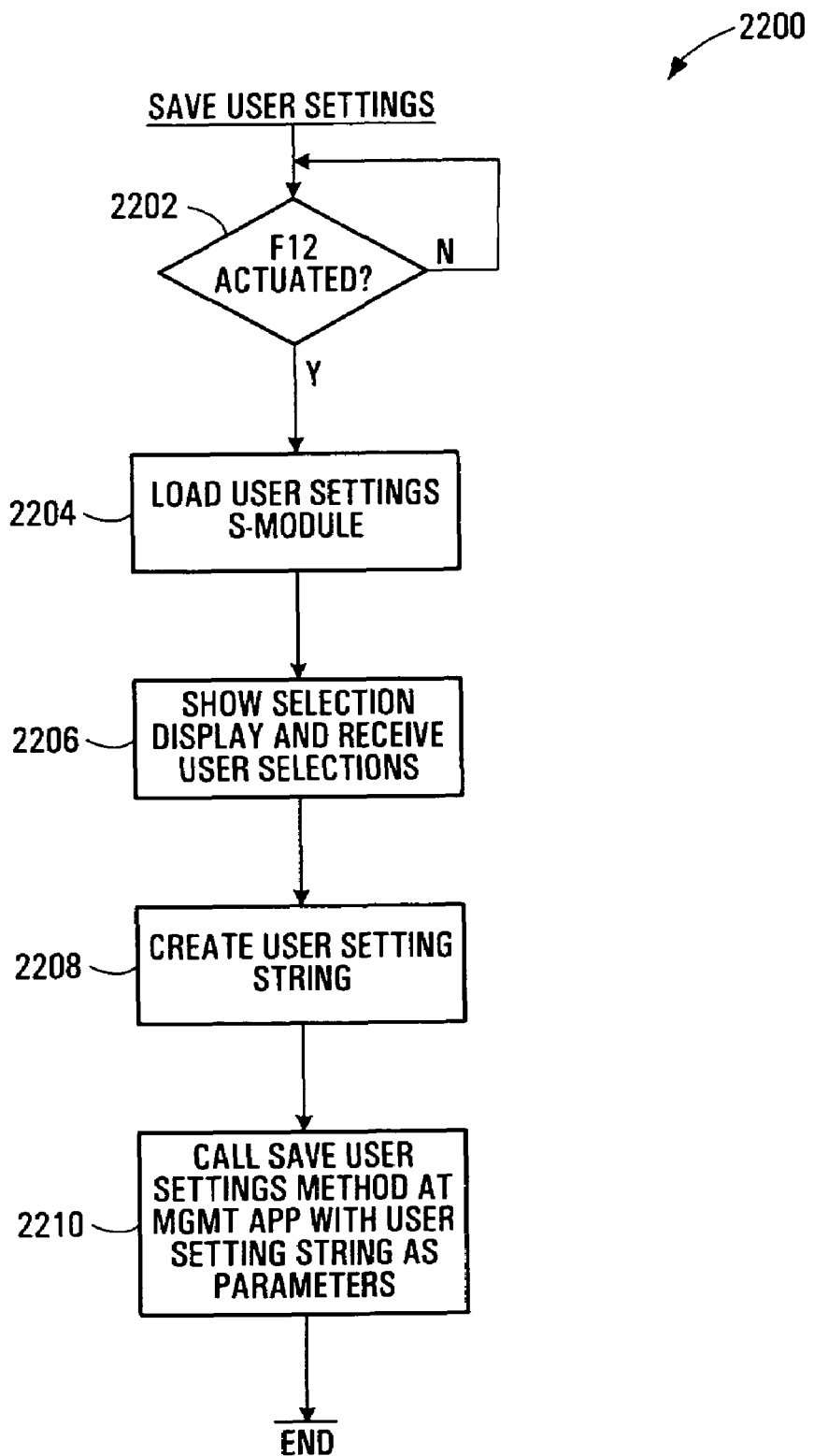

FIG. 129 is a screen shot of a flow chart depicting a save user settings process executed at a communication appliance for saving user settings such as those defining background images and colors of text boxes, for example.

DETAILED DESCRIPTION

Figure 1:
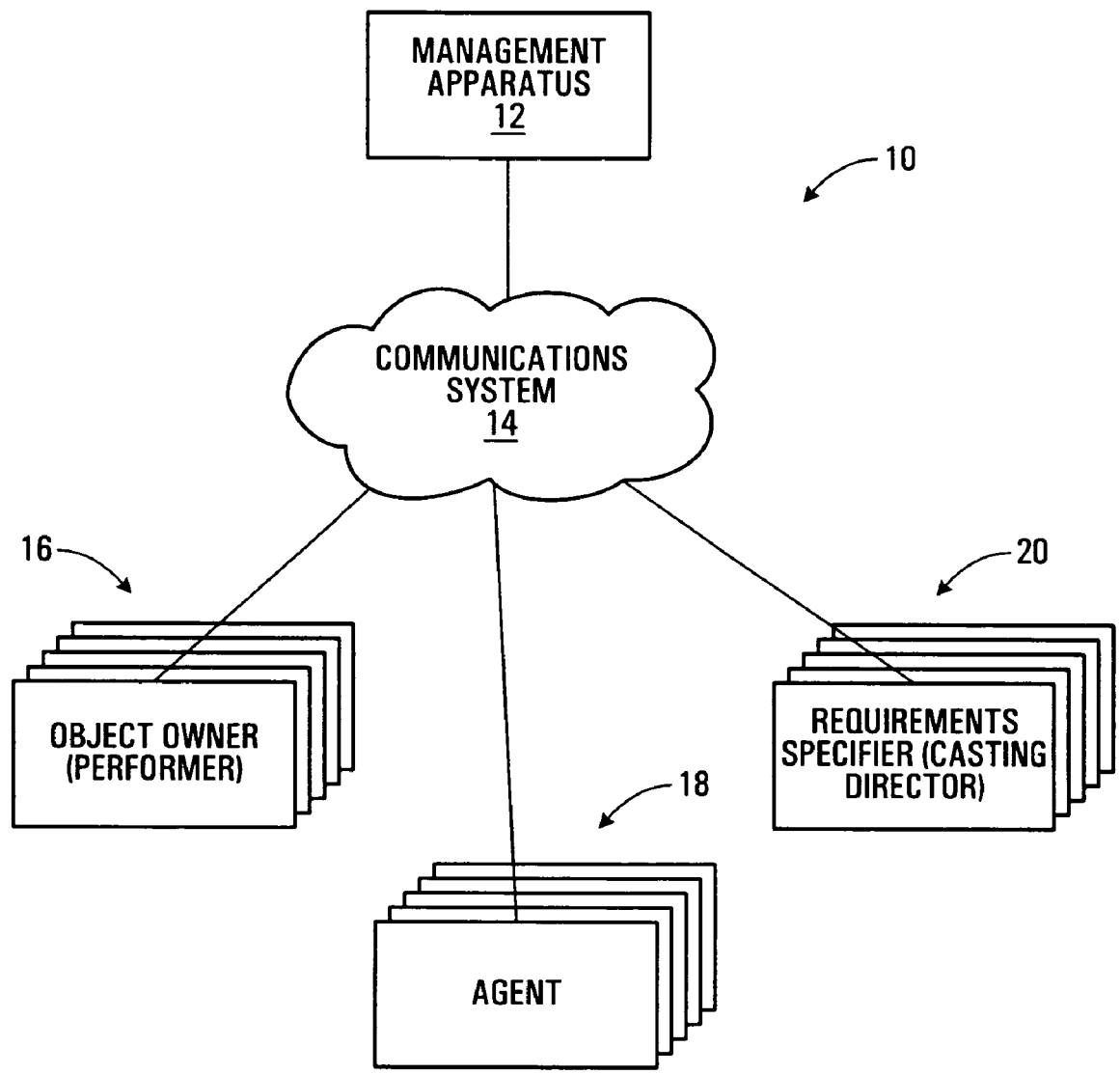
FIG. 1 is an overview of an environment in which an embodiment of the present invention may be used.

Referring to FIG. 1, a system facilitating third party representation of goods and/or services, e.g., an object, according to a first embodiment of the invention is shown generally at 10. The system 10 includes a management apparatus shown generally at 12, a communications system shown generally at 14, at least one, but typically a plurality of object owner communications appliances 16, at least one but preferably a plurality of agent communication appliances 18 and at least one but preferably a plurality of requirements specifier communication appliances 20.

Generally, the management apparatus 12 provides for an owner or controller of an object to use one of the object owner communications appliances 16 to communicate information such as features and attributes about an object to the management apparatus 12. The management apparatus 12 produces and stores one or more records containing this information and associates such records with the object.

The management apparatus 12 also facilitates associating the object with at least one agent, or more generally a third party representative to allow only said at least one agent or manager to have access to the records associated with a particular object, via one of the agent communications appliances 18.

The management apparatus 12 also facilitates communications with one of the requirements specifier communications appliances 20 to permit a requirements specifier to submit to the management apparatus a list of requirements such as features and attributes of a desired object. The management apparatus 12 also permits all, or some, agents to use any of the agent communications appliances 18 to review the list of requirements provided by the requirements specifier and scan the records of associated objects to determine possible matches of features and attributes of objects represented by the agent. The management apparatus also permits an agent to produce and make available to the requirements specifier a short list of candidate objects potentially suitable to meet the requirements specified on the list.

The requirements specifier 20 may communicate with the management apparatus 12 to adjust the requirements. The agent 18 may communicate with the management apparatus 12 to adjust the attributes and features of the object to effect a form of negotiation between the requirements specifier and the agent and to facilitate the selection of a particular object for use by the requirements specifier 20.

The above description provides a very general view of the components of the system 10 and how the components interact with each other to facilitate third party representation of an object. The following provides a description of a specific embodiment of the system 10 in which the object 16 is a performer such as a musician, actor, model or other person holding marketable talent, the agent is a talent agent who represents the performer in order to obtain work for the performer in return for a fee, and the requirements specifier 20 is a casting director. These parties can make use of the system 10 to permit the agent 18 to represent performers to obtain work for them with the casting director. It should be appreciated, however, that the system 10 may be used by other parties, such as: by job candidates, employment agencies and employers to match job candidates with employers; by manufacturers, sales personnel and buyers to sell goods to buyers; and by service providers, agents such as travel agents, and consumers to sell travel services to consumers. These are but a few of the possible applications of the system described herein. Generally, the method and apparatus described herein involve facilitating third party representation of an object by maintaining a database of structured and unstructured data associated with a plurality of objects, the database being accessible through a computer.

The method and apparatus further involve facilitating communications between the computer and a first communications appliance having a first set of access criteria to permit an operator of the first communications appliance to create, modify or delete the structured and unstructured data for at least some of the objects;

The method and apparatus further involve facilitating communications between the computer and a second communications appliance having a second set of access criteria to permit an operator of the second communications appliance to group into a package the structured and unstructured data for at least some of the objects;

The method and apparatus further involves facilitating communications between the computer and a third communications appliance having a third set of access criteria to permit the structured and unstructured data for at least some of the objects in said package to be presented to an operator at the third communications appliance.

To use the system 10 in any application, it is contemplated that the management apparatus 12 includes one or more computers, and that the object owner, agent and requirements specifier communications appliances 16, 18 and 20 include one or more computers, and that the communications system 14 includes a voice or data network such as the Internet, or a private Local Area Network or Wide Area Network maintained by an organization, and may include terrestrial and/or celestial wire-based and/or wireless connection-oriented and/ or connectionless communications. Effectively, the communications system 14 provides for communications between any of the communications appliances 16, 18 and 20 and the management apparatus 12. The communications appliances 16, 18 and 20 preferably include browser-enabled personal computers such as desktop computers, laptop computers, tablet personal computers, and personal digital assistants (PDAs) for example, or may include browser-enabled wireless telephones, PDAs, or other communications appliances. As will be explained below, the communications appliances are configured to run a Flash™ player, provided by Macromedia Inc., or equivalent.

Figure 2:
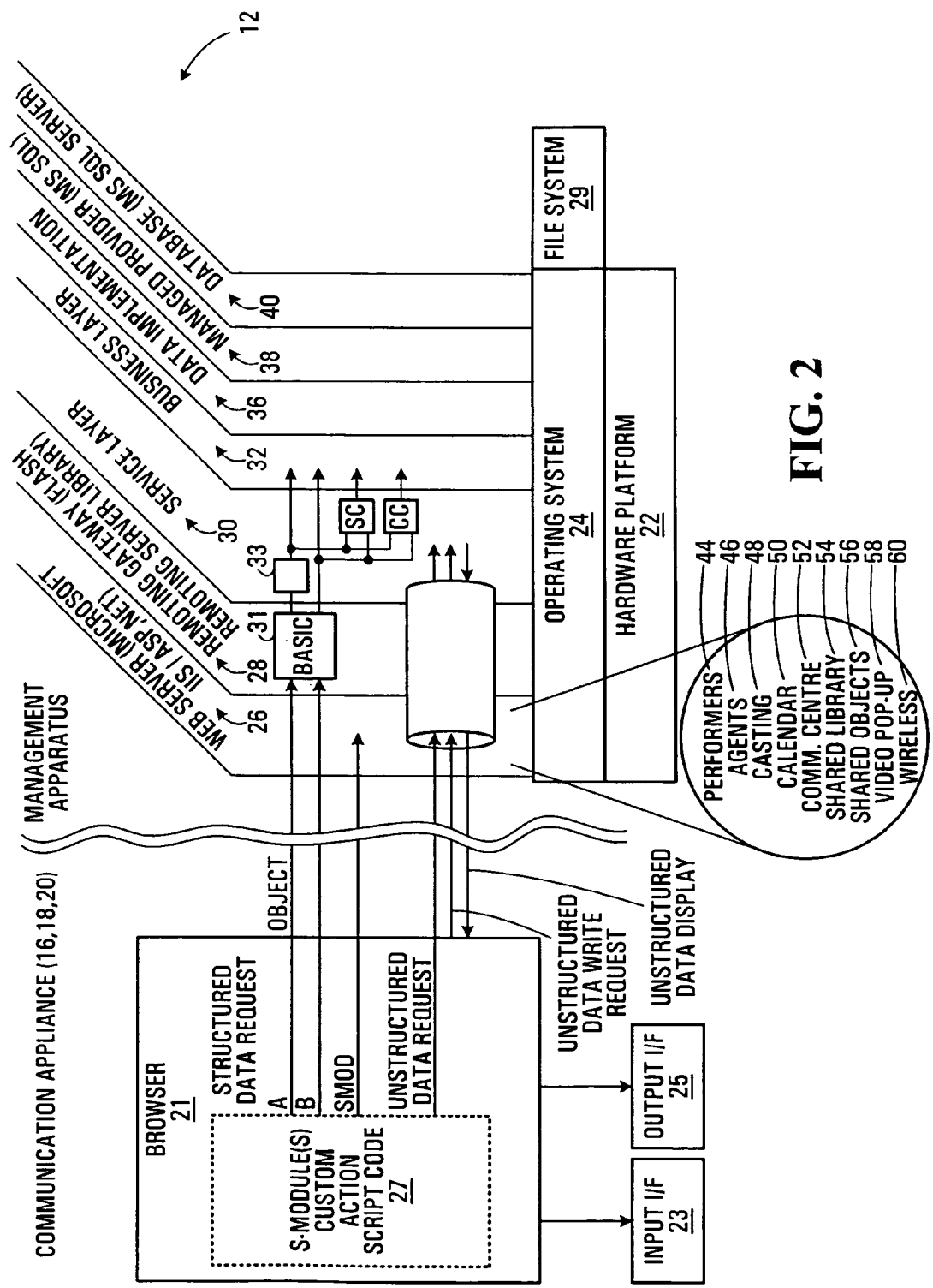
FIG. 2 is a somewhat block diagram illustrating the functional modules of a management apparatus and a communication appliance constructed in accordance with the subject invention.

Referring to FIG. 2, the communication appliance (16, 18, 20) includes a browser 21 operable to interact with an input interface 23 and an output interface 25. The input interface 23 may be a mouse or keyboard interface, electronic tablet stylus, and/or be voice-actuated for example, and the output interface 25 may be a video controller or liquid crystal display (LCD) controller, for example. The communication appliance (16, 18, 20) also includes memory shown generally at 27, which may be loaded with a FLASH™ player available from Macromedia Inc., for example, to facilitate viewing streaming files. The FLASH™ player or functionally similar environment may be regarded as a FLASH client.

The management apparatus computer 12 may be regarded as a "computer system" as it may include a plurality of computers to accommodate a large volume of data traffic with the object owners, agents and requirements specifier communication appliances 16, 18 and 20 and/or it may include a plurality of computers to distribute various tasks among said computers to provide fast, distributed processing. The management apparatus 12 may thus be regarded as a processor, it being understood that this term encompasses everything from a dedicated application specific integrated circuit (ASIC) chip-level implementation to a dedicated or general-purpose multi-computer implementation.

One embodiment of the management apparatus 12 may be implemented by a computer employing an Intel® Pentium® II 800 MHz processor, 512 Mb of random access memory (RAM) and 20 GB of hard disk drive space; another embodiment of the management apparatus 12 may be implemented by a computer employing an Intel Pentium III 1.33 GHz processor with associated RAM and hard disk drive space; another embodiment of the management apparatus 12 may be implemented by a computer employing an Intel Pentium 4 3.2 GHz Processor associated RAM and hard disk drive space. Another embodiment of the management apparatus 12 may be implemented by a computer employing an Apple® Computer 1 GHz PowerPC® G4 processor associated RAM and hard disk drive space. A plurality of other embodiment implementations may be employed but generally the computer system on which the management apparatus may be implemented may be referred to as a hardware platform 22. The hardware platform 22 is operable to run an operating system 24 such as the Microsoft® Windows 2000® or WindowsXP® operating systems, Unix, or Linux operating systems, and a plurality of operating systems, for example. The operating system establishes a file system 29 that is used to store multimedia files or generally unstructured files including pictures, animations, movies and sound files, for example.

Still referring to FIG. 2, the management apparatus 12 further includes software modules that implement a web server 26, modules that implement a remoting gateway 28, modules that implement a service layer 30, modules that implement a business layer 32, modules that implement a data implementation layer 36, modules that implement a managed provider 38 and modules that implement a database 40. One or more of these modules cooperate to facilitate communications between the management apparatus 12 and the communications appliances 16, 18 and 20.

In the embodiment shown, the web server 26 is provided by a portion of the operating system 24, in particular, modules associated with a Microsoft internet information server (IIS) or functionally similar environment. The remoting gateway 28 provides a server side implementation of Macromedia Flash Remoting MX or functionally similar environment. The service layer 30 provides for member authentication functions and provides a custom converter function. The business layer 32 provides functions for achieving some of the functionality of the system, in particular functions that involve access to the database 40. The data implementation layer 36 provides translation functions to ensure compatibility between the business layer and the managed provider 38.

The managed provider 38 includes a database interface such as that provided by Microsoft SQL™, where the database 40 is a Microsoft SQL™ server, Oracle Database, or a plurality of similar database environments. It will be appreciated that the managed provider 38 and database 40 may be located remotely from the management apparatus 12, It will also be appreciated that additional preferred embodiments of the managed provider 38 may include database interfaces such as those provided by IBM Structured Query Language/eXtensible Markup Language (SQL/XML), Oracle Database, or a plurality of database approaches and runtime environments and platforms.

The web server 26 also includes remoting environment program modules or, more particularly, streaming modules or S-modules that are comprised of Shockwave Flash (.swf) flash file format files, or any of a plurality of streaming file formats that deliver video, graphics, animation, text, and/or sound (i.e., media) to a communication appliance (16, 18 or 20). Generally, groups of S-modules provide broad categories of functionality to the communications appliances to facilitate the above-mentioned interaction between performers, agents and requirement specifiers, for example. These broad categories of functionality may include functionality for use by performers 44, functionality for use by agents 46, functionality for use by casting personnel 48, functionality associated with a calendar 50, functionality associated with communications 52, functionality associated with shared library information 54, functionality associated with shared object information 56, functionality associated with video pop-up information 58 and functionality associated with wireless information 60. The S-modules within each of the above categories are operable to define an arrangement of graphics content, for example, seen at a communication appliance (16, 18, 20) for display in a window created at the communications appliance by the Flash player, to elicit a response from the user of the communication appliance. The user's response may cause the Flash player to send to the management apparatus a request to store at the management apparatus information entered into a graphically defined area of the window or the response may cause the flash player to send a request to invoke another S-module at the management apparatus to cause a new set of media content to be seen in another window at the communication appliance.

Content presented at a communications appliance by an S-module may include information retrieved from or to be written to the database 40, hereinafter referred to as structured data, or it may include media content retrieved from or to be written to the file system 29, hereinafter referred to as unstructured data. A structured data communication includes two categories of data, the categories being designated A and B. The first category A is not supported by Flash™ Remoting or functionally similar environments and the second category B is supported by Flash™ Remoting and functionally similar environments. Requests made under the unsupported category A are passed through the web server 26 to the remoting gateway where a basic converter 31 implemented in the remoting gateway 28 converts the data into a weakly defined data type such as ASObject. This weakly defined data type is then passed to a custom converter 33 in the service layer 30 which converts the weakly defined ASObject into a more strongly defined object compatible with the modules in the business layer 32. The custom converter 33 is described in greater detail below.

Structured data requests that are supported by Flash™ Remoting are transmitted through the web server to the basic converter 31 at the remoting gateway 28. In response to these supported structured data requests the basic converter provides data according to a strongly defined data type for use by the business layer 32.

ASConverter

Considering structured data requests again, it will be appreciated that the management apparatus receives communications from the communication appliances in a Flash™ Remoting environment or plurality of functionally similar environments. In general, the management system, in particular the web server 26, service layer 30 and business layer establish a web services environment such as Microsoft .NET environment. It will also be appreciated that web server 26 service layer 30 and business layer preferred embodiments include IBM WebSphere, Sun Microsystems Java 2 Platform, Enterprise Edition (J2EE), Java Community Process$^{SM}$ (JCP), BEA Systems WebLogic, and a plurality of distributed computing environments and runtime platforms. Communications from communication appliances include objects representing structured data input, for example. The basic converter 31 and the custom converter 33 convert these objects into a format suitable for web services environments such as the .NET environment and a plurality of web services environmerits and runtime platforms at the management apparatus 12 in order to permit database accesses and other functionality to be provided by that environment.

Similarly, when the database 40 returns information, the managed provider 38 produces objects in the web services environment such as the .NET environment and these objects are converted by the basic converter 31 and/or the custom converter 33 into objects compatible with a remoting environment such as the Flash™ Remoting environment for transport to the communications appliance (16, 18 or 20).

Code in the Flash™ Remoting environment inherently provides for basic object conversions (i.e. the basic converter 31) between the Flash™ client and .NET environment according to Table 1 below.

TABLE 1

| C# (.NET) Data Type | Flash ™ Data Type |
| --- | --- |
| Null | Null |
| Bool, Boolean | Boolean |
| Any number type | Number |
| Char, String | String |
| Date Time | Date |
| ICollection, array of object | Array |
| Hashtable, IDictionary | Associative Array |
| DataSet | Associative Array of Recordset objects |
| DataTable | Recordset |
| ASObject | Object |

TABLE 1-continued

| C# (.NET) Data Type | Flash ™ Data Type |
| --- | --- |
| ASObject with type property set | Typed Object |
| XMLDocument | XML |

The Flash™ Remoting environment does not however, support the automatic conversion of other .NET environment objects (including member-defined objects). In normal practice the Flash™ Remoting environment requires that a .NET programmer explicitly write conversion code to translate all member-defined objects from and to the ASObject format, so that the Flash™ Remoting environment can then transport the object to the Flash™ client.

The ASObject format can be said to be "weakly typed", in that the type of data it contains is known only at runtime and therefore checks to ensure proper access to its data can only be performed at runtime. In contrast, .NET environment objects, for example, can be said to be "strongly typed", whereby the type of data an object contains is known at the time the code is compiled (hereinafter referred to as "compile time"), and checks to ensure that proper access to its data and operations may be performed at compile time.

The custom converter 33 according to one aspect of the invention automatically converts objects bi-directionally between the strongly typed .NET format and the weakly typed ASObject format, and between the weakly typed ASObject format and the strongly typed .NET format, respectively, thereby relieving the .NET programmer from the requirement to write explicit conversion code. The custom converter 33 employs .NET "attributes", which are special tags in the .NET environment that may add descriptions to any code symbol (such as classes, methods, properties or fields), and which may provide custom runtime information about the code symbols. This custom runtime type information is examined during runtime by other code through a process called "reflection", and that other code may manipulate or use the object associated with the code symbol in particular ways depending on the results of the reflection. (Reflection is the process whereby code can examine itself or other pieces of code to determine the structure, for example, classes, objects, properties, fields and methods, of the examined code). Reflection may be used to invoke methods, or get or set property or field values when code is introduced to a system some time after the original system code was compiled.

Additional preferred embodiments of the custom converter 33 convert objects bi-directionally between a plurality of strongly typed web services formats and the weakly typed ASObject format, and between the weakly typed ASObject format and a plurality of strongly typed web services formats, respectively, thereby relieving web services developers and programmers from the requirement to write explicit conversion code.

Combined with reflection, the use of attributes in the custom converter 33 supports a programming style called "declarative programming", whereby a programmer may extend the functionality of a given body of code simply by declaring that it has the additional functionality. Declarative programming is a simplification over a traditional programming style called "imperative programming", whereby the programmer may extend the functionality of a given body of code by specifying how additional functionality must be added to that body of code. In such a way, the normal practice of explicitly writing conversion code between the weakly typed ASObject format and strongly typed objects can be considered an example of imperative programming, whereas use of the converter and its associated attribute can be considered an example of declarative programming.

The novel custom converter 33 presented herein makes use of a custom attribute including a plurality of custom attribute property values that are associated with objects that are intended to be transferable between the .NET environment or a plurality of web services environments and the FLASH™ environment or a plurality of FLASH-compatible environments. The custom attribute property values specify how a conversion on an entity is to be done.

The custom attribute and its associated custom attribute property values can be applied both to an object's class definition and to individual properties and fields within the class definition. However, the effect of the custom attribute varies according to whether it is applied to a class, property or field. Marking a class with the custom attribute is used to signify to the custom converter 33 that objects of the marked class type can be converted. Marking a property or field within a class with the custom attribute is used to specify the way in which individual fields and properties of data within objects of the class will be converted.

In the embodiment described herein there is a custom attribute having four custom attribute properties, including an Auto property, a Name property, a Keyword property and an Access property that may be assigned to a given .NET environment entity or a plurality of web services environment entities.

Auto Property

The Auto property is used to specify whether public properties of a class may be automatically exposed to conversion. If the Auto property is set to "true", only the public properties of the class will be exposed to the conversion, as may be seen from the code sample shown in FIG. 2A. Conversely, if the Auto property is set to "false" or is unspecified, only those fields and properties that have a custom attribute applied to them will be exposed to conversion. The attribute property is generally intended for use with simple classes. It is ignored if applied to a field or property.

Name Attribute Property

The Name attribute property is used to specify a specific name for the entity being converted. When the Name attribute property is associated with a class the converted entity assumes a name specified by the Name attribute property. When the Name attribute property is associated with a property or field the associated field within the converted entity assumes a name specified by the Name attribute property. The Name attribute property may have a default, non-specified value indicating that that the name of the target entity or field within the target entity is to be derived from the name of the starting entity or associated property or field of the starting entity. The Name attribute property applied to a class is shown in FIG. 2B and applied to a property or field is shown in FIG. 2C.

Keyword Attribute Property

The Keyword attribute property is used to limit which properties and/or fields of the .NET object are used in a specific conversion operation to a subset of the properties and fields that would normally be used in a conversion. This facility enables the weakly typed object output from a conversion to represent a smaller version of a strongly typed object, which is useful for optimizing network communication speed and memory usage, especially when dealing with large collections of weakly typed objects. The keyword attribute property is ignored if applied to a class.

Access Attribute Property

The Access attribute property may be associated with a property or a field. The Access attribute property is ignored when applied to a class and is given one of three values when applied to a property or field. These three values include: Both, Read, or Write. The "Both" value indicates that the property or field is used for read and write operations. The "Read" value indicates the property or field is used only for read operations and the "Write" value indicates the property or field is used only for write operations. The Access attribute property allows one property or field to be used for conversion during a read operation and another property or field to be used for conversion during a write operation. An example of the use of the Access mode parameter is shown in FIG. 2D.

Typically, .NET environment classes, for example, will permit only limited access to their data through an object oriented programming principle called encapsulation, will indicate that a publicly accessible property is available for read-only operations and will keep the underlying field implementation private and inaccessible to code outside the class. The Access attribute property can be used to provide privileged access to the private field implementation for write access during a conversion, thereby maintaining encapsulation for the remainder of the .NET environment code and allowing special access only to the conversion process.

Generally, the custom conversion schemes provided herein include a first converter for converting strongly typed objects into weakly typed ASObject objects and a second converter for converting weakly typed ASObject objects into strongly typed objects.

ASConverter Class

The first and second converters are implemented in a class of .NET environment objects hereinafter referred to as an ASConverter class. The ASConverter class is a class of .NET environment objects operable to convert strongly typed objects to which custom attribute parameters have been associated, to and from weakly typed ASObject objects. In general, this class of objects performs conversion according to the custom attribute parameters associated with the strongly typed objects. Additional preferred embodiments for the ASConverter class include a plurality of web services environments including for example IBM WebSphere, Sun Microsystems J2EE, JCP, BEA Systems WebLogic, and a plurality of additional possible embodiments.

In a preferred embodiment, the environment is Java-based. Java does not have the concept of properties formally in its language or run-time specification, although it accomplishes a similar goal with property accessors. Property accessors are simply methods that, by convention, begin with "get" or "set" to indicate a read or write operation respectively on the logical property. Accordingly, the ASConverter is modified to use reflection on methods in addition to properties and fields.

Further, Java does not have the concept of attributes or similar declarative programming constructs. Java may at some time be extended to support such a thing, as a competitive measure against .NET. Even if this is not the case, the ASConverter extends to take advantage of a 'pre-processor'. Pre-processors are an approach in computer programming systems that allow a standard language (such as C, Java) to be annotated with additional constructs. Before standard compilation, the pre-processor is run to extract the additional constructs and perform processing on those constructs, then passing the original, standard language constructs to the standard compiler.

The ASConverter class includes three main methods including a ToASObject method, a FromASObject method, and GetMapping method. The ToASObject method implements the first converter and converts strongly typed objects into weakly typed ASObject objects and the FromASObject method implements the second converter and converts weakly typed ASObject objects into strongly typed objects. Both the ToASObject method and the From ASObject method use the GetMapping method to obtain a list of methods that define property and field mappings that describe the conversions required for each property and field.

The GetMapping Method

The GetMapping method returns mapping information that can be used to convert a strongly typed .NET object to a weakly typed ASObject or vice versa. The GetMapping method examines the custom attributes of a strongly typed object and looks in a pre-defined list of processes associated with respective properties and fields, to gather and select the processes that are to be used to convert the properties and fields of the strongly typed object to a weakly typed ASObject object or vice versa. The GetMapping method has a plurality of parameters including an IsWriteMode parameter and property and field dictionary parameters. The IsWriteMode parameter indicates whether the mapping is for a strongly typed object to weakly typed ASObject object conversion or for a weakly typed ASObject object to strongly typed object conversion, e.g., a write mode control parameter. For the former conversion, the IsWriteMode parameter may have the values "false" or "read mode" and for the latter conversion, this parameter may have the values "true" or "write mode". The property and field dictionary parameters include identifications of property and field conversion objects associated with respective properties and fields of the starting entity that can be used by .NET reflection to read or write data values into a target output entity that is the result of the conversion process. Preferred embodiments of the ASConverter Class include a plurality of web services environments. In the case of a conversion of a strongly typed object to a weakly typed ASObject the return value or ASType output parameter.of the GetMapping method is the class name of the weakly typed ASObject as determined by the custom attribute associated with the class declaration of the strongly typed object. This class name is used for example, by the Flash™ Remoting environment to ultimately associate the data contained in the weakly typed ASObject with its representation in the Flash™ client, for example. The class name will be null if no custom attribute parameters are associated with the strongly typed object. Thus, given a starting strongly typed object, the custom attribute parameters associated with the strongly typed object and an indication of conversion, the GetMapping method finds a plurality of sub-methods selected and controlled by the custom attribute parameters, that will affect conversion between properties and fields of an entity in the Flash™ Remoting or .NET environments to the other, for example. This plurality of sub-methods may be regarded as a plurality of property and field mappings or may be collectively referred to as the mapping method.

Referring now to FIGS. 2H-M, a flow chart for the GetMapping method is referred to generally by the reference numeral 500. The GetMapping method has three input parameters that control its behavior and three output parameters that represent the mapping information as shown in legend 502 and as follows:

1. Object—an input parameter that is the strongly typed .NET object that will be converted to or from a weakly typed ASObject.

2. IsWriteMode—an input parameter that can have a true or false value. A true value indicates that the output parameters that are returned should be for converting a weakly typed ASObject to the strongly typed .NET object indicated by the Object parameter. A false value indicates that the output parameters that are returned should be for converting the strongly typed .NET object indicated by the Object parameter to a weakly typed ASObject.

3. Keyword—an optional input parameter that can limit which properties and/or fields of the .NET object are used in the conversion to a subset of the properties and fields that would normally be used in a conversion.

4. Property Definition Dictionary—an output parameter that forms part of the mapping information returned by the method, containing a dictionary of property definitions that specify the properties of the strongly typed .NET object that will be used in the conversion. The dictionary consists of key/value pairs, with the key being the name of the property's representation in the weakly typed ASObject, and the value being the PropertyInfo object furnished by .NET reflection that is associated with that name.

5. Field Definition Dictionary—an output parameter that forms part of the mapping information returned by the method, containing a dictionary of field definitions that specify the properties of the strongly typed .NET object that will be used in the conversion. The dictionary consists of key/value pairs, with the key being the name of the field's representation in the weakly typed ASObject, and the value being the FieldInfo object furnished by .NET reflection associated with that name.

6. ASType—an output parameter that forms part of the mapping information returned by the method, indicating the name of the type of the weakly typed ASObject that will be converted to or from the strongly typed .NET object.

The flowchart 500 starts at step 504. At step 506, the management apparatus 12 first uses .NET reflection to check whether the Object input parameter has an ActionScript attribute associated therewith. If there is no such attribute an exception is raised, causing a termination of the method 500 at step 508. The exception construct in the .NET environment and similar OOP environments is used to signify an exceptional or run time error situation, causing termination of the currently executing method and any methods that have directly or indirectly caused the current method to execute through a method call or stack of method calls. The exception is thus propagated to all executing methods in the stack of method calls until a method explicitly handles the exception. An exception is raised if the ActionScript attribute is not present as this indicates a programmer error in the use of the ASConverter. If the ActionScript attribute is present, the method 500 proceeds to step 510.

At step 510, the ASType output parameter value is then set to (a) the Name property of the ActionScript attribute associated with the Object input parameter, or if this Name attribute property is not specified, (b) the class name of the Object input parameter as retrieved through .NET reflection.

At step 512, the GetMapping method 500 then determines whether property and field definition dictionaries are in the dictionary cache. The ASConverter maintains a cache of property and field definition dictionaries (the "Dictionary Cache") for each combination of input parameters supplied in calls to the GetMapping method throughout the lifetime of the ASConverter, specifically the combination of the (a) class name of the strongly typed .NET object, (b) the IsWriteMode input parameter, and (c) the Keyword input parameter. The ASConverter uses this Dictionary Cache to optimize the retrieval of the property and field definition dictionaries, such as to only calculate these values if they have not been calculated in a previous call to the GetMapping method with the same input parameter values. If the property and field definition dictionaries are cached, the method 500 proceeds to step 514. If not, the method proceeds to step 516.

At step 516, the cached values are applied to the Property Definition Dictionary output parameter and the Field Definition Dictionary output parameter respectively, and the GetMapping method is terminated at step 518. Otherwise, these parameters are calculated in the manner explained as follows.

At step 514, the method 500 determines whether it should perform its calculation using one of two modes: automatic mode or manual mode in order to subsequently calculate the values for the Property Definition Dictionary and Field Definition Dictionary output parameters. Automatic mode is the calculation mode used if the Auto property of the ActionScript attribute is true and the process proceeds along the path to matching circle A. The method 500 proceeds to matching circle B, if no value has been specified for the Keyword input parameter, then manual mode is the calculation mode used if either the Auto property of the ActionScript attribute is false or if a value has been specified for the Keyword input parameter.

Automatic Mode

Figure 2E:
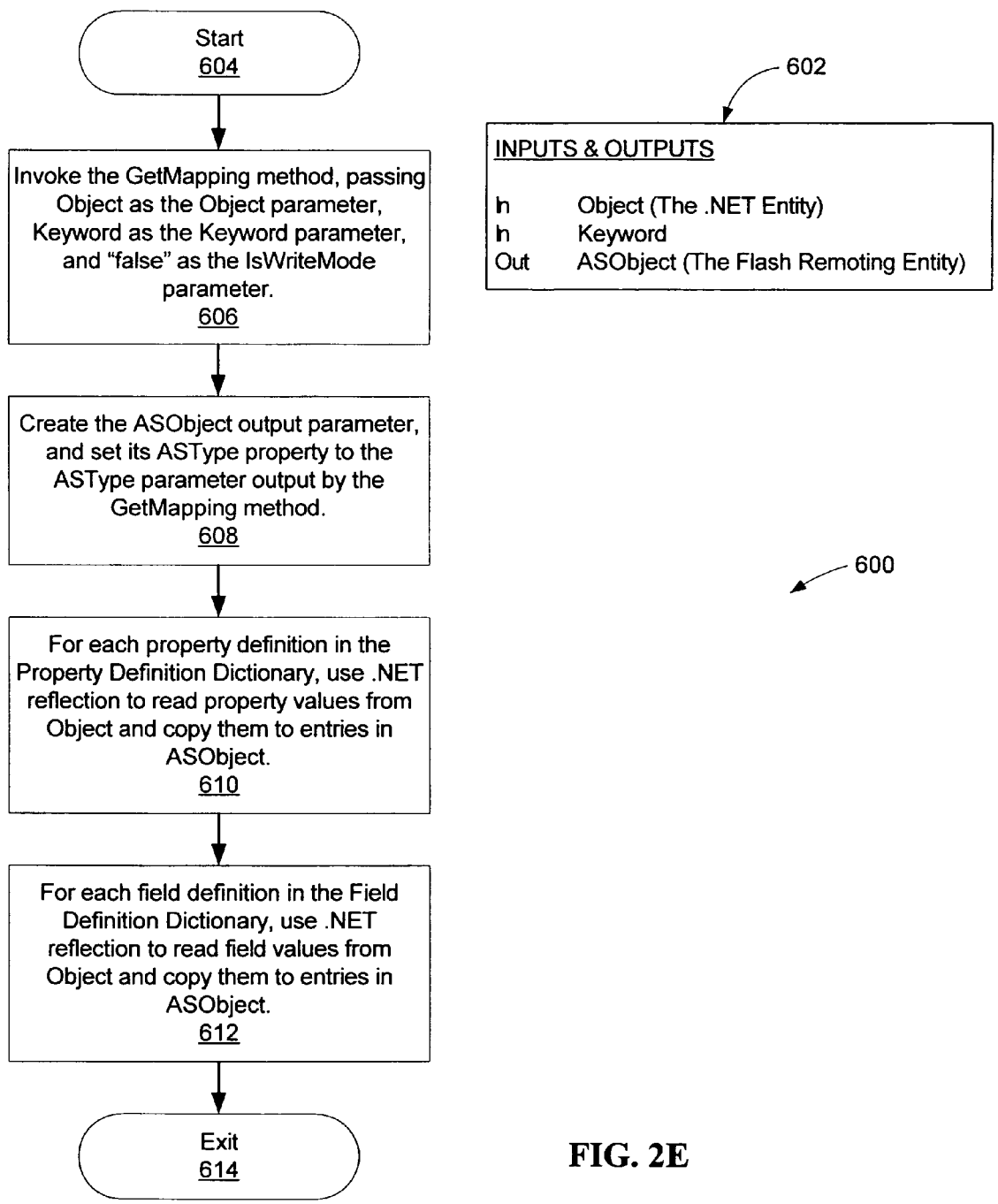
FIG. 2E is a flowchart of an exemplary ToASObject method for use in an embodiment of the subject invention.
Figure 2F:
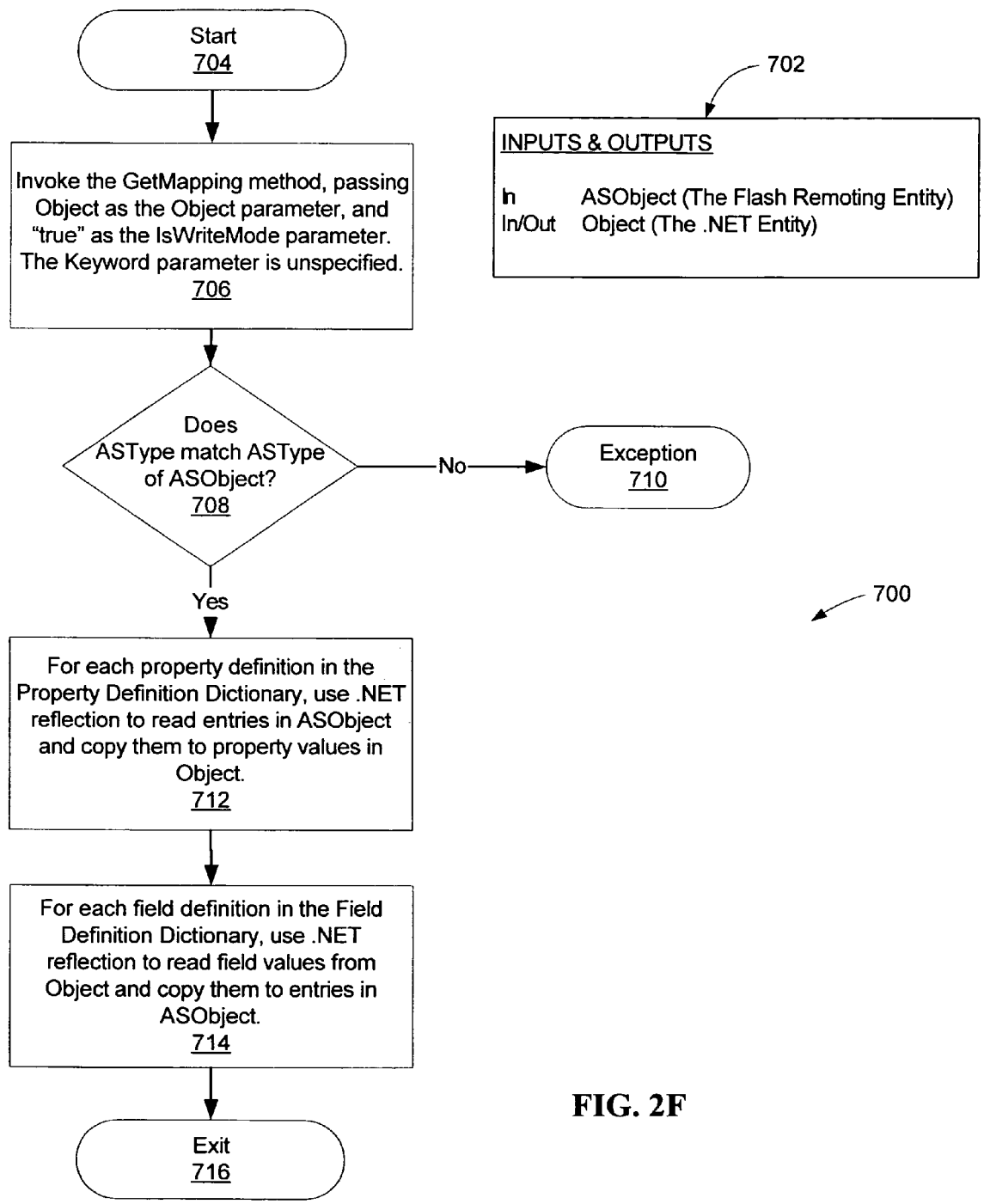
FIG. 2F is a flowchart of an exemplary FromASObject method for use in an embodiment of the subject invention.
Figure 2H:
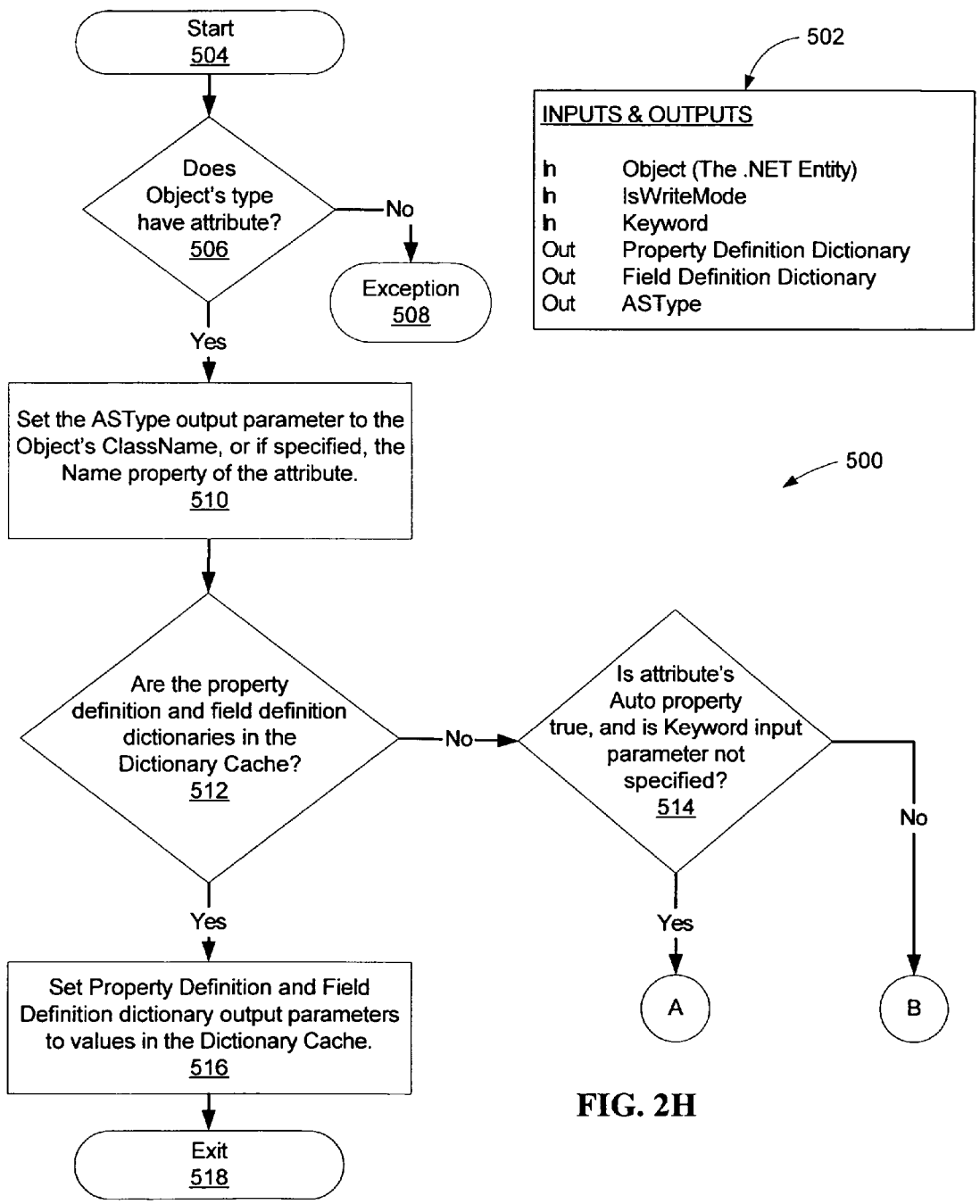
FIGS. 2H-M is a flowchart illustrating a GetMapping Method in accordance with a preferred embodiment with matching circles illustrating how to properly connect these figures.
Figure 2I:
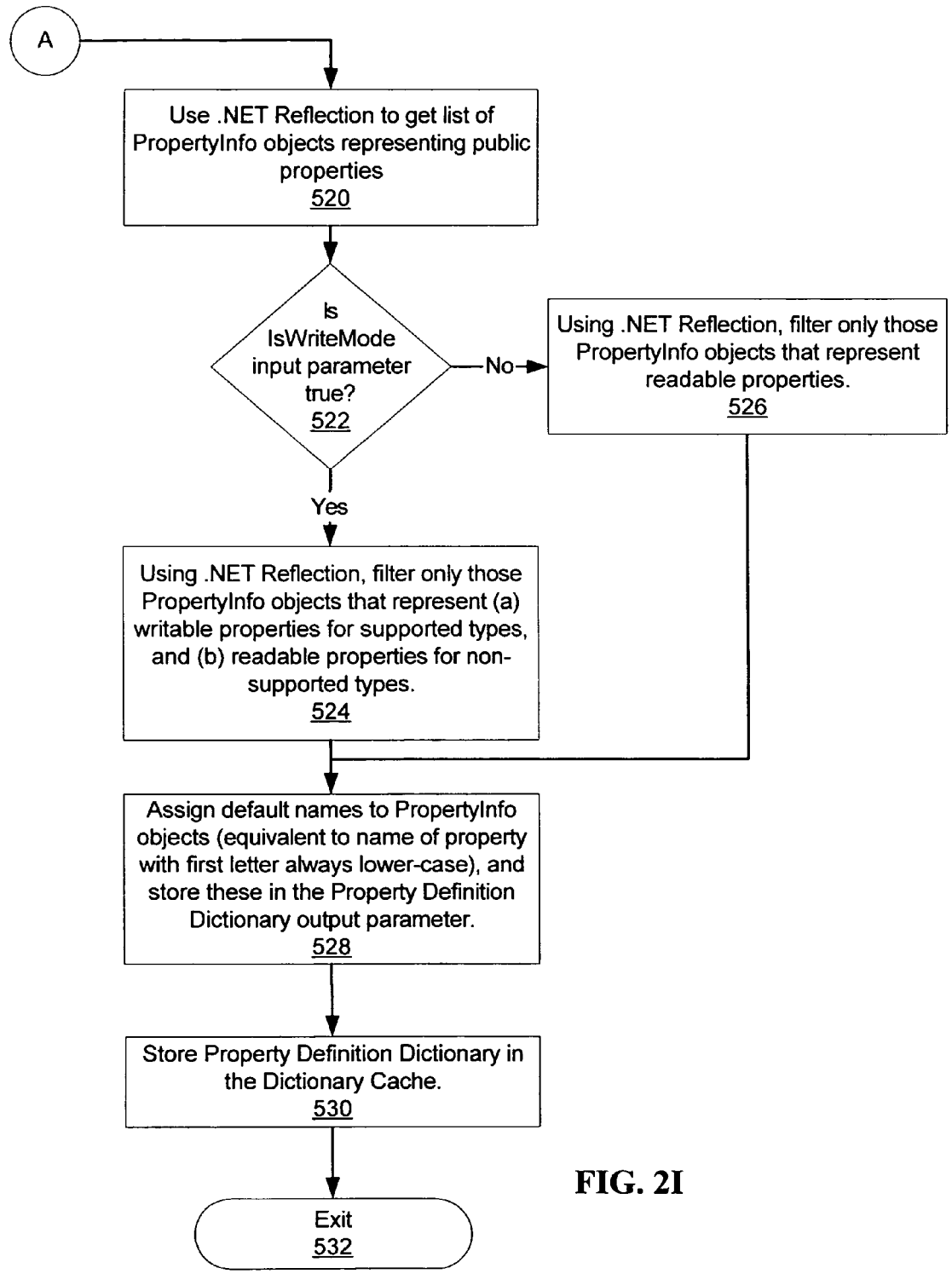

Referring now to FIG. 2I, matching circles A-A illustrate how to properly connect FIGS. 2H and 2I. The automatic mode of calculating the values for the Property Definition Dictionary and Field Definition Dictionary output parameters is typically used for simple conversions of strongly typed .NET objects (specified as the Object input parameter) to or from weakly typed ASObject objects. Unlike manual mode, automatic mode does not require that the Object input parameter's properties and/or fields involved in the conversion process have associated ActionScript attributes.

At step 520, the GetMapping method implements the automatic mode calculation by first using .NET reflection to obtain a list of PropertyInfo objects representing the public properties of the Object input parameter. The list of PropertyInfo objects is then filtered to include only those PropertyInfo objects that meet specific criteria.

At step 522, the method 500 determines if the IsWriteMode input parameter is true (representing a conversion of a weakly typed ASObject to the Object input parameter) or false (representing a conversion of a strongly typed .Net object to a weakly typed ASObject). At step 522, if the IsWriteMode input parameter is false, the method proceeds to step 526. If true, at step 524, the list is filtered to include only those PropertyInfo objects that represent writable properties for the data types supported by Flash Remoting (as seen, for example in Table 1 above) or that represent readable properties for the data types not supported by Flash Remoting. The GetMapping method determines whether a given PropertyInfo object represents a readable or writable property by examining the CanRead or CanWrite properties respectively of the said PropertyInfo object and the method proceeds to step 528.

Conversely, at step 526, if the IsWriteMode input parameter is false (representing a conversion of the Object input parameter into a weakly typed ASObject), the list is filtered to include only those PropertyInfo objects that represent readable properties. The GetMapping method determines whether a given PropertyInfo object represents a readable property by examining the CanRead property of the said PropertyInfo object. If the PropertyInfo object is a readable property, this information is passed to the ASConverter and the method 500 also proceeds to step 528. As a result, at step 528, a subset list of PropertyInfo objects is developed.

At step 528, the ASConverter uses the subset list of PropertyInfo objects. The GetMapping method 500 assigns default names to each PropertyInfo object in the list. The default name is the name of the property represented by the PropertyInfo object, with the first letter of the name always lower-case to follow Flash Remoting conventions but it is to be recognized that alternative conventions could be followed. Each of the default names is then stored along with its associated PropertyInfo object in a dictionary. The dictionary is set as the value of the Property Definition Dictionary output parameter, and, at step 530, is added to the Dictionary Cache along with the (a) class name of the strongly typed .NET object, (b) the IsWriteMode input parameter, and (c) the Keyword input parameter to identify the dictionary in subsequent calls to the GetMapping method. Note that in automatic mode, the GetMapping method sets an empty value for the Field Definition Dictionary output parameter. As a result, the Property Definition Dictionary (containing pairs of names and PropertyInfo objects) is stored in the Dictionary Cache, to be identified in subsequent calls to the GetMapping method by ClassName, IsWriteMode and Keyword. At step 532, the automatic portion of the method 500 terminates.

Manual Mode

Figure 2J:
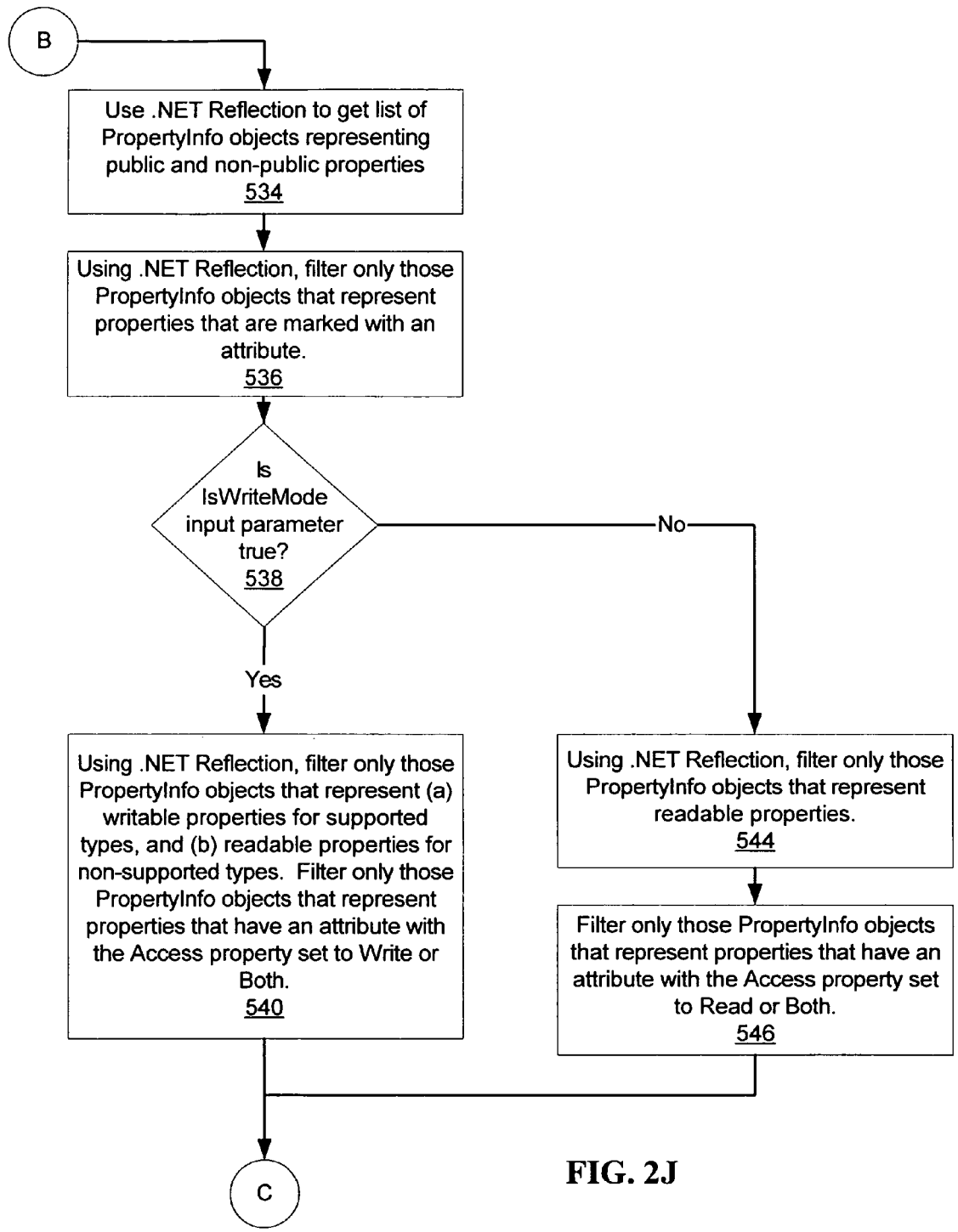

Referring now to FIG. 2J, matching circles B-B illustrate how to properly connect FIGS. 2H and 2J. The manual mode of calculating the values for the Property Definition Dictionary and Field Definition Dictionary output parameters is typically used for more complex conversions of strongly typed .NET objects (specified as the Object input parameter) to or from weakly typed ASObject objects. Unlike automatic mode, manual mode requires that the Object input parameter's properties and/or fields involved in the conversion process have associated ActionScript attributes.

At step 534, the GetMapping method implements the manual mode calculation by first using .NET reflection to obtain a list of PropertyInfo objects representing the public and non-public properties of the Object input parameter. The list of PropertyInfo objects is further filtered in a plurality of operations to include only those PropertyInfo objects that meet specific criteria. At step 536, the list of PropertyInfo objects is filtered to include only the PropertyInfo objects that represent properties that have an associated ActionScript attribute.

At step 538, the method 500 proceeds through different steps according to the value of the IsWriteMode input parameter. If the IsWriteMode input parameter is true (representing a conversion of a weakly typed ASObject to the Object input parameter), the method 500 proceeds to step 540. If false, the method 500 proceeds to step 544.

At step 540, the list is filtered to include only those PropertyInfo objects that represent writable properties for the data types supported by Flash Remoting or that represent readable properties for the data types not supported by Flash Remoting. The GetMapping method 500 determines whether a given PropertyInfo object represents a readable or writable property by examining the CanRead or CanWrite properties respectively of the said PropertyInfo object.

Still referring to step 540, if the IsWriteMode input parameter is true, the list is further filtered to include only those PropertyInfo objects that represent properties that have an associated ActionScript attribute with the Access property set to Write or Both.

At step 544, if the IsWriteMode input parameter is false (representing a conversion of the Object input parameter into a weakly typed ASObject), the list is filtered to include only those PropertyInfo objects that represent readable properties. The GetMapping method 500 determines whether a given PropertyInfo object represents a readable property by examining the CanRead property of the said PropertyInfo object. At step 546, the method 500 further filters the list to include only those PropertyInfo objects that represent properties that have an associated ActionScript attribute with the Access property set to Read or Both.

Figure 2K:
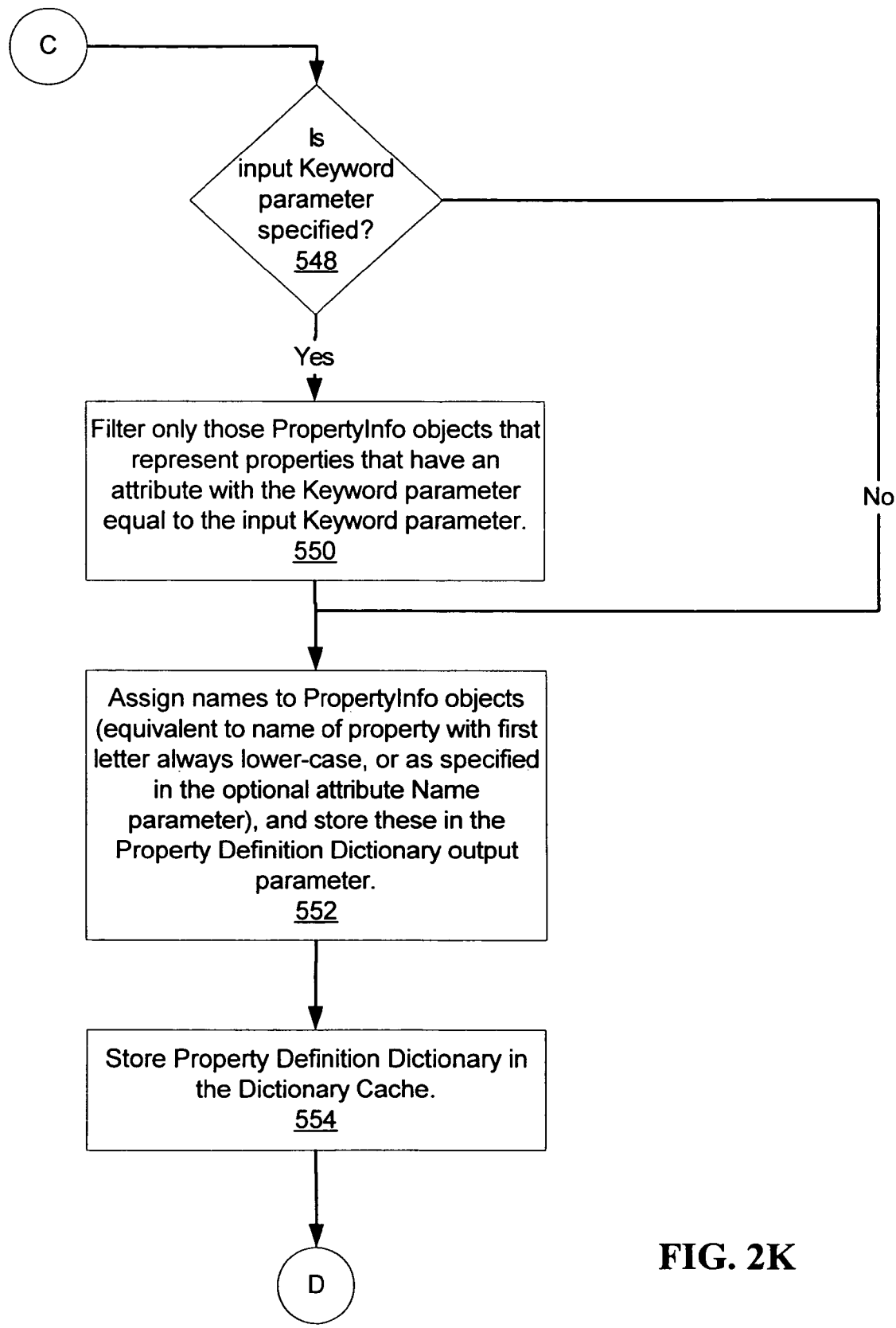

Referring now to FIG. 2K matching circles C-C illustrate how to properly connect FIGS. 2J and 2K. At step 548, if the Keyword input parameter is specified, the method proceeds to step 550 where the list is further filtered to include only those PropertyInfo objects that represent properties that have an associated ActionScript attribute with the Keyword property set to the value of the Keyword input parameter. If the Keyword input parameter is not specified, the method skips step 550 and proceeds directly to step 552.

At step 552, the ASConverter, using the subset list of PropertyInfo objects, then assigns names to each PropertyInfo object in the list. This name is either (a) the value of the Name property of the ActionScript attribute associated with the property represented by the PropertyInfo object, or if this Name property is not specified, (b) the name of the property represented by the PropertyInfo object, with the first letter of the name always lower-case to follow Flash Remoting conventions but it is to be recognized that alternative conventions could be followed.

At step 554, each of these names is then stored along with the associated PropertyInfo object in a dictionary. The dictionary is set as the value of the Property Definition Dictionary output parameter, and is added to the Dictionary Cache along with the (a) class name of the strongly typed .NET object, (b) the IsWriteMode input parameter, (c) the Keyword input parameter to identify the dictionary in subsequent calls to the GetMapping method.

Figure 2L:
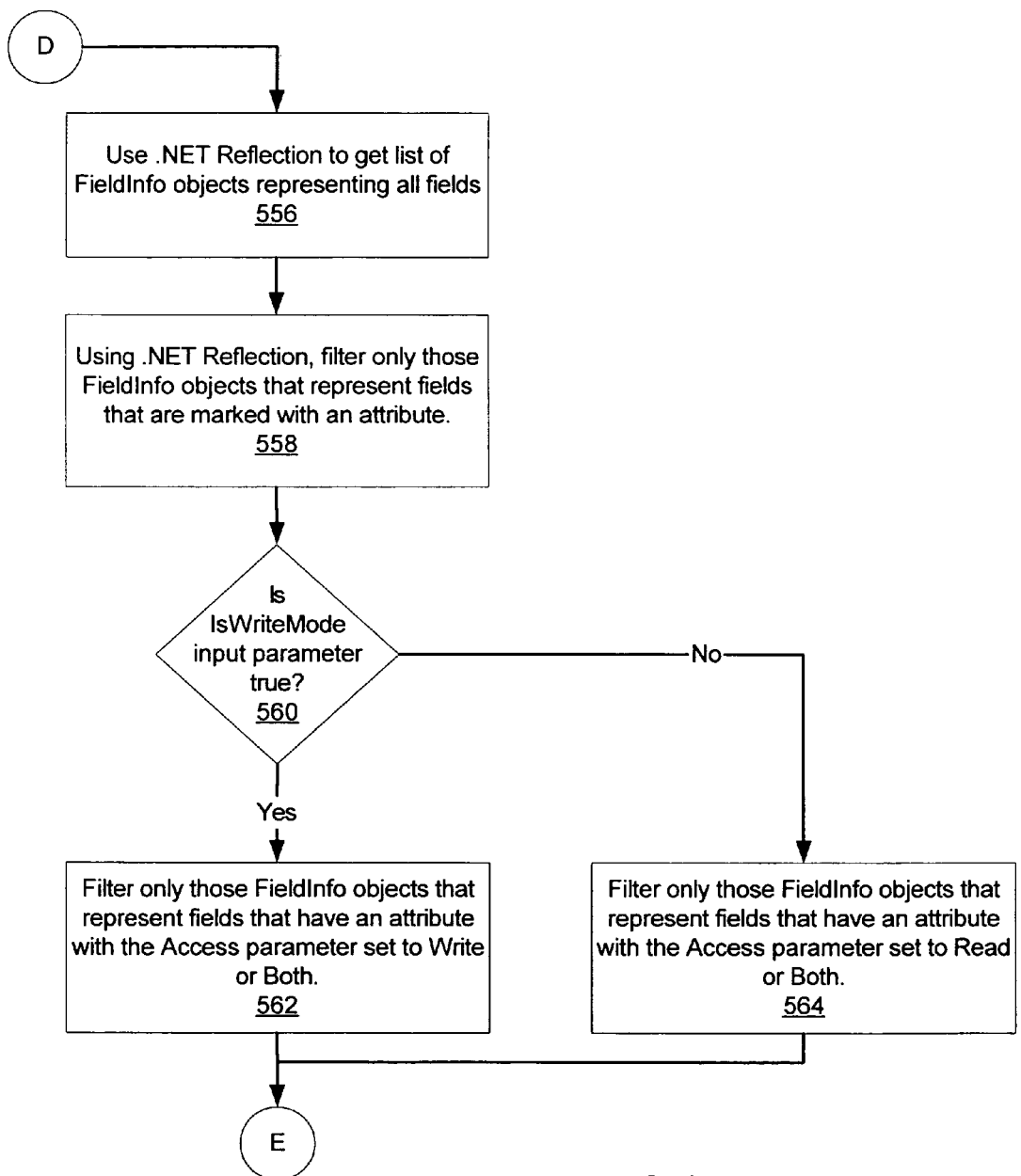

Referring now to FIG. 2L matching circles D-D illustrate how to properly connect FIGS. 2K and 2L. At step 556, the GetMapping method continues the manual mode calculation by using .NET reflection to obtain a list of Fieldinfo objects representing the fields of the Object input parameter.

At step 558, the list of FieldInfo objects is further filtered in a plurality of operations to include only those FieldInfo objects that meet specific criteria to create a subset list of FieldInfo objects. In a preferred embodiment, the list is filtered to include only those Fieldinfo objects that represent fields that have an associated ActionScript attribute.

At step 560, if the IsWriteMode input parameter is true (representing a conversion of a weakly typed ASObject to the Object input parameter), the method 500 proceeds to step 562 where the list is filtered to include only those Fieldinfo objects that represent fields that have an associated ActionScript attribute with the Access property set to Write or Both. If the IsWriteMode input parameter is false (representing a conversion of the Object input parameter into a weakly typed ASObject), the method 500 proceeds to step 564 where the list is filtered to include only those Fieldinfo objects that represent fields that have an associated ActionScript attribute with the Access property set to Read or Both.

Figure 2M:
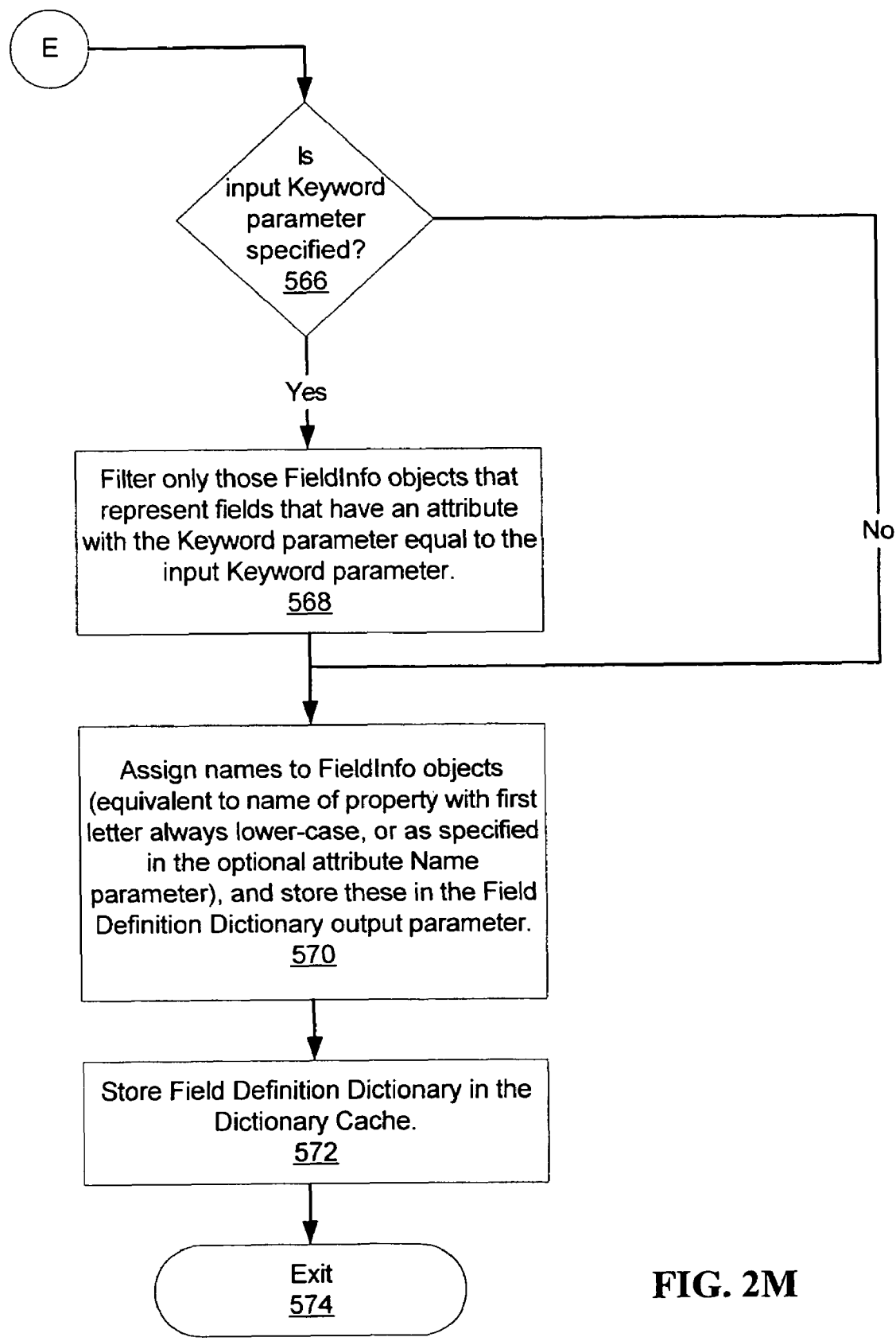

Referring now to FIG. 2M matching circles E-E illustrate how to properly connect FIGS. 2L and 2M. At step 566, if the Keyword input parameter is specified, the method 500 proceeds to step 568 where the list is further filtered to include only those FieldInfo objects that represent fields that have an associated ActionScript attribute with the Keyword property set to the value of the Keyword input parameter. If the Keyword input parameter is not specified, the method 500 skips step 568 and proceeds directly to step 570.

At step 570, the ASConverter uses the subset list of FieldInfo objects to continue the GetMapping method 500. The ASConverter assigns names to each FieldInfo object in the list. This name is either (a) the value of the Name property of the ActionScript attribute associated with the field represented by the Fieldinfo object, or if this Name property is not specified, (b) the name of the field represented by the Fieldinfo object, with the first letter of the name always lower-case to follow Flash Remoting conventions but it is to be recognized that alternative conventions could be followed. At step 572, each of these names is then stored along with its associated Fieldinfo object in a dictionary. The dictionary is set as the value of the Field Definition Dictionary output parameter, and is added to the Dictionary Cache along with the (a) class name of the strongly typed .NET object, (b) the IsWriteMode input parameter, and (c) the Keyword input parameter to identify the dictionary in subsequent calls to the GetMapping method and the method 500 terminates at step 574.

ToASObject Method

Referring now to FIG. 2E, given a strongly typed object, the ToASObject method which implements the first converter, makes a call to the GetMapping method to obtain property and field mappings according to the custom attribute parameters associated with the strongly typed object. The reflection feature of the .NET platform, for example, is then used to retrieve the property and field values of the strongly typed object and the property and field mappings specified by the custom attribute parameters are used to populate a corresponding weakly typed ASObject entity.

The ToASObject method has the form:

public ASObject ToASObject(object aObject, string keyword);

The GetMapping method has the form:

public string GetMapping(object aObject, bool isWriteMode, IDictionary propList, IDictionary fieldList, string keyword);

The ToASObject method handles properties and field values where:

1. the data type is already supported for example by Flash™ Remoting; or
2. the value represents a strongly typed object and that strongly typed object has one or more custom attribute parameters associated with it. When this type of value is encountered, the method will call itself recursively to convert the value to a weakly typed ASObject object.

The conversion fails with an exception if the specified strongly typed object does not have any custom attribute parameters associated with it, or if the strongly typed object's properties or fields marked as available for the conversion do not fit one of the two above categories. The exception is raised by the GetMapping method and propagates past the ToASObject method because the ToASObject method does not explicitly handle the exception.

ToASObject Method

Referring to FIG. 2E, the ToASObject method converts a strongly typed .NET object to a weakly typed ASObject and is referred to generally by the reference numeral 600. The ToASObject method 600 has two input parameters that control its behavior and one output parameter that represents the weakly typed ASObject as shown in legend 602 and as follows:

1. Object—an input parameter that is the strongly typed .NET object that will be converted to a weakly typed ASObject.
2. Keyword—an optional input parameter that can limit which properties and/or fields of the strongly typed .NET object that are used in the conversion to a subset of the properties and fields that would normally be used in the conversion.
3. ASObject—an output parameter that is the weakly typed ASObject that is converted from the strongly typed .NET object.

At step 604, the management apparatus 12 starts the ToASObject method 600 in response to [4]. At step 606, the ToASObject method 600 invokes the GetMapping method 500 to determine the mapping information necessary to convert the strongly typed .NET object identified by the Object input parameter into a weakly typed ASObject identified by the ASObject input parameter. The following values as input parameters to the GetMapping method 500:

1. Object Input Parameter—this parameter is set to the value of the Object input parameter of the ToASObject method.
2. IsWriteMode Input Parameter—this parameter is set to the value "false".
3. Keyword Input Parameter—this parameter is set to the value of the Keyword input parameter of the ToASObject method.

[4] IS IT A REQUEST/CALL FROM ANY OF THE OTHER COMMUNICATION DEVICES?

The GetMapping method 500 performs processing as noted above and returns mapping information in the form of the GetMapping method's Property Definition Dictionary, Field Definition Dictionary and ASType output parameters, which are then available to the ToASObject method 600.

Still referring to FIG. 2E, at step 608, the ToASObject method 600 then creates a weakly typed ASObject object, assigning said object to the ASObject output parameter, and sets this ASObject output parameter's ASType property to the ASType output parameter of the GetMapping method 500.

At step 610, the ToASObject method 600 modifies the ASObject to contain entries for property values that are named according to each pair of name and property definition in the Property Definition Dictionary. The ASConverter iterates through each key/value pair in the Property Definition Dictionary. For each key/value pair, the ASConverter performs the following series of operations:

1. Using the PropertyInfo object stored in the value element of the key/value pair to obtain the value of the property represented thereby, and assign said property value to a temporary value. The ToASObject method 600 determines the value of the property represented by the said PropertyInfo object by invoking and applying the return value of the GetValue method of the PropertyInfo object to the temporary value. This operation is referred hereinafter as step 610-a, and is generally represented in FIG. 2E as step 610.
2. Using the PropertyInfo object stored in the value element of the key/value pair to obtain the data type of the property represented thereby. The ToASObject method 600 determines the data type of the property represented by the said PropertyInfo object by examining the PropertyType property of the PropertyInfo object. This operation is referred hereinafter as step 610-b, and is generally represented in FIG. 2E as step 610.
3. If the data type determined in step 610-b is not supported by Flash Remoting as shown in Table 1, the temporary value determined in step 610-a is treated as a strongly typed object that itself must undergo conversion to a weakly typed object. In this case, the ToASObject method 600 is invoked recursively with the recursive ToASObject method's Object input parameter set to the temporary value determined at step 610, and the recursive ToASObject method's Keyword input parameter is set to the calling ToASObject method's Keyword input parameter. Upon completion of the recursive ToASObject method, the temporary value is replaced by the value of the resulting ASObject output parameter of the recursive ToASObject method. This operation is referred hereinafter as step 610-c, and is generally represented in FIG. 2E as step 610.
4. Storing the temporary value (initialized in step 610-a and potentially replaced in step 610-c) to the ASObject output parameter, associating a name to the temporary value equal to the key element of the key/value pair.

At step 612, the ToASObject method 600 modifies the ASObject to contain entries for field values that are named according to each pair of name and field definition in the Filed Definition Dictionary. The ASConverter performs an iteration similar to that of step 610 for each key/value pair in the Field Definition Dictionary. The ASConverter performs the following series of operations for each key/value pair:

1. Using the Fieldinfo object stored in the value element of the key/value pair to obtain the value of the field represented thereby, and assign said field value to a temporary value. The ToASObject method 600 determines the value of the field represented by the said FieldInfo object by invoking and applying the return value of the GetValue method of the FieldInfo object to the temporary value. This operation is referred hereinafter as step 612-a, and is generally represented in FIG. 2E as step 612.
2. Using the Fieldinfo object stored in the value element of the key/value pair to obtain the data type of the field represented thereby. The ToASObject method 600 determines the data type of the field represented by the said FieldInfo object by examining the FieldType property of the FieldInfo object. This operation is referred hereinafter as step 612-b, and is generally represented in FIG. 2E as step 612.
3. If the data type determined in step 612-b is not supported by Flash Remoting as shown in Table 1, the temporary value determined in step 612-a is treated as a strongly typed object that itself must undergo conversion to a weakly typed object. In this case, the ToASObject method 600 is invoked recursively with the recursive ToASObject method's Object input parameter set to the temporary value determined in step 612-a, and the recursive ToASObject method's Keyword input parameter is set to the calling ToASObject method's Keyword input parameter. After the completion of the recursive ToASObject method, the temporary value is replaced by the value of the resulting ASObject output parameter of the recursive ToASObject method. This operation is referred hereinafter as step 612-c, and is generally represented in FIG. 2E as step 612.
4. Storing the temporary output value (initialized in step 612-a and potentially replaced in this step 612-c) to the ASObject output parameter, associating a name to the temporary output value equal to the key element of the key/value pair.

As a result, the ToASObject method 600 converts a strongly typed .NET object to an equivalent ActionScript object.

FromASObject Method

Referring now to FIG. 2F, the FromASObject method 700 takes a weakly typed ASObject object and a strongly typed object as parameters and attempts to convert values listed in the weakly typed ASObject object to the fields and properties of the strongly typed object in accordance with the custom attribute parameters associated with the strongly typed object. The FromASObject method makes a call to the GetMapping method to obtain property and field mappings according to the custom attribute parameters associated with the strongly typed object. The reflection feature of the .NET platform for example, is then used to retrieve the pre-defined dictionary list of methods associated with respective properties and fields, and the mapping specified by the custom attribute parameters of the strongly typed object is then used with these methods to populate the strongly typed object.

The FromASObject method 700 has the form:

public void FromASObject(ASObject asObject, object aObject);

The conversion can take place if the strongly typed object and all of its properties fields involved in the conversion are supported by the conversion process. The conversion will fail if:

1. the strongly typed object does not have any custom attribute parameters associated with it.
2. the expected weakly typed ASObject object class name defined by the custom attribute parameters associated with the strongly typed object class declaration does not match the name of the weakly typed ASObject object; or if
3. any of the strongly typed object's properties and/or fields defined as being convertible are not supported by the pre-defined dictionary associated with the GetMapping method.

Still referring to FIG. 2F, a process performed by a preferred FromASObject method is shown generally at 700. Generally, a weakly typed ASObject object and strongly typed object are inputs. The attribute attached to the strongly typed object has a Name property identifying the weakly typed ASObject object. The ASObject object matches the stongly typed object if the ASType property of the ASObject matches, either, the Name property of the attribute if specified, or the name of the class (ClassName) that defines the strongly typed object. The ASConverter converts the values listed in the weakly typed ASObject object to corresponding fields and properties of the strongly typed object.

The FromASObject method 700 converts a weakly typed ASObject to a strongly typed .NET object. The method 700 has one input parameter that controls its behavior and one input/output parameter that represents the strongly typed object as shown in legend 702 and as follows:

1. ASObject—an input parameter that is the weakly typed ASObject that is converted to the strongly typed .NET object.
2. Object—an input/output parameter that is the strongly typed .NET object that will be converted from the weakly typed ASObject. The strongly typed .NET object is considered a partial input parameter because the strongly typed .NET object cannot be created by the FromASObject method 700, and must be created before the FromASObject method 700 is invoked.

At step 704, the FromASObject method 700 is invoked when a programmer wants to utilize a weakly typed object in a strongly typed environment. At step 706, the FromASObject method 700 first invokes the GetMapping method 500 to determine the mapping information necessary to convert the weakly typed ASObject identified by the ASObject input parameter to the strongly typed .NET object identified by the Object input/output parameter. The FromASObject method 700 provides the following values as input parameters to the GetMapping method 500:

1. Object Input Parameter—this parameter is set to the value of the Object input/output parameter of the FromASObject method.
2. IsWriteMode Input Parameter—this parameter is set to the value "true".
3. Keyword Input Parameter—this parameter not specified.

The GetMapping method 500 processes as noted above and returns mapping information in the form of the GetMapping method's Property Definition Dictionary, Field Definition Dictionary and ASType output parameters, which are then available to the FromASObject method 700.

At step 708, the FromASObject method 700 determines if the ASType property of the weakly typed ASObject object is the same as the ASType output parameter of the GetMapping method. If this is not the case, the FromASObject method 700 proceeds to step 710 where an exception is raised, causing termination of the FromASObject method 700. If the ASType property is the same, the FromASObject method 700 proceeds to step 712.

At step 712, the FromASObject method 700 iterates through each key/value pair in the Property Definition Dictionary, and for each key/value pair performs the following series of operations:

1. Retrieving the value from the ASObject input parameter that is named by the key element of the key/value pair, and store this value as a temporary value. This operation is referred hereinafter as step 712-*a*, and is generally represented in FIG. 2F as step 712.
2. Using the PropertyInfo object stored in the value element of the key/value pair to obtain the data type of the property represented thereby. The FromASObject method 700 determines the data type of the property represented by the said PropertyInfo object by examining the PropertyType property of the PropertyInfo object. This operation is referred hereinafter as step 712-*b*, and is generally represented in FIG. 2F as step 712.
3. If the data type determined in step 712-*b* is not supported by Flash Remoting as shown in Table 1, the temporary value determined in step 712-*a* is treated as a weakly typed object that itself must undergo conversion to a strongly typed object. In this case:
   a. Using the PropertyInfo object stored in the value element of the key/value pair to obtain the value of the property represented thereby, and assign the value of the property to a second temporary value. The FromASObject method 700 determines the value of the property represented by the said PropertyInfo object by invoking and applying the return value of the GetValue method of the PropertyInfo object to the second temporary value. This operation is referred hereinafter as step 712-*c*, and is generally represented in FIG. 2F as step 712.
   b. The FromASObject method 700 is invoked recursively with the recursive FromASObject method's ASObject input parameter set to the temporary value determined in step 712-*a*, and the recursive FromASObject method's Object input/output parameter initialized to the second temporary value determined in step 712-*c*. Upon completion of the recursive FromASObject method, the temporary value determined in step 712-*a* is replaced by the value of the resulting Object input/output parameter of the recursive FromASObject method. This operation is referred hereinafter as step 712-*d*, and is generally represented in FIG. 2F as step 712.

4. Using the PropertyInfo object stored in the value element of the key/value pair to set the value of the property represented thereby to the temporary value initialized in step 712-*a* and potentially replaced in step 712-*d*. The FromASObject method 700 sets the value of the property represented by the said PropertyInfo object by invoking the SetValue method of the PropertyInfo object with the temporary value as an input parameter to said method.

As a result, the ASObject entry names are matched according to each pair of name and property definition in the Property Definition Dictionary.

At step 714, the FromASObject method 700 then performs a similar iteration of each key/value pair in the Field Definition Dictionary, performing the following series of operations for each key/value pair:

1. Retrieving the value from the ASObject input parameter that is named by the key element of the key/value pair, and storing the value in a temporary value. This operation is referred hereinafter as step 714-*a*, and is generally represented in FIG. 2F as step 714.

2. Using the Fieldinfo object stored in the value element of the key/value pair to obtain the data type of the field represented thereby. The FromASObject method determines the data type of the field represented by the said FieldInfo object by examining the FieldType property of the FieldInfo object. This operation is referred hereinafter as step 714-*b*, and is generally represented in FIG. 2F as step 714.

3. If the data type determined in step 714-*b* not supported by Flash Remoting as shown in Table 1, the temporary value determined in step 714-*a* is treated as a weakly typed object that itself must undergo conversion to a strongly typed object. In this case:

a. Using the FieldInfo object stored in the value element of the key/value pair to obtain the value of the field that the FieldInfo object represents, and assigning the FieldInfo Object to a second temporary value. The FromASObject method 700 determines the value of the field represented by the said FieldInfo object by invoking and applying the return value of the GetValue method of the FieldInfo object to the second temporary value. This operation is referred hereinafter as step 714-*c*, and is generally represented in FIG. 2F as step 714.

b. The FromASObject method 700 is invoked recursively with the recursive FromASObject method's ASObject input parameter set to the temporary value determined in step 714-*a*, and the recursive FromASObject method's Object input/output parameter initialized to the second temporary value determined in sub-step a of step 714-*c*. Upon completion of the recursive FromASObject method, the temporary value determined in step 714-*a* is replaced by the value of the resulting Object input/output parameter of the recursive FromASObject method. This operation is referred hereinafter as step 714-*d*, and is generally represented in FIG. 2F as step 714.

4. Using the FieldInfo object stored in the value element of the key/value pair to set the value of the field represented thereby to the temporary value initialized in step 714-*a* and potentially replaced in step 714-*d*. The FromASObject method 700 sets the value of the field represented by the said FieldInfo object by invoking the SetValue method of the FieldInfo object with the temporary value as an input parameter to said method.

As a result, the ASObject entry names are matched according to each pair of name and field definition in the Field Definition Dictionary.

The result of FromASObject method 700 is a strongly typed object populated with property and field values derived from the weakly typed ASObject object. In some cases, Flash™ Remoting is not capable of expressing some values in the exact data type expected by the strongly typed object. For example, integer values in strongly typed objects are represented as generic numbers, i.e. floating point values, in their weakly typed ASObject object representation. In this case an additional step is required to ensure the weakly typed ASObject object representation of the value is compatible with the representation of the value in the strongly typed object. This additional step may involve forcing a generic number represented by a weakly typed ASObject object into an expected format. Sample conversion code is provided in FIG. 2G.

Other related methods may include an IsSupportedType method that indicates whether the specified .NET data type is supported natively by Flash Remoting. This method has the form:

public bool IsSupportedType(Type aType);

This method is generally for internal use only, and simply indicates whether a type is already supported by Flash Remoting (see Data Conversion for the list of supported data types). If a type is already supported the converter doesn't need to any additional work; if the type is not supported the converter must use attributes or a converter handler object (see RegisterConverterHandler) to perform the conversion.

Another related method is a ConvertASType method which converts a primitive .NET data type to another type.

This method has the form:

public object ConvertASType(object aobject, Type expectedType);

This method is used to perform minor conversions between .NET primitive data types. It is necessary as ActionScript cannot represent some .NET primitive types directly, and will convert to a more generic type (ActionScript may represent an integer as a generic floating point number for example). This method will coerce the generically-typed value retrieved from ActionScript to its specific, expected type. An exception is raised if the conversion cannot take place. This should only occur if the ActionScript data has been grossly malformed by errant code in the Flash user interface.

Another related method is a RegisterConverterHandler method which registers a handler for converting predefined .NET objects, for example.

The RegisterConverterHandler method has the form:

public static void RegisterConverterHandler(Type typeToConvert, Type handlerType);

This method is used to extend the support for predefined or third-party .NET classes for example, where access to source code and thus the ability to mark classes with attributes is not provided. This scenario should generally not be the case, as the data and business logic layer classes are typically created on a per-project basis and source code availability is not a problem. There are times where this may occur, however.

The typeToConvert parameter in the RegisterConverterHandler method is the .NET object class type, for example, that is handled by the custom handler. The handlerType parameter is the type of the class that performs the conversion; this class must implement an IASConverterHandler interface to perform the conversion, which has the following form:

```
public interface IASConverterHandler
{
object ToSupported(object unsupportedObject);
object FromSupported(object supportedObject);
}
```

An example of the conversion handler is provided as follows in connection with the .NET system.Decimal Class:

The .NET System.Decimal class represents large numeric types with greater precision than a floating point value. However, there is no equivalent in ActionScript, and the class cannot be marked with ReelActionScript attributes because it is part of the core .NET framework and source code is not available. A possible solution would be to convert it to and from a double precision value, which is supported by ActionScript:

```
public class DecimalASConverterHandler : IASConverterHandler
{
public object ToSupported(object unsupportedObject)
{
  return ((Decimal)unsupportedObject).ToDouble( );
}
public object FromSupported(object supportedObject)
{
  return new Decimal((double)supportedObject);
}
}
```

// Now we must register our handler class to handle Decimal types. Once we do that, // any Decimal value encountered by the converter will be converted by our handler.

ASConverter.RegisterConverterHandler(Type.GetType ("System.Deci mal"), Type.GetType("DecimalASConverterHandler"));

Once the handler is registered, the ASConverter class will automatically be able to handle, for example, any .NET object that has properties or fields of the System.Decimal class.

From the foregoing, it will be appreciated that, while Flash™ Remoting, for example, provides basic object conversions, weakly typed ASObject objects may be converted into strongly typed objects and vice versa. Thus, data objects originating at a communications appliance, for example, may be used to initiate actions at the management apparatus operating, for example, the .NET environment, and responses produced by the server may be communicated back to the communications appliance for receipt in the communications appliance. This allows the client device to operate in a Flash™ environment, for example, while the management apparatus operates in a .NET environment, for example. In this way each environment is optimized for its specific platform.

Login Procedure

Figure 3:
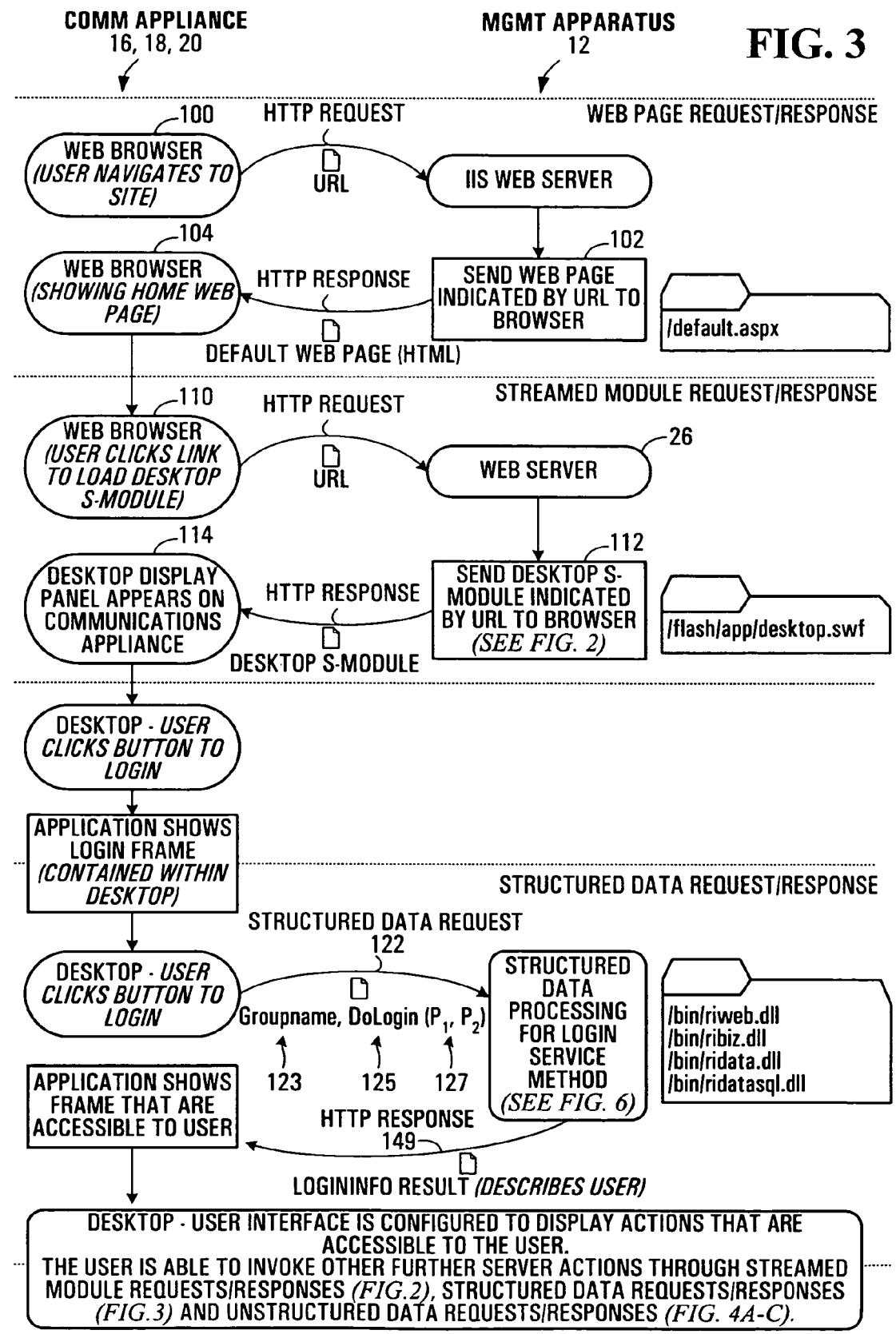
FIG. 3 depicts a flowchart for an exemplary login in accordance with the subject invention.

Referring to FIGS. 2 and 3, a login procedure is described. It is assumed that the user of the communication appliance has earlier "registered" with the management apparatus 12 and has thus provided name and contact information and an indication of a level of service to be provided by the system based on a subscription fee to be paid to an operator of the system. This name and contact information is stored in a member profile in a "member table" in the database 40. When registration has been completed the user is given a member identification (ID) and a password that specify whether the user is a Performer, Agent, casting director or the like, and the level of service the user is entitled to, for example. A user who has earlier registered with the management apparatus and thus has registered with "the system" will henceforth be referred to as a member. A member can be any entity including a living person, a corporation, a group of persons or corporations, or a project as will be described below.

As shown at 100, using a communication appliance (16, 18, 20) a member begins a communication session by navigating to a predefined universal resource locator (URL), using the web browser 21 shown in FIG. 2. This causes a hypertext transfer protocol (HTTP) request to be transmitted via the communication system to the management apparatus 12. At the management apparatus 12 the IIS web server 26 causes a home web page indicated by the URL to be loaded from the local file system in the management apparatus 12 and sent back to the communication appliance (16, 18, 20) whereupon the web browser 21 causes the output interface 25 to cause the home web page to be shown as indicated at 104. An example of this home web page is shown at 106 in FIG. 4.

FIG. 4

Referring to FIG. 4, the home web page includes an enter link shown generally at 108. This enter link 108 is associated with a URL identifying a first streaming module (S-module) in the remoting gateway 28 shown in FIG. 2. Referring to FIGS. 3 and 4, when, as indicated at 110 in FIG. 3, when a member clicks on the enter link 108 shown in FIG. 4, the IIS web server 26 causes the first S-module indicated by the URL to be sent to the communication appliance (16, 18 20), as indicated at 112, where it is loaded into memory 27 controlled by the Flash player at the communication appliance. As indicated at 114, the first S-module causes a desktop display such as shown at 116 in FIG. 5 to be displayed by the output interface 74 shown in FIG. 2. This first S-module may also include or cause a library of files to create windows, to provide an event dispatcher, to provide for text formatting and to save user setting, for example to be sent to the communication appliance for use by subsequent S-modules.

FIG. 5

Figure 6:
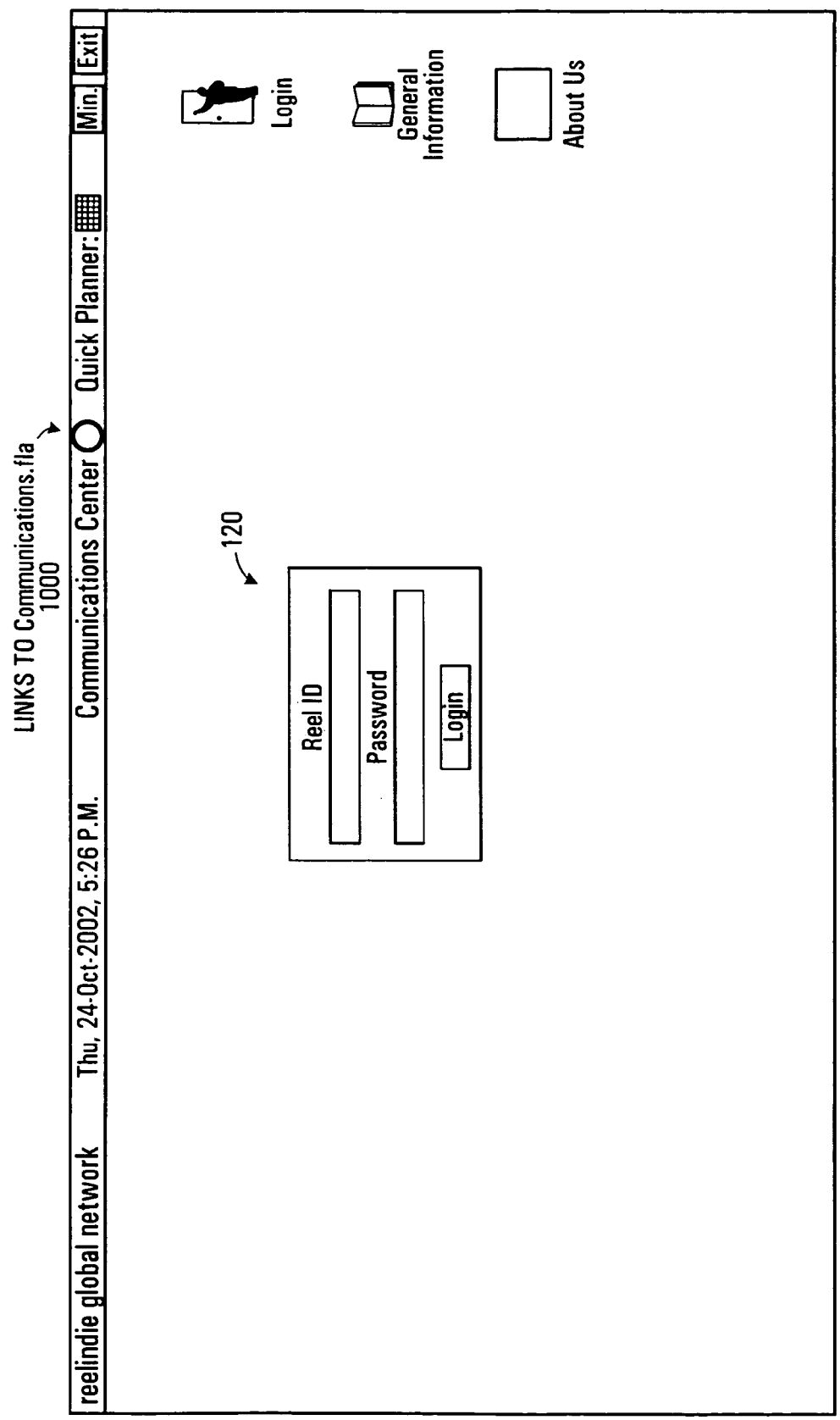
FIG. 6 is another exemplary Web page during the login procedure of FIG. 3.

The desktop display 116 includes a log-in button 118 which, when actuated, invokes methods within the desktop S-module to produce a log-in display window as shown at 120 in FIG. 6.

FIG. 6

Referring to FIG. 6, the member using the communication appliance (16, 18 20 of FIG. 1) may then enter an identification and password code and actuate the log-in button within the log-in display window to cause a log-in request object as shown at 122 in FIG. 3 to be transmitted to the management apparatus 12. Referring to FIG. 3, this log-in request object represents a structured data request as described above and includes a group name 123, a service method name 125 and a parameter field 127. The contents of the parameter field include the member ID and password. These are data of the type supported by flash remoting (Category B) and thus the custom converter 33 is not used for login. The group name identifies a group of service methods in the service layer, of which a service method identified by the service method name is a member.

FIG. 7

Figure 7:
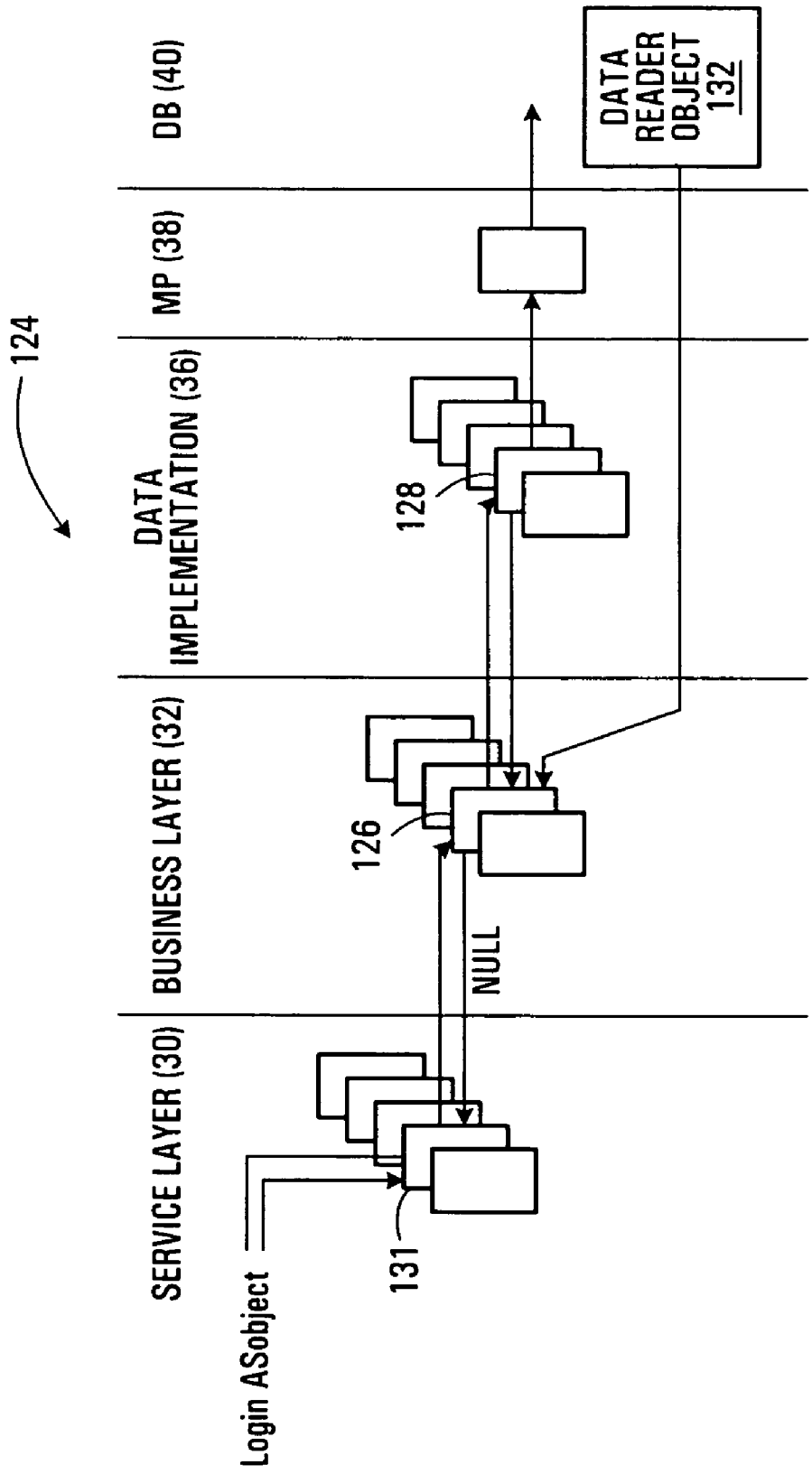
FIG. 7 is a functional block diagram view of the flowchart of FIG. 3.

Referring to FIG. 7, as shown at 124, the login request object invokes a service method 131, identified by the service method name 125 (FIG. 3) in the object, in the service layer 30 (FIG. 2). The invoked service method 131 responds by invoking a method 126 in the business layer 32 (FIG. 3) which invokes a method 128 in the data implementation layer 36 (FIG. 2) that cooperates with the managed provider 38 (FIG. 2) causing it to use the ID and password to retrieve member information from the database 40 (FIG. 2).

The database 40 (FIG. 2) retrieves the member information matching the ID and password, from the pre-stored member table and provides a data reader object 132 containing this information, if available, back to the managed provider 38 (FIG. 2) which forwards it to the business layer 32 (FIG. 2). Member information may include an identification of whether or not the member is a performer, casting director or agent for example, and it may also indicate the level of service to which the member has subscribed. A performer, for example may be an operator of a first communications appliance and may have a first set of access criteria. An agent, for example may be an operator of a second communications appliance and may have a second set of access criteria and a casting director may have a third set of access criteria and may be an operator of a third communication appliance. In general, each set of access criteria may be different and determined by the member ID.

The calling method 126 in the business layer 32 (FIG. 2) causes the data reader object 132 to be inspected to determine whether or not it contains data and, if not, a null is sent to the service method 131 (FIG. 2) in the service layer 30 (FIG. 2) and the service method sends a null back to the communication appliance. The communication appliance then indicates an error condition (not shown) on the login display shown in FIG. 6.

Figure 7A:
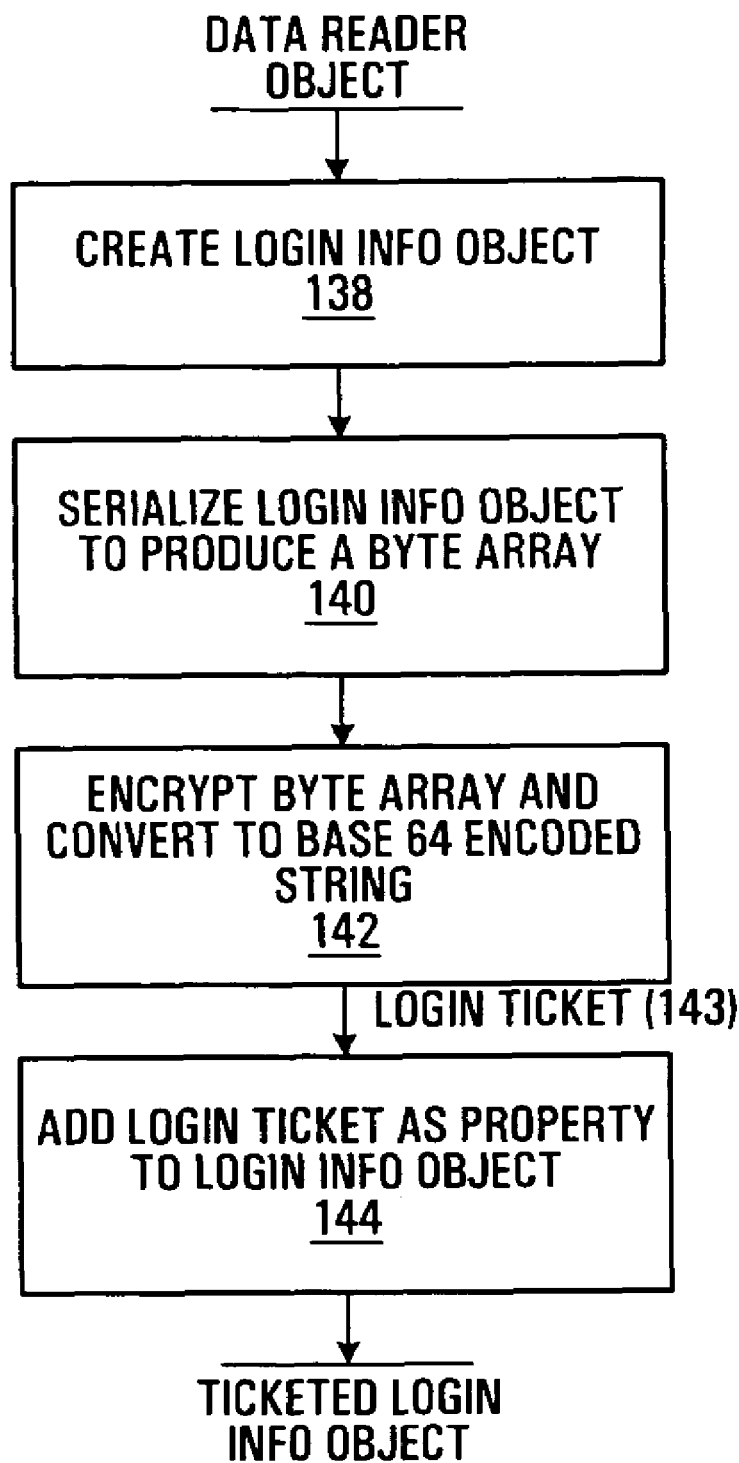
FIG. 7A depicts a flowchart for an exemplary ticketed login in accordance with the subject invention.

If the data reader object contains data, the calling method 126 directs the management apparatus 12 to produce a ticketed login info object according to the process shown in FIG. 7A.

FIG. 7A

Referring to FIG. 7A to produce the ticketed login info object, the calling method executes a first step 138 in which the management apparatus is directed to create a log-in info object that is more strongly typed than the data reader object 132 in FIG. 7. Then as shown at 140, this log-in info object is serialized into a byte array. Then as shown at 142, the byte array is encrypted and converted into a base-64 encoded string referred to as a log-in ticket 143. Then, as shown at 144, the log-in ticket 143 is added as a property to the log-in info object produced at step 138, to produce the ticketed log-in info object. This ticketed login info object is then passed from the business layer 32 (FIG. 2) to the service method 131 (FIG. 2), which invokes the converter 33 (FIG. 2), to produce a login ActionScript object that represents log-in information. This login ActionScript object is passed back to the communication appliance and is stored there for further use. Subsequently obtained S-modules may make use of this login ActionScript object to control access to data and control displays produced thereby.

The receipt and storage of the login ActionScript object is detected by the S-module that produced the display window shown in FIG. 6 and this S-module uses the login ActionScript object, specifically identification information relating to whether or not the member is a performer, agent or casting director, and the level of service to which the member subscribes, for example to produce a display as shown at 151 in FIG. 7A.

FIG. 7B

Figure 7B:
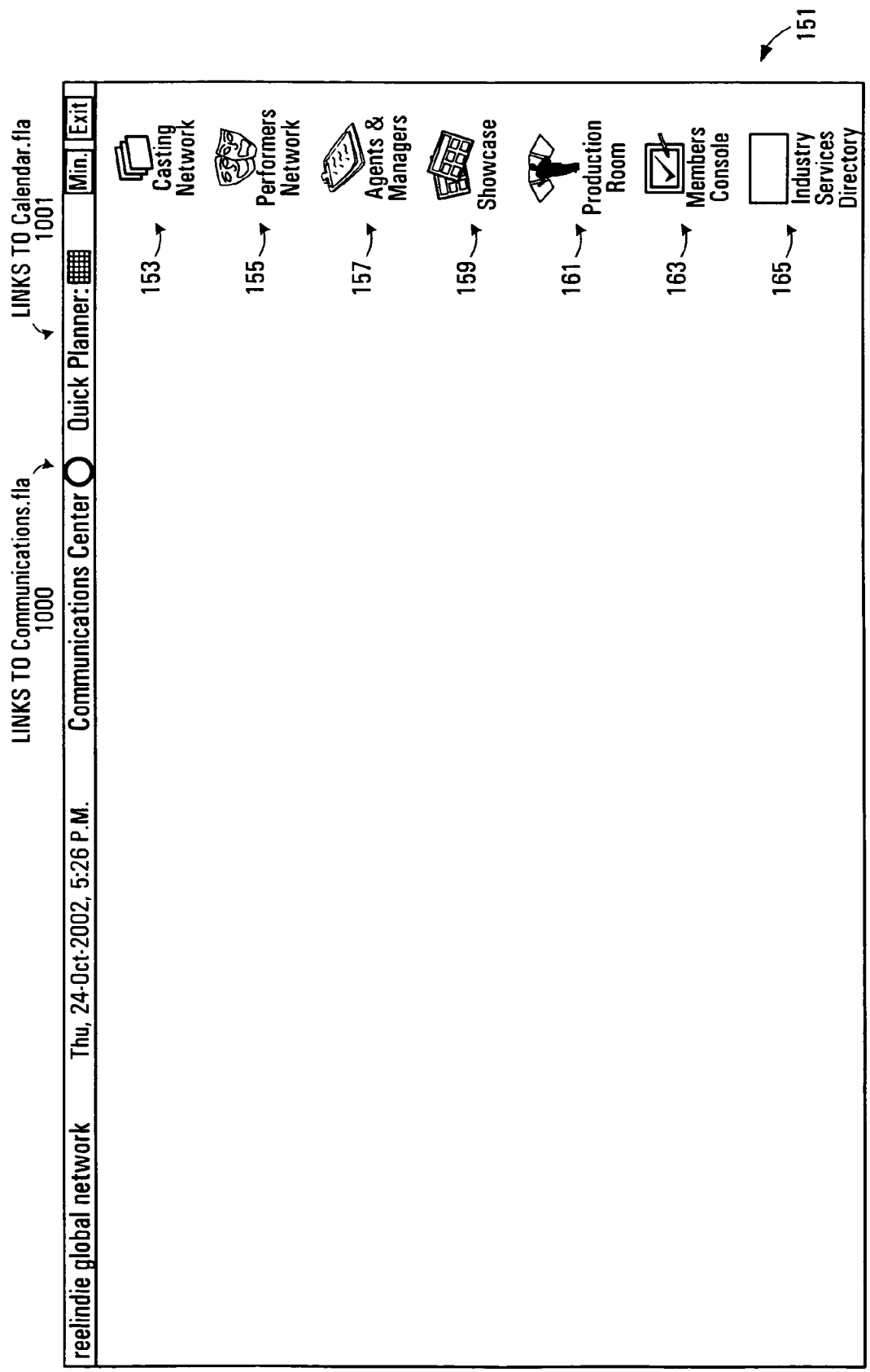
FIG. 7B is an exemplary Web page utilized with S-modules in accordance with the subject invention.

Referring to FIG. 7B, the display 151 includes a plurality of common navigation icons including a communication center icon 1000 for linking to a communication function provided by the business layer 32 (FIG. 2) of the system in cooperation with certain S-modules and a planner icon 1001 for linking to a planner function provided by the business layer of the system, in cooperation with other S-modules. These common navigation icons will be presented anytime a member successfully logs into the system and will persist on every display subsequently produced, to provide for easy access to the communications and planner functions.

The display further includes a plurality of member-specific icons. A full set of the available icons in a representative system are provided and include an icon 153 for providing a link to casting functions provided by the system, an icon 155 for providing a link to performers functions provided by the system, an icon 157 for providing a link to agents and managers functions provided by the system, an icon 159 for providing a link to showcase functions provided by the system, an icon 161 for providing a link to production room functions provided by the system, an icon 163 for providing a link to a members console function and an icon 165 for providing a link to an industry services directory.

The actual icons seen on a display window at the communication appliance will depend upon what category of members or set of access criteria the member is associated with. For example if the member is a performer, the casting network icon 153 and the agents and managers icon 157 may not be shown and thus not available to the member. Similarly, if the member has only paid for a basic system, the showcase 159, production room 161 and industry services icons 165 may not be shown and thus not available. To determine what icons will be made available to the member, the S-module that produces the display window shown in FIG. 6A uses the login information stored locally at the communications appliance at the time of login.

Figure 8:
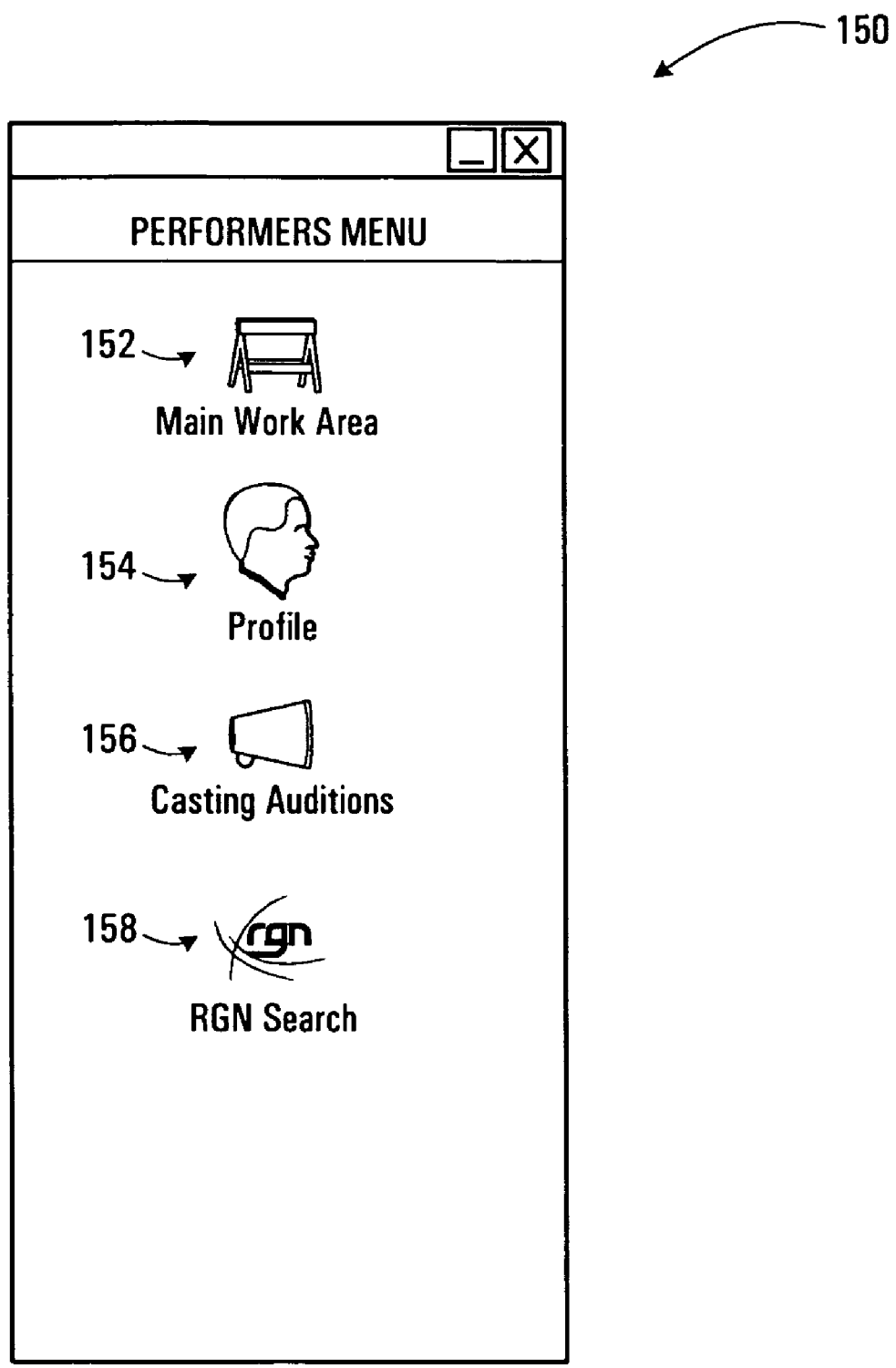
FIG. 8 is an exemplary Web page for an overlay display in accordance with the subject invention.

Assuming the member is a performer and the member actuates the performers' network icon 155, an S-module is obtained from the performers group 44 of program modules at the management apparatus to cause a display window as shown at 150 in FIG. 8 to be displayed at the first communication appliance to permit an operator thereof to create, modify or delete structured or unstructured data pertaining to that performer.

FIG. 8

Referring to FIG. 8, the overlay display window 150 represents a performers menu. This performers menu 150 includes a plurality of option icons 152, 154, 156 and 158. On selecting any one of the indicated options 152 to 158, a further S-module is sent to the communication appliance to present further functionality associated with the corresponding option, to the performer.

FIG. 9

Figure 9:
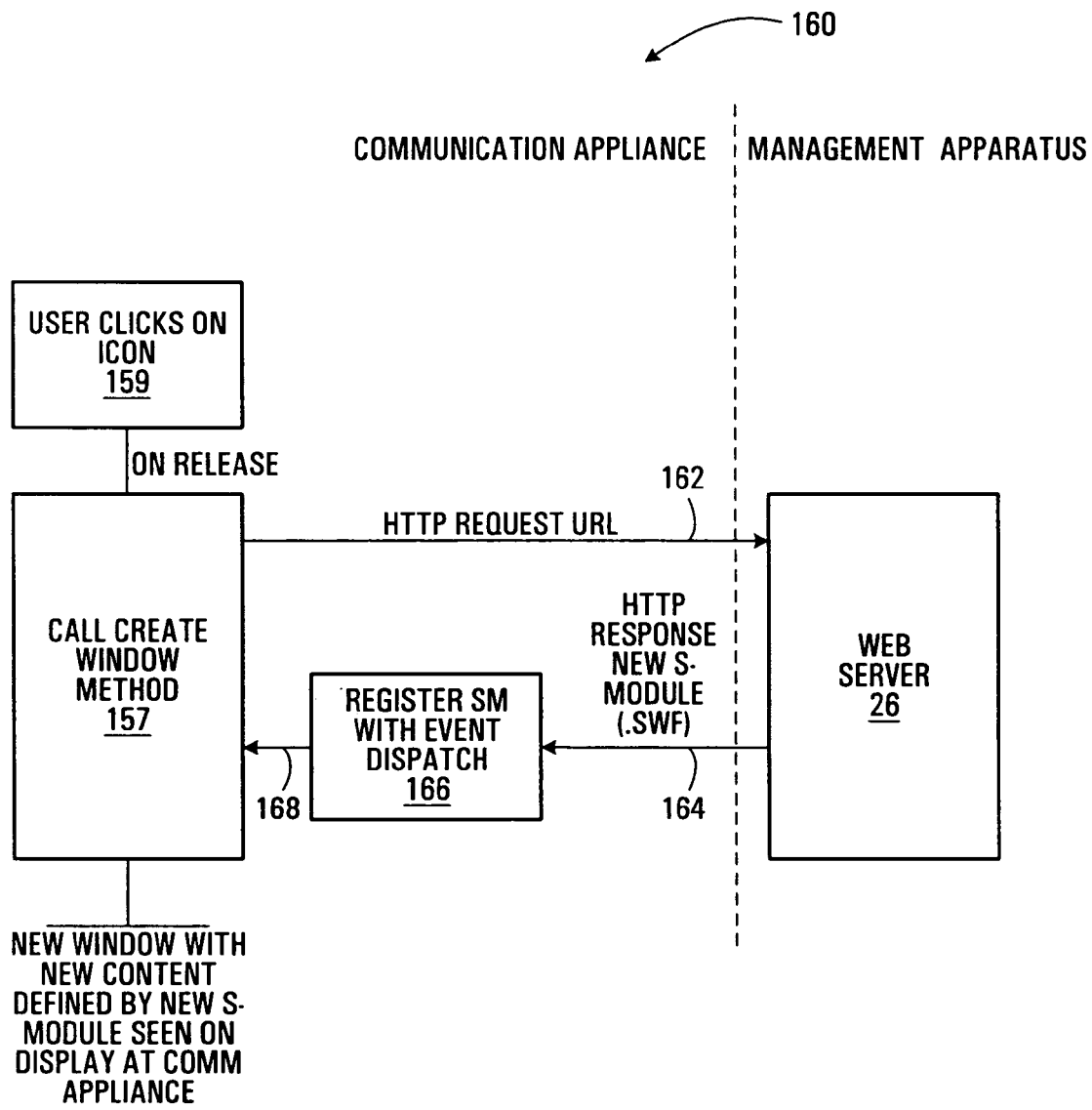
FIG. 9 is a flowchart for utilizing S-modules in accordance with the subject invention.

Referring to FIG. 9, in general, any time a member selects an option indicated in a display on a communication appliance, a corresponding S-module is sent from the management apparatus 12 to memory 27 (FIG. 2) controlled by the Flash player in the communication appliance, as shown generally at 160.

In general, S-modules are designed in a Flash development environment or plurality of Flash-compatible development environments that provide facilities for dragging text boxes and assigning labels, for example, to different areas on a display window. In addition, graphic icons can be placed at desired locations on the display template. Text boxes and other areas on the display template can be associated with links to structured and/or unstructured data to be obtained from the management apparatus. Graphic icons (and other items) can be assigned an "on release" function that is intended to launch a function when a user "clicks" on the icon or area. In the embodiment shown, the function is one that opens a new window at the communication appliance, the new window having content defined by a new S-module associated with the icon. Thus, a new S-module is invoked. The function may have the form: methodname(window name, width, length, contentfilename, id,usetitlebar) for example. A link associated with an "on release" event might have a form as follows: createwindow(profile", 200, 100, http:profile.swf, 1001. For example, where the information within the brackets is hard coded in association with the link to specify the values of parameters to be passed to the create window method. This create window method may be provided in a library of files sent to the communication appliance in response to the user logging onto the system, for example. Thus, as seen in FIG. 9, when a use clicks on an icon as indicated generally at 159, the create window method is invoked as seen at 157.

Figure 9A:
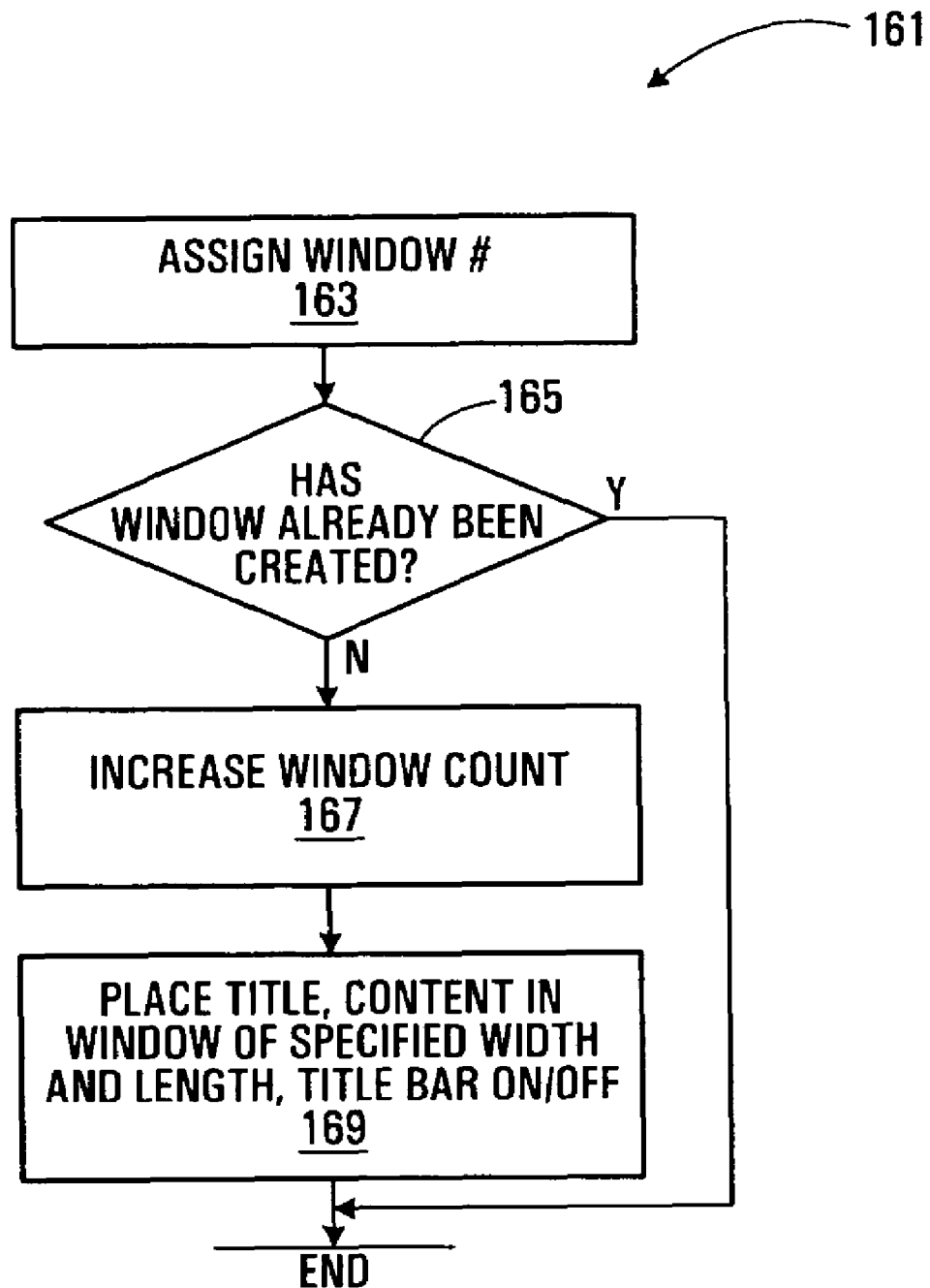
FIG. 9A is a flowchart executed at the communication appliance for S-modules in accordance with the subject invention.

Referring to FIG. 9A the process executed at the communication appliance, by the create window method, is shown generally at 161. The process begins with a first block 163 that assigns a window number to the window. This may be done, for example, by keeping a global window count and creating a window number based on the sum of the global window count number and the ID passed to the createwindow method as a parameter associated with the "on release" command.

Once the window has been assigned, block 165 causes a check to see whether or not the window has already been created. This may be done by searching through all of the assigned window numbers for the same number. If the same number is located, then the window has already been opened and there is no need to open another one. Consequently, the procedure is ended. If, however, a window has not yet been created for the requested S-module, block 167 causes an increase in the window count number and block 169 causes the title and content specified in the parameters associated with the "on release" command to be placed in a window of width and length specified in the parameters and to include a title bar or not, depending upon a true/false indicator in the parameters.

Referring back to FIG. 9, the content parameter of the create window method is specified by an http request 162 including a URL that designates an S-module at the web server 26. As shown at 164, the designated S-module is sent to the communication appliance and as shown at 166 when the S-module is received at the communication appliance it is registered with an event dispatcher executing at the communication appliance.

Figure 9B:
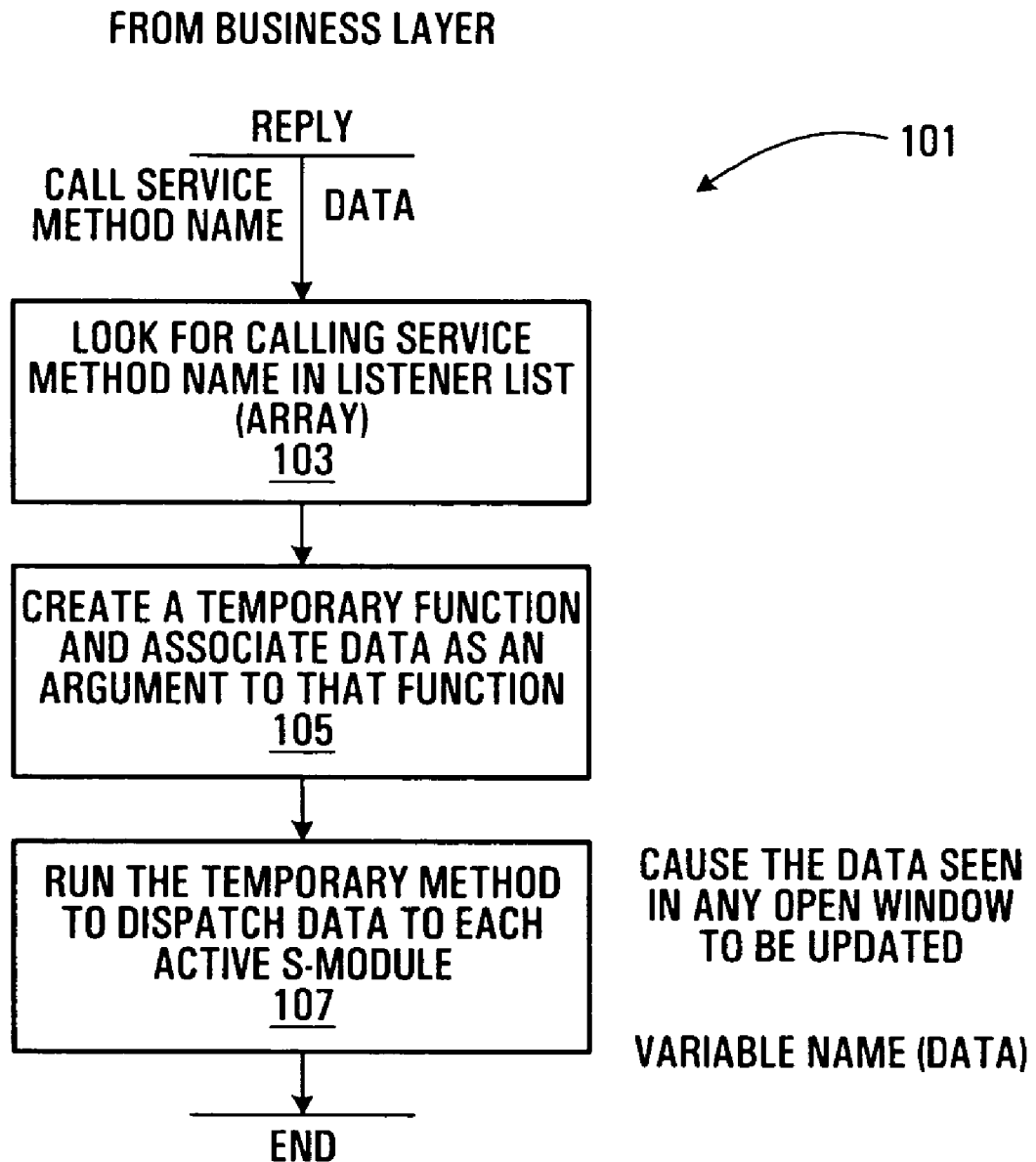
FIG. 9B is a flowchart executed at the event dispatcher for S-modules in accordance with the subject invention.

Referring to FIG. 9B a process executed by the event dispatcher is shown at 101. Generally the event dispatcher maintains a listener list that receives an entry from an S-module whenever a request for data is made. When data is received back from the management apparatus, the event dispatcher dispatches the data to every S-module that is registered in the listener list. To do this, the event dispatcher waits for a reply to be received at the communication appliance in response to a request from an S-module. The reply includes an identification of the calling service method name from the S-module that initiated the request for the reply. When a reply is received, block 103 directs the processor circuit at the communication appliance to look for the calling service method name in the listener list. Block 105 then directs the processor circuit to create a temporary function and associates data the data returned in the reply as an argument to that function. Block 107 then directs the processor circuit to execute the temporary function to dispatch data to each active S-module. This causes the data seen in any open windows to be updated. Thus a reply received in response to a request made by one S-module, may cause displays produced by other S-modules to be updated with new information.

As shown at 166, the web server 26 then sends the S-module indicated by the URL from the local file system to the memory controlled by the flash player in the communication appliance. As shown at 168, the requested S-module is loaded into the memory 27 at the communication appliance (16, 18, 20) and co-operates with the browser 21 and the input and output interfaces 23 and 25 to implement a member interface that includes a window panel or a display at the communication appliance.

Referring back to FIG. 9, the content specified in it is requested and is received by the event dispatcher which causes the content to be displayed in appropriate windows at the communication appliance. In the event that the content includes links to structured or unstructured data, appropriate requests are made of the server to cause such data to be transmitted to the communication appliance for display as specified by the new S-module.

As part of the library of methods that are made available to the S-modules in reply to a successful login response, various text formatting routines may be provided. Examples of such routines are shown in FIGS. 9C, D, E and F for example. FIG. 9C shows a formatting routine that sets field colors for input fields seen in displays provided by S-modules. FIG. 9D shows a way of applying color settings to active (in focus) windows and FIG. 9E shows a way of applying color settings to inactive (out-of-focus) windows. FIG. 9F shows a way of showing a dark line around an input field to indicate it is selected. In general, the above text formatting routines allow a single method call to format all of the input fields in a movie clip, for example. Part of the routine is to set the handleFieldFocus property to a slightly different color in order to show the user what field is currently selected. The handleFieldBlur property is also used to reset the coloring of the text field.

Referring back to FIG. 8, if the member selects the main work area 152, an S-module associated with the main work area is retrieved from the performers area at the web server and is loaded into the Flash Memory, for example, at the communication appliance (16, 18, 20) using the procedure described above. This may result in the presentation of a display window as shown at 170 in FIG. 10.

FIG. 10

The display window 170 includes a header information panel shown generally at 171, and other information panels that define messages, events, tasks and work in progress panels 173, 175, 177, 179, respectively. The basic information panel 171 has a plurality of fields including a name field 172 and an agency field 174, for example, which are populated with structured data retrieved from the database 40 of the management apparatus (12). This data is that which was initially provided by the member at registration. To retrieve this structured data from the management apparatus 12 a structured data transfer is requested by the S-module.

The header information panel 171 may also include an image of the member with whom the profile is associated. The image is considered to be unstructured data and is retrieved according to an unstructured data retrieval process that will be described below. In effect, the S-module associated with the display window 170 causes an object profile to be displayed at the first communications appliance and populated with structured and unstructured data from the database.

Structured Data Transfer/Response

FIG. 11

Figure 10:
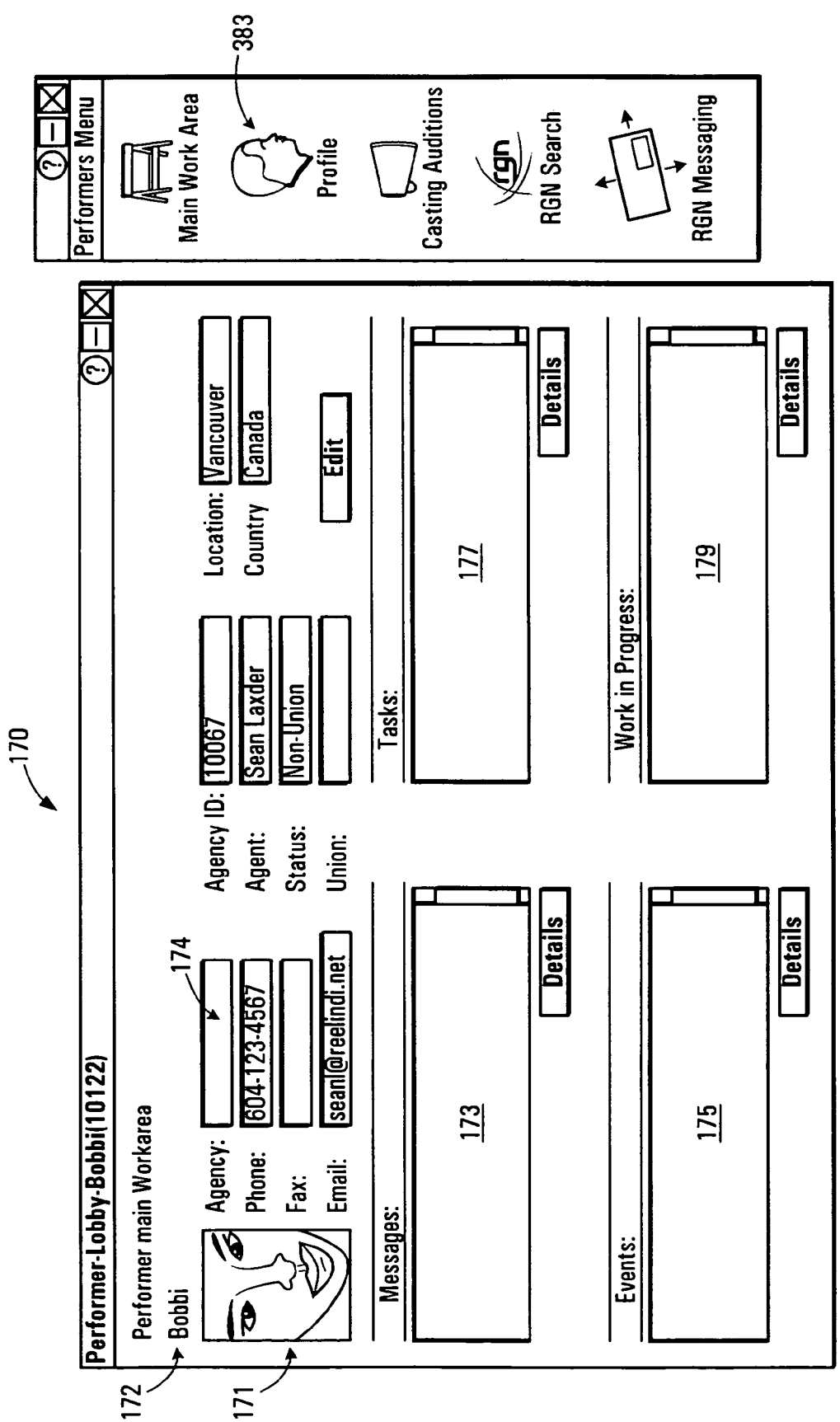
FIG. 10 is an exemplary Web page for a display related to a performer in accordance with the subject invention.
Figure 11:
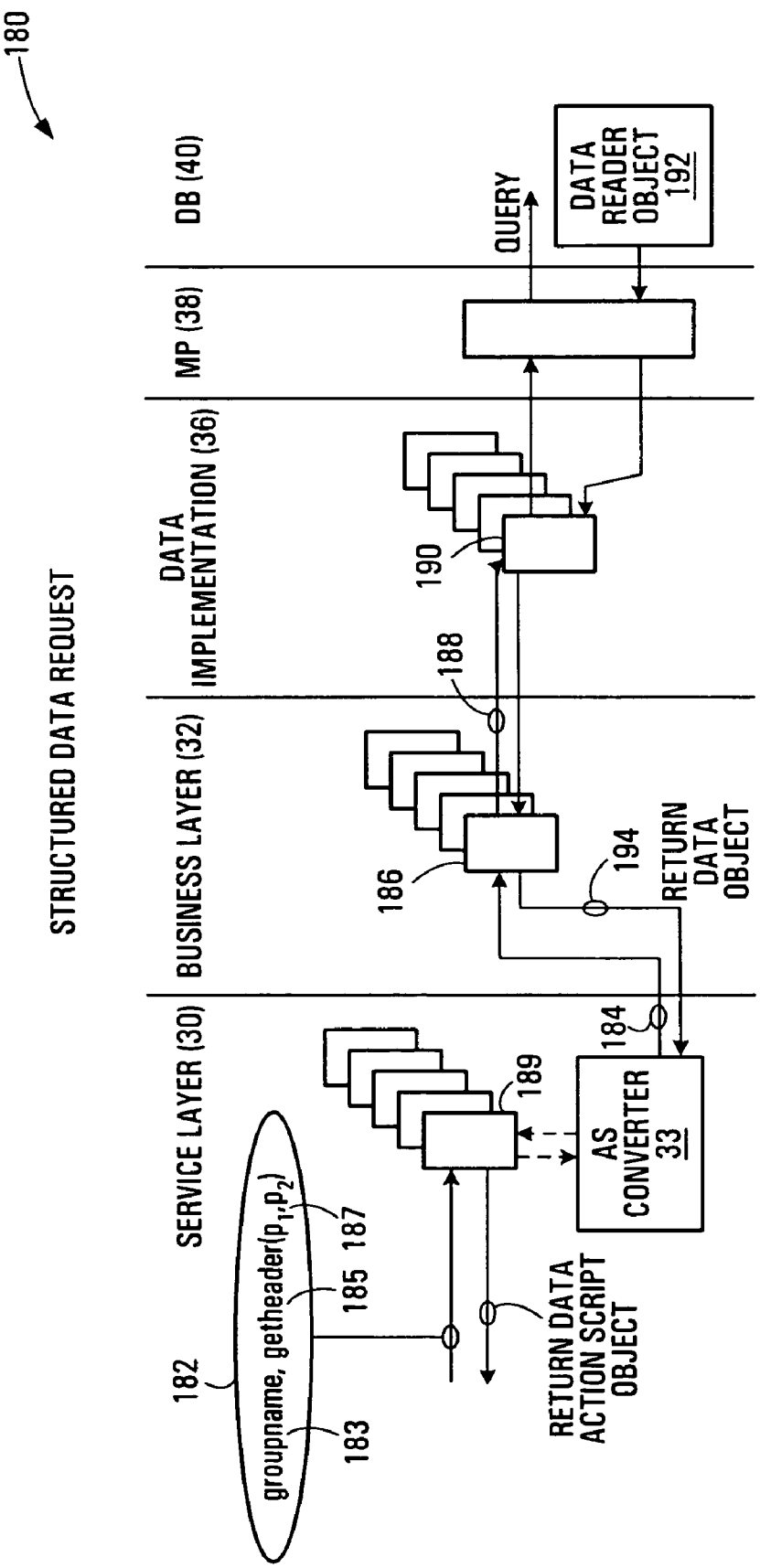
FIG. 11 is a data flow diagram for a structured data request related to an S-module in accordance with the subject invention.

Referring to FIG. 11, a typical structured data request/response to populate the plurality of fields including the name field 172 (FIG. 10) and the agency field 174 (FIG. 10), for example, is shown generally at 180. In general, a structured data request is manifest as a structured data request Action-Script object 182 at the communication appliance. The structured data request Action Script object specifies a group name 183, a service method name 185 and parameters 187. The group name 183 refers to a group of service methods held in the service layer 30 (FIG. 2) of which the service method referred to by the service method name 185 is a member. The parameters 187 identify the information to be requested from the database 40 (FIG. 2).

The ActionScript object 182 is communicated from the communication appliance to the management apparatus where it is received at the remoting gateway 28 (FIG. 2). Referring back to FIGS. 2 and 11, the remoting gateway 28 employs the basic converter 31 and the service layer 30 employs a service method 189 identified by the service method name 185 of the structured data request ActionScript object and the custom converter 33 to convert the structured data request object 182 into a strongly defined structured data request object 184 useable, for example, in the .NET environment. This strongly defined structured data request object 184 then interacts with a service method 186 in the business layer 32 to produce a structured data request object 188 useable by a method 190 in the data implementation layer 36 to cause the managed provider 38 to query the database 40 for the requested information.

The database 40 returns data to the method 190 in the data implementation layer 36 in the form of a data reader object 192 and this data reader object is forwarded by the data implementation layer 36 to the service method 186 in the business layer 32. This service method 186 may organize the data and encapsulate it in a return data object 194 which interacts with the custom converter 33 and the service method 189 to cause a return data ActionScript object to be sent to the communication appliance that requested the data. The return data ActionScript object received at the communication appliance interacts with the S-module that requested it and cooperates with the Flash player and the browser 21 (FIG. 2) to cause the data contained therein to be presented in the appropriate locations in the display window 170 (FIG. 10).

Figure 12:
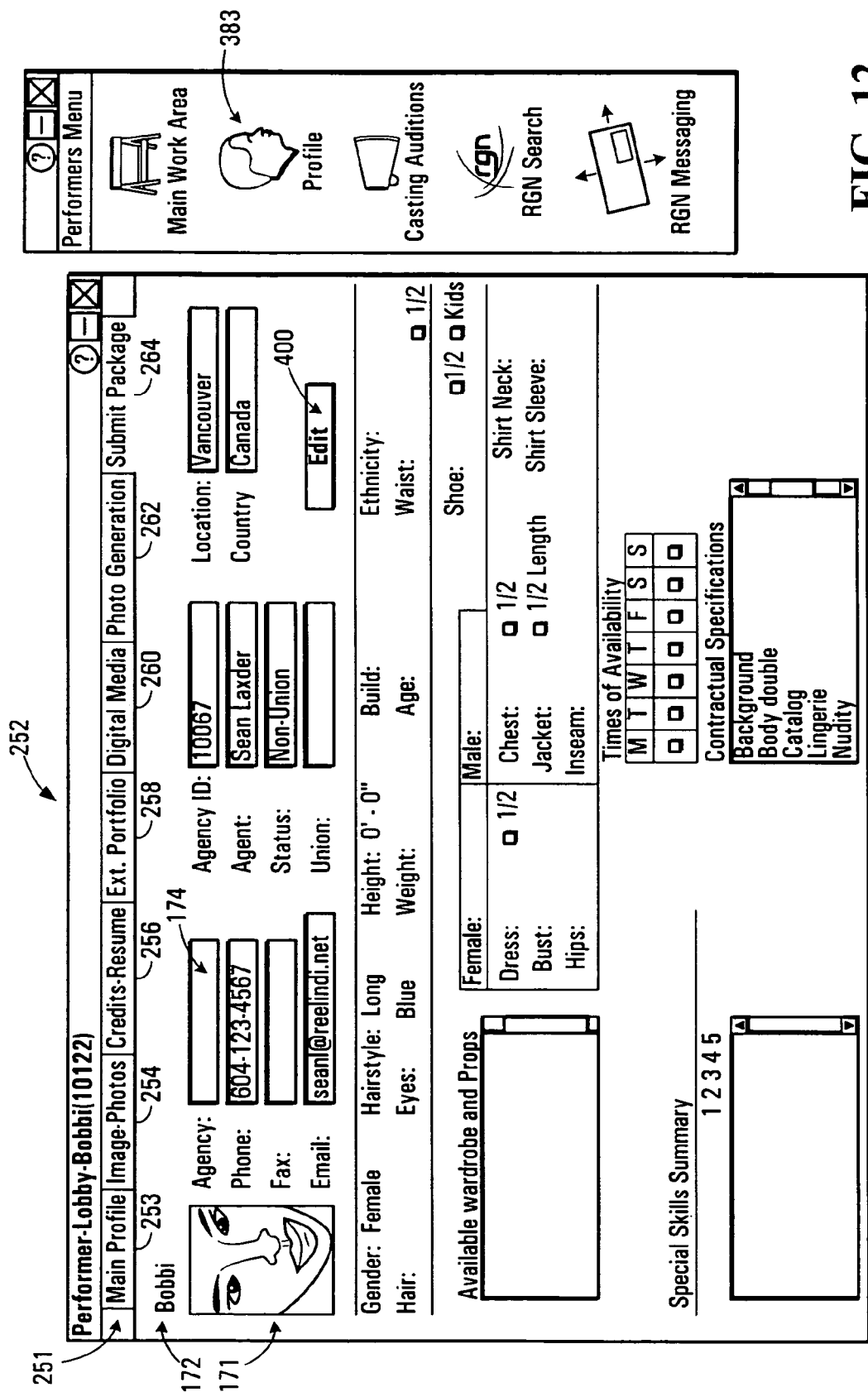
FIG. 12 is another exemplary Web page for a display related to a performer in accordance with the subject invention.

Referring back to FIG. 8, if the member had selected the profile option 154, an S-module causing a display window as shown at 252 in FIG. 12 to appear at the communication appliance may be requested and sent to the communication appliance (16, 18, 20).

FIG. 12

Referring to FIG. 12, the header information panel 171 is repeated in the display window 252. The display window 252 may also link to a performers top menu that causes a top menu as shown at 251 to be displayed. The performers top menu provides links to further S-modules associated with functions described as main profile 253, images-photos 254, credits-resume 256, Ext.-portfolio 258, digital media 260, photo-generator 262 and submit-package 264.

In the embodiment shown, an edit icon 400 and associated functionality are now made available to the member. This icon did not appear in the previous instance of the header information panel 171 because the S-module that causes the header information panel to be produced must first detect that the performer profile S-module has been received at the communication appliance before the edit feature is shown or enabled. In general the display features and functional features provided by an S-module may be controlled in response to detecting the presence of another S-module, in addition to user information as mentioned above.

If the member should activate the edit function through the edit icon 400, the member may edit information in any of the structured data display areas of the header panel. Activation of the edit function may invoke a member selectable save function (not shown) that can be invoked after the member has edited any fields in the header panel. Actuation of the save function causes a write request to be made by the communication appliance.

Referring back to FIG. 11, a write request originates as a structured data write request ActionScript object similar to the structured data request ActionScript object 182, at the communication appliance. The structured data write request Action Script object has a format similar to that of the structured data request ActionScript object with the exception that the group name 183 and service method name 185 are different and the parameters 187 include information identifiers and associated information to be written into the database. The conversion process described above in connection with a structured data request may occur depending upon whether the basic converter 31 is able to provide a strongly typed object in response to the structured data write request object. The business layer 32 may perform security and context checks and may cooperate with the data implementation layer 36 to translate the information identifiers used by the communication appliance into information identifiers recognizable by the database 40 to identify to the database where to store the information. After storing the information, an acknowledgement object is sent from the database to the data implementation layer 36 and forwarded to the business layer 32 which may be configured to immediately initiate a structured data request to cause a data reader object containing the just-written data to be produced. This data reader object is treated as described above in connection with the structured data request and ultimately results in the data read from the database to be displayed in the header information panel 171 shown in FIG. 12. Thus, as soon as data is written to the database, it is read and sent to the communication appliance so that the communication appliance always displays the most up to date information.

Unstructured Data Transfer/Response

Figure 13:
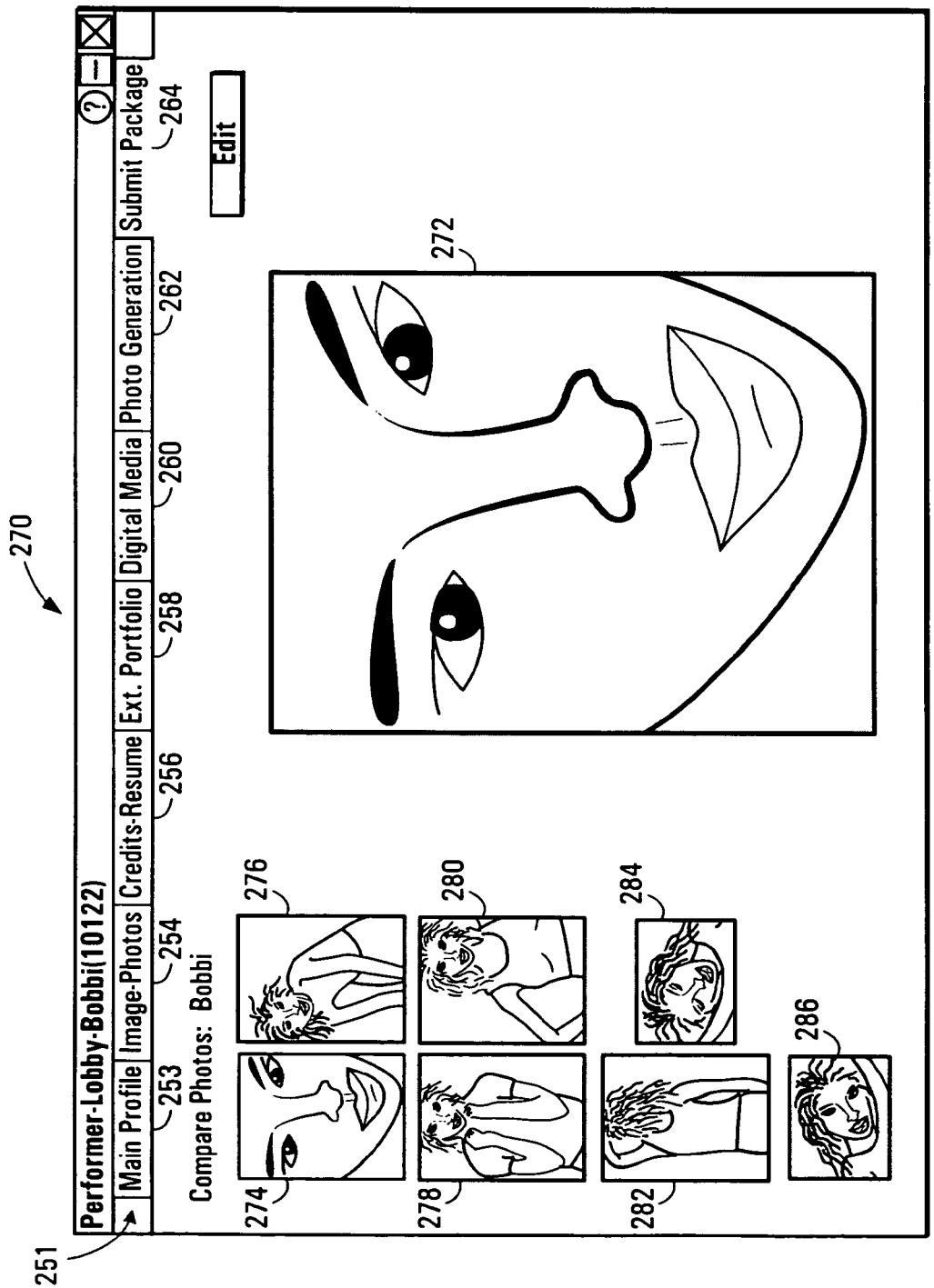
FIG. 13 is another exemplary Web page for a display related to a performer in accordance with the subject invention.

Referring back to FIG. 12, should the member select the images-photos option 254, an S-module is obtained to define a display window as shown at 270 in FIG. 13.

FIG. 13

Referring to FIG. 13, the display window 270 includes areas 272, 274, 276, 278, 280, 282, 284 and 286 to be filled with images produced from files such as Joint Photographic Experts Group (JPEG) files which may have earlier been provided by the member. These files are considered to hold unstructured data as they represent binary content of any size that is transferred between the communication appliance (16, 18, 20) computer and management apparatus (12). The display window 270 includes links associated with areas 272, 274, 276, 278, 280, 282, 284 and 286 for making requests for these files from the management apparatus (12). To be able to display the images in the locations shown in FIG. 13, the images must first have been uploaded to the server. To do this, the member stores a file such as a JPEG file, Joint B-Level Image Experts Group (JBIG) file, JPEG Utilities Registration Authority (JURA)-formatted file, Moving Picture Experts Group (MPEG) file (including a plurality of MPEG formatted files such as MPEG-1, MPEG-2, MPEG-4, MPEG-21), or any of a plurality of other content files in a specific location of the member's choice in memory on the communication appliance and then invokes an upload procedure described below.

When photos are available, areas 274-286 are loaded with separate photos. The member may select one of the photos to appear in the area 272. This photo is considered to be a representative photo of the member and is used on the main performer profile shown in FIG. 12, for example and will be used on performer summaries (or member summaries) as described below.

Uploading Files

Uploading files to the server cannot be achieved with program modules operating in the remoting environment as such files inherently have restricted access to the memory of the communications appliance on which they are executing. Thus a special procedure must be invoked to permit files to be uploaded. Following is a description of a general method specifically implemented using the components described, for presenting multimedia content residing at a first computer, using a restricted access program executing on the first computer, where the restricted access program has restricted access to the multimedia content at the first computer and has access to a resource at a second computer in communication with the first computer. In the embodiment described, the first computer includes the first communications appliance 16 and the second computer includes the management apparatus 12. The resource to which the restricted access program has access includes the file system 29. In general, the method involves using the restricted access program to request from the second computer a set of computer-readable instructions operable to cause the first computer to transmit the multimedia content to the resource at the second computer accessible by the restricted access program, receiving and executing the set of computer-readable instructions at the first computer and causing the restricted access program to access the resource at the second computer to cause the multimedia content to be presented at the first computer. The specific way in which this is carried out is described below.

FIG. 13A

Referring back to FIG. 7B the main menu includes a member's console icon 163. Activation of this icon by the member causes an S-module (restricted access program) to be obtained from the management apparatus to cause an administration display window as shown at 301 in FIG. 13A to be displayed at the communication appliance. The S-module is the restricted access program.

The administration display window 301 includes a storage space monitor and control panel 303, an account information monitor panel 305, a performer lobby control panel 307 and a function/tool selector panel 309. It may also include a time zone display 311.

The storage space monitor and control panel indicates the amount of storage space, that has been allocated to the member, in the file system at the management apparatus, the space used and the space that is remaining, in connection with the member. It also includes a more space option 313 to rent more space, for a further fee and includes an upload function 315.

FIG. 14

Figure 13A:
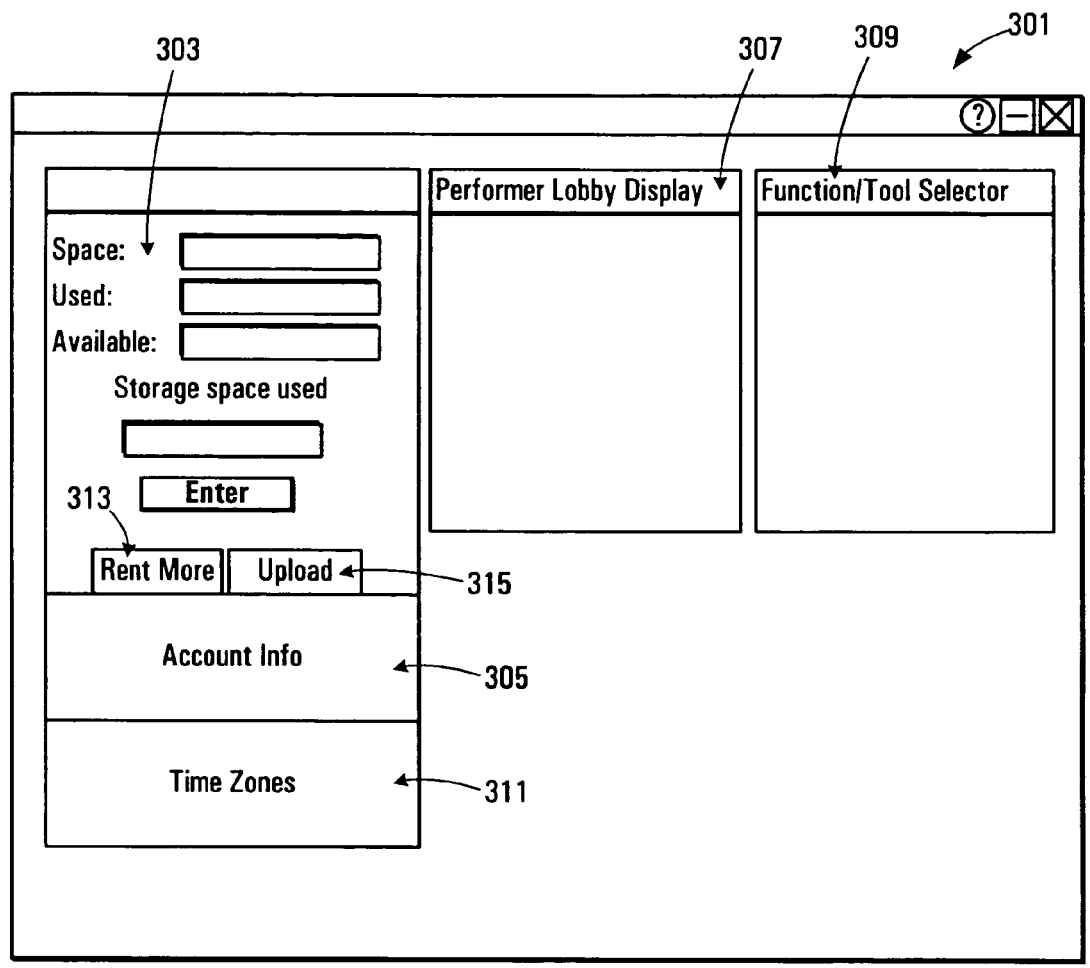
FIG. 13A is a blank Web page for a display related to a performer in accordance with the subject invention.
Figure 14:
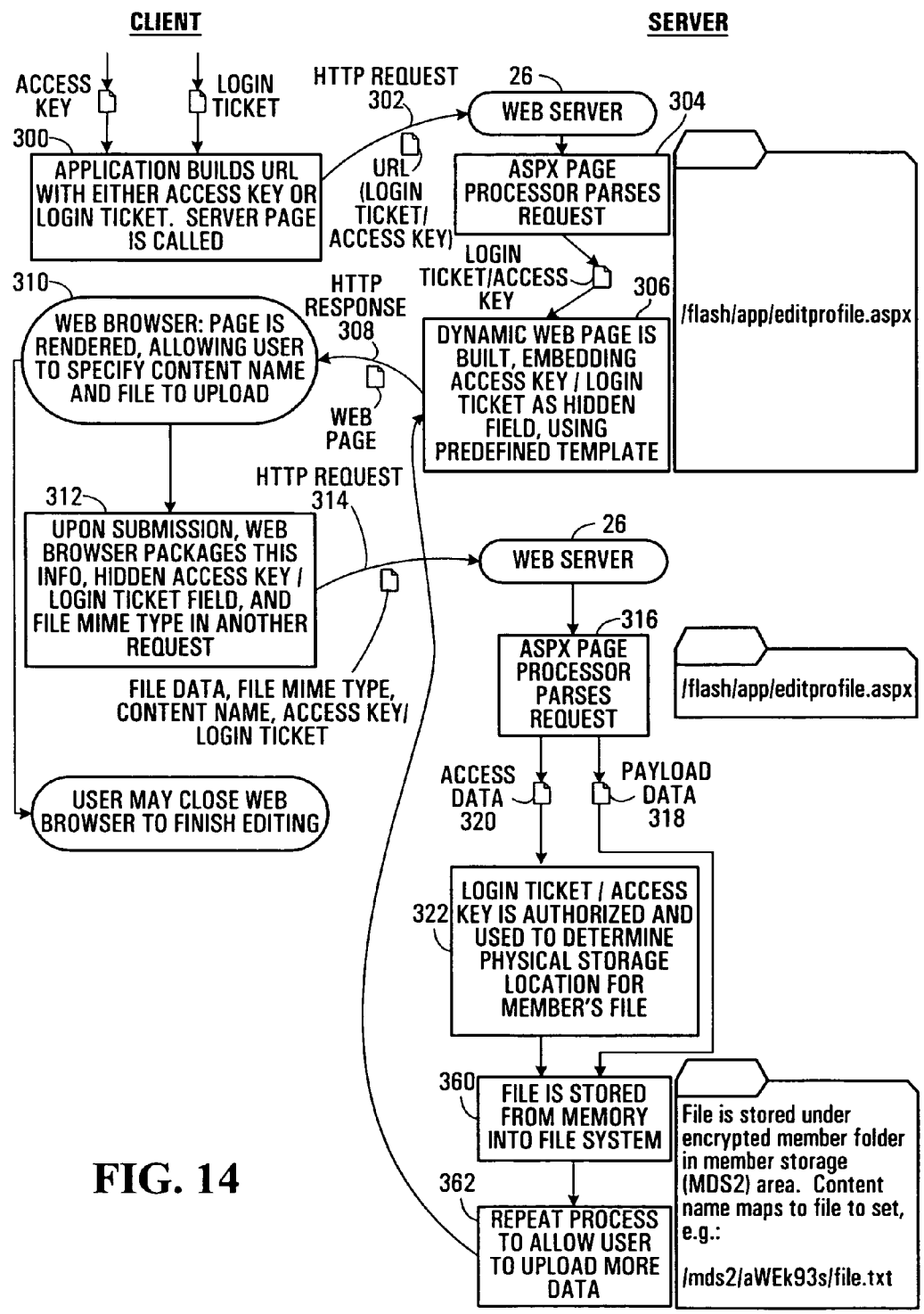
FIG. 14 is a data flow diagram for uploading information in accordance with the subject invention.

Referring to FIG. 14, in response to actuation of the upload function 315 in FIG. 13A the member's access key or log-in ticket received at the time of login is used by the S-module at the communication appliance to build a URL, as shown at 300. Alternatively, if the member is trying to access or upload information to an area associated with another member, such other member must first have provided the member with an access key, which may be pre-associated with the member by the other member and downloaded to the member at login or during a communication session. A server page defined by the URL is then called by making an http request as shown at 302, the request including a URL defined based on the log-in ticket or access key. This http request 302 is received by the web server 26 which invokes an Active Server Page X (ASPX) page processor, for example, to parse the http request, as shown at 304. This causes the log-in ticket or access key to be extracted from the request and in response, as shown at 306, a dynamic web page is built using a predefined template that embeds the access key or log-in ticket as a hidden field. This dynamic web page is then sent back to the communication appliance in an http response 308. This dynamic web page is the set of computer-readable instructions that causes the communications appliance to transmit the multimedia content to the second computer as will be seen below. At the communication appliance (16, 18, 20) the dynamic web page is received and executed such that the web browser 21 causes the dynamic web page to be displayed, allowing the member to specify the content name and file to upload as shown at 310.

FIG. 14A

Figure 14A:
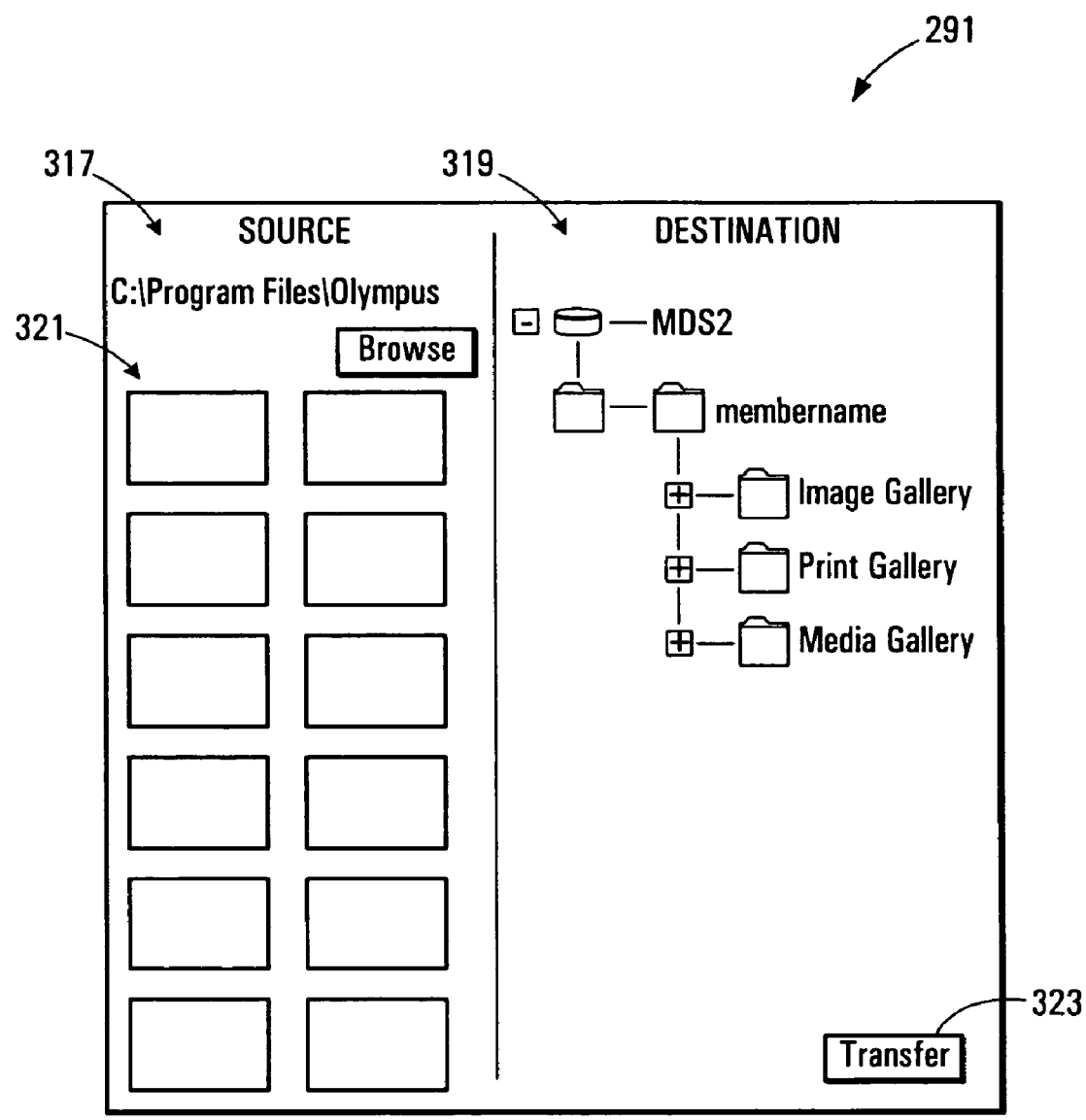
FIG. 14A is an input Web page in accordance with the subject invention.

Referring to FIG. 14A the dynamic web page is shown at 291 and includes source and destination browse panels 317 and 319 that appear on a display at the communication appliance to permit the member to select a folder on the local file system at the communication appliance from which to retrieve a file and to create, edit and delete folders or "galleries" in the space allocated to the member on the file system, respectively. A pre-defined set of folders may be initially provided, and identified as Image Gallery, Print Gallery and Media Gallery, for example. Thus, executing a set of computer-readable instructions (dynamic web page) involves receiving user input to identify a memory location at the first computer, at which the multimedia content is stored, receiving user input to identify at least one of a create, edit and delete function and to identify the multimedia content to be uploaded to the second computer.

The source panel 317 includes a plurality of thumbnail views 321 each representing a different photo, media file, mixed-object file, or automated object content architecture™ (AOCA™) file in the local file system. To select a photo or media file the member simply clicks on the thumbnail view associated with the desired file to be uploaded.

The destination panel 319 includes a directory tree identifying file folders in the file system of the management apparatus to which the selected files can be uploaded. This tree is specific to the member. On selecting the desired destination folder a transfer function 323 is actuated to initiate a process to transfer the selected file to the indicated destination folder. In response, as shown at 312 in FIG. 14, the web browser packages the content file name, the hidden access key or log-in ticket information, a multipurpose internet mail extensions (mime) type and a plurality of mixed-object native and mixed-object-transformed file types, using or not using Base64 Encoding, into an HTTP request as shown at 314 in FIG. 14. Thus, the process involves receiving user input to identify a memory location at the second computer, at which identified multimedia content at the first computer is to be stored and causing the first computer to transmit identified multimedia content to the resource accessible by the restricted access program at the second computer.

In one embodiment, where the selected file is a raw video file, the S-module invokes a compression procedure stored locally at the communication appliance to compress the file before it is sent to the management apparatus.

In another embodiment, compression may occur at the management apparatus 12. In this embodiment, the S-module sends a succession of portions of the raw video file to the management apparatus and these are individually compressed and accumulated to produce a final compressed file representing the raw video data, for storage at the management apparatus. In one embodiment, prior to invoking the compression procedure, the raw video data is filtered into a digital video (DV) format (such as national television system committee, NTSC, phase alternating line, PAL, sequential color with memory, SECAM) having, for example, an image aspect ratio of 4:3, a resolution of 720×480 pixels, a color resolution of 32 bits, a frame rate of 29.97 frames per second, an audio sample rate of 48 KHz in a 16 bit format and an overall data rate of 3.6 Mb/sec.

Figure 14B:
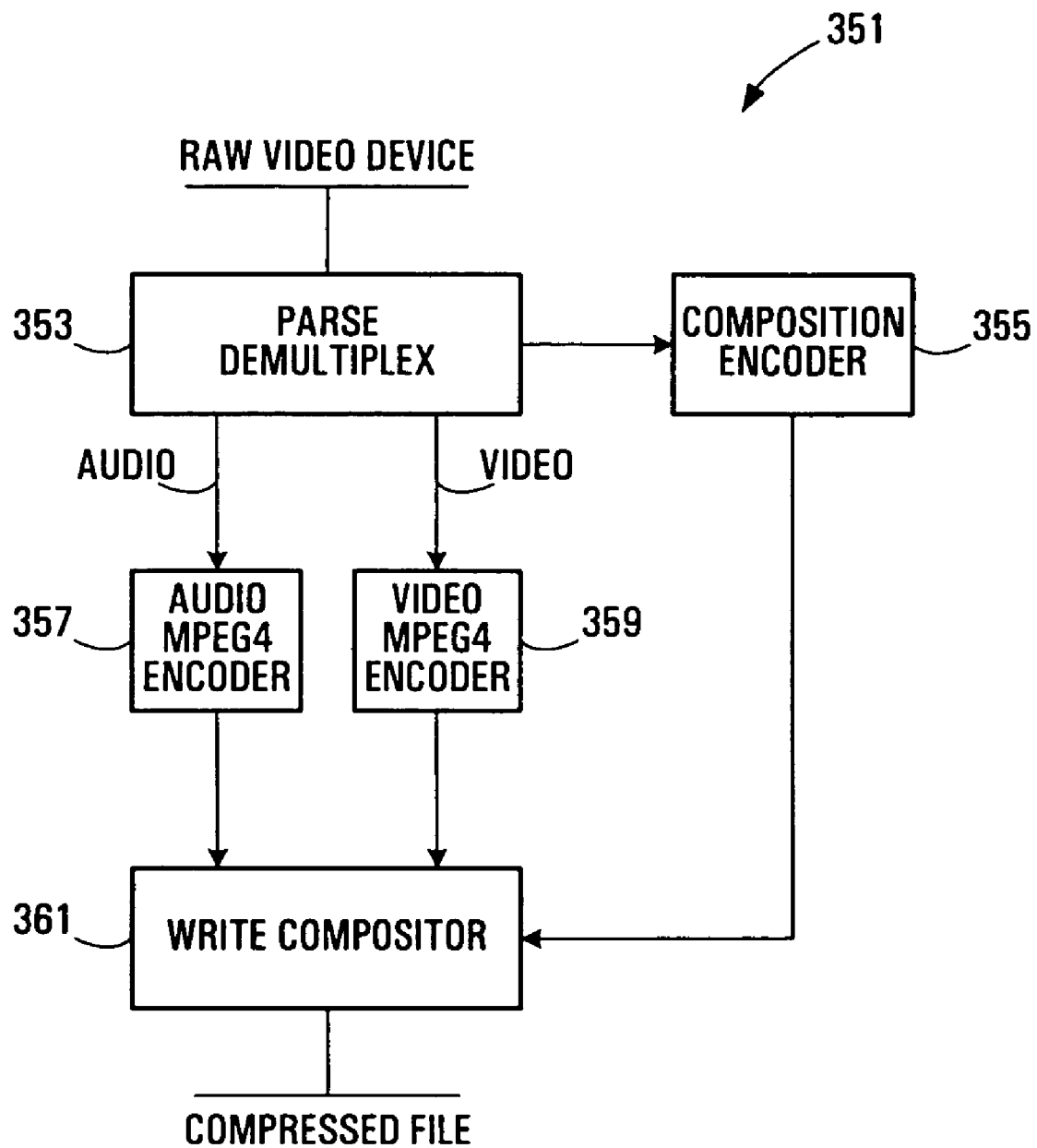
FIG. 14B is a flowchart for a compression procedure in accordance with the subject invention.

Referring to FIG. 14B the compression procedure is shown generally at 351 and involves parsing the raw video file data to produce audio, video and composition portions, as shown at 353, where the example shown in FIG. 14B is specific to MPEG-4. A plurality of other embodiments is supported, including, for example, any of MPEG-1 through MPEG-21.

In another embodiment, the results of the compression procedure shown generally at 351 are conveyed by MPEG-21 Part 4, Intellectual Property Management and Protection (IPMP) and MPEG-21 Part 5, Rights Expression Language (REL), where MPEG-21 Part 4 includes standardized ways of retrieving IPMP tools from remote locations, exchanging messages between IPMP tools, and between tools and the terminal. MPEG-21 Part 4, for example, also addresses authentication of IPMP tools, and has provisions for integrating Rights Expressions according to the Rights Data Dictionary and the Rights Expression Language (REL).

Referring again to FIG. 14B, in another embodiment, the audio, video and composition portions, as shown at 353 can be seen in MPEG-21 Part 5 (REL) format as a machine-readable language that can declare rights and permissions using the terms as defined the Rights Expression Dictionary, where REL provides flexible, interoperable mechanisms to support transparent and augmented use of digital resources in publishing, distributing, and consuming of digital movies, digital music, electronic books, broadcasting, interactive games, computer software, and other creations in digital form, in a way that protects digital content and honours the rights, conditions, and fees specified for digital contents.

FIG. 14B indicates that the composition portion is provided to a composition encoder 355 which produces an encoded composite signal. In one embodiment, the audio data and video data signals are provided to audio and video MPEG-4 encoder 357 and 359 respectively to produce compressed audio and video signals which along with the encoded composite signal are provided to a write compositor 361 to produce a compressed file. In this embodiment, the video encoder 359 performs an encoding function based on the MPEG-4 standard. Different encoders may implement different types of encoding and may be employed at 357 and 359, instead of the MPEG-4 encoders described.

In this embodiment, the signal produced by the video encoder in one embodiment is in the same format as the input signal (NTSC, PAL) and has an image aspect ratio of 4:3 and scaling to 320×240 pixels resolution (common intermediate format, CIF). A color resolution of 32 bits is maintained. The frame rate is 15 frames per second and the frames are de-interlaced. Flat field adaptive noise reduction is employed. A key frame (I-frame) occurs every 120 frames. The data rate is limited to 240 kbits/sec. The audio sample rate is 44.1 kHz in a 16 bit format and the audio data rate is 64.04 kHz. The overall data rate is 3.6 Mb/sec.

Referring back to FIGS. 2 and 14, before the compressed file is sent to the management apparatus, the HTTP request 314 is received by the web server 26 of the management apparatus 12, which invokes an ASPX page processor to parse the request, as shown at 316, to produce payload data as shown at 318 and access data shown at 320. The payload data 318 includes file information, the file mime type and the content file name. The access data 320 includes the log-in ticket or access key. As shown at 322, the access data 320 is then used to determine whether or not the member is authorized to store the information and, if so, to determine the physical storage location corresponding to the selected destination folder in which to store the files.

FIG. 15

Figure 15:
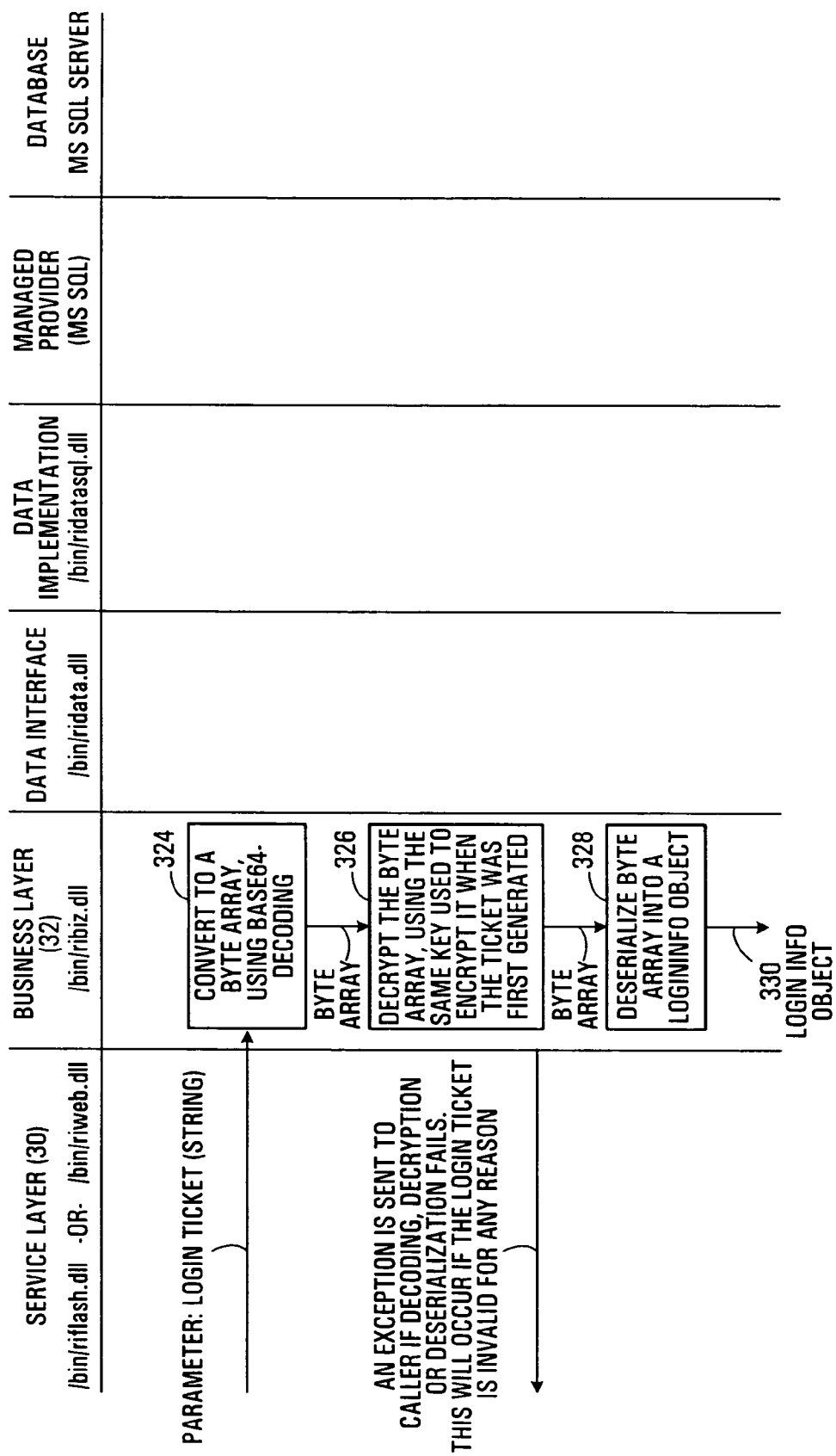
FIG. 15 is a data flow diagram for processing a login ticket in accordance with the subject invention.

Referring to FIG. 15, where the access data includes a log-in ticket, the log-in ticket is passed through the service layer 30 to the business layer 32 which, as shown at 324, converts the log-in ticket to a byte array using base 64 decoding. Then, as shown at 326, the business layer decrypts the byte array using the same key used to encrypt it when the ticket was first generated. Then, as shown at 328, the business layer 32 de-serializes the byte array into a log-in info object shown generally at 330. The log-in info object is passed back to the service layer which may use it to perform security and context verification on the log-in info object.

If decoding, decryption, or de-serialization in the business layer 32 fails, an appropriate message is returned back through the service layer 30 to the communication appliance (16, 18, 20) to indicate that the file(s) could not be uploaded.

FIG. 16

Figure 16:
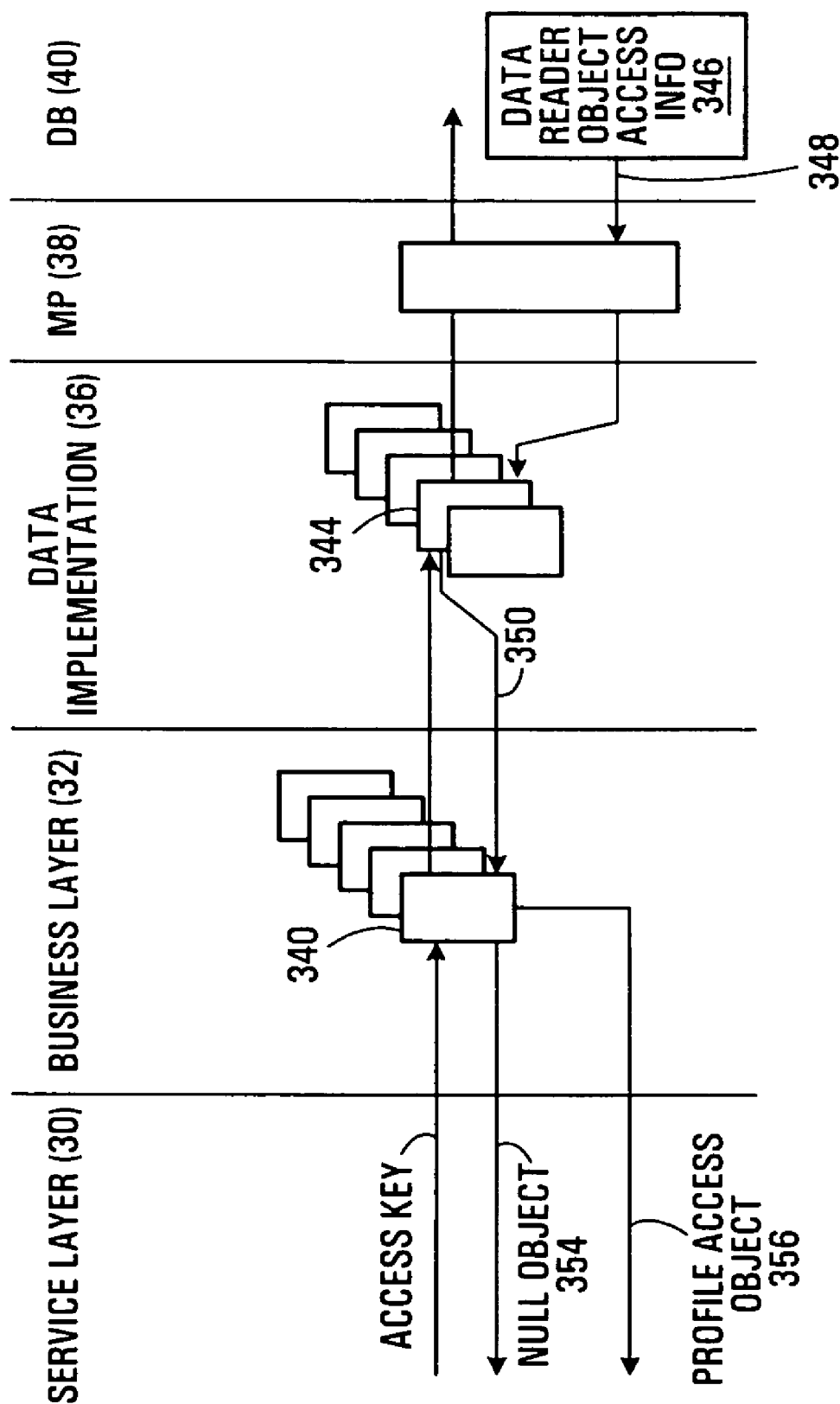
FIG. 16 is a data flow diagram for access data in accordance with the subject invention.

Referring to FIG. 16, where the access data 320 includes an access key, the access key is passed through the service layer 30 to the business layer 32 which, as shown at 340, prepares a call to retrieve data for profile access. The call includes parameters including the access key, and these parameters are received by the data implementation layer 36 which causes a stored procedure to be executed as shown at 344 to produce a list of parameters according to the database data types. The managed provider 38 produces an appropriate function call to the database server 40 causing profile information 346 matching the access key to be retrieved from the database 40, and returned to the managed provider 38, as shown at 348. This information is formatted by the managed provider 38 as a data reader object which is passed back to the business layer 32 as seen at 350. Modules in the business layer 32 review the data reader object, to determine whether it contains data. If it does not, the access key is invalid and read and write access is denied. As shown at 354, a null object is then sent back to the communication appliance (16, 18, 20) to indicate this. If the business layer 32 determines that the data reader object does contain data, then, as shown at 356, the business layer 32 creates and sends to the service layer a profile access object which determines whether the member bearing the access key has read or write access to the database in respect of information he or she may wish to retrieve.

The log-in info object 330 shown in FIG. 15 or the profile access object 356 shown in FIG. 16 are used by the business layer 32 to determine the physical storage location in the management apparatus file system for the content file provided by the member. Once the physical file location is known, the compressed unstructured data file is transferred using the file transfer protocol to the management apparatus and is stored in a compressed format at the physical file location determined according to the process described above.

Referring back to FIG. 14, as shown at 362, after a file is uploaded and saved the member is then referred back to the web page included in the http response 308 to identify further files which are to be uploaded to the database.

Figure 17:
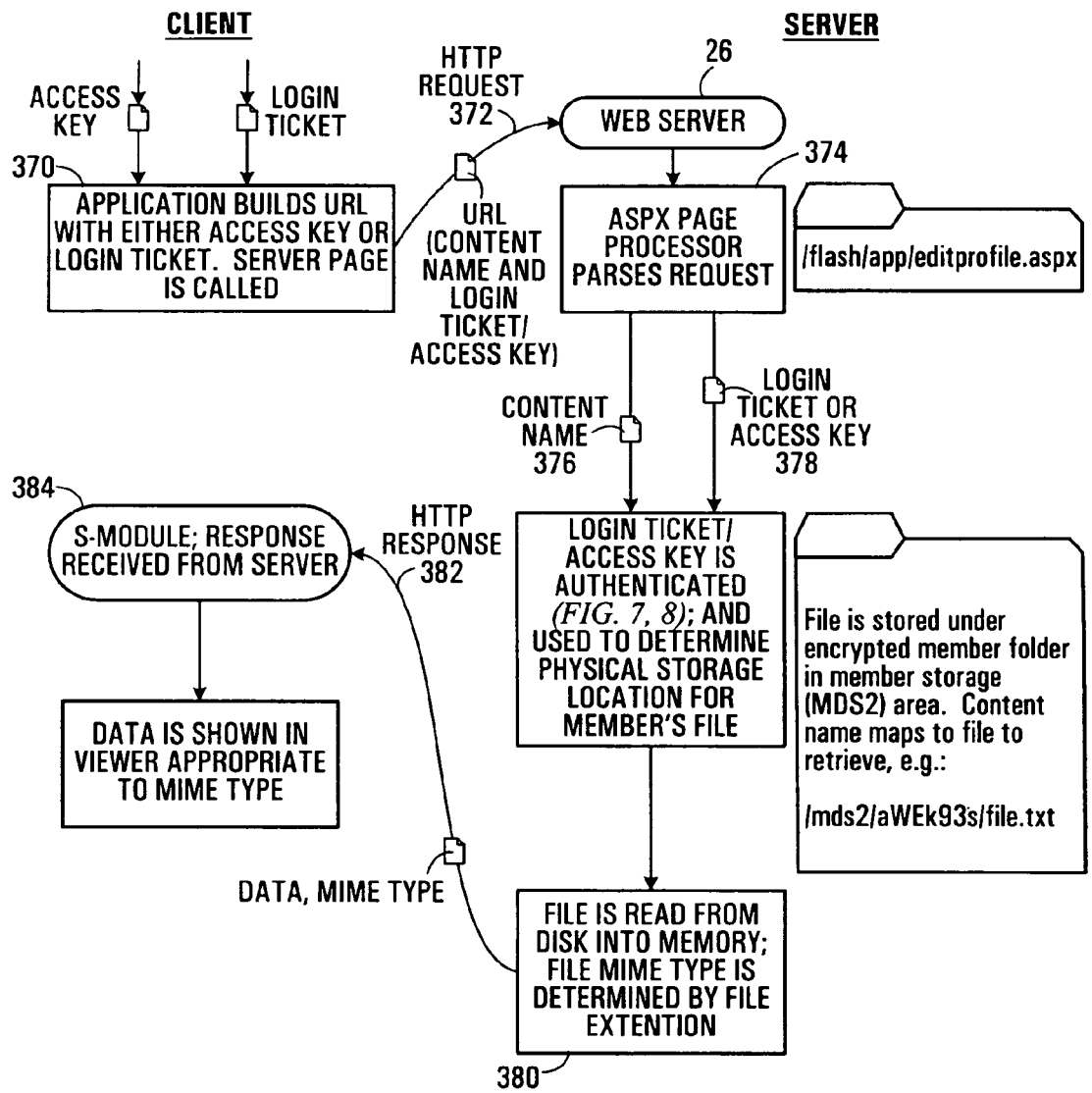
FIG. 17 is a data flow diagram for building a URL in accordance with the subject invention.

The S-module that produces the display window 270 shown in FIG. 13 obtains JPEG files, for example, depicting the photos 272 to 286 by building a URL with either an access key or log-in ticket and the name of content to retrieve, as shown at 370 in FIG. 17. The content name may include an identification of the image gallery, print gallery or media gallery folders shown in FIG. 14A, for example such that all multimedia files in a selected one of these folders are retrieved in the order in which they were stored, to fill available spaces in the display window 270 shown in FIG. 13. Thus, causing the restricted access program to access the multimedia content at the second computer comprises transmitting to the second computer a uniform resource locator identifying a location at the second computer, where the multimedia content is stored.

FIG. 17

Referring to FIG. 17, the URL built by the S-module that produces the display window 270 in FIG. 13 includes the content name and log-in ticket or access key. The URL is sent as an http request 372 to the management apparatus (12). As shown at 374, at the web server (26), the ASPX page processor at the management apparatus 12, parses the request and produces a list of content names 376 and the log-in ticket or access key 378. The log-in ticket or access key 378 is then used in either of the processes shown in FIG. 15 or FIG. 16, as appropriate, to determine whether or not the log-in ticket or access key can access the content defined in the content name list 376. If so, then as shown at 380, the physical file location is determined from the log-in ticket or access key and content name and the files are read from the file system 29 (FIG. 2) and are transferred back to the communication appliance (16, 18,20) as an http response 382. This response 382 includes data and a MIME type. As shown at 384, the http response 382 is received by the S-module at the communication appliance causing the files, i.e. multimedia content to be presented at the communications appliance. In other words, the restricted access program (the S-module) accesses the resource at the second computer to cause the multimedia content to be presented at the first computer (communications appliance).

The following description relates to functionality observed by members using the system, it being understood that the underlying communications between the communications appliance and management apparatus generally involve requests for S-modules, requests to read or write structured data and requests to read and write unstructured data following the procedures described above.

Performers

When the S-module associated with the profile icon 383 shown in FIG. 10 is obtained the main profile display window 252 shown in FIG. 12 is displayed.

As described above, should the member click on the images photos option 254, an S-module associated with the images photos feature is obtained from the management apparatus (12) so that a window panel such as shown at 270 in FIG. 13 is seen on a display at the communication appliance, according to the S-module. The S-module also causes requests for unstructured data representing photos to be made so that photos are displayed in fields 272 to 274 respectively. The profile is thus populated with unstructured data.

The header that indicates options 253 to 264 of FIG. 12 is repeated at the top of the display window shown in FIG. 13 to allow the same options to be selected from the display window shown in FIG. 13. Thus, should the member select the credit/resume function 256, an S-module is obtained from the management apparatus (12) and causes a display window as shown at 402 in FIG. 18 to be displayed at the communication appliance.

FIG. 18

Figure 18:
FIG. 18 is a screen shot of a display window permitting a person associated with an object to be represented, to enter information to be stored as structured data at the management apparatus.

The display window shown in FIG. 18 includes the top menu 251 as seen in FIG. 12. This display window also includes a display window as shown at 404, which can be used to permit the performer to add information relating to credits, in a structured format. In addition, a further display window as shown at 406 may be provided to permit the member to edit or view structured data relating to special skills. Effectively, these two display windows 404, 406 allow a member to add information to create a "resume". More generally, the S-module causes the first communications appliance to receive operator input and communicates such operator input to the management apparatus to cause structured and unstructured data to be created, modified or deleted.

Figure 19:
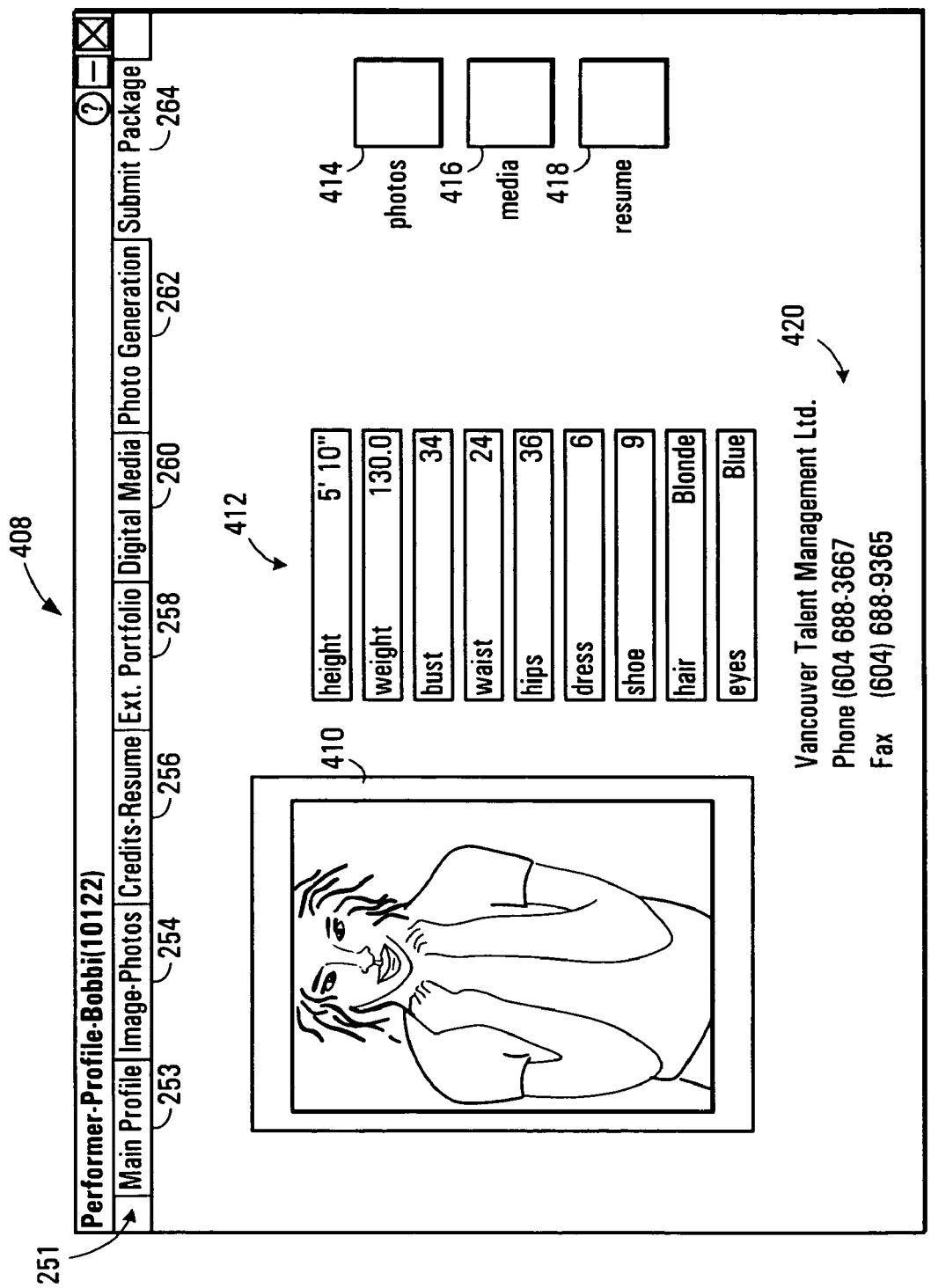
FIG. 19 is a screen shot of an external portfolio display window seen at a communication appliance by a person associated with an object to be represented.

From FIG. 18, should the member select the external portfolio option 258, an S-module is obtained from the management apparatus (12) to produce a External Portfolio display window as shown at 408 in FIG. 19, for building a portfolio comprised of photos, media files and/or resume information, for example, for dispatch to a desired recipient, such as a talent agent representing the performer, for example.

FIG. 19

Referring to FIG. 19, the external portfolio display window 408 includes the top menu 251 shown in the previous window panels and further includes a picture area 410, a primary statistics area shown generally at 412 and three information control options including a photos option 414, a media option 416 and a resume option 418. The resume option 418 may be used to activate functions in the S-module producing the display window 408 to include or omit the resume portion 412 from the external portfolio package. The name and address of a talent agency representing the performer may be shown at 420.

Figure 20:
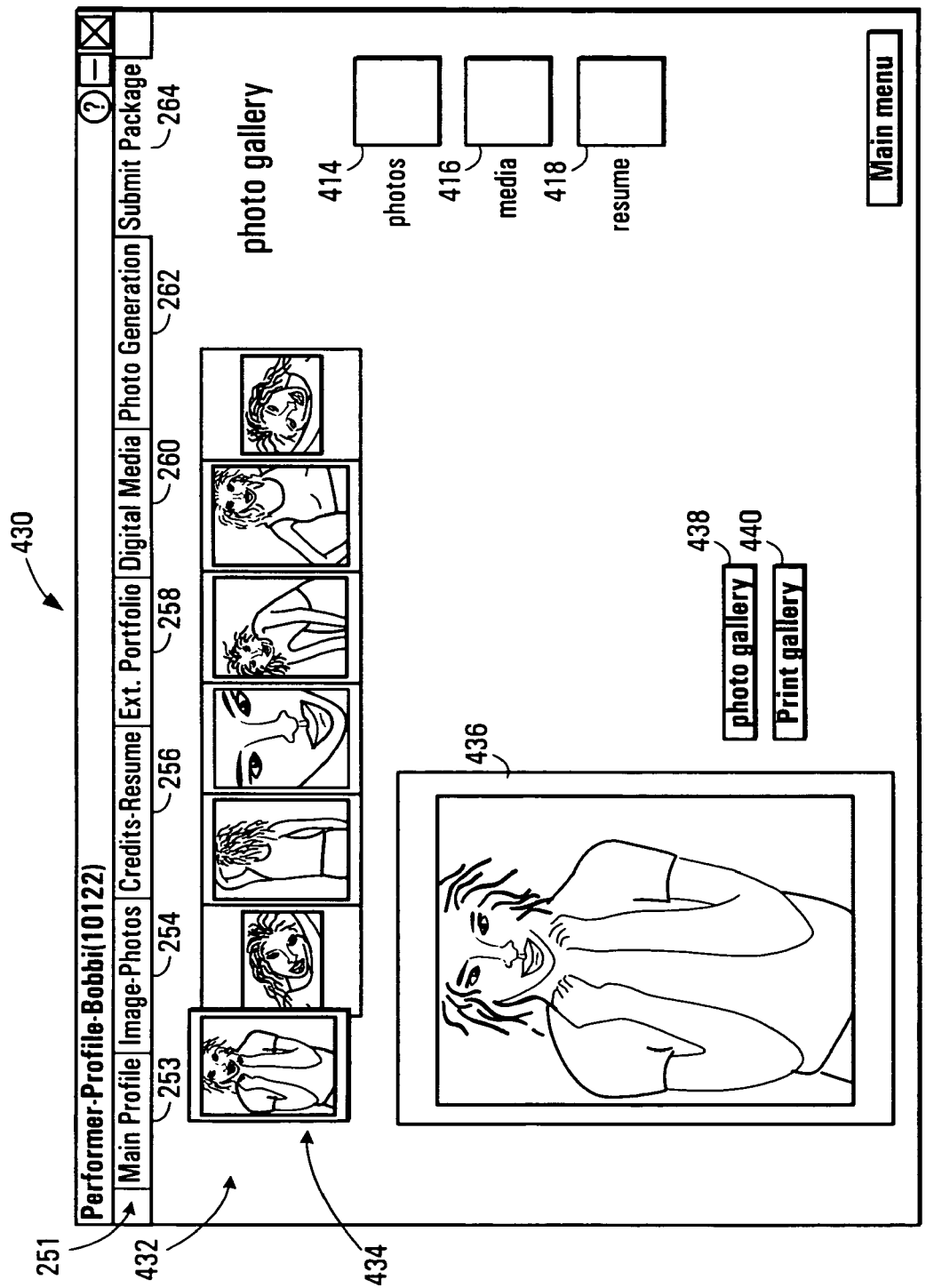
FIG. 20 is a screen shot of a photo gallery display window seen at a communication appliance by a person associated with an object to be represented.

The photos option 414 may be used to cause an S-module associated with manipulation of photos to be downloaded into the communication appliance to produce a photo gallery display window as shown at 430 in FIG. 20. Alternatively, the same S-module may be obtained in response to actuation of the photo generator option 262 in the top menu 251.

FIG. 20

The photo gallery display window 430 includes the top menu 251 and further includes the three information control options seen in FIG. 19 to provide for easy navigation. The display window further includes a photo gallery shown generally at 432 including thumbnail pictures 434. The photo gallery display window 430 further includes a main picture area 436. The thumbnail area includes all photos that have been uploaded into a common "gallery" in the management apparatus by the member. Different galleries may be selected by actuating a drop down menu 438, for example.

Selecting a desired promotional photo in the thumbnail area 434 causes the selected photo to be shown in the main photo area 436 and identified at the management apparatus as a promo photo to be used in the external portfolio.

Figure 21:
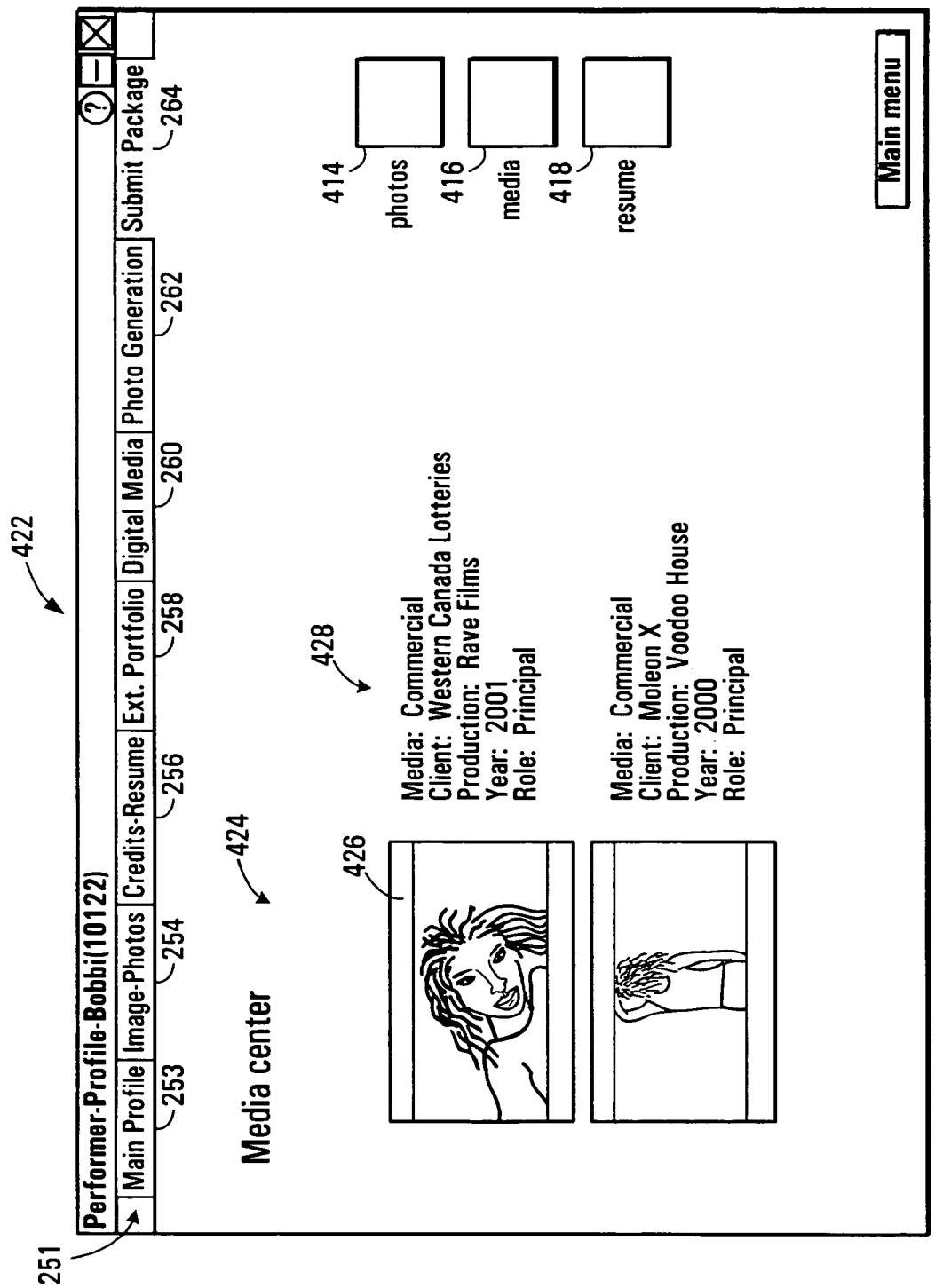
FIG. 21 is a screen shot of a media center display window seen at a communication appliance by a person associated with an object to be represented.

Referring to FIGS. 19 and 20, the media option 416 may be used to cause an S-module associated with the retrieval of media files including audio or movie files, for example, to be downloaded into the communication appliance to produce a media center display window as shown at 422 in FIG. 21.

FIG. 21

Referring to FIG. 21, the media center display window 422 includes the top menu 251 and further includes media selections one of which is shown generally at 424, to provide thumbnail views as shown at 426 and basic information as shown at 428 relating to media files that can be added to the external portfolio. After making a request for video files from the server, when the video files are received from the management apparatus the S-module invokes a decoder function that decompresses the file(s) received from the management apparatus by performing MPEG 4 decoding to perform the inverse function to the encoding function described above. After the file is decoded a first frame of the video file is depicted in one of the areas 426 shown in FIG. 21. The member may scroll through listed media files and select one or more files to be included in the external portfolio.

After selecting photos and media files and resume options, the member may activate the submit package option 264 in the top menu to cause an S-module to be obtained to provide for dispatch by email for example, of the external portfolio just created.

Figure 22:
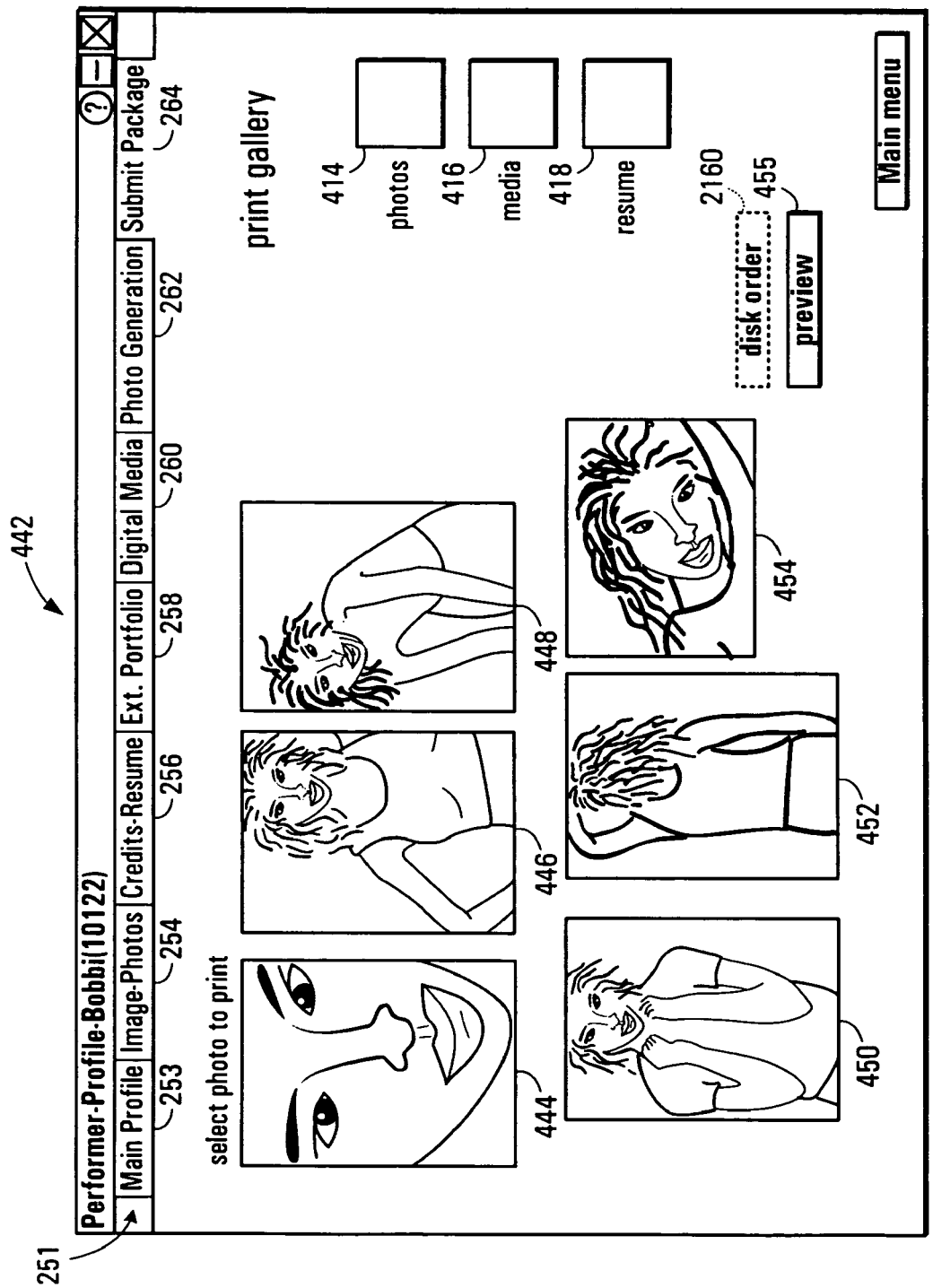
FIG. 22 is a screen shot of a print gallery display window seen at a communication appliance by a person associated with an object to be represented.

Referring back to FIG. 20, the photo gallery display window 430 includes a print gallery link 440, which when activated by the member causes an S-module to be obtained to cause a print gallery display window 442 as seen in FIG. 22 to be displayed at the communication appliance.

FIG. 22

Referring to FIG. 22, the print gallery display window 442 includes the top menu 251 and further includes areas 444, 446, 448, 450, 452 and 454, for example, for showing photographs, the files of which may be loaded into a print buffer (not shown) at the communication appliance (16, 18, 20) for printing. The photos are arranged in two rows. The first or top row is used to select a primary print photo and the second row is used to select a secondary print photo. The user may scroll through all available photos on each to select desired ones for inclusion in a promo page that can selectively be printed by a printer controlled by the communication appliance. A colored border is shown around selected photos to indicate they are selected. In the print gallery, the resume function 418 is used to select whether or not a resume panel will be included as a second print page.

Figure 23:
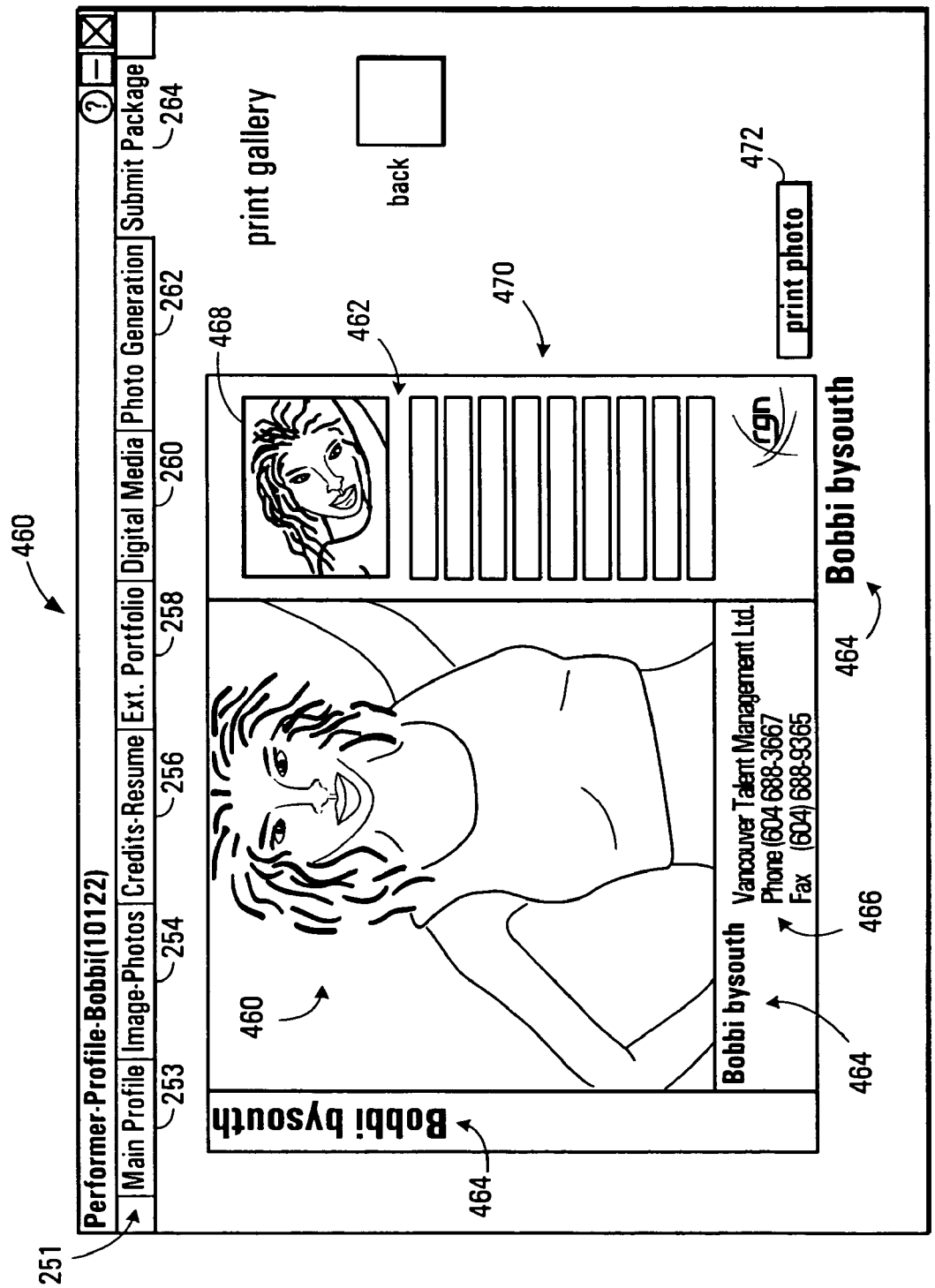
FIG. 23 is a screen shot of a preview window seen at a communication appliance in response to actuation of a preview button of the display shown in FIG. 22.

When the user has made desired selections, a print preview control 455 is actuated by the member, which causes another S-module to be obtained from the management apparatus (12) to cause a display window as shown at 460 in FIG. 23 to be seen on the display at the communication appliance.

FIG. 23

The display window 460 shown in FIG. 23 includes the top menu 251 and includes a formatted view window 462 comprising the primary photo 460, the name of the performer 464, the name of the advertising agency or talent agent associated with the performer 466, the secondary photo 468 and primary information 470 in a format and scale as it would appear on a printed page. A print photo option 472 may be activated by the member to cause the actual image seen in the window 462 to be loaded into a print buffer at the communication appliance and to initiate printing on a printer connected to the communication appliance to produce a printed sheet identically as shown within the window 462. Printers capable of producing double sided output may print the image shown within the window 462 on one side of the page and may print the resume information as shown in FIG. 24, in the form of a resume on an opposite side of the page. Alternatively, the image and information may be printed on separate pages.

FIG. 24

Referring to FIG. 24, the resume information printed may include the name 464, basic information 470, an identification of the agent 466, credits as shown generally at 474, and special skills as shown generally at 476, as entered originally using the display shown in FIG. 18.

Agents and Managers Functionality

Figure 25:
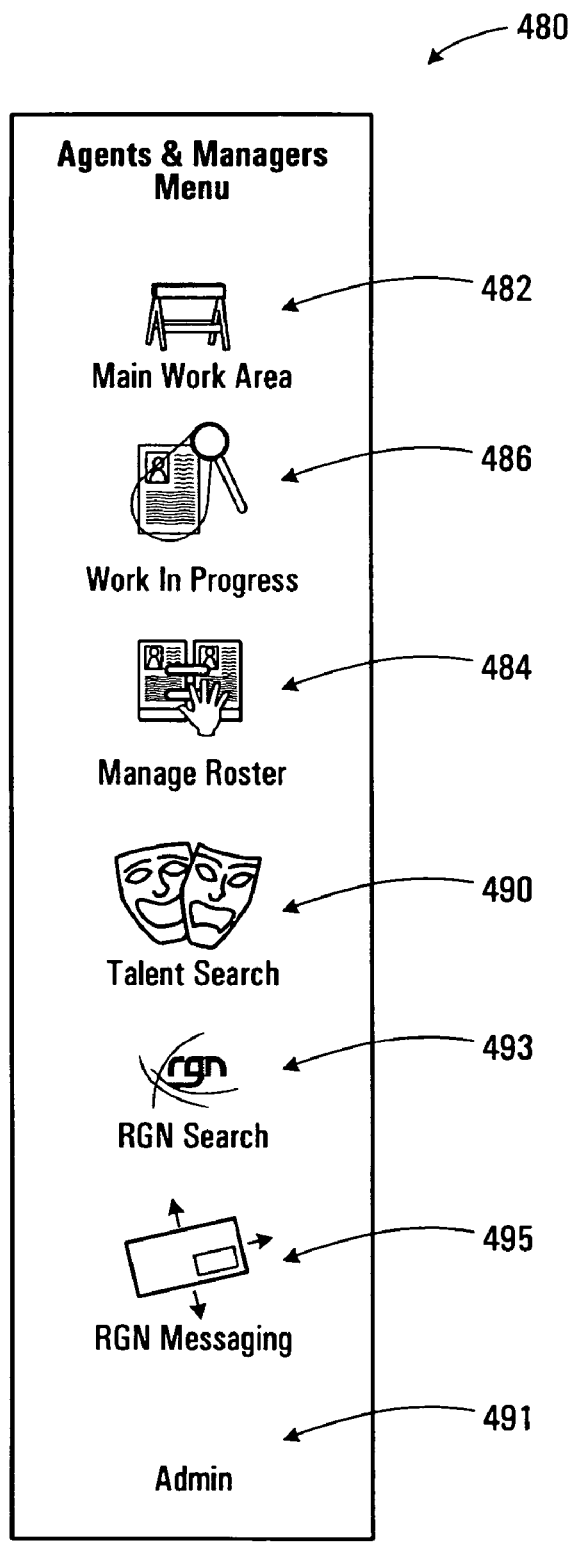
FIG. 25 is a screen shot of a display window seen at a communication appliance operated by a representative of an object.

Referring back to FIG. 6, if the member enters a real ID and password related to an agent or manager, (i.e. related to the second set of access criteria, an S-module for producing a display window as shown at 480 in FIG. 25 is obtained from the agents group 46 of program modules at the management apparatus 12 to facilitate communications between the management apparatus and the second communications appliance to permit structured and unstructured data for at least some of the objects (e.g. performers) to be grouped into a package. Other, non-agent/manager members may also have access to some of the functions in this display window.

FIG. 25

Referring to FIG. 25, the agents and managers display window is similar to the display window shown in FIG. 8 used by performers and includes a main work area icon 482, a manage roster icon 484, a work in progress icon 486, a detailed talent search icon 490 an administration icon 491, an RGN search icon 493 and a messaging icon 495. On selecting the main work area icon 482, an S-module is obtained from the management apparatus 12 to cause the communications appliance to show a display window as seen at 492 in FIG. 26.

FIG. 26

Referring to FIG. 26 this display window includes a logo space 494 for showing a trade-mark or logo of a talent agency, an identification panel 496 for indicating contact information of the agency and agents within the agency, a background panel 498 for indicating various background about the agency such as its date in business and other business information, and a history panel 500 for showing information about the agency history. A representation button 501 is also included, for invoking a representation function. In general, the information in panel 494 is derived from unstructured data such as a JPEG or bit map depicting the agency logo. The remaining panels 496, 498 and 500 are populated with structured data. Edits to the structured data may be effected through the use of an edit function 502 in the information panel 496. Only a member associated with the agency is likely to have access rights to invoke the edit function.

Actuation of the edit function 502 may cause an S-module to be obtained from the agents group 46 at the management apparatus 12, the S-module interacting with the S-module that produces the display shown in FIG. 26, to produce save and cancel buttons 504 and 506 as shown in FIG. 27, on the display 492 originally seen in FIG. 26.

FIG. 27

Referring to FIG. 27, the save and cancel buttons allow the member to save information entered into the various fields shown in the display window 492.

Figure 28:
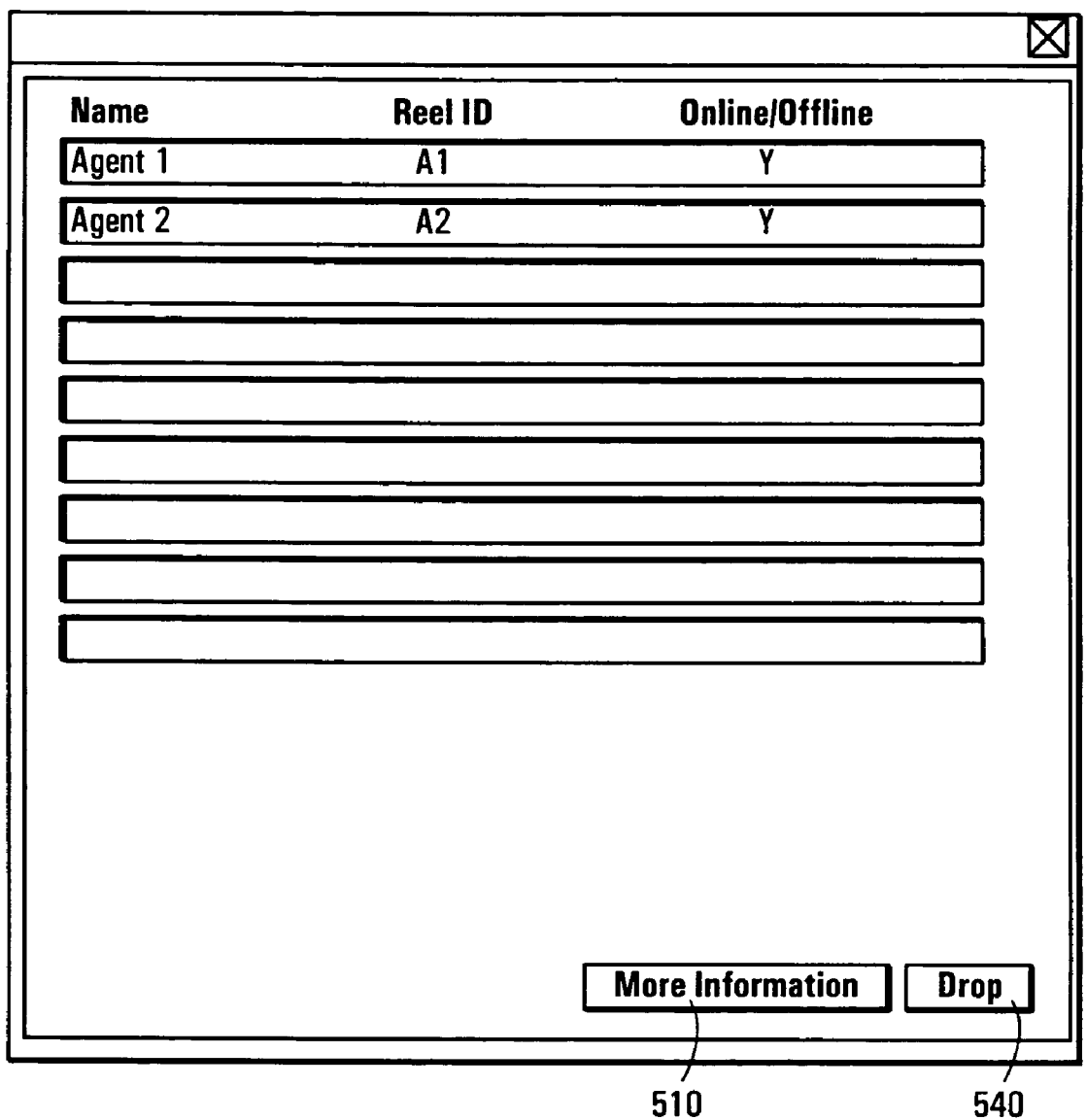
FIG. 28 is a screen shot of a list panel indicating the names of a plurality of representatives, their identification numbers and an indication of whether or not they are on or off line.

Actuation of the representation button 501 shown in FIGS. 26 and 27 causes an S-module to be obtained from the management apparatus to cause a display window as shown as 508 in FIG. 28 to be displayed at the communication appliance.

FIG. 28

Referring to FIG. 28, the S-module that produces the display window shown in FIG. 28 also makes structured data requests to cause the names, identification numbers and an online/offline status indicator for each of a plurality of agents in the agency to appear in the format shown. Selecting any of the indicated agents and selecting the more information button 510 shown in FIG. 28, causes an agent profile summary as shown at 512 in FIG. 29 to be displayed. This allows members to view a list of agents to consider whether or not the member wishes to engage the agent to represent the member.

FIG. 29

Figure 29:
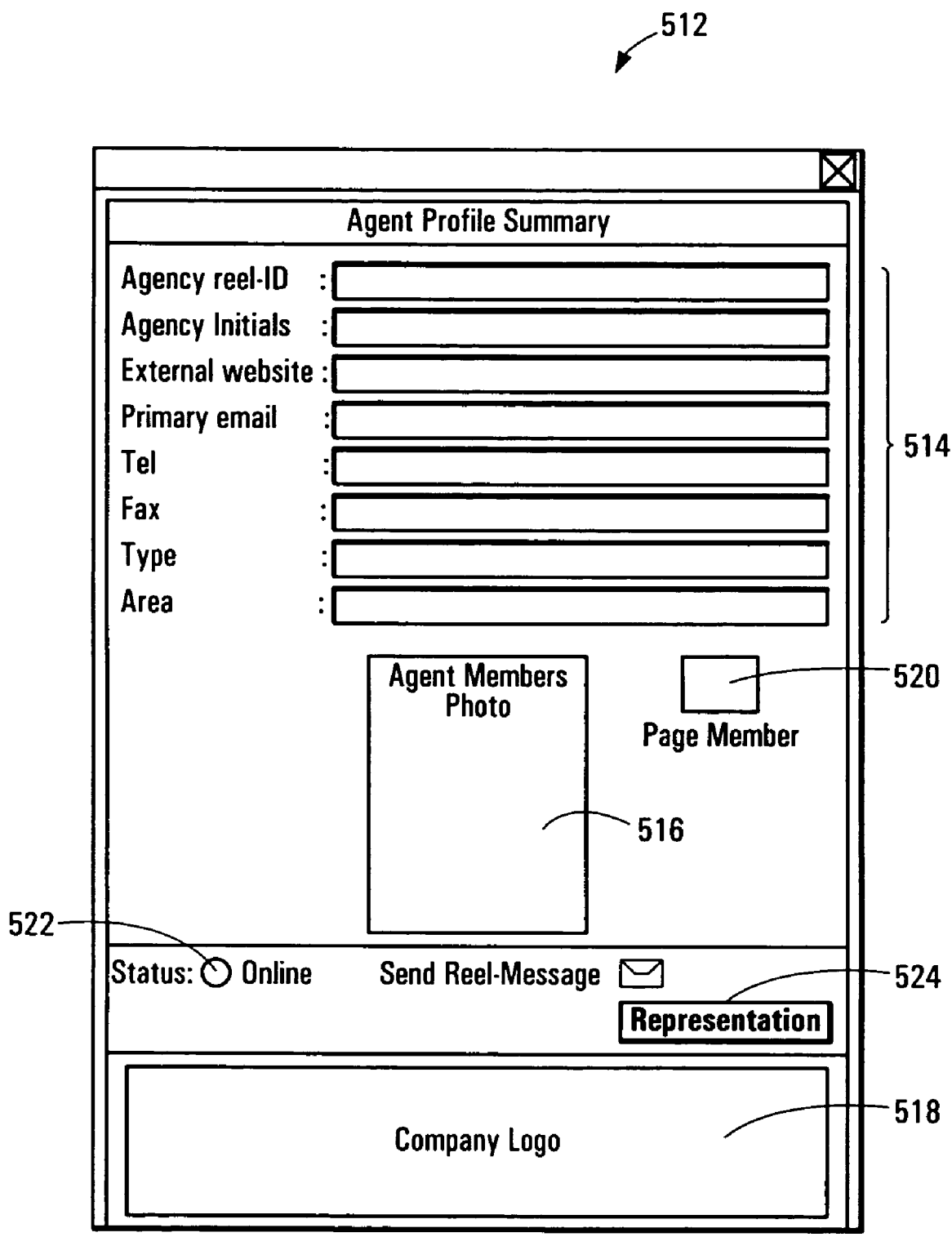
FIG. 29 is a screen shot of an agent profile summary seen at a communication appliance operated by a person representing an object.

Referring to FIG. 29, the agent profile summary includes primary information about the particular agent as shown generally at 514, a photo of the agent as shown at 516, and a company logo area 518 for displaying a logo of the agency. The panel 512 also includes a page member button 520 which allows the viewer to page the agent represented by the agent profile summary and the panel further includes a status indicator 522 for indicating whether or not the agent is currently online or offline, i.e. logged onto the system. The panel 512 also includes a representation button 524 that allows the member to see a list of performers represented by the agent, the list having a format similar to that shown in FIG. 28, only instead of agents' names being shown, performers' names are shown. Clicking on any of the listed performers causes an agency application such as shown at 526 in FIG. 30 to be shown.

FIG. 30

Figure 30:
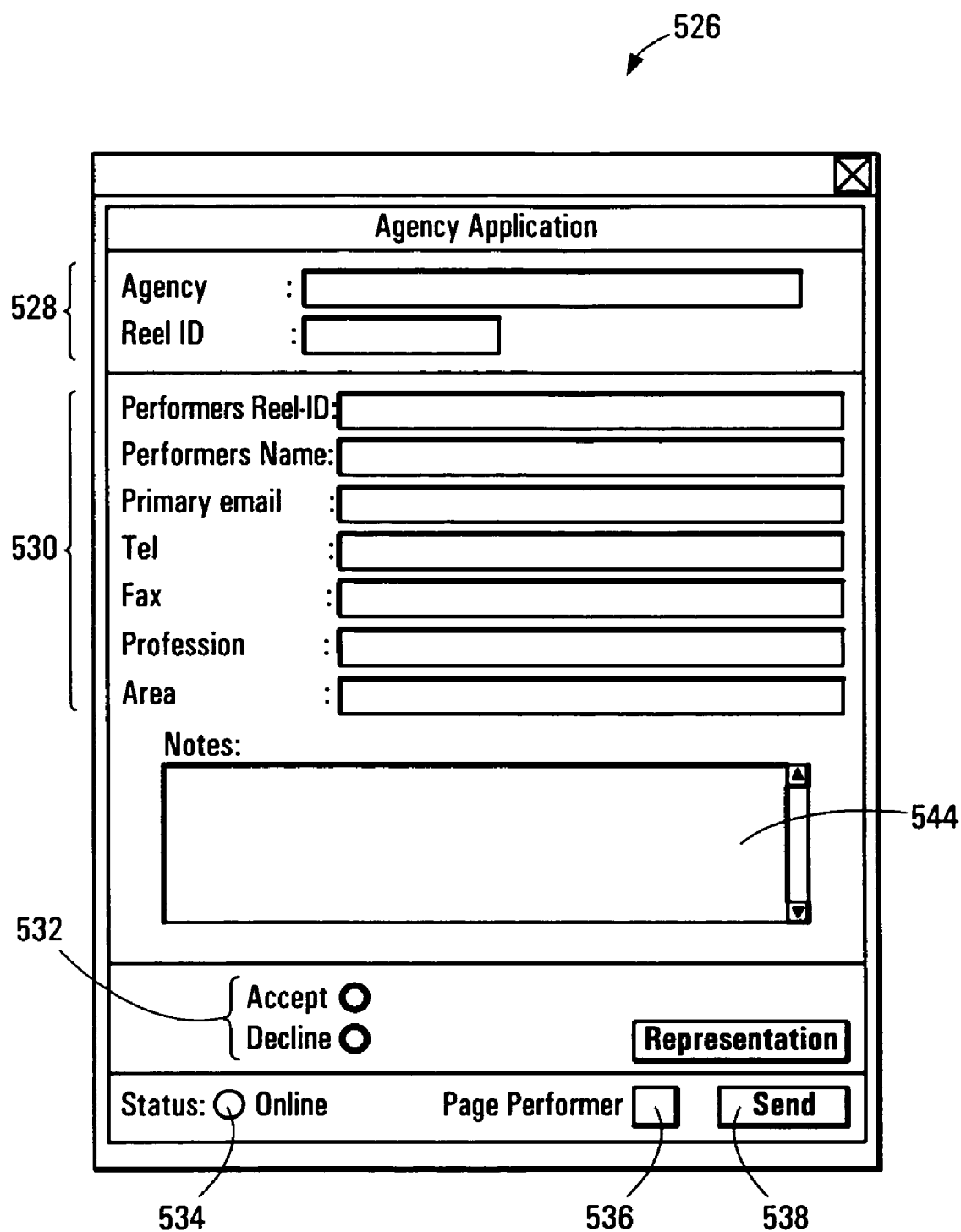
FIG. 30 is a screen shot of an agency application window seen at a communication appliance operated by a person associated with an object to be represented, to permit such person to make application to a potential representative.

Referring to FIG. 30, this panel 526 includes a basic information section shown generally at 528 indicating the agency and its ID number, performer information 530 and includes a notes area 540 for receiving notes from the member. The member then sends the application to the agent by actuating a send function 538. Actuation of this send function results in a structured data write request being made to the business layer in the manner described above effectively updating the database with information indicating that an agency application has been made and providing database links to the data contained in the application. When the agent to whom application for representation is being made views the application, controls shown generally at 532 may be used by the agent to accept or decline the application. The panel further includes a status indicator 534 indicating whether or not the member which is the subject of the application is currently online and further includes a selector 536 for allowing the agent to page the performer by invoking remote paging functions. Alternatively, the send button 538 may be used to send a message to the applicant.

Referring back to FIG. 28, when the display window 508 lists a plurality of performers, a drop button 540 is seen at the lower right-hand corner of the display to allow the agent to drop certain performers. In this regard, when the drop button 540 is actuated, an agency drop panel as shown at 542 in FIG. 31 is produced.

FIG. 31

Figure 31:
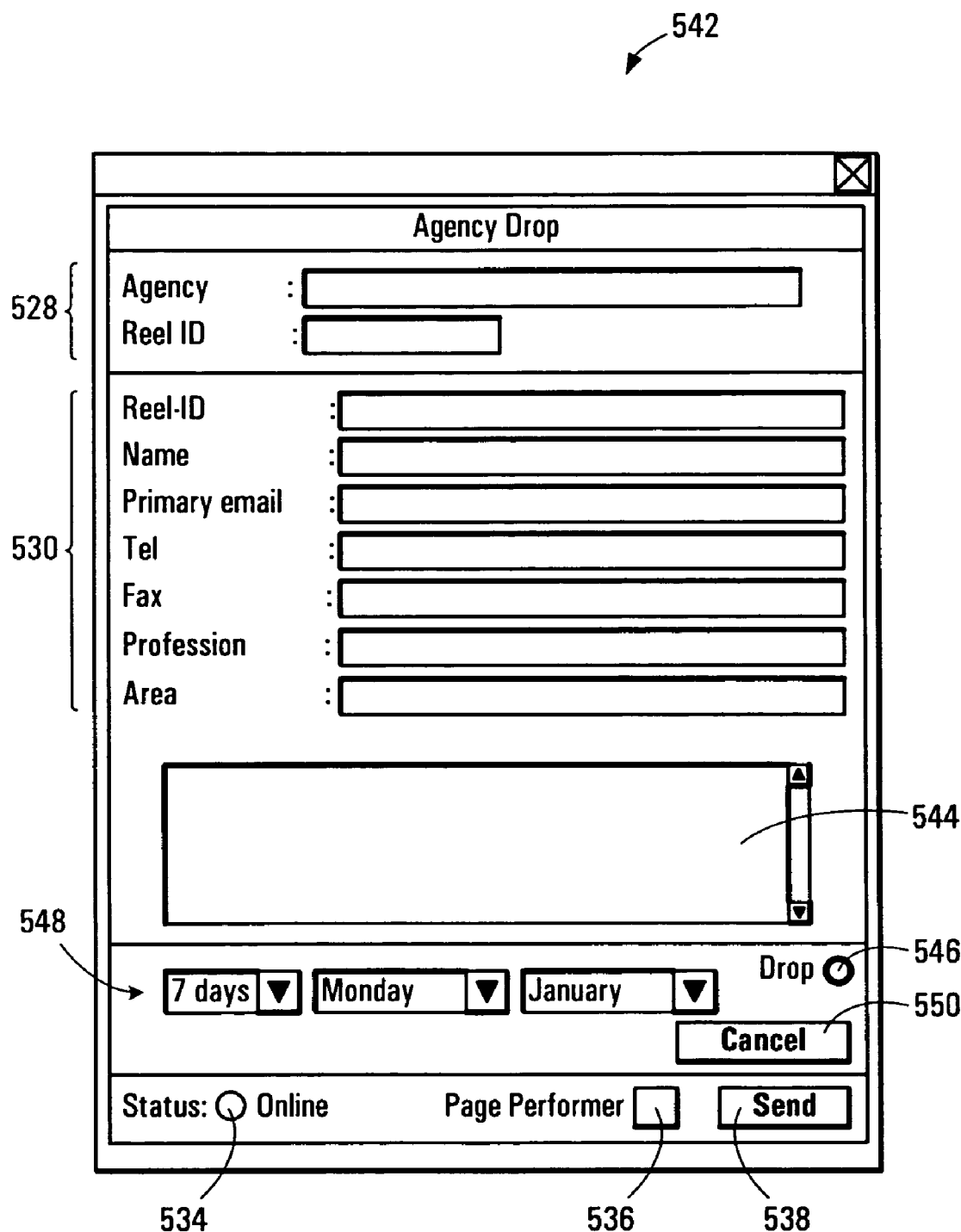
FIG. 31 is a screen shot of an agency drop panel seen at a communication appliance operated by a person representing an object to permit such person to cancel his or her representation.

Referring to FIG. 31, the agency drop panel includes the same basic header information 528 and the performer information 530 as seen in FIG. 30 and includes an area 544 for agent's notes allowing the agent to indicate to the performer reasons for dropping the performer, for example. The panel 542 further includes a drop indicator 546 for indicating that the performer is to be dropped and indicates a contractual time for the drop to occur as shown at 548. A cancel drop actuator is also shown at 550 to allow the drop status indicated on the drop indicator 546 to be cancelled in case the agent changes his/her mind. Finally, the panel 542 includes the online indicator, page performer and send options 534, 536 and 538 described in connection with FIG. 30.

Figure 32:
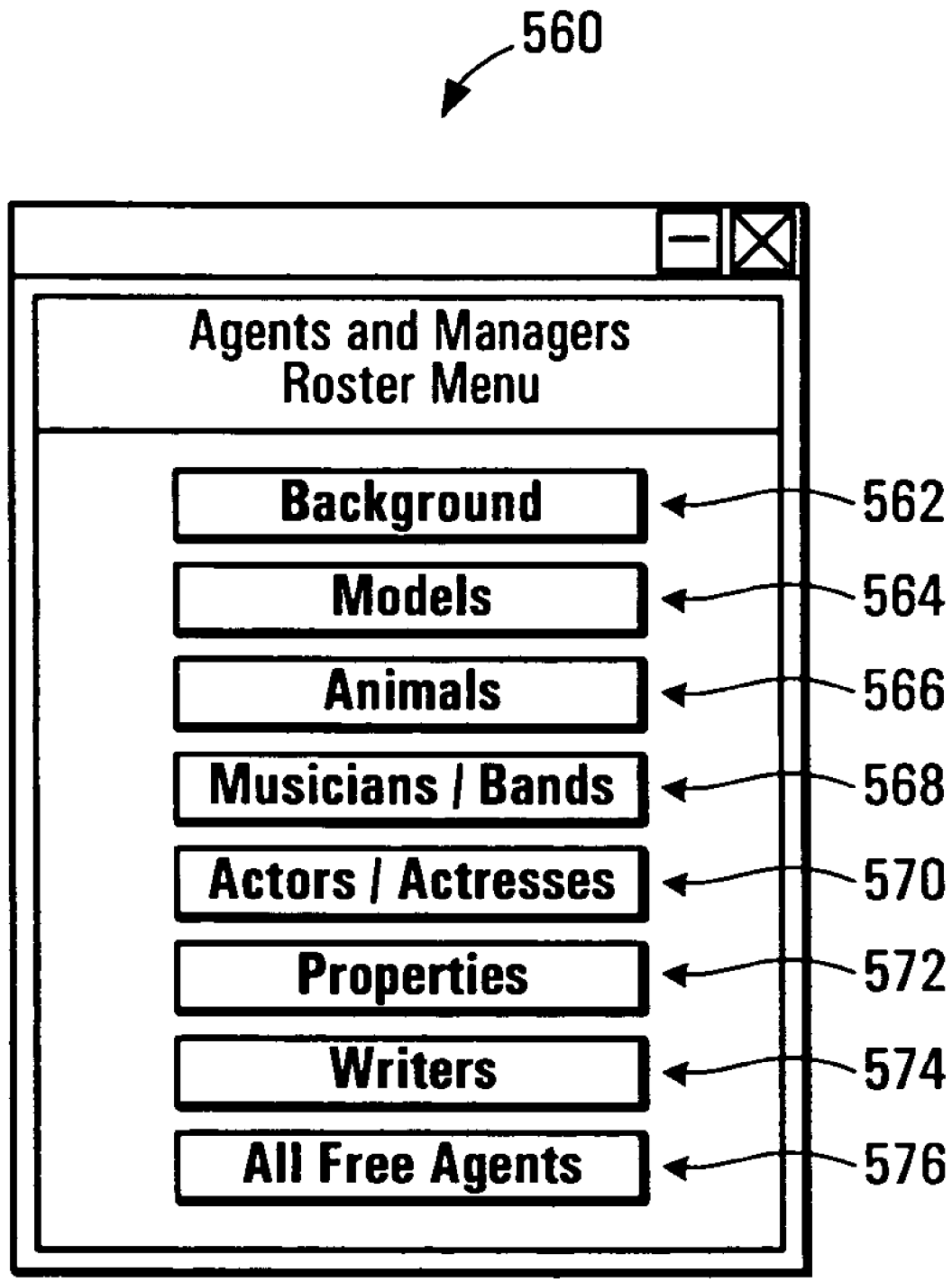
FIG. 32 is a screen shot of a management display window seen at a communication appliance operated by a person representing an object to permit such person to access categories of objects.

Referring back to FIG. 25, if an agent selects the talent management option 484, a small talent management overlay panel as shown at 560 in FIG. 32 is shown.

FIG. 32

Referring to FIG. 32, the talent management display window provides an agents and managers roster menu and includes option selections for a background extras roster as shown at 562, a models roster as shown at 564, an animal roster as shown at 566, a musician/band roster shown at 568, an actor/actress roster as shown at 570, a properties roster as shown at 572, a writers roster as shown at 574 and a free agents roster as shown at 576. These are the rosters of performers the agent acts for. Each of these is similar and therefore only one will be described. In this regard, when a selection is made on the models roster 564, a display window as shown at 580 in FIG. 33 is shown.

FIG. 33

Figure 33:
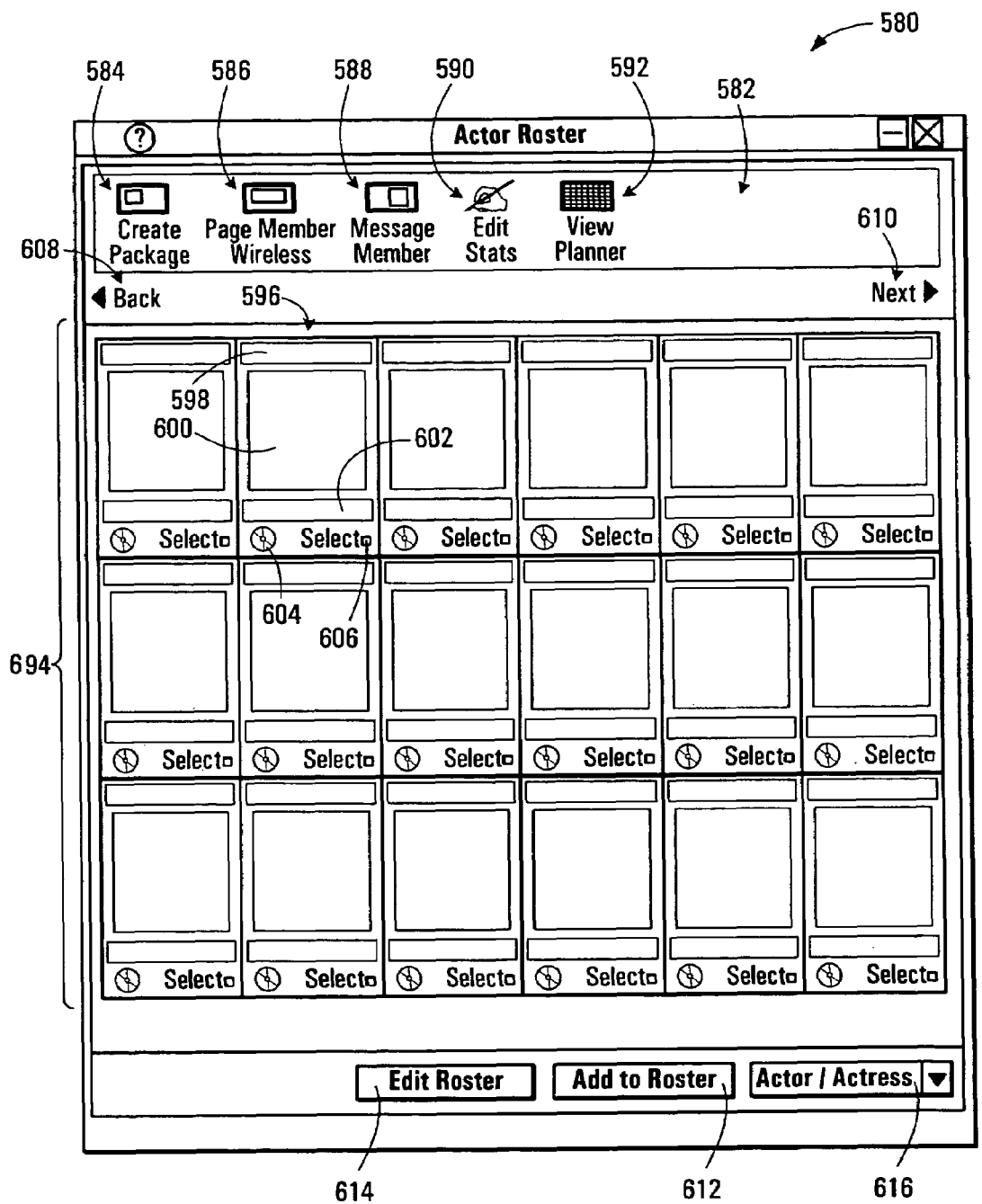
FIG. 33 is a screen shot of a main selection panel seen at a communication appliance operated by a representative of a plurality of objects to permit the representative to select data associated with at least some of the objects for inclusion in a package.

Referring to FIG. 33, this panel includes a main selection panel 582 including a create package icon 584, a page member wireless icon 586, a message member icon 588, an edit stats icon 590, and a view planner icon 592, each with related functionality.

The panel 580 further includes a photo display area shown generally at 594 for showing performers included in the roster selected through the panel shown in FIG. 32. The photo display area 594 includes a plurality of areas such as shown generally at 596 each including an area for a performer name 598, an area for a photograph 600, an area for an identification number 602, an icon for selecting an extended portfolio function 604 and an icon for selecting the particular performer 606. Back 608 and next 610 page functions may be used to scroll back and forth throughout the pages. The agent may actuate any of the select icons 606 to select particular performers for possible inclusion in a "package" the agent may prepare in response to a "breakdown" provided to him/her by a casting director, for example. A breakdown specifies the requirements of particular roles the casting director is seeking to fill. It may describe a character, for example, indicating that the character has blonde hair and blue eyes. The agent can thus review his/her roster to determine whether any of his/her clients is suitable for the role. If the agent wishes to obtain further information about a performer before making a selection, the agent may select on the ID area 602 to retrieve a profile as seen in FIG. 12, associated with the performer. More generally, the S-modules effecting the above functionality cause the second communications appliance to receive operator input to cause the second communications appliance to communicate with the management apparatus to receive operator input to cause at least some of the structured and unstructured data associated with at least one object (performer) to be presented at the second communications appliance and selected for grouping in a package.

Referring back to FIG. 33, different rosters may be accessed from the panel 580 by using a pulldown menu 616.

After making desired selections of performers to be included in a package, the create package icon 584 is actuated by the agent. Actuating the create package icon 584 causes a package display window as shown at 630 in FIG. 34 to be displayed.

FIG. 34

Figure 34:
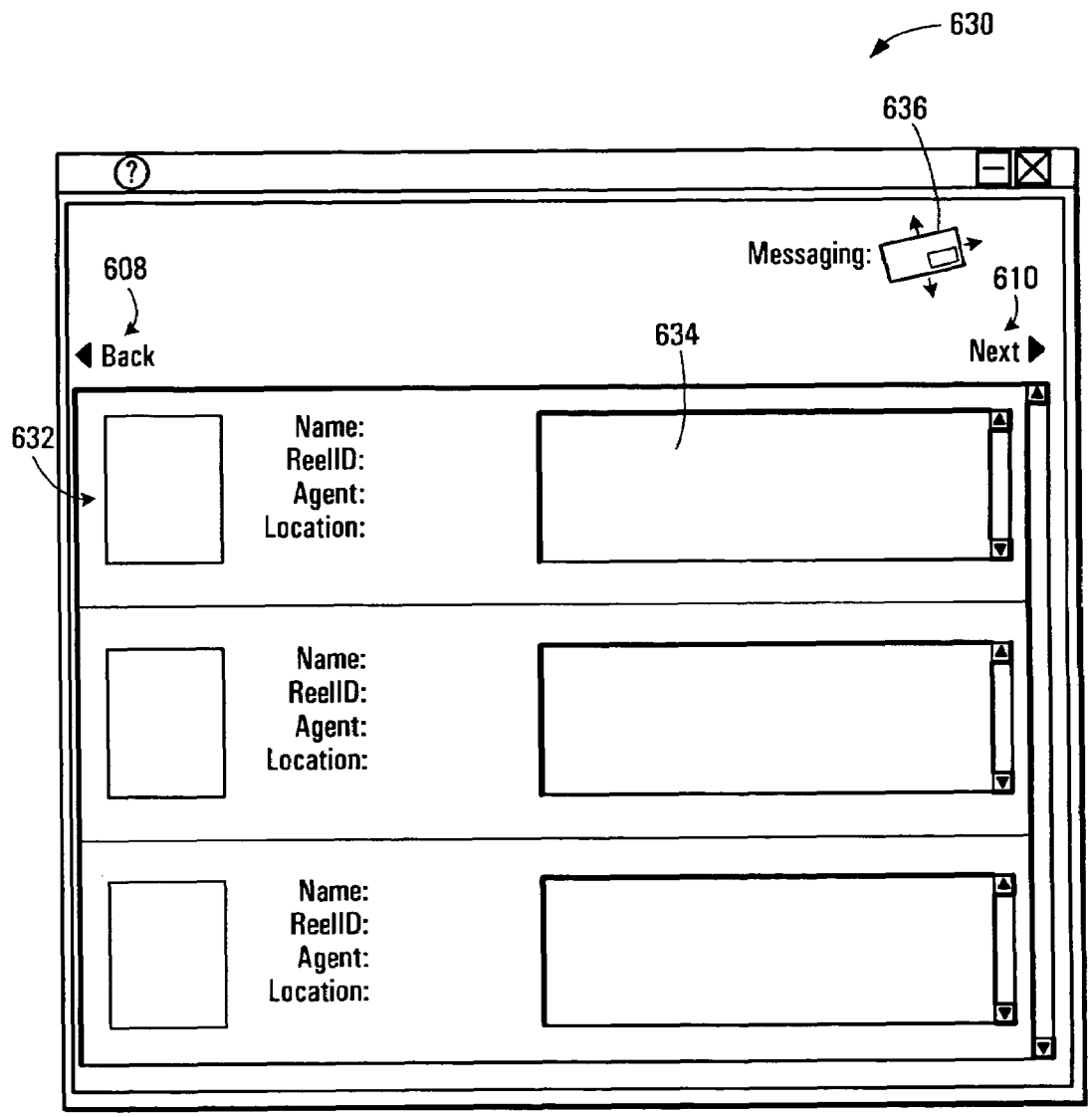
FIG. 34 is a screen shot of a package display window panel seen at a communication appliance operated by a representative of a plurality of objects showing basic photo and identification information of selected objects included in a package.

Referring to FIG. 34, this package display window 630 includes basic photo and identification information of the selected performer, as shown generally at 632, the photo being the same as the one seen in FIG. 33 and includes a notes area 634 enabling the agent to add notes to an intended recipient of the package. A plurality of these performer summaries, or at least one of them may be considered to make up a package. The package may include a large number of performers in which case the back and next buttons 608 and 610 are used to go forward and back among pages of performer summaries. The panel 630 further includes a messaging icon 636 which, when activated, causes a package dispatch display window as shown at 638 in FIG. 35 to be displayed at the agent's communication appliance.

FIG. 35

Figure 35:
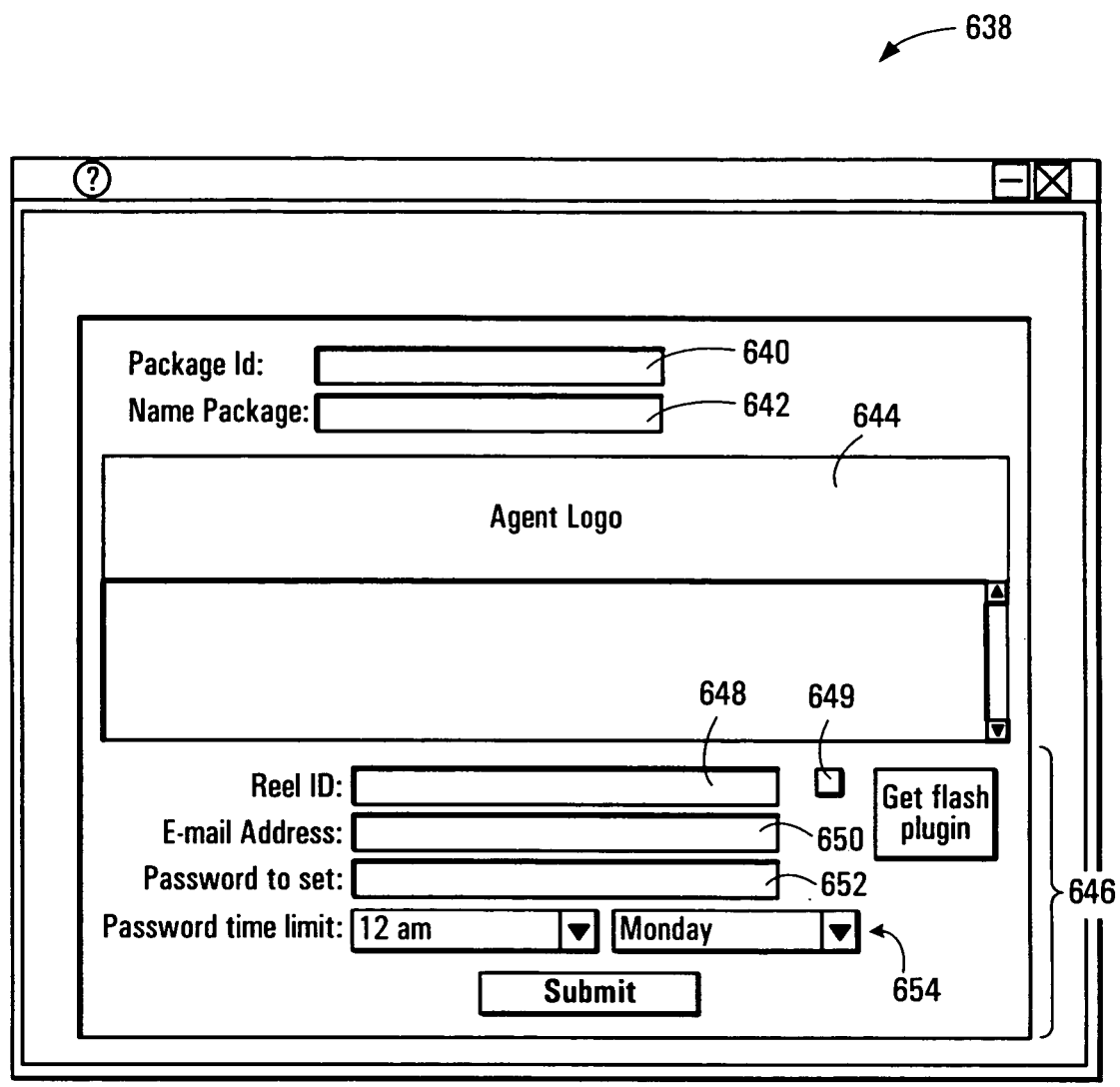
FIG. 35 is a screen shot of a package dispatch display window panel seen at a communication appliance operated by a representative of a plurality of objects to permit the package to be directed to an intended recipient.

Referring to FIG. 35, the package dispatch display window 638 includes a package ID field 640 enabling the agent to enter a package identification number such as a number provided by the casting director identifying the job, and includes a name field 642 for allowing the agent to enter a name of the package. An agent logo field 644 is also provided for a logo of the agent and/or his agency and an addressee area is provided at 646 for receiving information relating to the sending of the package to the casting director and access by the casting director. This area includes a real ID field 648 for receiving an identification of the casting director if he has one in the system, an email address field 650 for receiving an email address of the casting director, a password field 652 for receiving a password to be given to the casting director to allow only him or her to open the package and a password limit field 654 for placing an expiry time and date on the password so that after such time and date the package can no longer be viewed by the casting director. Actuation of a submit button on the display shown in FIG. 35 causes the second communications appliance to transmit an identification of structured and unstructured data in support of the package to the computer.

FIG. 36

Figure 36:
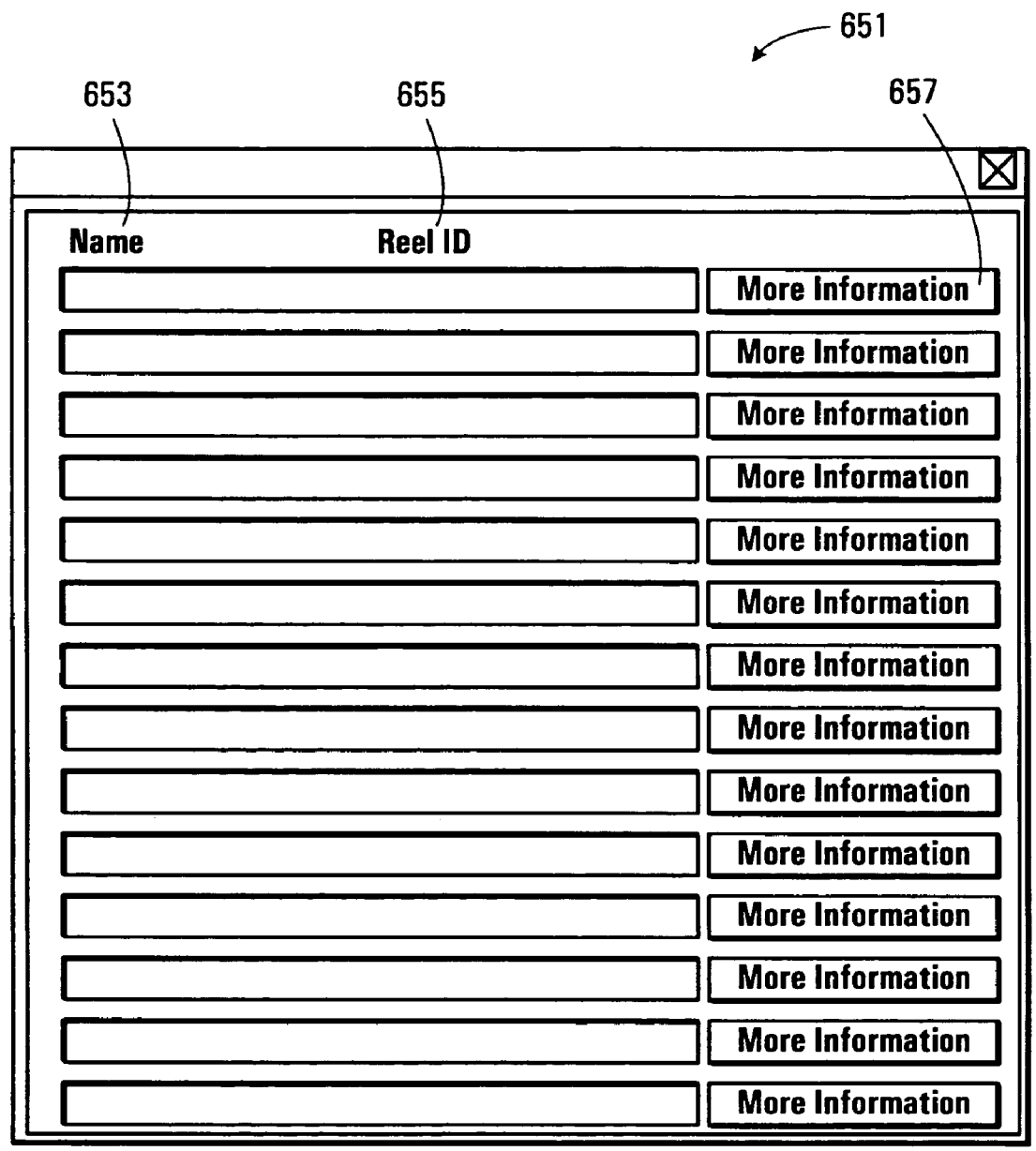
FIG. 36 is a screen shot of a directory display panel seen at a communication appliance operated by a representative of a plurality of objects showing possible recipients of a package.

A call directory button 649 is also provided on the display window shown in FIG. 35 and actuation of this call directory button causes an S-module to be obtained from the management apparatus to cause a directory display as shown at 651 in FIG. 36 to be produced at the communication appliance. The call directory display 651 includes names 653, and identification numbers 655 of possible contacts to whom the package may be sent. Each of the contacts listed is associated with a more information function 657 which links to a profile as shown in FIG. 29, enabling the agent to view a picture and other information, for example, of the person to whom the package may be sent if such person is a member of the system. This may be helpful if the agent forgets the name of the person he/she wishes to send the package to, but does remember the face. It also provides a security check.

Figure 37:
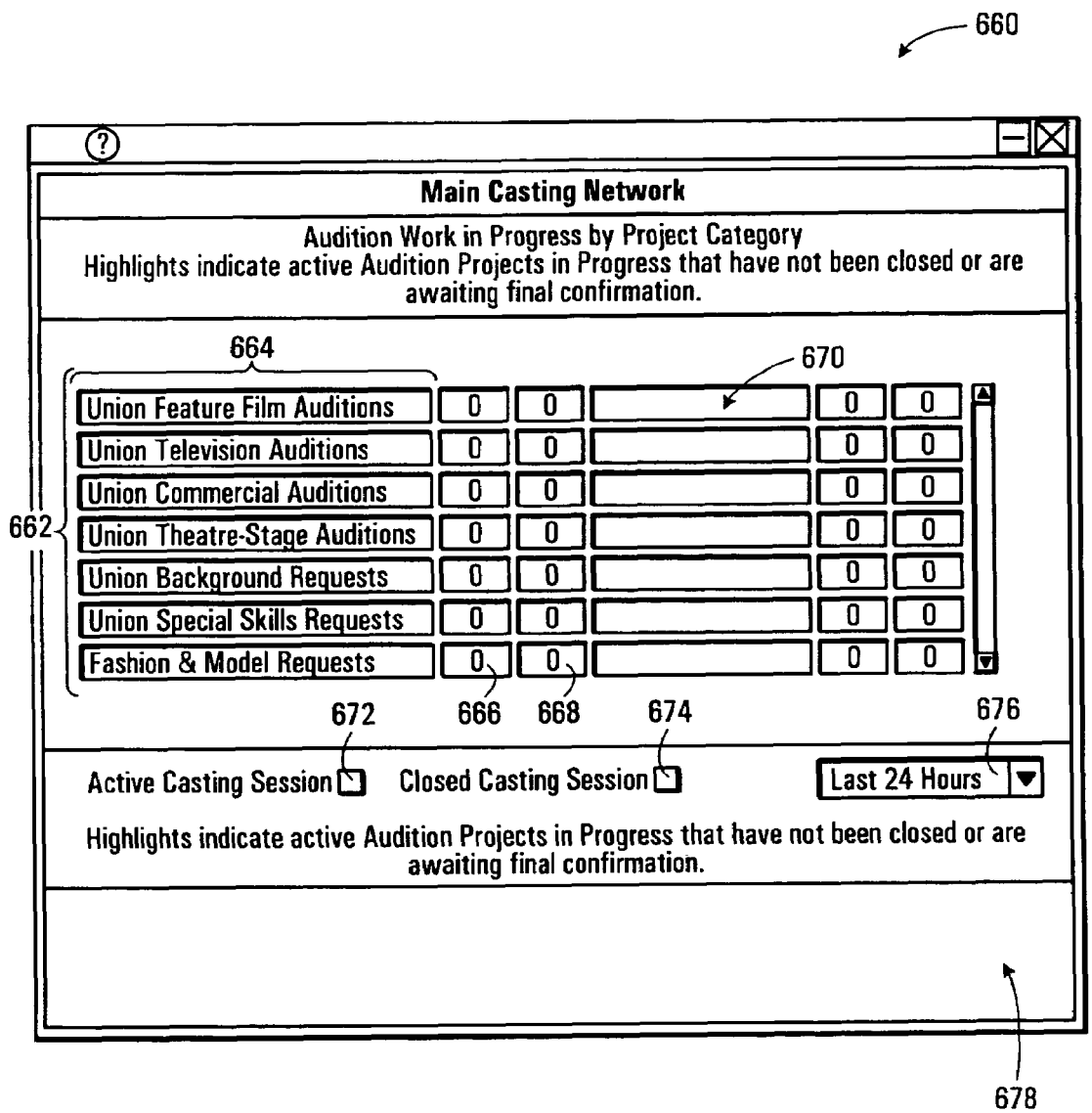
FIG. 37 is a screen shot of a main casting network display seen at a communication appliance operated by a representation of an object for determining audition work in progress.

Referring back to FIG. 25, should the agent select the work in progress icon 486, a display as shown at 660 in FIG. 37 is shown at the communication appliance.

FIG. 37

Referring to FIG. 37, this display shows the current work in progress of the agent. It includes a summary as shown generally at 662, the summary listing various types of submissions made to casting directors, for example, in response to performer work opportunities such as union feature film auditions, union television auditions, union commercial auditions, union theatre stage auditions, union background requests, union special skills requests, fashion and model requests, for example. The names of general categories of submissions are shown generally at 664 and the number of submissions of each is shown adjacent the corresponding name, as shown generally at 666. In addition, the number of replies to those submissions is shown at 668, adjacent the number of submissions. Further entries on the list are provided in the area shown at 670. An area 678 is provided for displaying a list of the individual submissions under a selected one of the categories identified in the name category 664. These represent each individual audition or request available to be serviced by the agent.

Status indicators as shown as 672 and 674 may be used to indicate the status of the casting session as being either active or closed, respectively. A cut off period may be specified by the dropdown menu shown generally at 676 to specify work in progress within the last twenty-four hours, the last week or last month, for example.

Selecting any of the submissions appearing in the area 678 returns the agent to the display shown in FIG. 34 which is populated with information from the corresponding submission or package.

FIG. 38

Figure 38:
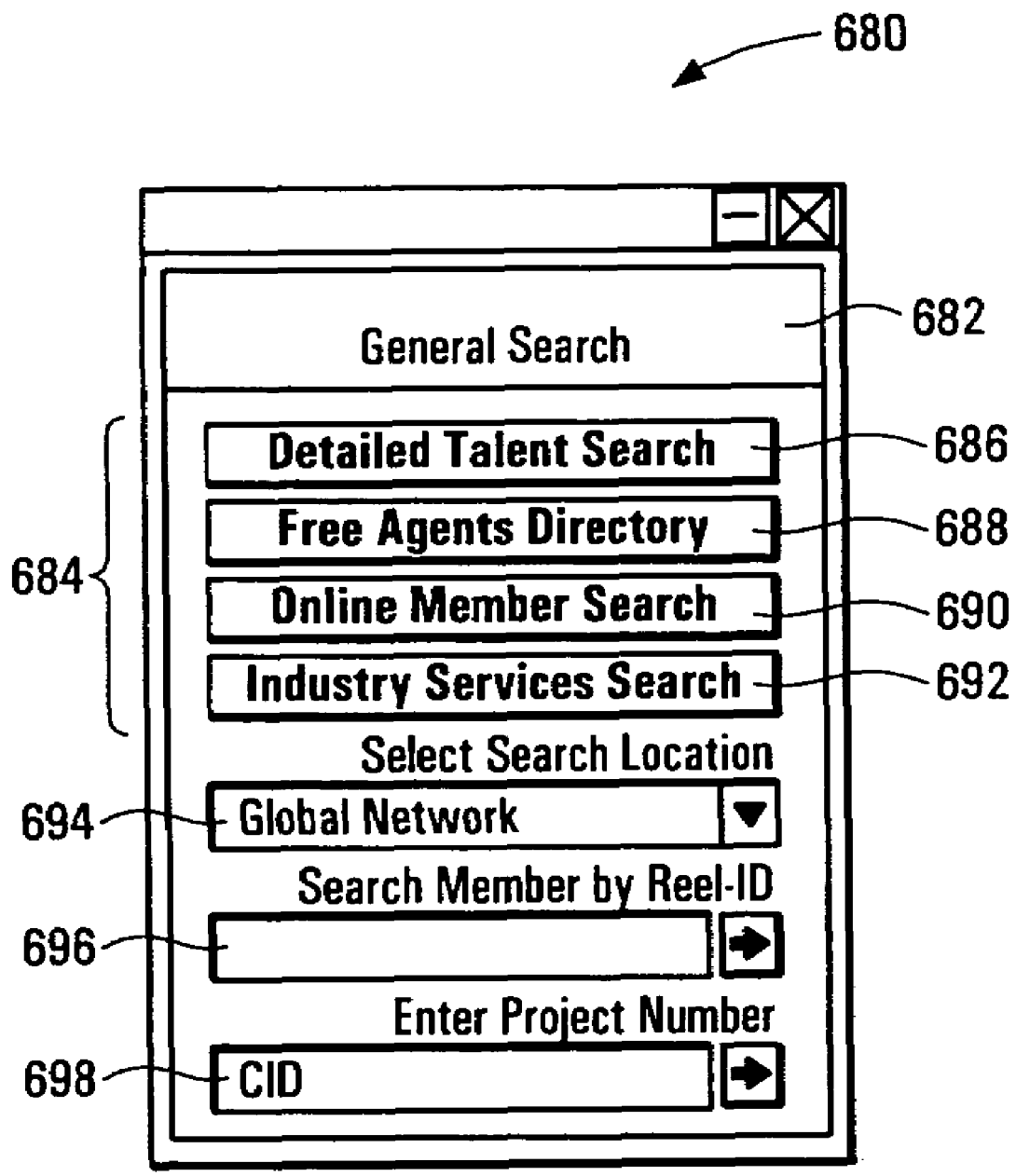
FIG. 38 is a screen shot of a search window seen at a communication appliance operated by a representative of an object in response to actuation of a detailed talent search icon shown in FIG. 25.

Referring back to FIG. 25, if the agent selects the detailed talent search icon 490, a small display window as shown at 680 in FIG. 38 is displayed. This panel 680 includes a title area 682 and links shown generally at 684 to various search options. One search option includes a detailed talent search link 686 for performing a talent search through all performers records associated with the agent. In addition, it includes a free agents directory link 688 for enabling a search through all free agents, i.e., performers that are not assigned to an agent and further includes a link 690 for searching through all performers who have profiles on the database. There is also an industry services search link 692 for searching for industry services information not directly related to performers. The panel further includes a search location dropdown menu 694 for permitting searches through one or more databases and includes a search member function 696 for enabling searching by identification number to go directly to a particular profile. Finally, the panel includes a project number search 698 that allows the agent to search for a project having a particular Casting ID (CID) number.

FIG. 39

On selecting any of the search features for performers, i.e., search features 686, 688 or 690 of FIG. 38, a display window as shown at 700 in FIG. 39 is displayed at the communication appliance (18). This panel includes a plurality of fields, one of which is shown at 702, for entering search parameters for searching through the database. Thus, the panel 700 acts as a search query template, for example. The panel 700 includes a start search button 704 that causes a display window as shown at 706 in FIG. 40 to be displayed at the communications appliance (18).

FIG. 40

Figure 40:
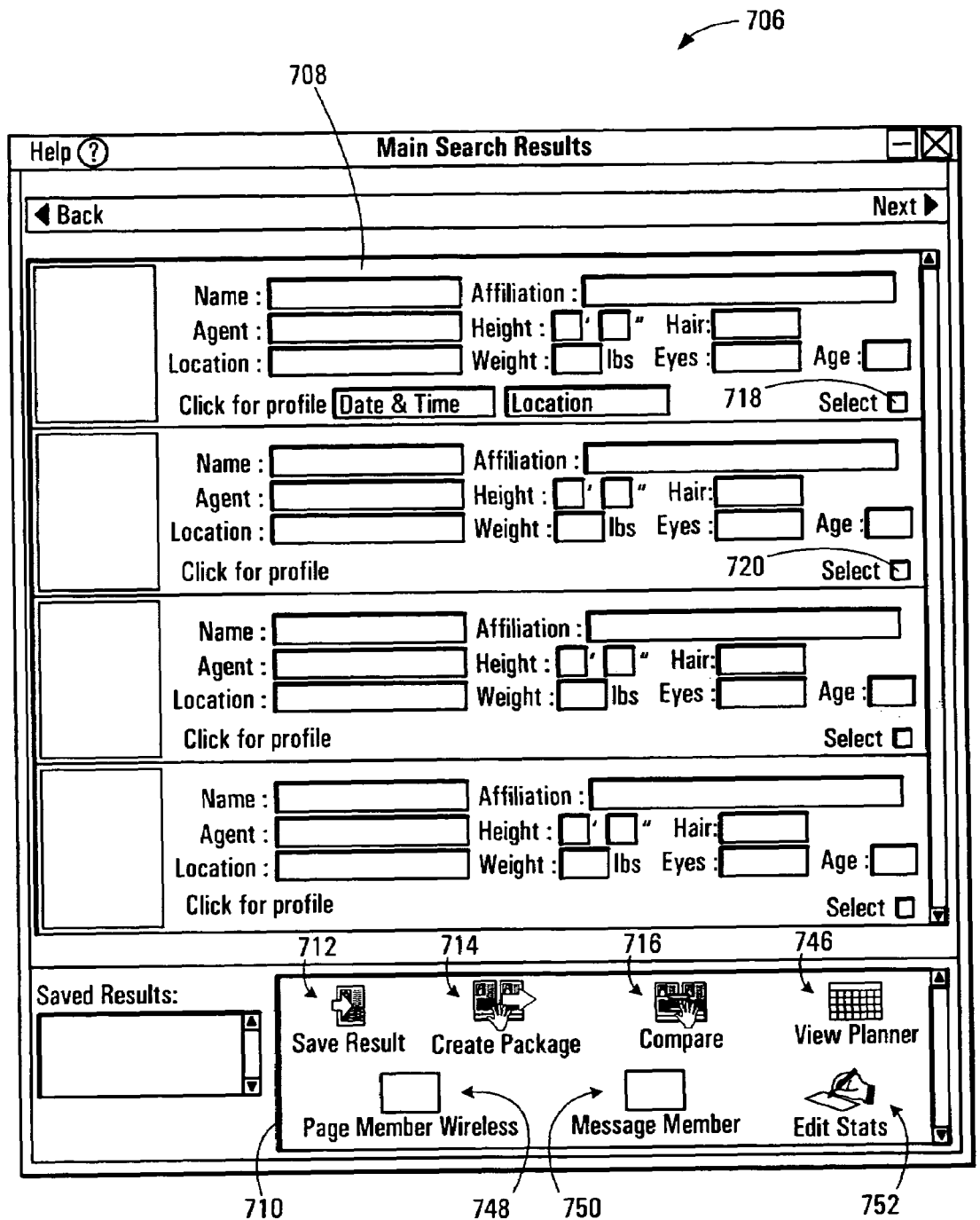
FIG. 40 is a screen shot of a main search results display seen at a communication appliance operated by a representative of an object produced in response to starting a selected search identified by the display in FIG. 39.

Referring to FIG. 40, this display 706 includes member panels 708 that depict a brief summary and provide a photograph of the member meeting the criteria set in the panel shown in FIG. 39 for conducting the search.

The search feature may be used to search for members meeting particular criteria to satisfy requirements as specified by a casting director and, in this regard, a panel 710 is provided with icons for permitting the search results to be used in various ways, or for accessing other functions. For example, an icon 712 is provided for saving the search result, an icon 714 is provided for creating a package as described above in connection with FIG. 33, and a compare icon 716 is provided for actuating a comparison function for comparing members. The comparison function is effected by actuating select buttons such as shown at 718 and 720 on respective member profiles returned from the search and then actuating the compare icon 716 which causes a display window as shown at 722 in FIG. 41 to be displayed at the communication appliance (18) (FIG. 41).

FIG. 41

Figure 41:
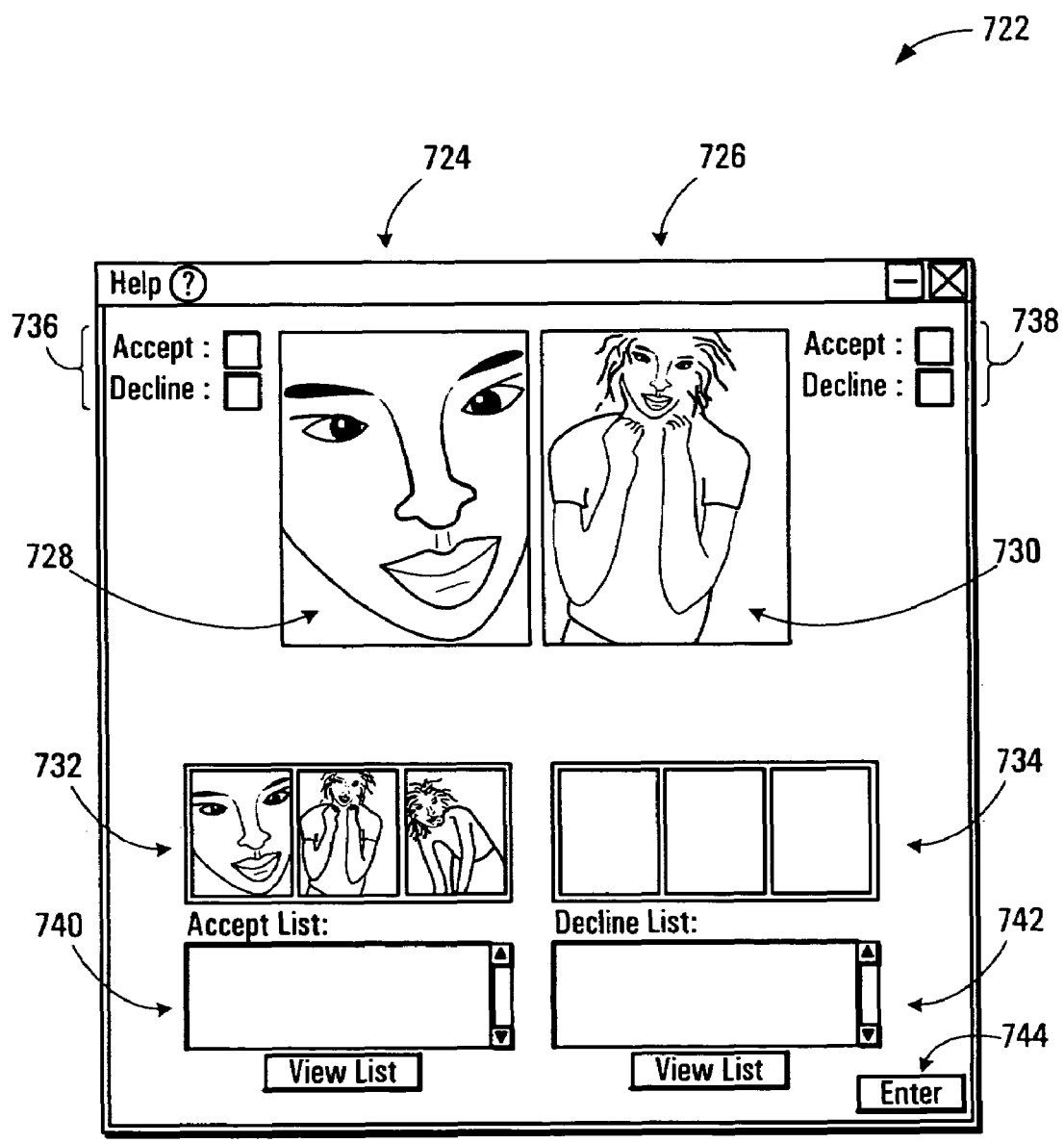
FIG. 41 is a screen shot showing a display window seen at a communication appliance operated by a representative of an object for use in comparing data associated with two objects.

Referring to FIG. 41, the panel 722 includes first and second halves shown generally at 724 and 726, respectively, the first half 724 including space 728 for a photo of the member associated with the first profile associated with select button 718 (FIG. 40) and the second half 726 includes a second space 730 for displaying a photo of a person associated with the profile associated with select button 720 (FIG. 40). In addition, each area 724 and 726 includes further thumbnail photo areas 732 and 734 for displaying other photos of the selected members and each section 724 and 726 further includes accept or decline options 736, 738 for accepting or declining the corresponding member depicted in the photographs, for inclusion in a package, for example. In general, at least one remoting environment communications module from the agents group is operable to cause the second communications appliance to simultaneously display at least some unstructured data associated with at least two objects to permit operator comparison of said unstructured data. The panel 722 further includes an accept list area 740 for displaying the names of members who have been accepted for the package and includes a decline list 742 for listing the names of members who have been declined. The panel further includes an enter button 744 which causes the display shown at 706 in FIG. 40 to be redisplayed at the communications appliance (18) without the summaries of declined members. In this way, the agent can further reduce his or her search results to a more manageable level.

Still referring to FIG. 40, the icons in area 710 further include a view planner icon 746 for enabling a day planner display (not shown) to be made available to the agent. The panel 710 further includes a page member wireless icon 748 for enabling a paging function through a wireless network to be used to page a member. The panel also includes a message member icon 750 that allows the agent to send a message to selected members and the panel includes an edit status icon 752 to allow the information shown in FIG. 12 relating to a particular member, to be edited by the agent to suit a particular opportunity. Thus, the S-module associated with the display 706 is operable to cause the second communications appliance to communicate with the computer to receive and display at the second communications appliance an object profile populated with structured and unstructured data from the database and to receive operator input and communicate the operator input to the computer to cause the computer to cause the structured and unstructured data at the database to be created, modified or deleted.

FIG. 42

Figure 42:
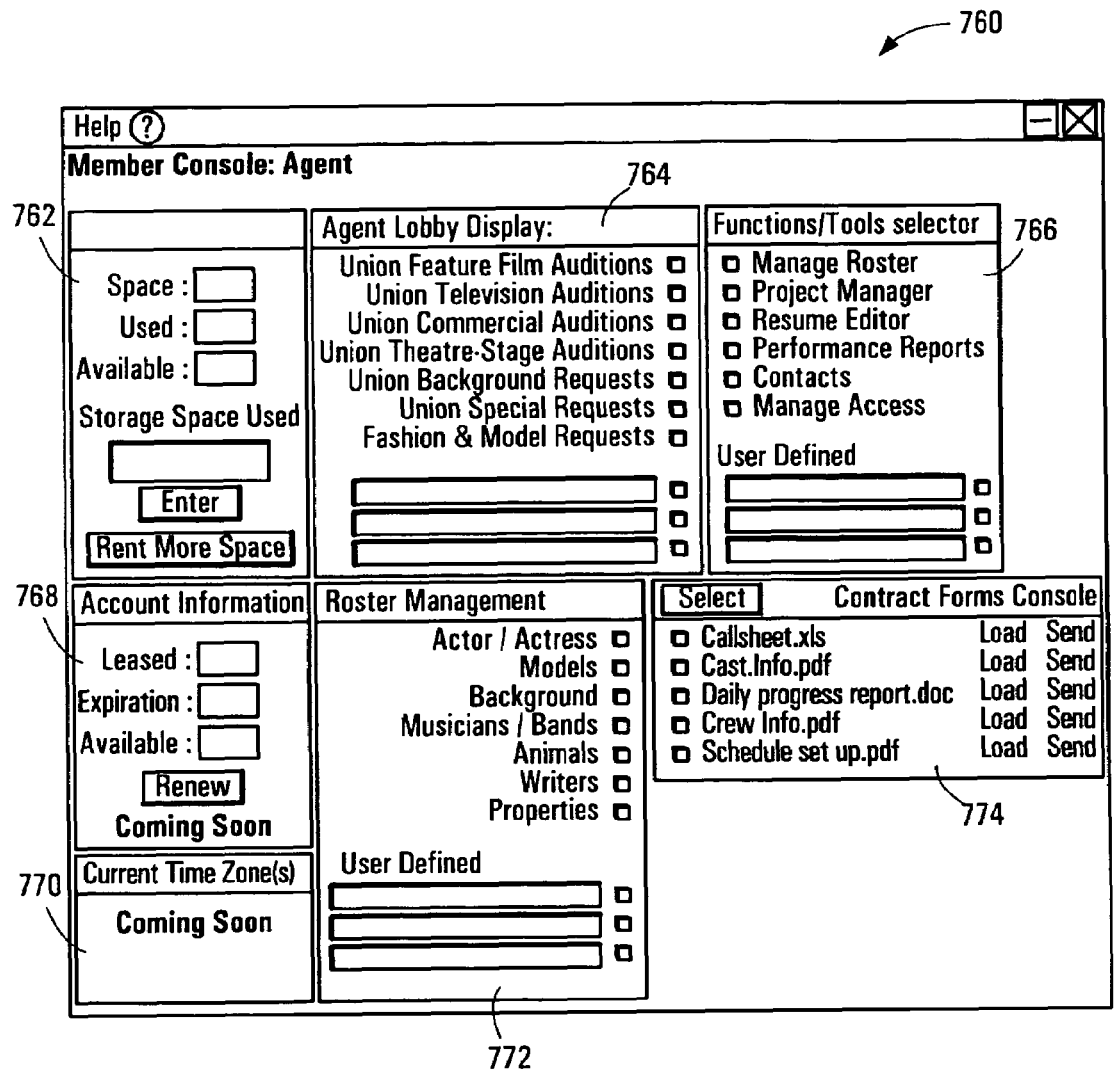
FIG. 42 is a screen shot of a display seen at a communication appliance operated by a representative of an object in response to actuation of an administration option shown in FIG. 25.

Referring back to FIG. 25, the administration option 491 causes a display window as shown at 760 in FIG. 42 to be displayed at the communications appliance. This display 760 includes a plurality of information panels or control panels for allowing the agent to monitor and control resources. For example, a panel 762 shows server storage space rented, used and available, and allows the agent to rent more space. A further panel 764 allows the agent to cause only certain types of packages to be seen in the display shown in FIG. 37. A further panel 766 allows the agent to select certain functions or tools to be made available to the agent and panel 768 shows current account information. A further panel 770 shows current time in particular areas of the world and a further panel 772 provides for roster management, allowing the agent to select particular categories of talent or members to be made available or included in the agents roster. Finally, the panel 760 may include a further panel 774 that provides access to particular contract forms that may have been provided by the agency or provided by other parties and made available to the agency.

Casting

FIG. 43

Figure 43:
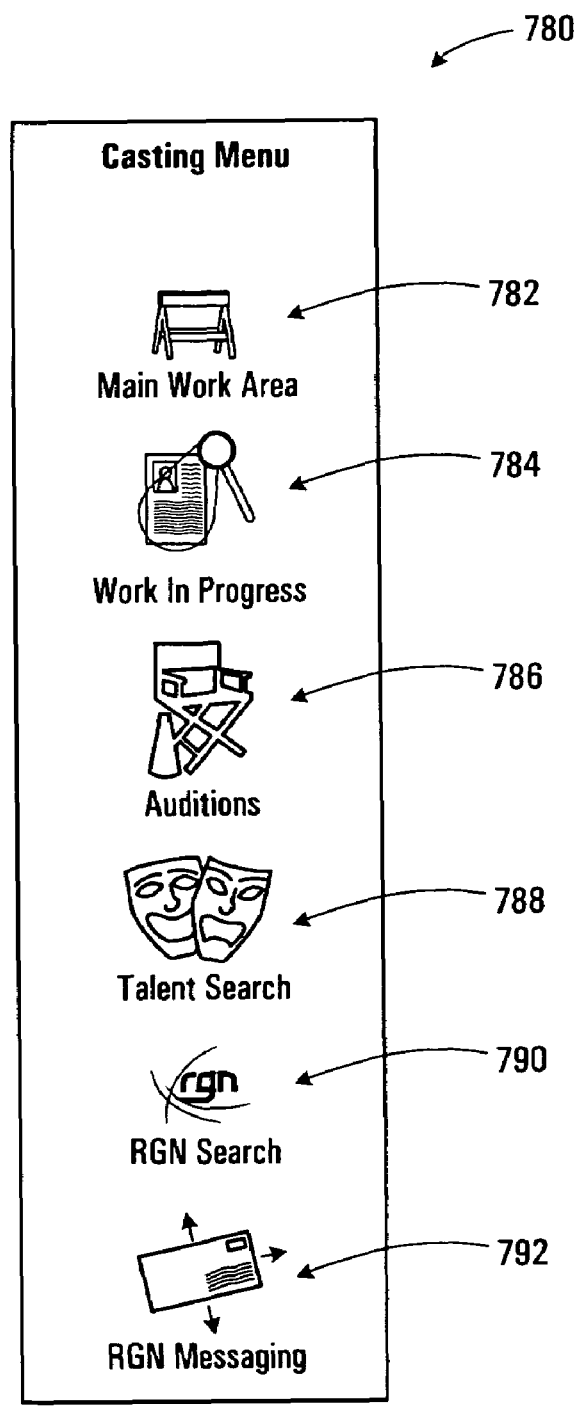
FIG. 43 is a screen shot a display seen at a communication appliance operated by a requirements specifier seeking to satisfy certain requirements by one or more objects represented by one or more representatives.

Referring back to FIG. 6, if the member enters a real ID and password related to a casting director, i.e. a third set of access criteria an S-module for producing a display window as shown at 780 in FIG. 43 is obtained from the management apparatus 12 to facilitate communications between the third communications appliance and the management apparatus 12 to permit structured and unstructured data for at least some objects in a package produced by an agent to be presented to an operator (e.g. casting director) at the third communications appliance. This display window includes a main work area icon 782, a work in progress icon 784, an auditions icon 786, a talent search icon 788, a system search icon 790 and a messaging icon 792. Generally, the display window shown at 780 in FIG. 43 is permanently displayed on the requirement specifier communication appliance 20 on a right-hand side thereof, for example.

Figure 44:
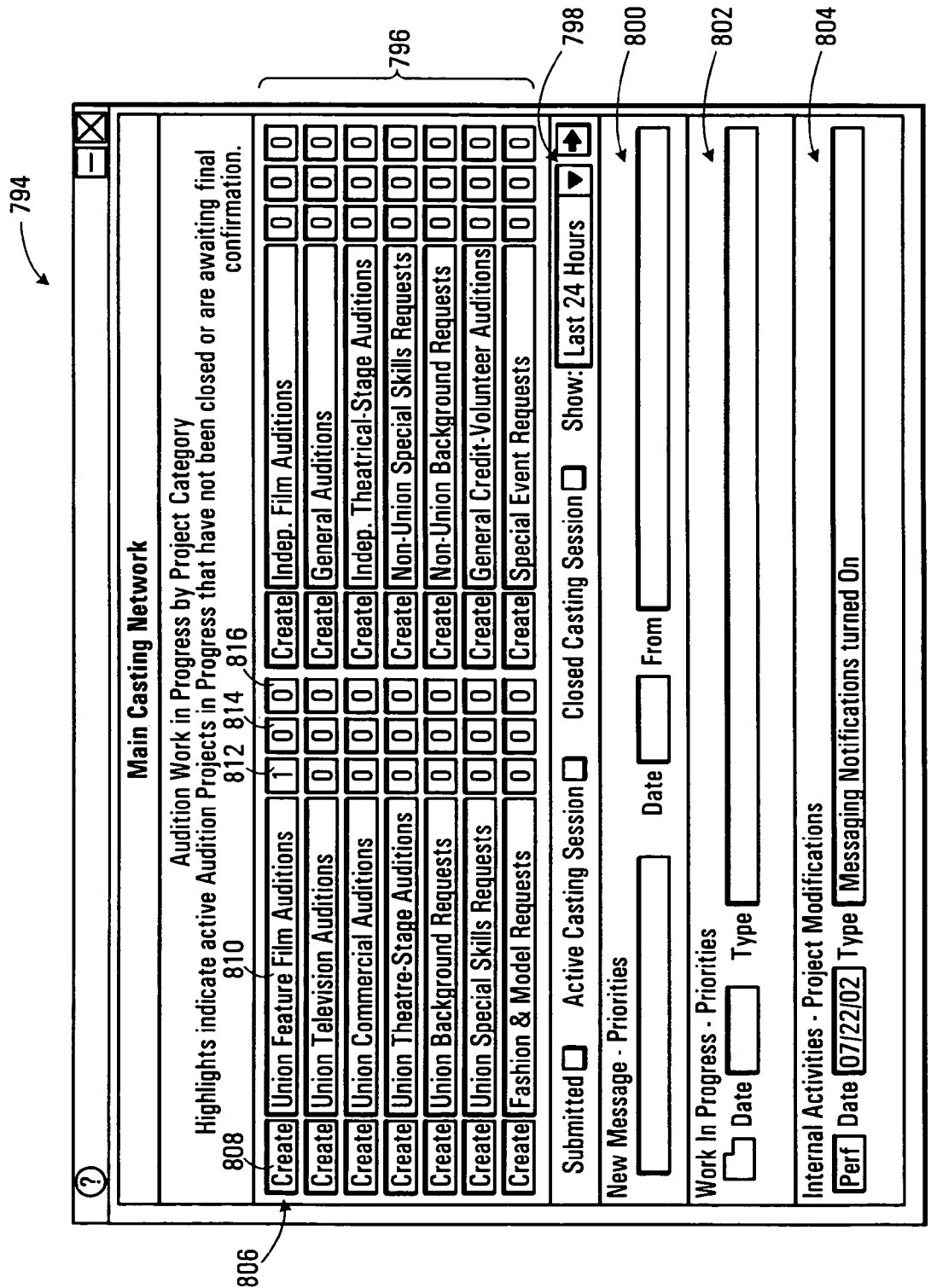
FIG. 44 is a screen shot of a work in progress display window seen at a communication appliance operated by the requirements specifier.

Should the member select the main work area icon 782, a display window as shown at 794 in FIG. 44 is produced from a corresponding S-module received from the management apparatus.

FIG. 44

The display window 794 shown in FIG. 44 includes a list of current work in progress as shown generally at 796 including union feature film auditions, union television auditions, union commercial auditions, etc., as shown in FIG. 44. The display window 794 also has a control panel shown generally at 798 for controlling colour coding of different types of casting sessions and for indicating whether or not a "breakdown" has been submitted and for limiting the number of projects shown at a time. In addition, the display window 794 includes a message area 800 for displaying messages received according to a messaging system associated with the management system (the messaging system to be described later). The display window 794 further includes a work in progress panel 802 and an internal activities area 804. The work in progress area 802 lists current projects in order of priority and the internal activities area 804 lists internal activities related to the casting director. These internal activities may be activities associated with the casting director's company, for example.

Referring to the project listing section 796, this section includes a plurality of areas such as shown at 806 including a create icon 808, a name icon 810, a submissions counter 812, a replies counter 814 and a call back counter 816. The submissions, replies and call back counters 812 to 816 relate to submissions, replies and call backs for projects within the category indicated in the name field 810. Packages received from agents, for example are counted as replies. Should the casting agent wish to create another project within the category specified in the field 810, the casting agent actuates the create icon 808, causing a display as shown at 818 in FIG. 45 to be displayed at the casting director's communication appliance.

FIG. 45

The display 818 shown in FIG. 45 includes basic information about the casting director as shown at 820, a field for entering the member IDs of recipients of the project breakdown 822, and an optional link 824 to a list of available contacts and their member IDs. This may be a link to agents, for example. The panel 818 further includes a priority indicator 826 that can be set by the casting director to specify the priority of the project, it further includes a casting director's reference number or CID 828 which uniquely identifies the project and the panel further includes various other information fields shown generally at 830 providing further information about the project, including its title, class, anticipated markets, episode name, network, cities where casting auditions will be carried out, the names of the producers and directors, etc. The panel further includes a next icon 832, a save project icon 834, a reset icon 836, and a cancel icon 838. The cancel icon 838 simply cancels the form and redirects the casting director's communication appliance back to the display shown in FIG. 44. The reset icon 836 shown in FIG. 45 causes the content of the fields above to be reset to blank values, the save project icon 834 enables the current project to be saved and the next icon 832 causes a display as shown at 840 in FIG. 46 to be displayed at the casting director's communication appliance.

FIG. 46

Referring to FIG. 46, this display 840 includes further information relating to the project including audition details 842, shooting details 844, relevant dates for auditions and shooting 846, and pay information 848. The same bottom icons are provided at the bottom of this panel, namely the next icon 832, the save project icon 834, the reset icon 836 and the cancel icon 838, all of which have the same functions as described in connection with FIG. 45. A further icon labelled as a "back" icon 850 is included to permit returning to the display window shown in FIG. 46. If when the display window 840 shown in FIG. 46 is shown on the casting director's communication appliance, the casting director actuates the next icon 832, the display window shown at 852 in FIG. 47 is shown at the casting director's communication appliance.

FIG. 47

This display window 852 provides a continuation of the project information and includes an area 854 for receiving a brief description of the story line and comments relating to the project. The display window 852 also includes a character adder area as shown generally at 856 that allows the casting director to specify particular required features of a performer and the identification of the parts to be played by the performer, and provides space for adding any comments for viewing by agents. The same control buttons 832 to 838 and 850 are provided at the bottom of the display window 852 and an additional button 858 is provided to allow the casting director to go directly to a preview function.

Figure 47:
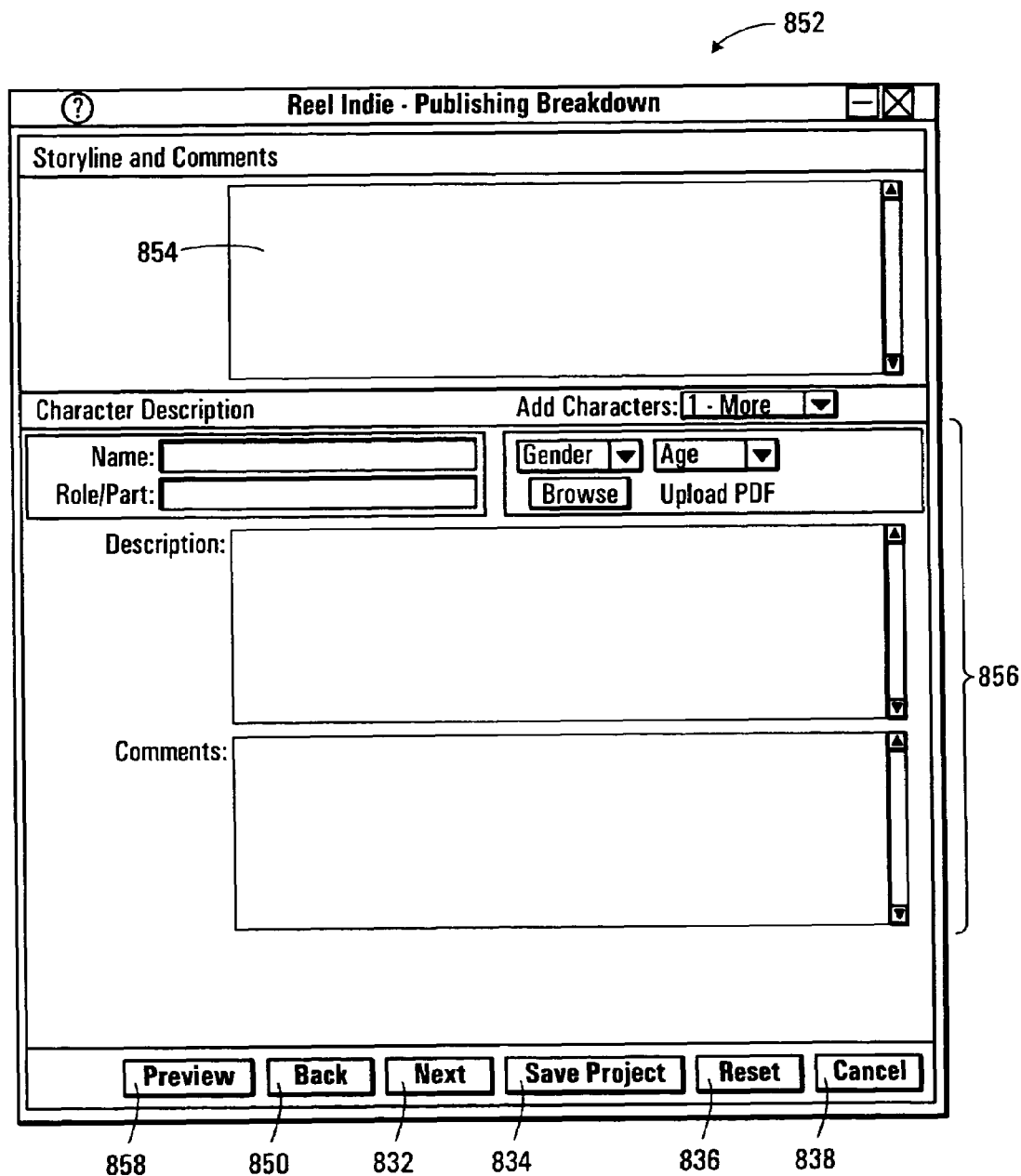
FIG. 47 is a screen shot of another alternative display seen at a communication appliance operated by a requirements specifier enabling the requirements specifier to specify requirements.

On actuation of the preview icon 858 of FIG. 47, a display a shown at 860 in FIG. 48 is shown at the casting director's communication appliance.

FIG. 48

Referring to FIG. 48, the display 860 shows a summary of the current project, also known as a breakdown as referenced above. The display includes various information fields as entered by the casting director using the displays shown in FIGS. 45 through 47 and further includes a control area shown generally at 864 for controlling the project or breakdown. For example, a .pdf version of a script associated with the project may be appended using a script breakdown feature 866 that associates a .pdf document with the project. In addition, accept and decline check boxes are provided as shown generally at 868 allowing the casting director to finalize the project or breakdown or discard it. In addition, an edit function 870 is provided to allow the casting director to navigate to any of the fields above to make edits directly in this display window 860. In addition, the control area 864 includes a download function 872 that allows the casting director to download the project or breakdown summary into local records at the casting director's communication appliance. A select format pulldown menu 874 may be provided to select any other plurality of formats for download, i.e., such as HTML, Word, .pdf, text, and other formats.

A print function 876 is provided to allow the currently displayed project or breakdown summary to be printed by a printer connected to the casting director's communication appliance. A save project button 878 is also provided to allow the casting director to save the current project or breakdown without finalizing it or sending it to anyone. The control area 864 also includes a submission method dropdown menu 880 that allows the casting director to select whether the summary or breakdown is to be sent to recipients indicated in the send to field 822 in FIG. 45. For example, the casting director may select to send by email, by hand or by fax. Alternatively, a recipient-specified mode of communication may be used where the intended recipients as determined from the list associated with field 822 in FIG. 45 have specified their own preferred methods of receiving projects or breakdown summaries.

A further control button 882 enables the casting director to actually submit the project to the indicated recipients through the management system.

After making such a submission, the display shown at 794 in FIG. 44 is shown on the casting director's communication appliance and the value in the number of submissions field 812 is incremented by one to reflect that another submission has been sent. In effect, at least one remoting environment program module from the casting group 48 is operable to cause the casting director's communications appliance to receive operator input identifying a list of requirements of a desired object (performer) and communicate the list to the management apparatus for communication to another communications appliance.

Figure 49:
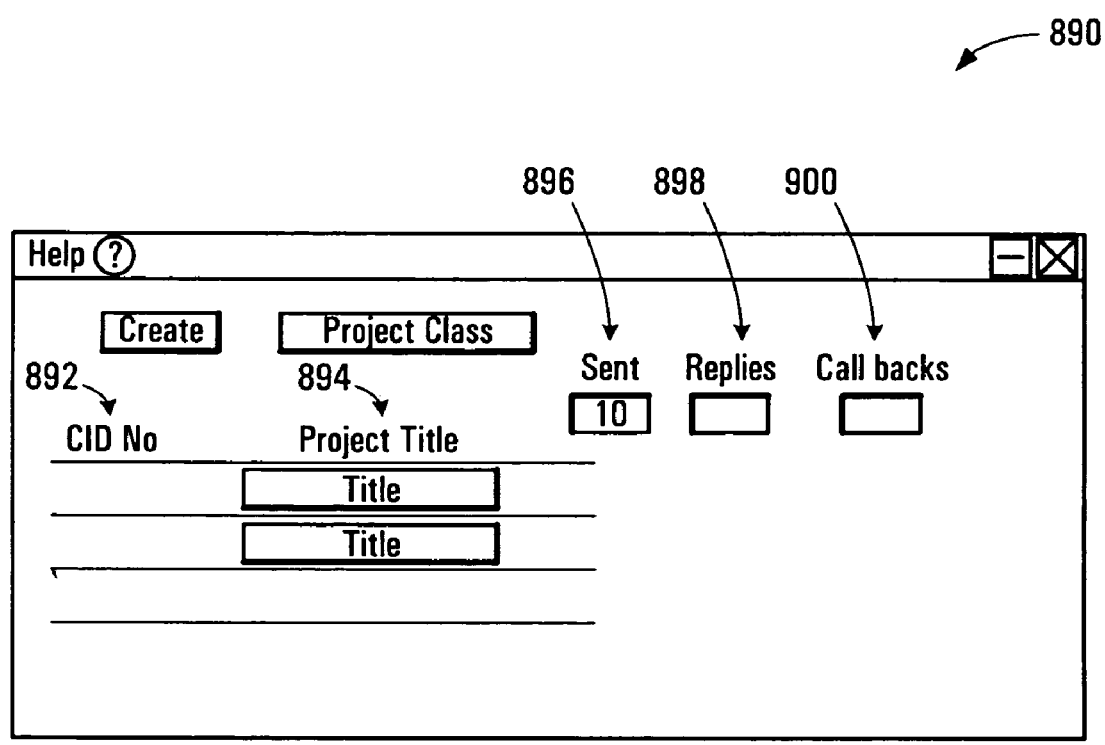
FIG. 49 is a screen shot of a project listing screen seen at a communication appliance operated by the requirements specifier.

When viewing the display shown at 794 in FIG. 44, should the casting director desire to check the status of a particular project, the casting director simply clicks on the name field 810 of the desired category of projects and a list of the projects as shown in FIG. 49 is shown.

FIG. 49

Referring to FIG. 49, projects are shown with a CID number 892, a project title 894, an indication of the number of agencies to which the project has been sent 896, an indication of the number of replies received 898, and an indication of the number of call backs associated with the project 900. The CID number and project title field 892 and 894 are derived from the project title field shown in the project information area 830 shown in FIG. 45 and the CID number field 828 shown in FIG. 45. The contents of the number of agencies field 896 is populated by the system in response to counting the number of different agencies that have been selected to receive the package based on the casting director's list of agents specified in field 822 shown in FIG. 45. The number of replies is calculated based on how many times the agencies to whom the project breakdown has been sent have replied and the number of call backs indicates the number of times the casting director has requested certain performers to return after the first audition for another interview or test. Within the display shown at 890 in FIG. 49, the casting director may click on one of the project titles 894 and this will cause the display shown at 910 in FIG. 50 to be displayed at the casting director's communication appliance.

Figure 50:
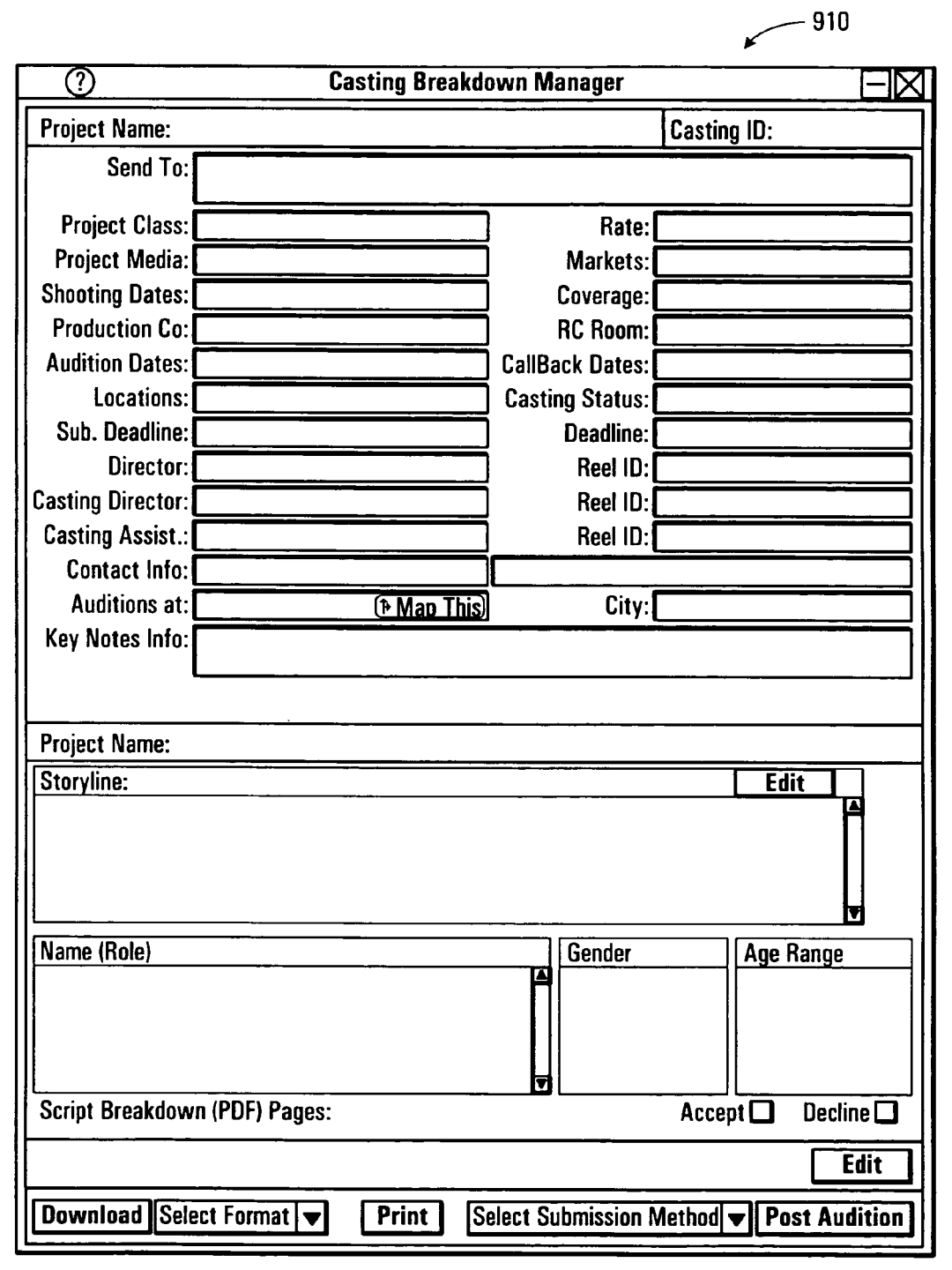
Figure 52:
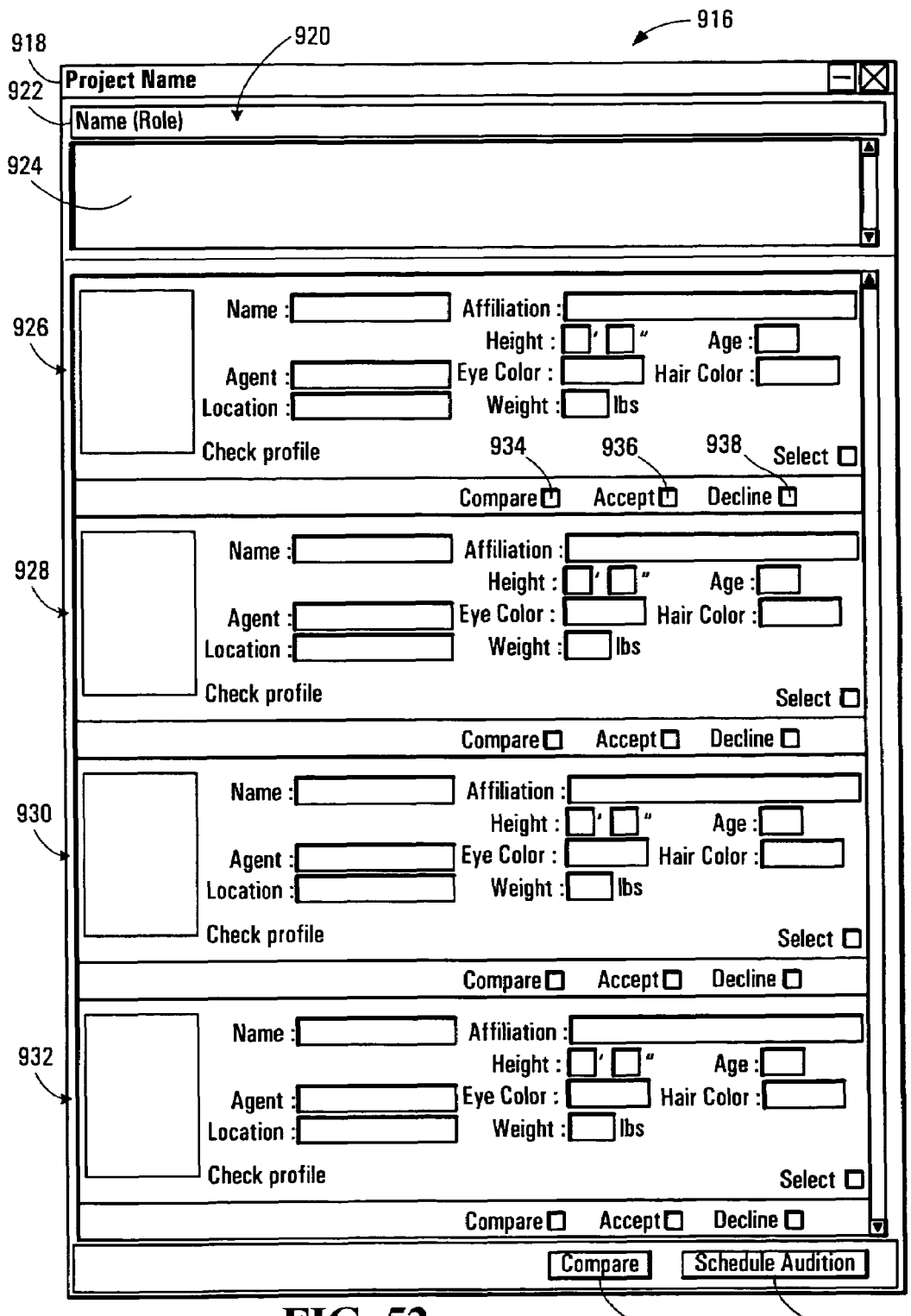
FIG. 52 is a screen shot of a display seen at a communication appliance operated by a requirements specifier showing data related to objects that may potentially satisfy the requirements specified by the requirements specifier.

FIGS. 50, 51 and 52

The display shown at 910 in FIG. 50 is similar to the one shown at 860 in FIG. 48 and provides a convenient way of showing all pertinent data relating to the project. Alternatively, the display 912 shown in FIG. 51 may be displayed at the casting director's communication appliance and this display includes a view submissions icon per every replied role 914 which, when activated causes the display shown at 916 in FIG. 52 to be displayed at the casting director's communication appliance. This display 916 includes a project title area 918 and an area shown generally at 920 for displaying specific roles within the project. In particular, the name of a particular role is displayed in an area shown generally at 922 and a description of the role is provided generally at 924. Persons or performers selected by the agents in response to the submission, identified by the agents as being potentially suitable for the role are provided by performer summaries as shown at 926, 928, 930 and 932. Pages of performer summaries may be provided by each agent or the cumulative total of possible performers from all agents may take several pages of the type shown at 916.

Each of the performer summaries includes a compare icon 934, an accept icon 936, and a decline icon 938 that allow the casting director to compare, accept or decline the suggested performer.

FIG. 53

Figure 53:
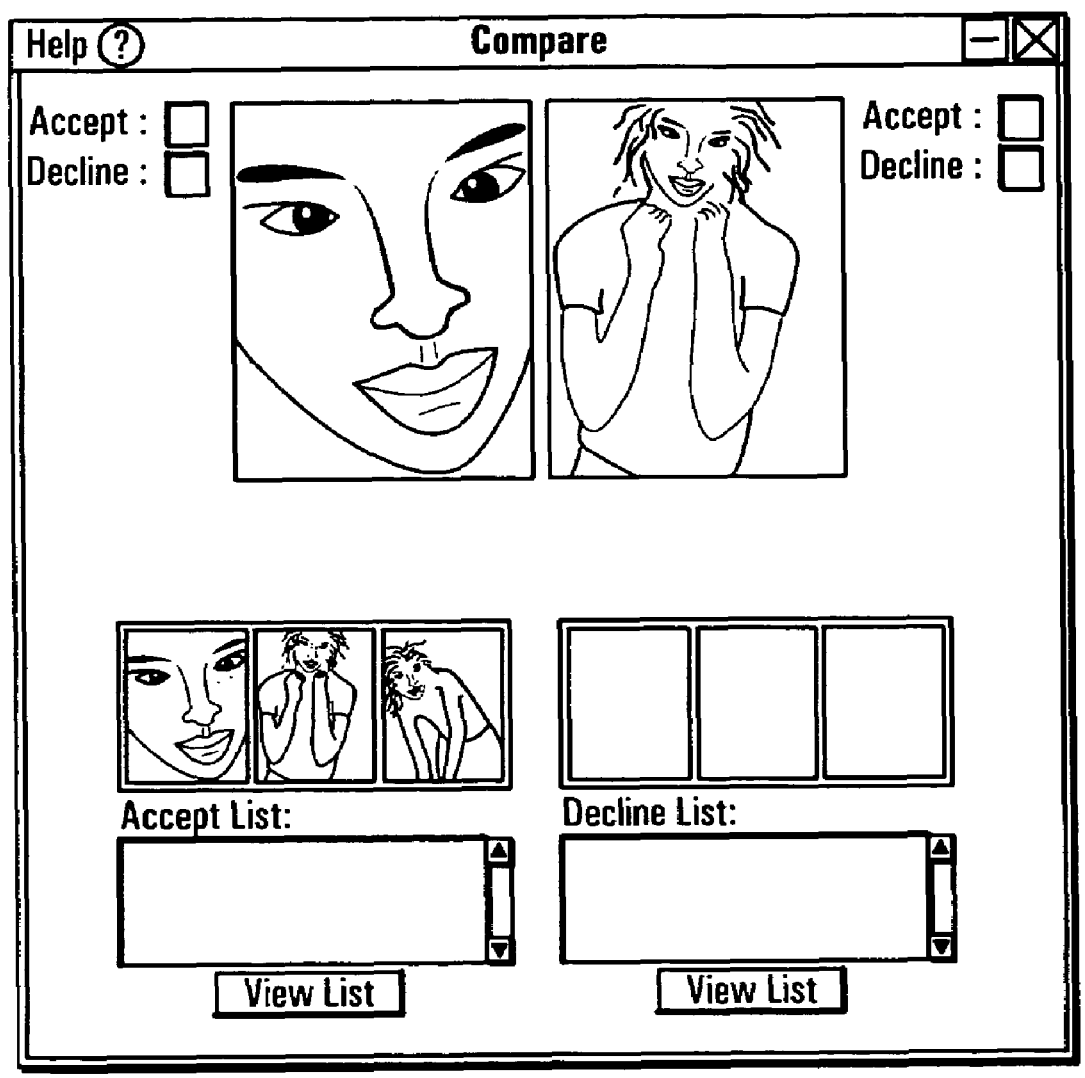
FIG. 53 is a screen shot of a compare screen seen at a communication appliance operated by a requirements specifier, that permits the requirements specifier to compare data associated with two objects to decide which of the two objects will be used to fulfill the requirements.

If the casting director selects the compare icon 934 in FIG. 52, a display as shown at 940 in FIG. 53 is provided to allow the casting director to compare pictures of two or more performers associated with summaries 926 and 928, for example, whose compare icons 934 have been actuated. The comparison function operates similarly to that explained above in connection with FIG. 41.

Referring back to FIG. 52, if the casting director wishes to select a particular performer, the accept icon 936 associated with that performer is actuated to copy the performer's summary to a short list. Alternatively, if the casting director wishes to decline the opportunity to use the performer, the decline icon 938 associated with that performer is selected.

After selections have been made regarding who should be selected, a schedule audition icon 940 (FIG. 52) is actuated. This causes a display as shown at 942 in FIG. 54 to be displayed at the casting director's communication appliance.

FIG. 54

Figure 54:
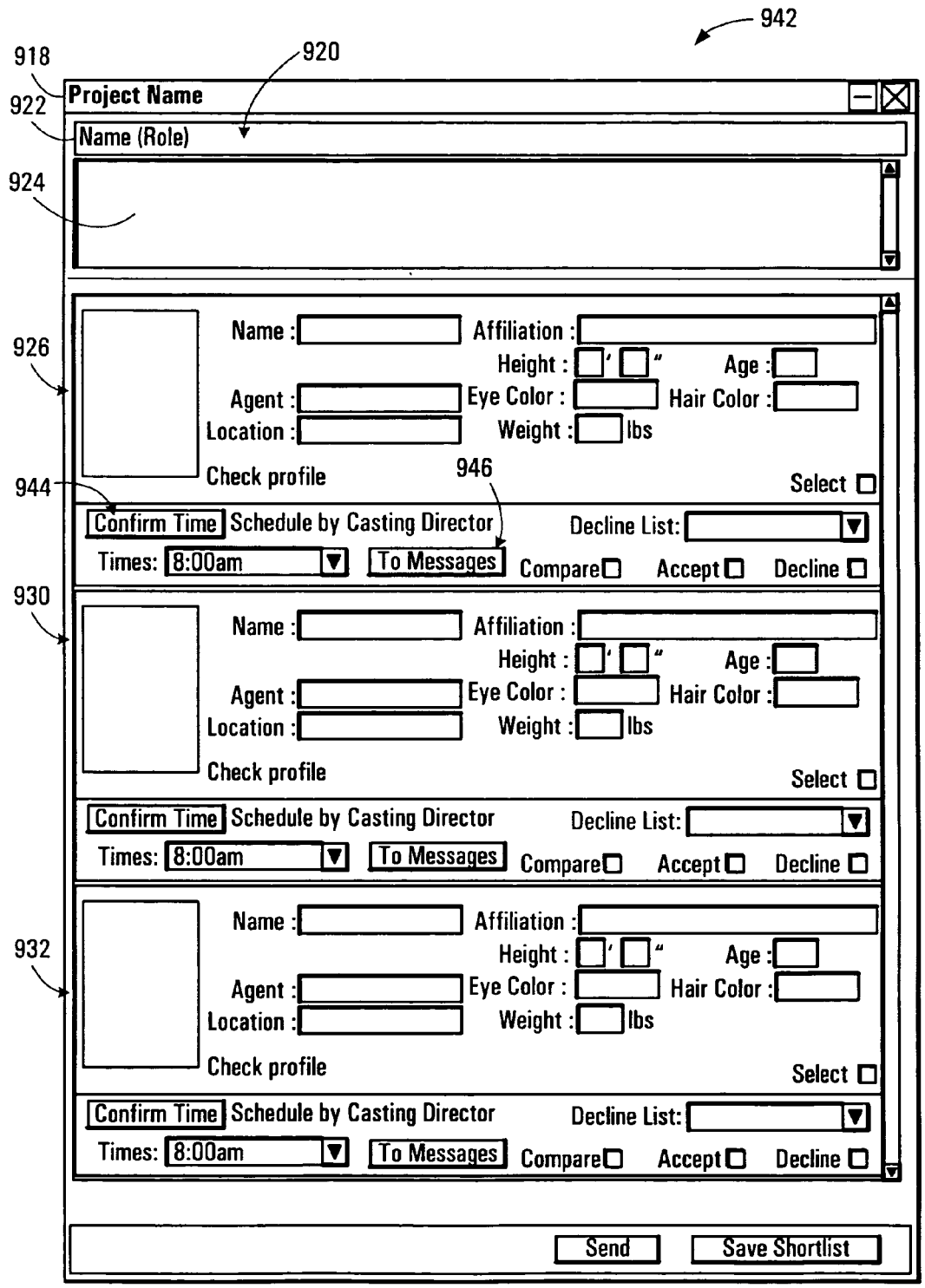
FIG. 54 is a screen shot of a display seen at a communication appliance operated by a requirements specifier showing data related to objects that may potentially fulfill the requirements subject to further review.

The display shown in FIG. 54 shows the same information including the project name 918, name of the role 920, and role description information 924 as described above in connection with FIG. 52 and further includes performer profile summaries such as 926, 930 and 932, for example, representing the performers that have made the "short list" for auditioning for the role indicated in the name field 920. Then, the casting director may actuate a confirm time icon as indicated at 944 in FIG. 54 to cause the casting director to have access to a scheduler for scheduling an appointment for the performer through his agent. After receiving this confirmation of audition, if the agent does not have access to the shared scheduler of the performer (access is made available to the agent normally when the agent signs a performer for representation), the agent actuates a messaging function 946 which invokes a messaging application allowing the agent to send a message to the performer to indicate that they have been accepted for an audition for the role. The message includes the summary of the project as shown in FIG. 48, including information regarding the location for the audition through a printable map.

Communications

FIG. 55

Referring back to FIGS. 5, 6 and 7B, each of the displays shown in these Figures has a communications link 1000. Clicking on this communications link causes an S-module to be loaded from the management apparatus 12 to the communication appliance, to cause a display as shown at 1002 in FIG. 55 to be displayed at the communication appliance. This display is for controlling communications with other communications appliances and includes an audio control link 1004, a video control link 1006, a presentation control link 1008 and a document link 1010.

Figure 56:
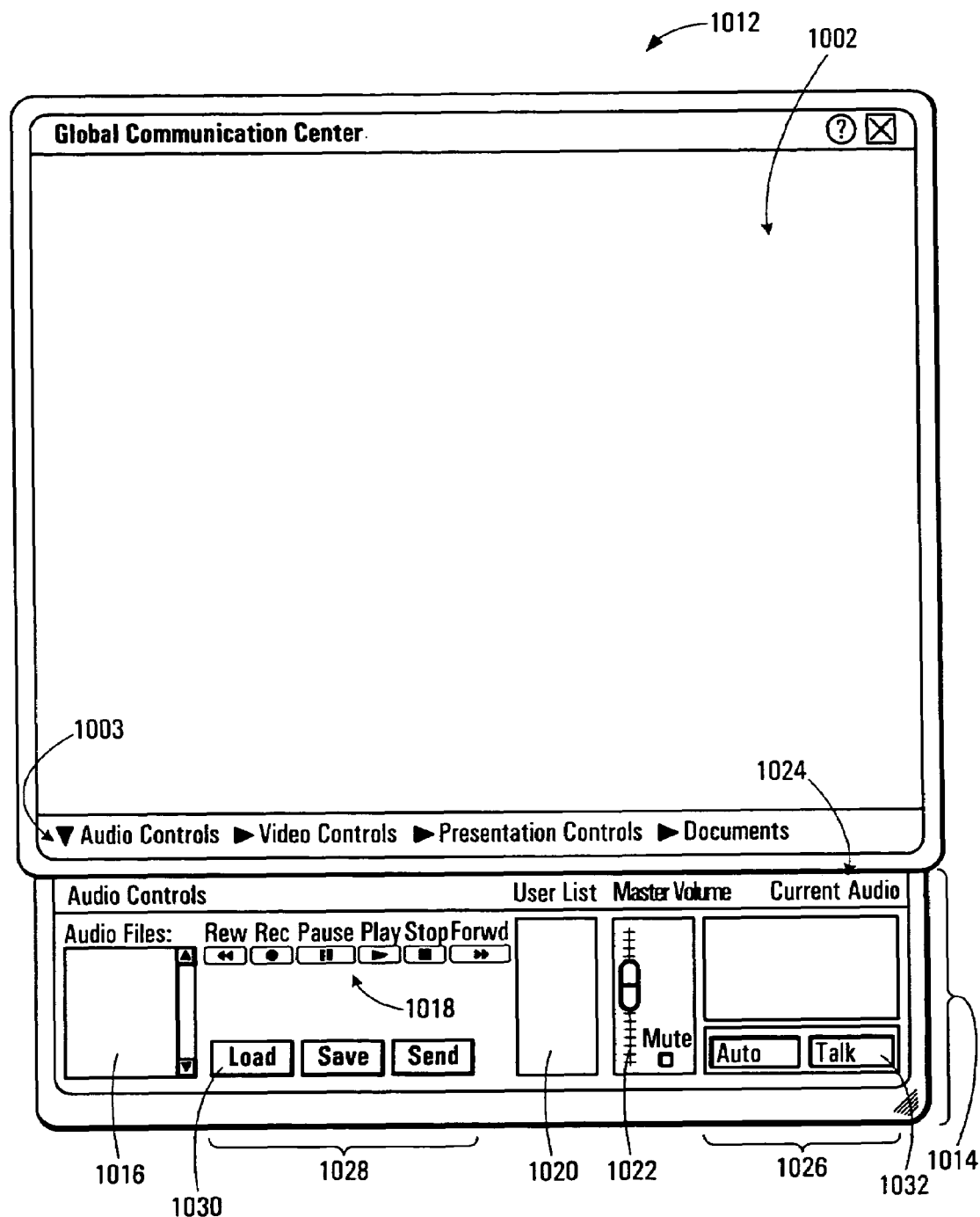
FIG. 56 is a screen shot of a display seen at a communication appliance operated by a requirements specifier for controlling audio functions.

On activation of the audio control link 1004, an S-module that causes a display as shown at 1012 in FIG. 56, is obtained from the management apparatus.

FIG. 56

Figure 55:
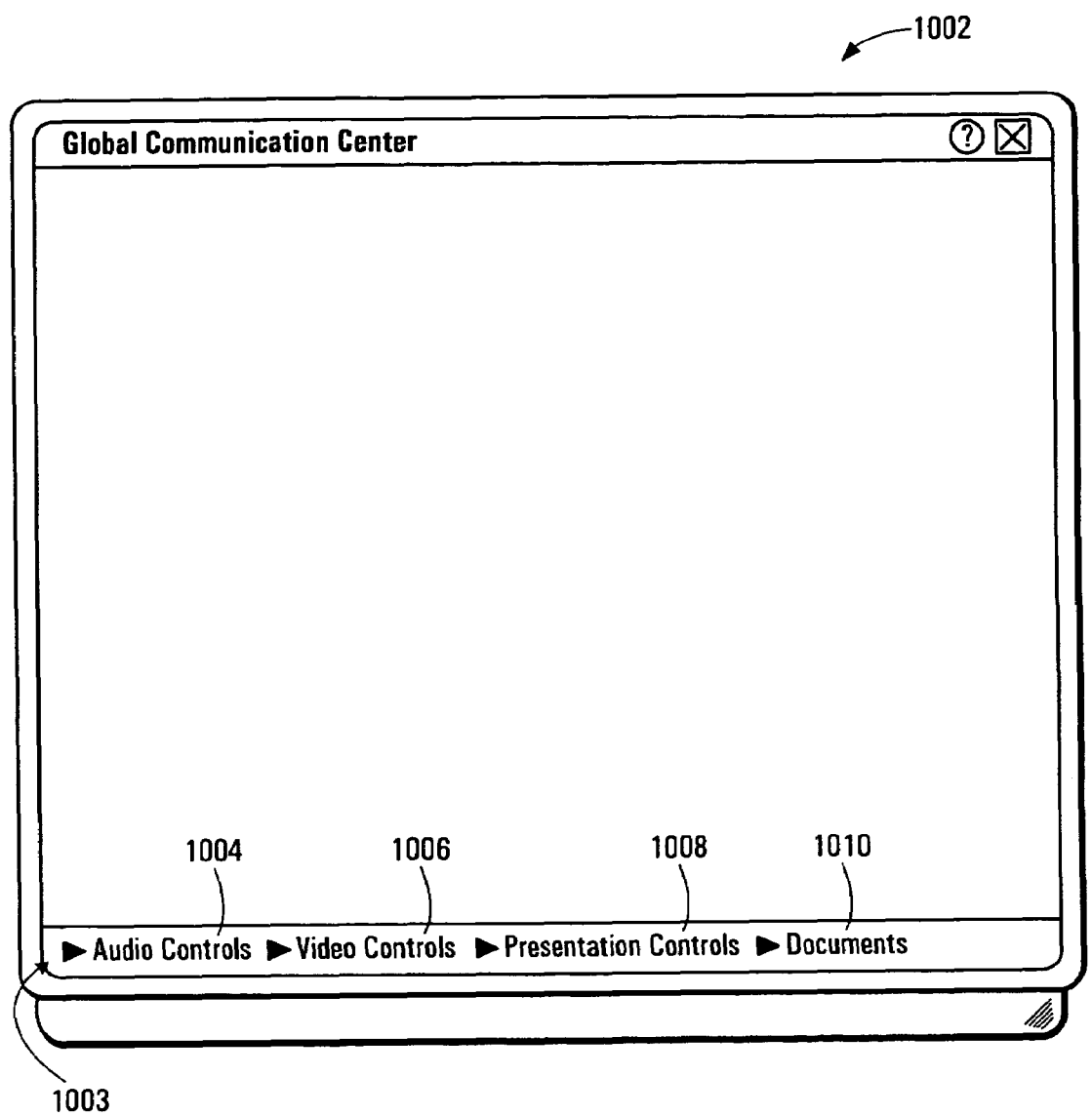
FIG. 55 is a screen shot of a display seen at a communication appliance operated by a requirements specifier for control and communications with other communications appliances.

Referring to FIG. 56, this display includes a display area 1002 similar to that shown in FIG. 55 and further includes an audio control area shown generally at 1014 having an area 1016 for listing available audio files, a transport control 1018 for controlling rewind, record, pause, play, stop and forward functions of an audio file, it has a member list area 1020, a master volume area 1022, a current audio area 1024 and a talk back control area 1026. The audio file area 1016 is used to display audio files available to the current member. The member ID and password effectively determine audio files available to be heard. A file control area 1028 is further included for loading, saving or sending audio files. For example, a load key 1030 may be used to load audio files that are already stored in files on the communications appliance and that the member wishes to upload to make available to others.

The member list 1020 shows a list of current members that are logged on to the management apparatus. The current audio area 1024 lists current members or members that are involved in an audio session. An audio session may include an audio conference, for example, between two or more members. The talk control area 1026 includes a talk button 1032 that allows the member to actuate when he wishes to speak, to communicate into a conference or to at least one other party.

Figure 57:
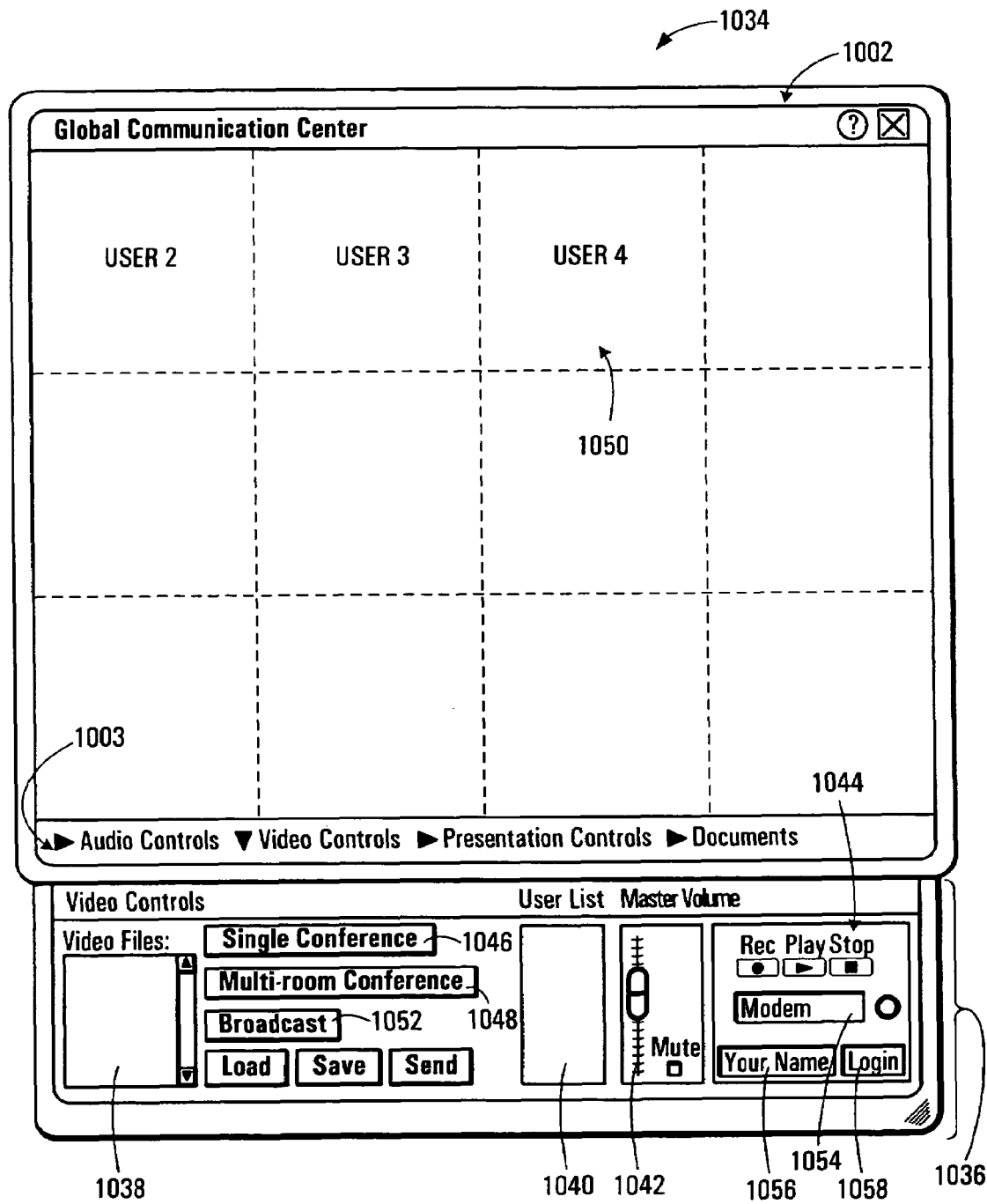
FIG. 57 is a screen shot of a display seen at a communication appliance operated by a requirements specifier for controlling video functions.

Referring back to FIG. 55, if the member actuates the video control function 1006, an S-module from the management apparatus is obtained and causes a display as shown at 1034 in FIG. 57 to be displayed at the communication appliance.

FIG. 57

Referring to FIG. 57, this display 1034 includes an area similar to that shown at 1002 in FIGS. 55 and 56 and further includes a video control area shown generally at 1036. The video control area includes a video file area 1038, a member list area 1040, a volume control 1042, transport controls 1044 that function similar to corresponding areas described in connection with FIG. 56. The video control area 1036, however, further includes other functional links including a single conference link 1046 which when activated provides for a single video conference with a member selected from the member list shown in area 1040. Consequently, the area 1002 would show a view from a camera taken at the opposite party and a camera at the communication appliance that is showing the display shown at 1034 would take pictures and send them for viewing at the other party. The video area 1036 also includes a multi-room conference link 1048 that allows a multi-room conference to occur by causing audio from all other members in the conference to appear in the area 1002 in a grid layout such as shown in broken outline at 1050, for example.

In addition, the video control area includes a broadcast link 1052 which when selected causes the video captured by a camera at the communication appliance to be broadcast to members selected from the member list 1040.

The video control area further includes a communication control function 1054 that allows optimization of video transmissions to occur based on the communications link or modem, for example, that is used to connect the communication appliance to the network. In addition, the video control area 1036 includes a function 1056 that allows the member to enter his or her name for use in appearing in member lists of other members that may be showing the same screen as shown in FIG. 57 and video control area further includes a log-in button 1058 for allowing a member to enter a video conference already in progress. As above, the area 1002 still includes the selection menu shown generally at 1003 to allow the member to enter other communications functions.

Figure 58:
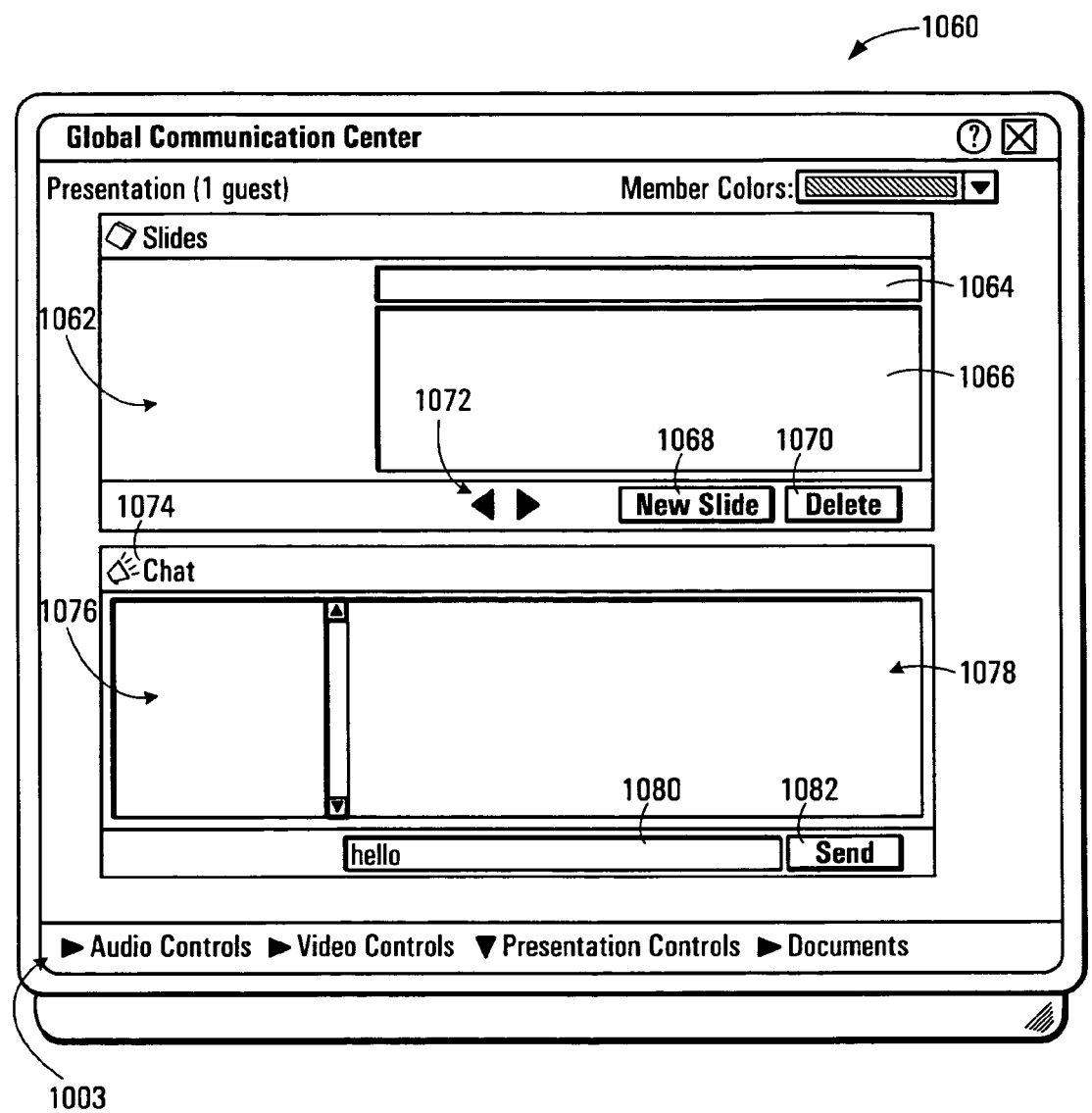
FIG. 58 is a screen shot of a display seen at a communication appliance operated by a requirements specifier for providing a presentation to a communication appliance.

Referring back to FIG. 55, when a member selects the presentation console 1008, an S-module is obtained from the management apparatus to cause a display as shown at 1060 in FIG. 58 to be displayed at the communications appliance.

FIG. 58

Referring to FIG. 58 this display 1060 includes a presentation area that includes an area 1062 for listing current slides, an area 1064 for indicating a slide title, and an area 1066 for displaying a selected slide. The area also includes a link 1068 which may be used to add a new slide and includes an area 1070 which may be used to delete a displayed slide. A slide transport control is shown generally at 1072 to allow the member to advance forward and backward among the slides.

The display 1060 further includes a chat room control 1074 that allows the member to work on the slides with other members that may be in remote locations while communicating with them. For example, the chat area includes a chat room member list 1076 and a chat text preview area 1078. Thus, as other members enter text or as the current viewing member enters text, all text entries appear in the chat text preview area for all members that are in the chat group to see.

The chat area also includes a chat input field 1080 for allowing the current member to enter text that will ultimately appear in the chat text preview area 1078 after a send button 1082 is actuated. Again, the communication menu 1003 appears at the bottom of the display 1060.

FIG. 59

Figure 59:
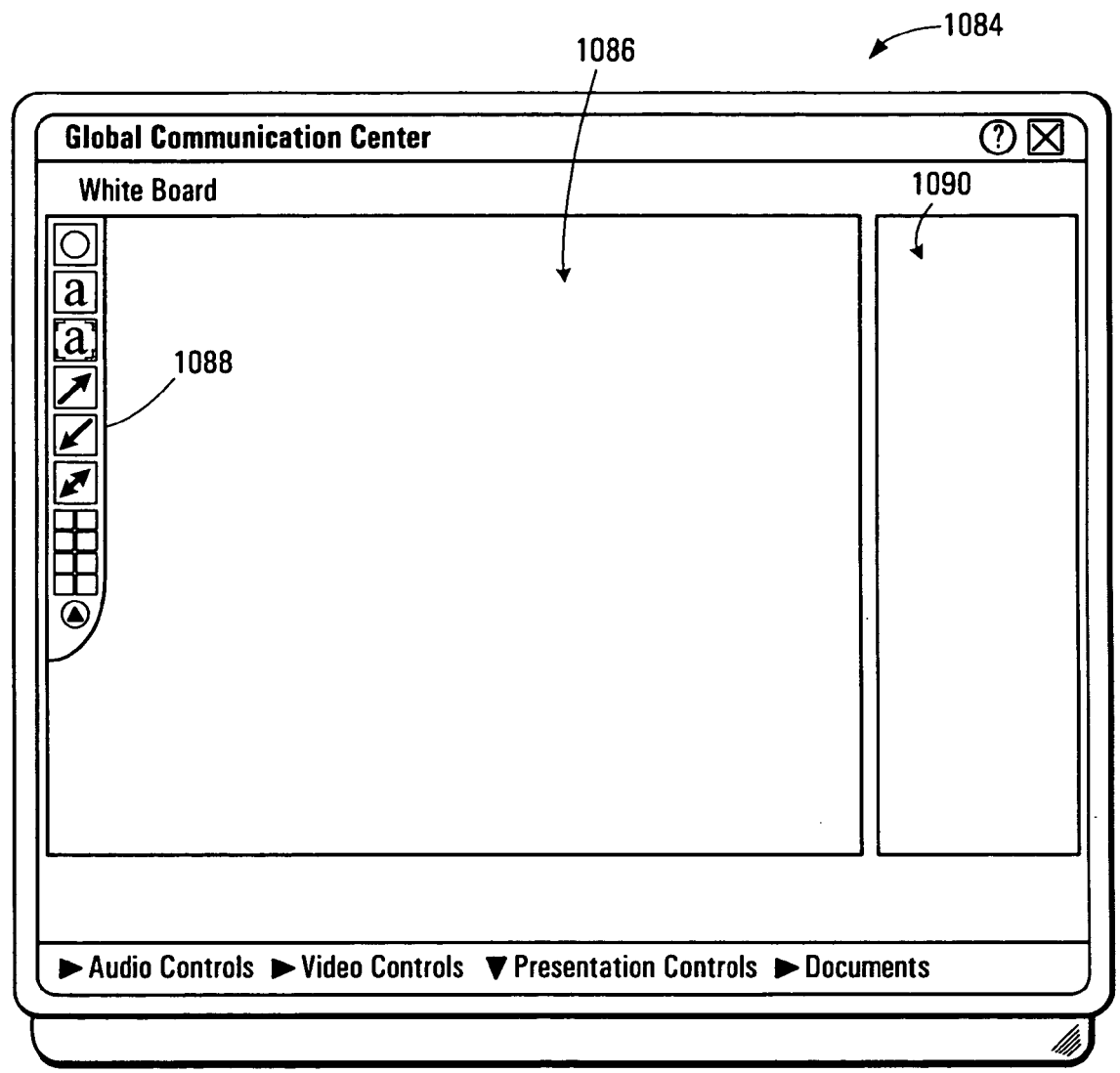
FIG. 59 is a screen shot of a display seen at a communication appliance operated by a requirements specifier depicting a white board operable to be viewed at other communications appliances.

Referring to FIG. 59, a white board function is also provided. The white board function is produced by an S-module that causes a display as shown at 1084 to be displayed at the communication appliance. This area includes a white board work area shown generally at 1086 and a white board drawing tool menu shown generally at 1088, for allowing a member to use an input device to select one of the drawing tools from the drawing tool menu 1088 to draw in the white board area 1086. Images drawn by the member may be seen by other members as selected from a members list area 1090.

FIG. 60

Figure 60:
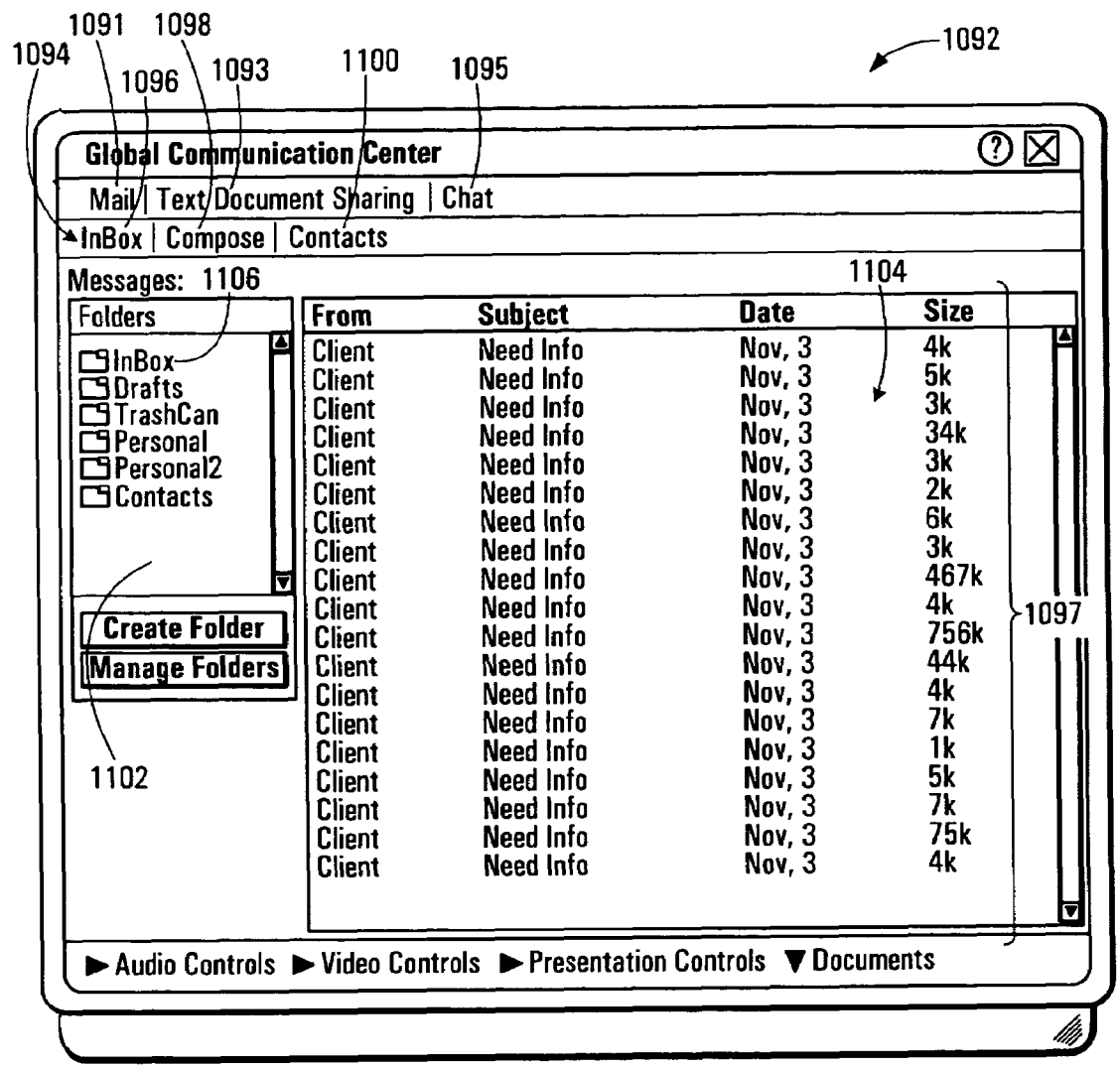
FIG. 60 is a screen shot of a display seen at a communication appliance operated by a requirements specifier facilitating text document sharing among communication appliances.

Referring to FIG. 60, an S-module that causes a display as shown at 1092 to be displayed at the communication appliance may be obtained to provide for text document sharing. In this regard, the display includes a mail navigation area 1094 that provides inbox, compose and contacts links 1096, 1098 and 1100. A folder management area is also provided at 1102 and an inbox list of mail links is provided as shown generally at 1104.

The inbox link 1096 provides a link to an inbox having a link 1106 also depicted in the folder management area 1102. On selecting the inbox function, a list of emails received from other members is shown. The member may simply click on one of the emails to cause a further panel to open up (not shown) to permit the member to view the content of the email.

The display 1092 includes a mail link 1091, a text document sharing link 1093 and a chat link 1095. On selecting the mail link 1091, a display as shown at 1097, specifically related to mail functions is shown on the communications appliance.

FIG. 61

Figure 61:
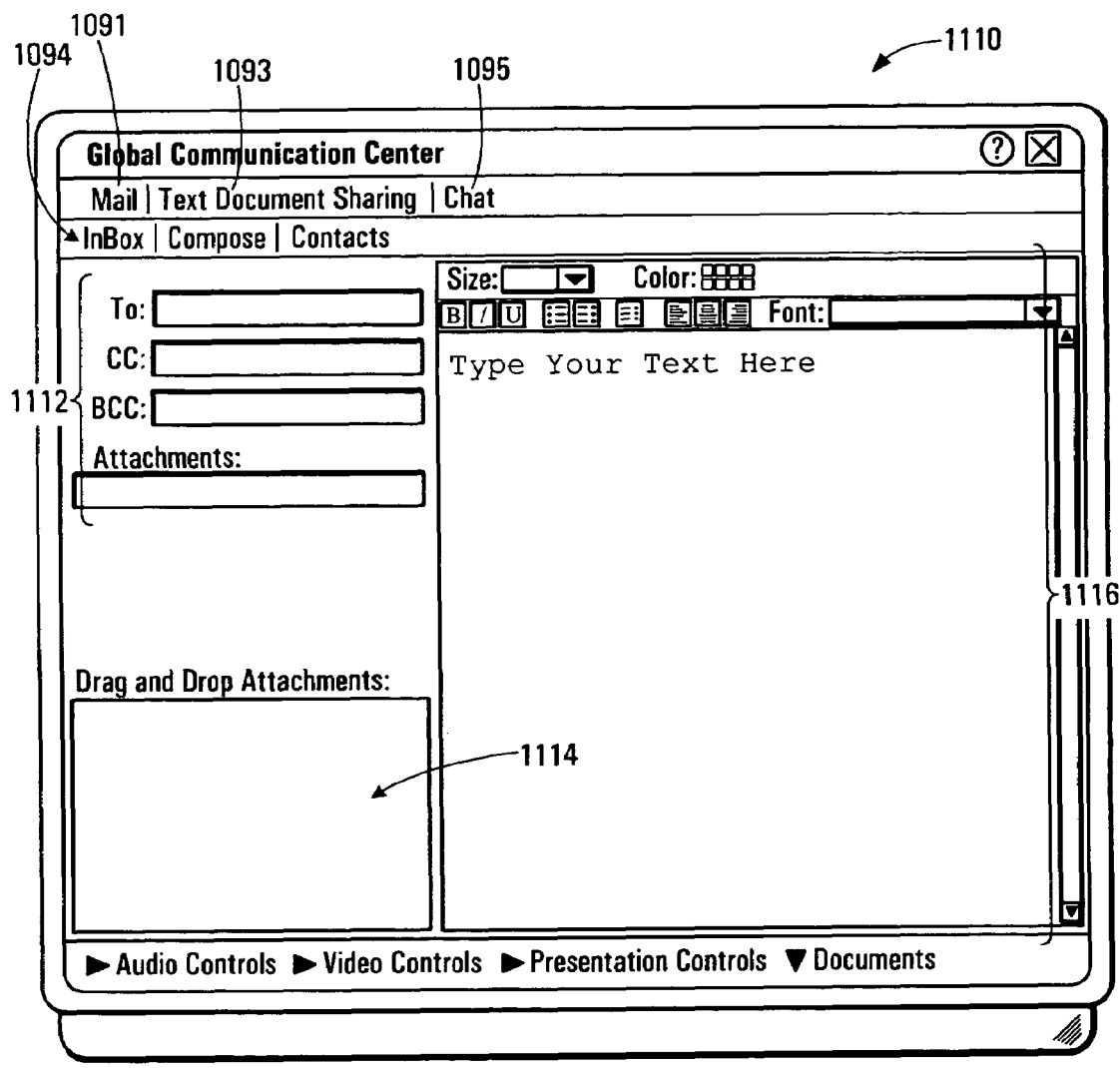
FIG. 61 is a screen shot of a display seen at a communication appliance operated by a requirements specifier facilitating messaging between communication appliances.

Referring to FIG. 61, when the member selects a new message link, a display as shown at 1110 in FIG. 61 is provided at the communication appliance. This includes the menu features 1091, 1093 and 1095 and further includes the email menu 1094. The usual email fields including the two carbon copy (CC) and blind carbon copy (BCC) fields and the attachments field are provided as shown at 1112.

A drag and drop attachment area is shown generally at 1114 and provides access to a storage area maintained by the member at the management system to allow documents to be attached to an email. This display further includes typical font control and formatting features and a text input area, all as shown generally at 1116.

FIG. 62

Figure 62:
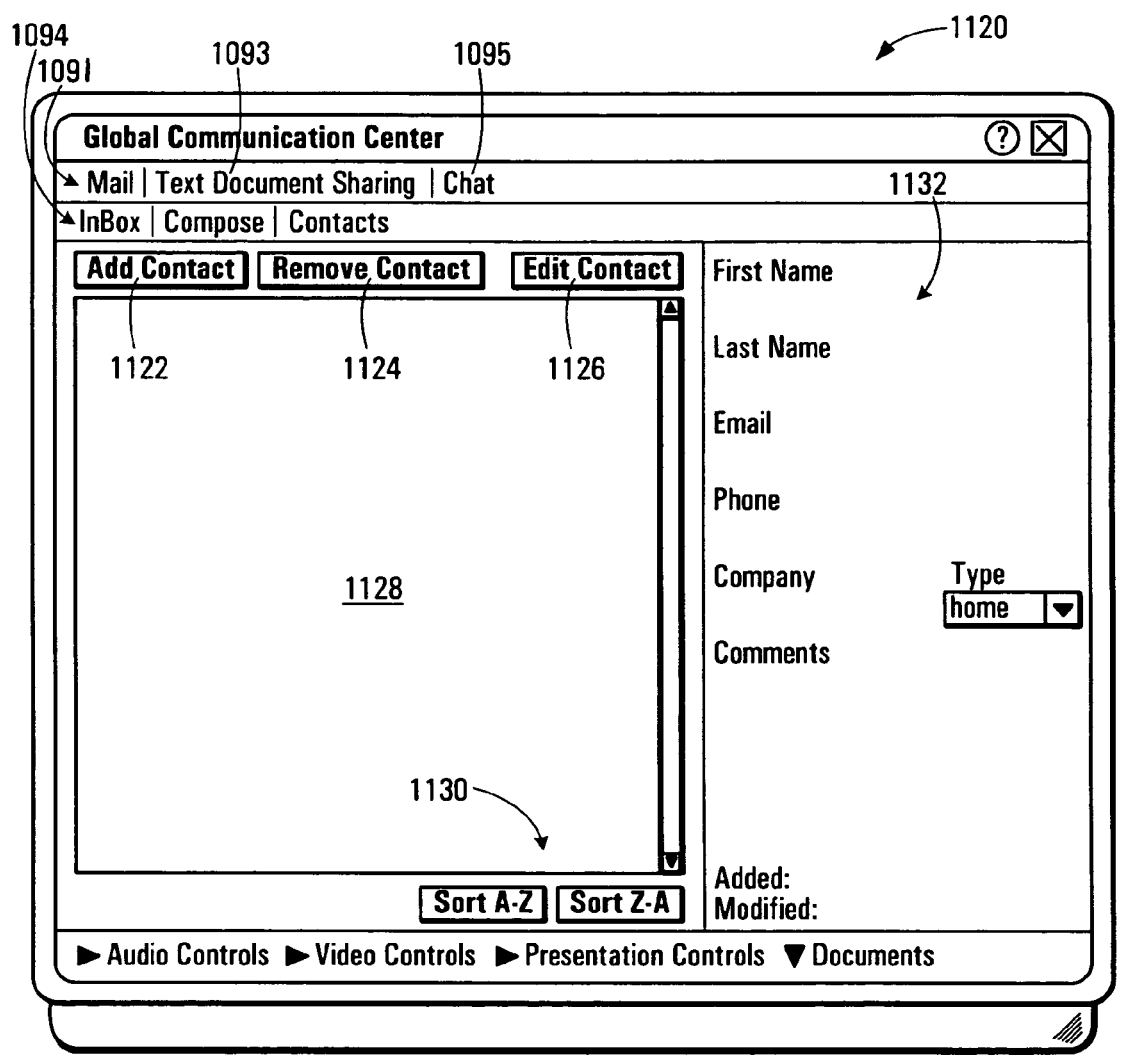
FIG. 62 is a screen shot of a contact manager display seen at any of the communication appliances.

Referring to FIG. 62, a contact management function is also provided by an S-module that produces a display as shown at 1120 in FIG. 62 to be displayed at the communication appliance. This display includes the aforementioned menus 1097 and 1094 and further includes links for adding, removing and editing contact information 1122, 1124 and 1126, respectively, and includes an area 1128 for displaying a list of contacts. Sorting functions are provided as shown generally at 1130. On selecting any contact listed in the display area 1128, details of that contact are displayed in a separate display window as shown generally at 1132.

FIG. 63

Figure 63:
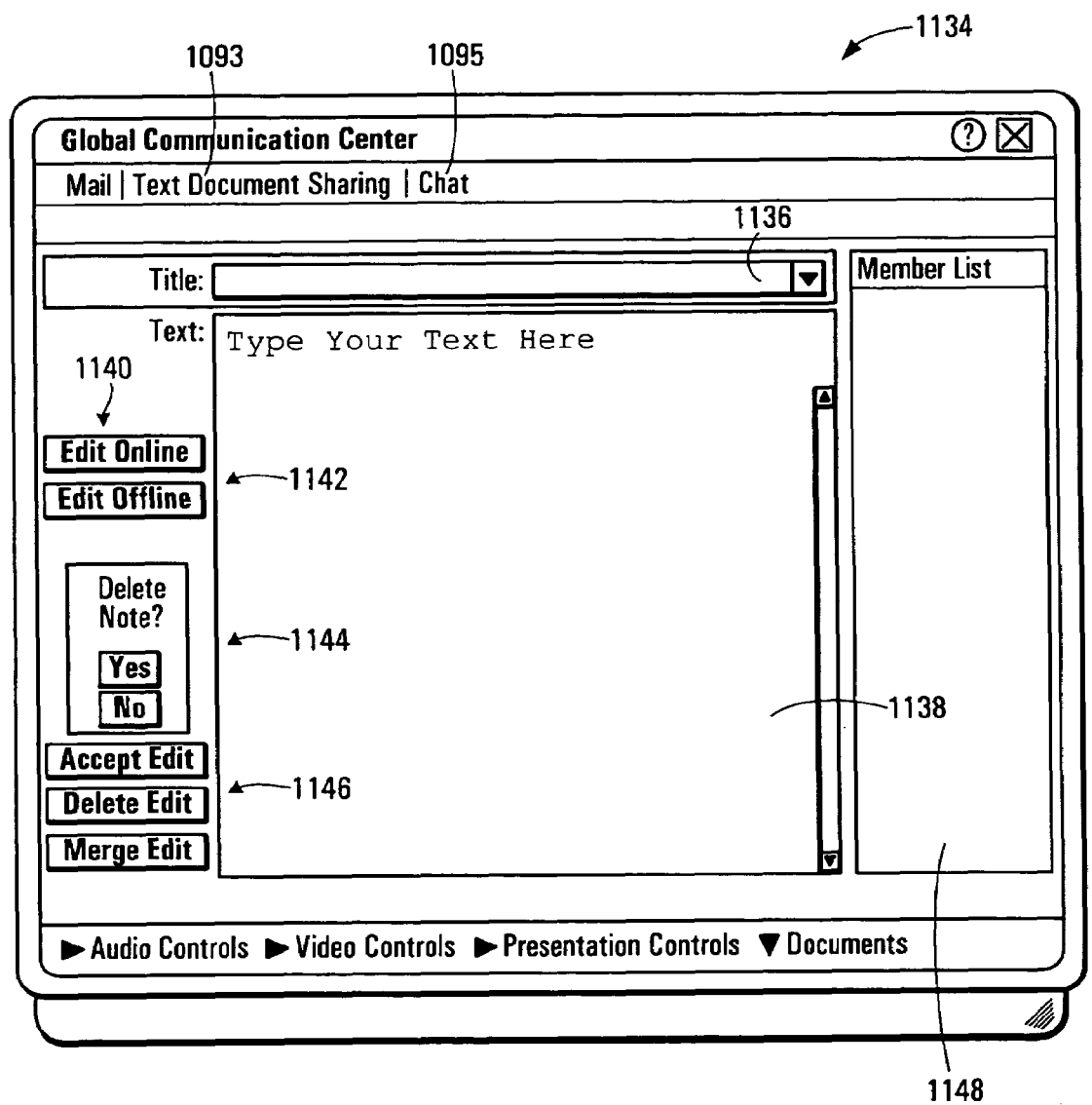
FIG. 63 is a screen shot of a display that may be seen on a plurality of communication appliances at the same time to permit persons using such appliances to edit the same document at the same time.

Referring to FIG. 63, an S-module that causes a display as shown at 1134 to be seen at the communication appliance is obtained from the management apparatus in response to a request for text document sharing made by activating the text document sharing feature 1093 shown in FIGS. 60 to 62. This display 1134 includes a document title area shown generally at 1136, an area for receiving text 1138, an area 1140 for providing icons for basic edit functions and access, deletion and edit control functions shown generally at 1142, 1144 and 1146, respectively. A members list as shown generally at 1148 may also be provided to select particular members that are to be able to share the document seen in the document work area 1138. The feature shown in FIG. 63 may be displayed on a plurality of communication appliances at the same time and all persons using those appliances may effectively edit the same document at the same time, particularly to allow for collaborative writing efforts.

FIG. 64

Figure 64:
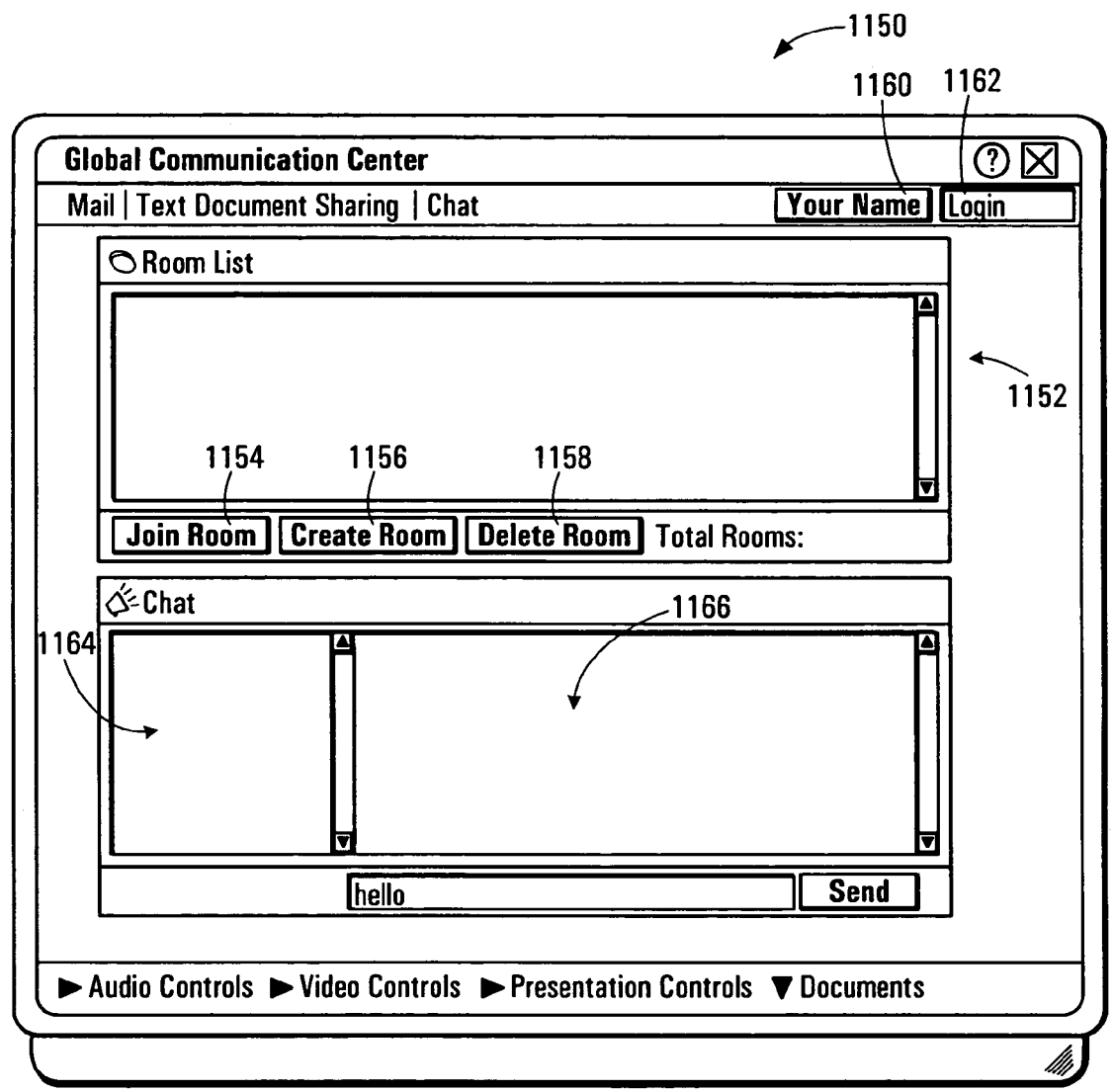
FIG. 64 is a screen shot of a display seen at any of the communication appliances facilitating a chat room function among communication appliances.

Referring to FIG. 64, an S-module that causes a display as shown at 1150 in FIG. 64 may be obtained on activation of the chat function identified at 1095 in FIGS. 60 through 63. Activation of the chat function causes a room list as shown generally at 1152 to appear to provide a list of current groups of members concurrently communication with each other. Room control functions including a join room function 1154, a create room function 1156 and a delete room function 1158 allow for the current member to join an existing room, create a new room, or delete his or her access to the current room. If a member wishes to join a room, the member would enter a name in a name area 1160 and then activate a log-in function 1162 to cause the name to be posted in association with the chat room selected by the member.

The display 1150 further includes a chat area shown generally at 1164 that provides a list of members currently involved in a chat room, selected from the room list shown in area 1152. This area also includes a text display area 1166 in which text associated with the chat room is displayed.

Production Room

FIG. 65

Figure 65:
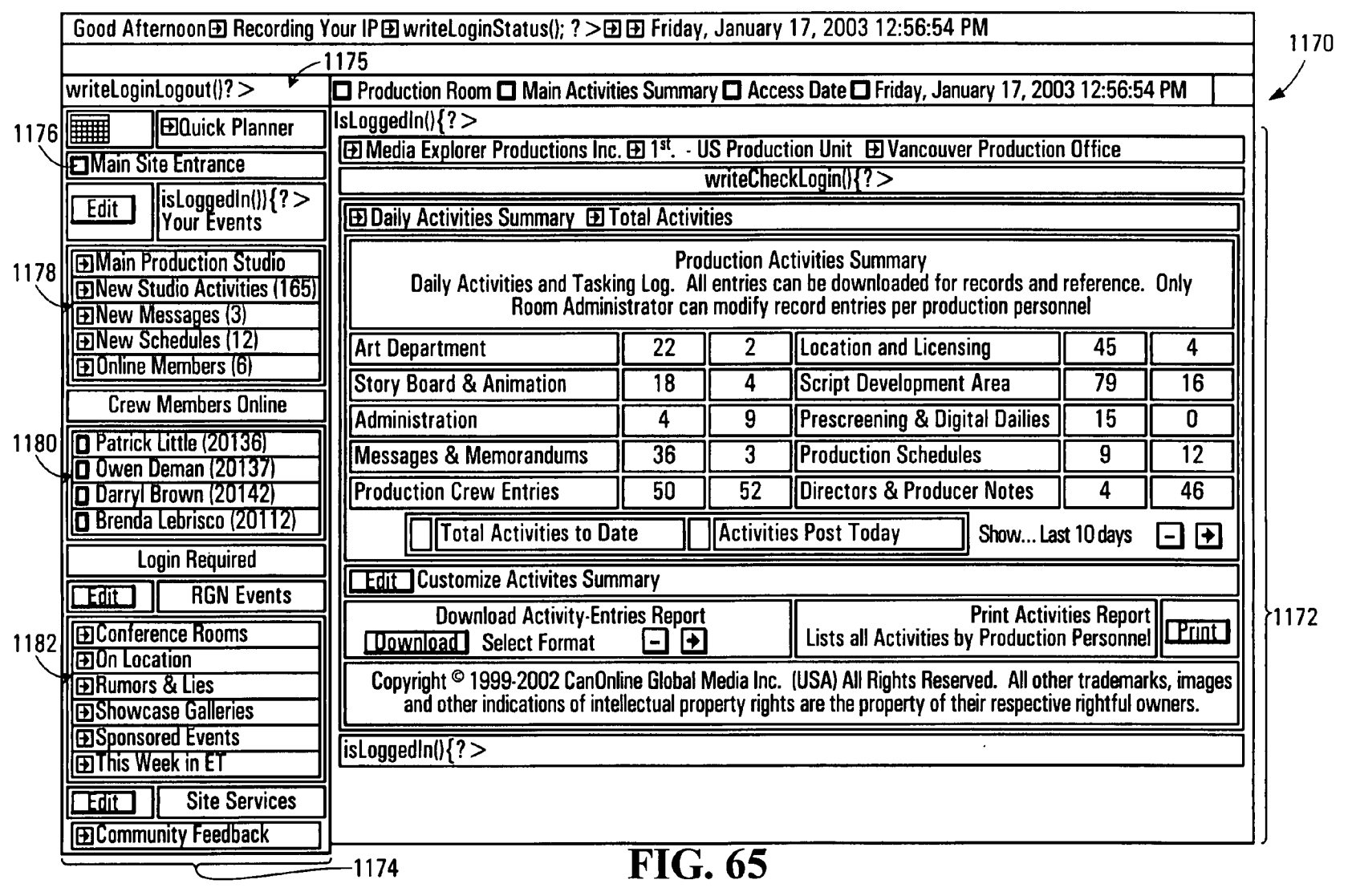

Referring back to FIG.7B, if a member clicks on the production room icon 161, an S-module that causes a display as shown at 1170 in FIG. 65 to be displayed at the communication appliance, is obtained from the management apparatus. The display 1170 is that of a production room "lobby" having a work area shown generally at 1172 and a control area shown generally at 1174.

The production room is effectively a collection of information made available to a limited list of members. The members that may have access to this information would be everyone involved in the making of a production. The information may include art department information and schedules, storyboard and animation information, administration information, location and licensing information, etc. In order to facilitate sharing this information, the production room involves the creation of a specific website associated with a particular production, the website linking to a plurality of different pages that provide for different functions such as casting, storyboard, location, script, etc. In this regard the production room includes a side panel 1175 having a main site link 1176, a collection of information links 1178, a list of members that have access to the production room 1180 and a list of general, possibly industry information links 1182. Activating the main site entrance link 1176, causes an S-module that causes a display as shown at 1184 in FIG. 66 to be displayed at the communication appliance.

FIG. 66

Figure 66:
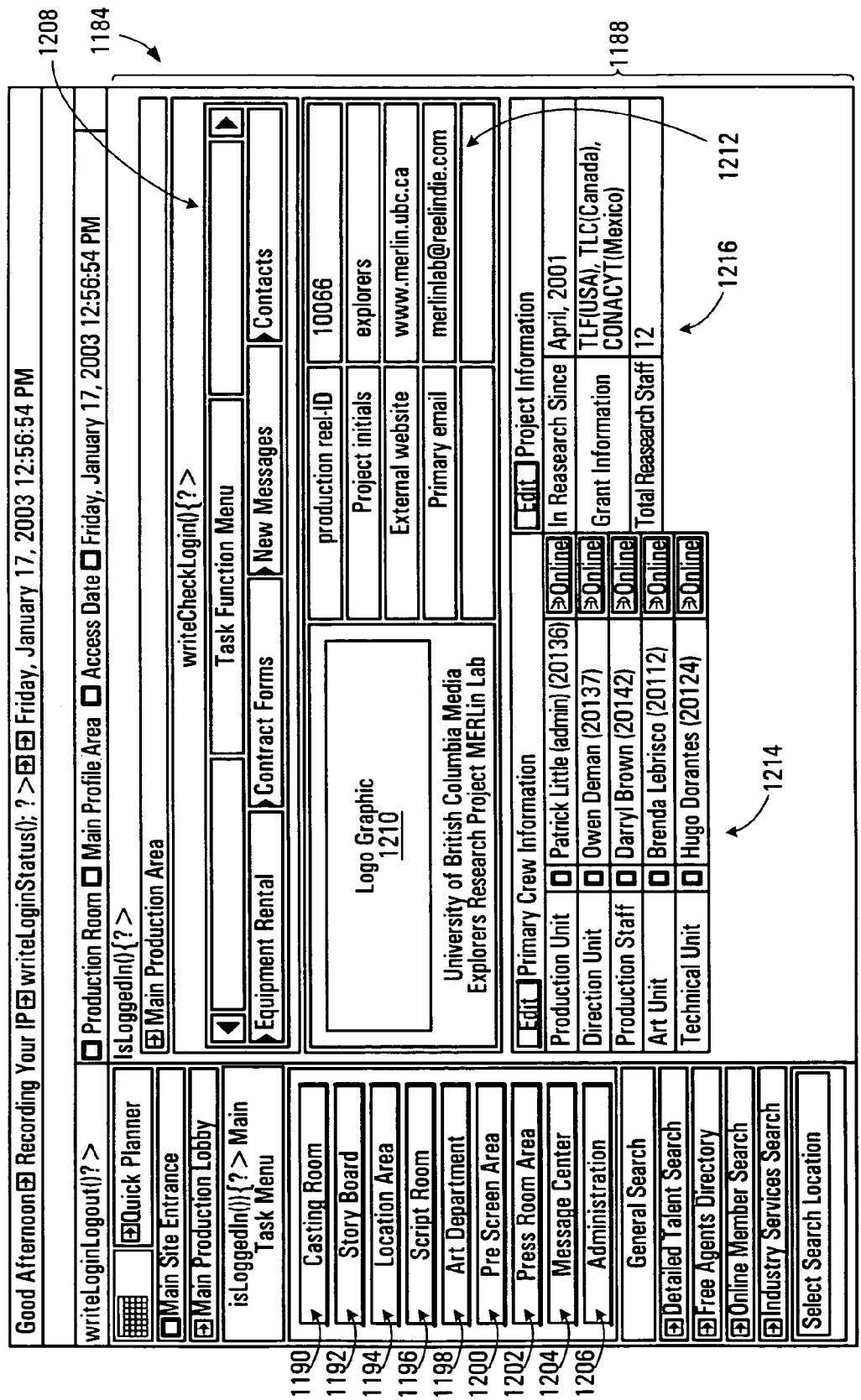
FIG. 66 is a screen shot of a production room display seen at any of the communication appliances showing an alternative control area and work area.

Referring to FIG. 66 this display 1184 includes a further control area 1186 and a work area 1188. The control area depicts various control features including providing access to a casting room 1190 for entering or viewing information relating to casting, a storyboard room 1192 for viewing or adding information relating to a storyboard, a location area room 1194, a script room 1196, an art department room 1198, a pre-screening area 1200, a press room area 1202, access to the message centre or communication functions described above 1204 and a link for access to an administration function 1206. The work area 1188 displays the website associated with the production. The opening page is shown generally at 1208 and includes a logo 1210, contact information for the production 1212, primary crew information 1214 and project information 1216.

FIG. 67

Referring to FIG. 67, the initial page 1208 may further include a summary or history of information as shown generally at 1218 and contact information 1220.

Figure 68:
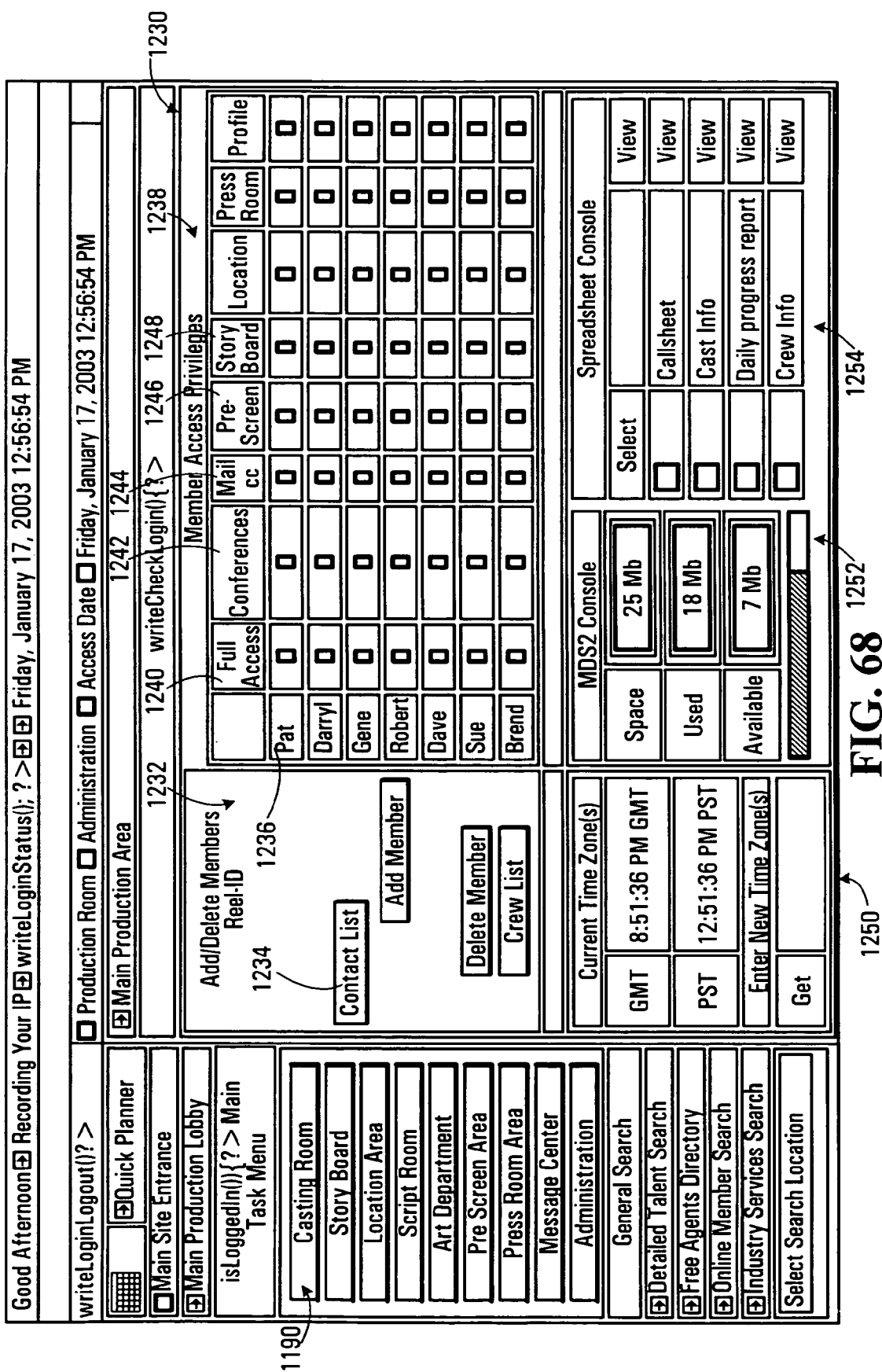
FIG. 68 is a screen shot of an administration display seen by an administrator operating any of the communication appliances for controlling additions and deletions of members in order to have access to production room functions.

Referring back to FIG. 66, control on access and other features of the website are controlled by an administration display which is shown generally at 1230 in FIG. 68.

FIG. 68

Referring to FIG. 68, the administration display 1230 includes a panel 1232 for controlling additions and deletions of members that are to have access to the website. A contact list link 1234 may be provided to cause a contact list as seen in connection with FIG. 62 to be displayed to allow selection of members to add, for example.

As members are added, their names appear in a column 1236 of a member access privileges table 1238. Further columns of this table include possible access rights including full access 1240, conferences 1242, mail 1244, pre-screen 1246, storyboard 1248 and other access levels. Each time a new name is added, the member may select access rights for the member just added. In this way, members and access rights are assigned to the project.

The work area 1230 also includes a list of times in designated areas shown generally at 1250, system usage measurements shown generally at 1252 for indicating server space used and available for the project, and further includes a spreadsheet console area 1254 that may provide immediate access to contracts and other important documents relating to the project. After members have been identified and their access has been specified using the administration menu, any of the links shown in the control area may be selected to enter information pertaining to the indicated function. For example, if the casting room link 1190 is activated, an S-module that causes a display as shown at 1260 in FIG. 69 is loaded from the management apparatus to the communication appliance.

FIG. 69

Figure 69:
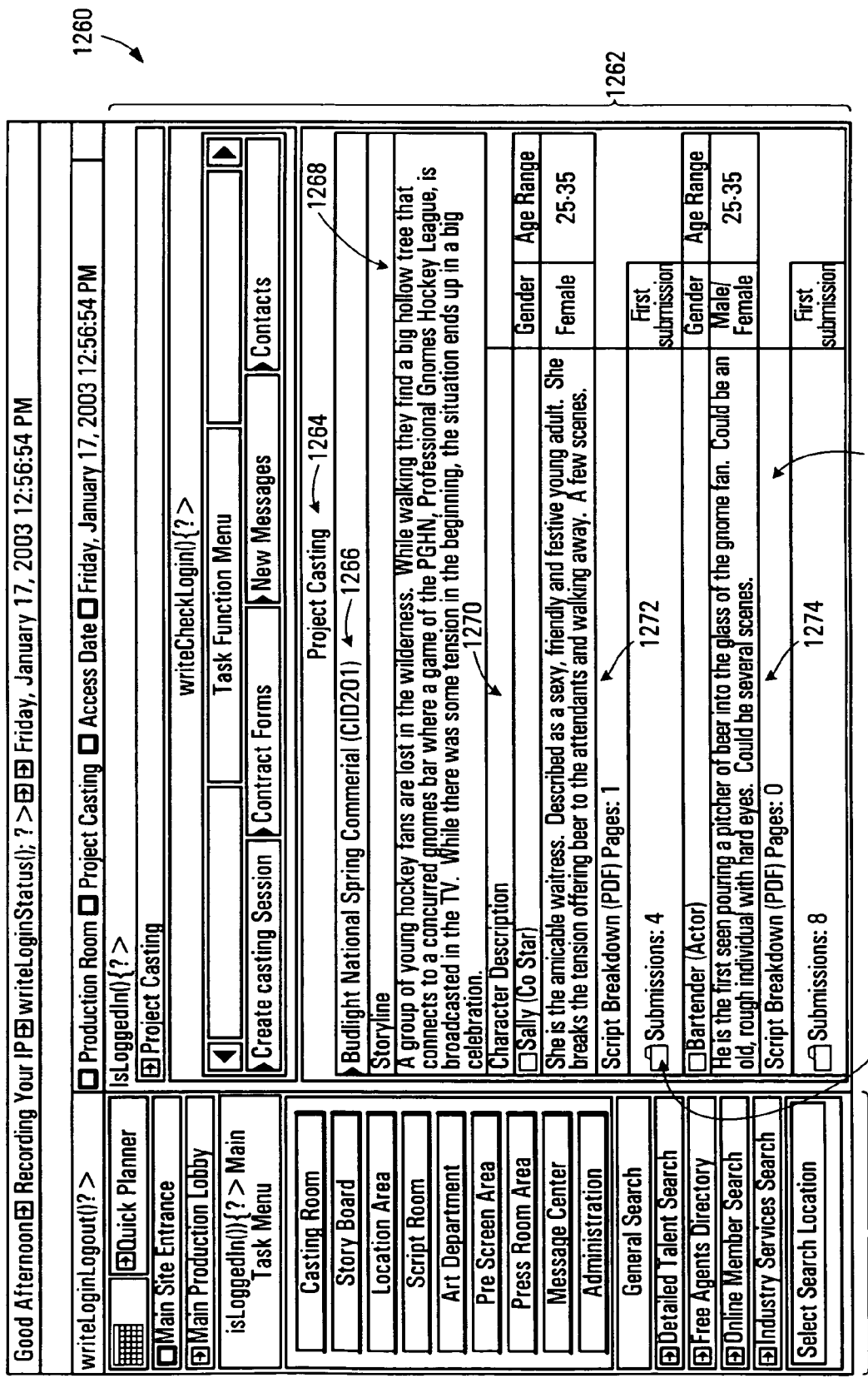
FIG. 69 is a screen shot of a production room display seen at any of the communication appliances showing a work area including project casting.

The display shown in FIG. 69 includes the same control area 1186 seen in FIG. 66 and includes a work area shown generally at 1262. In this work area 1262, information related to project casting is seen. An identification of the broad category of information is provided as seen generally at 1264. The name of the project is shown at 1266 and a brief description of the story line is provided at 1268. A description of the characters begins as shown at 1270 and includes a first character description 1272 and a second character description 1274, for example. Also associated with each character is a submissions icon shown generally at 1276 which, when activated causes an S-module that causes the display shown at 1278 in FIG. 70 to be displayed at the communication appliance.

FIG. 70

Figure 70:
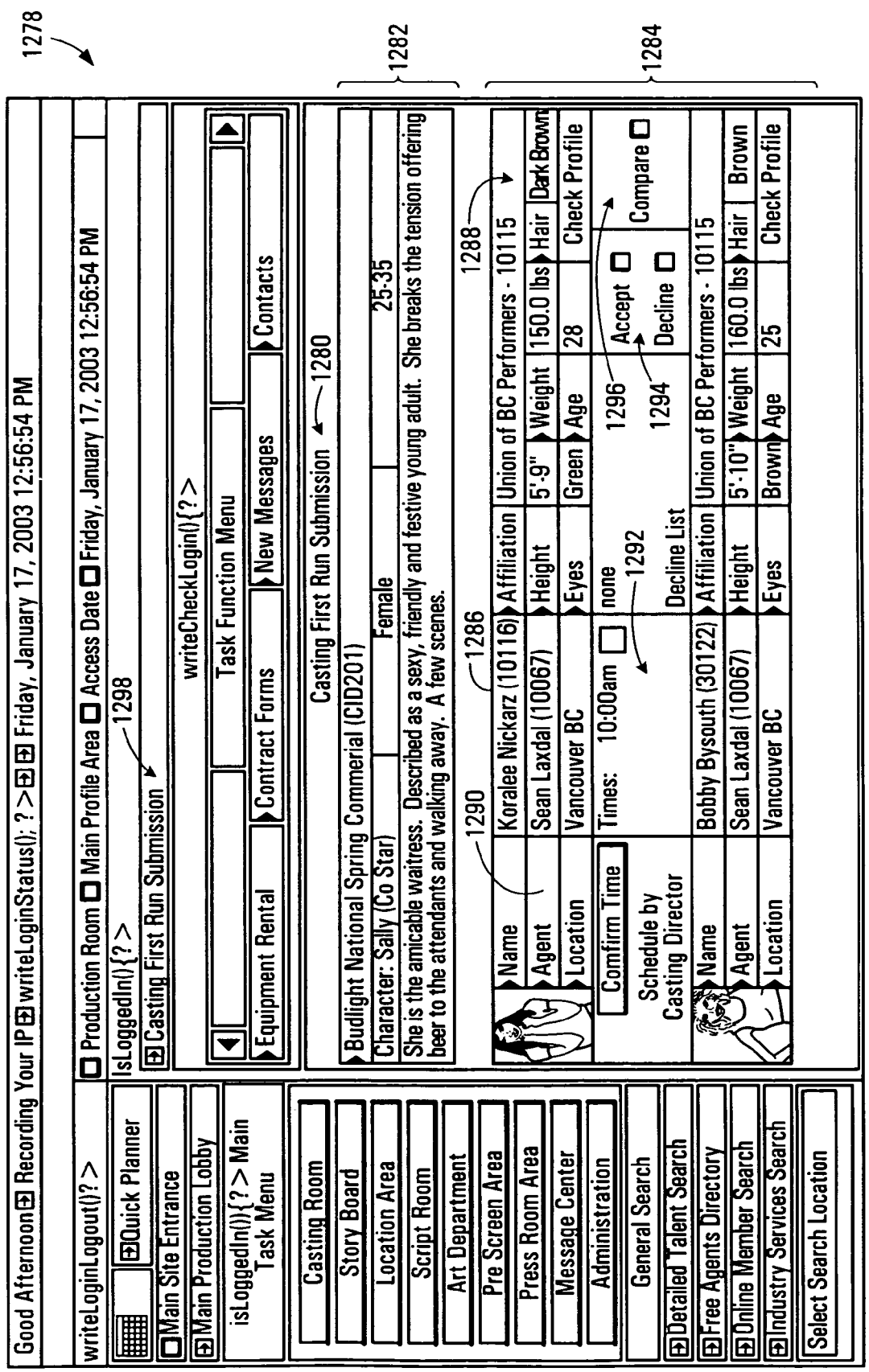
FIG. 70 is a screen shot of a display seen at any of the communication appliances depicting first run submission information for the project.

The display shown in FIG. 70 includes identification of the information as a casting first run submission as seen at 1280. This first run submission provides a brief description of the character as shown at 1282, this description being similar to that shown at 1272 in FIG. 69. However, the remainder of the display includes a plurality of actor summaries, one of which is shown at 1284. These actor summaries are obtained from packages of the type described in connection with FIG. 35, received from agents. Each performer who has been included in a package submitted to the casting director has a corresponding summary in the page shown in FIG. 70. This permits a producer to view all of the submissions for the part, in this case the part of the character "Sally", to select suitable candidates for auditions. Each summary includes basic information relating to the performer including a name 1286 and basic physical information shown generally at 1288. The summary further includes agent information 1290 and scheduling information shown generally at 1292. Each summary also includes an area shown generally at 1294 for allowing the producer to accept or decline the performer and each summary further includes a compare function 1296 that invokes a compare function similar to that shown in FIG. 41, for example.

After comparing after actuation of the compare feature 1296 shown in FIG. 70, for example, the producer may check the accept or decline boxes shown in area 1294 and may use the scheduling area 1292 to confirm a time and date for an audition, for example. After all of the prospective performers selected by the producer have been accepted and schedules arranged, the producer may activate a submit function (not shown) that causes the notification of acceptance and confirmation of time to be transmitted back to the agents and/or casting directors associated with the selected performers.

To do this, once the producer has indicated acceptance or declining of a performer, the producer may activate a submit button (not shown) that causes a notification to be posted back to the casting director. The notification takes the form as shown in FIG. 54 and allows the casting director to send individual messages back to respective agents who then schedule or contact the selected performer(s).

Referring back to FIG. 70, near the top of the main casting first run submission page, there is a link to a casting audition report page 1298 that provides a link to an audition report. On activation of this link, an S-module is obtained from the management apparatus, the S-module causing a display as shown at 1300 in FIG. 71 to be displayed at the communication appliance.

Figure 71:
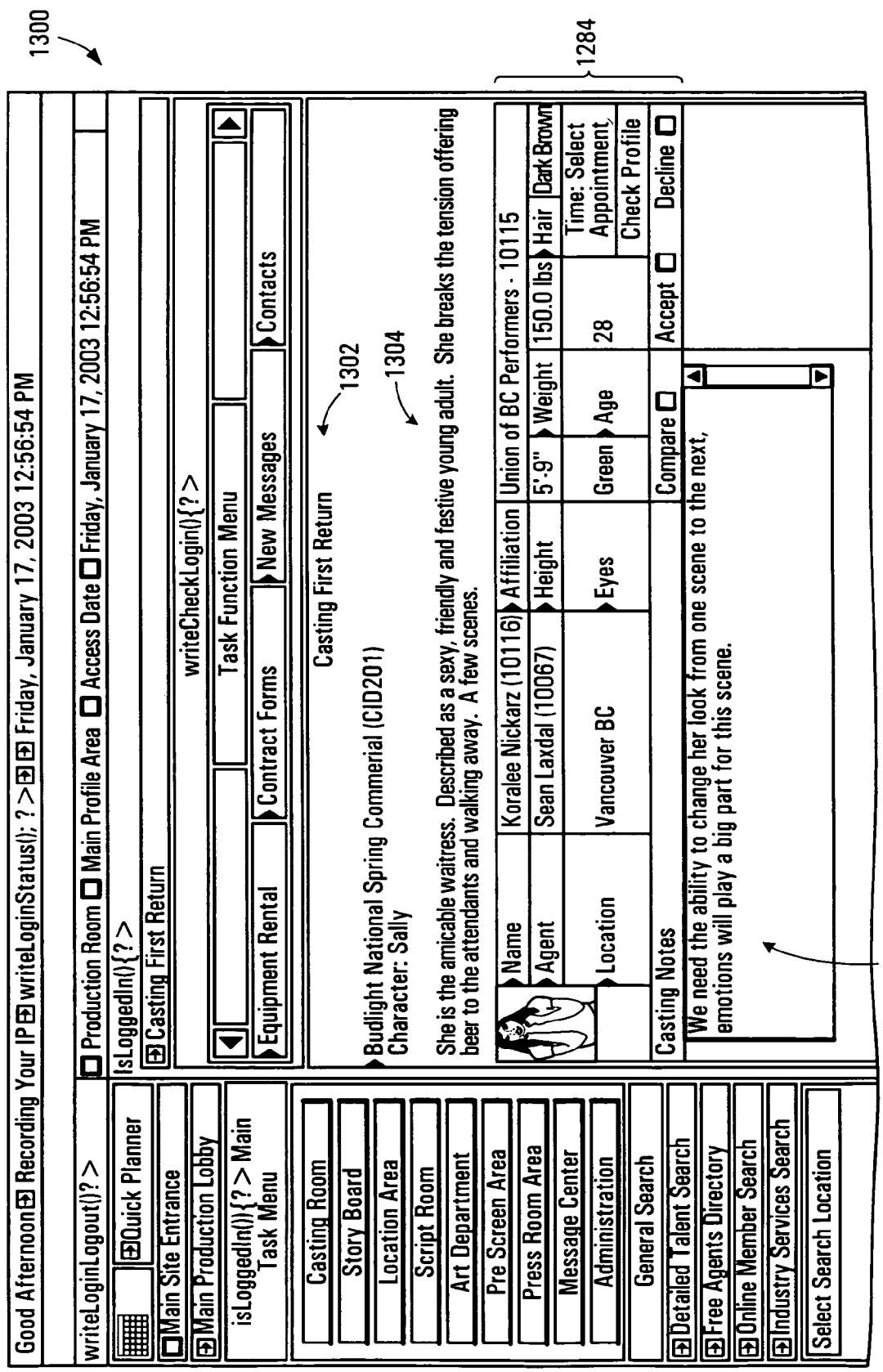
FIG. 71 is a screen shot of a display seen at any of the communication appliances showing casting first return information for the project.
Figure 71A:
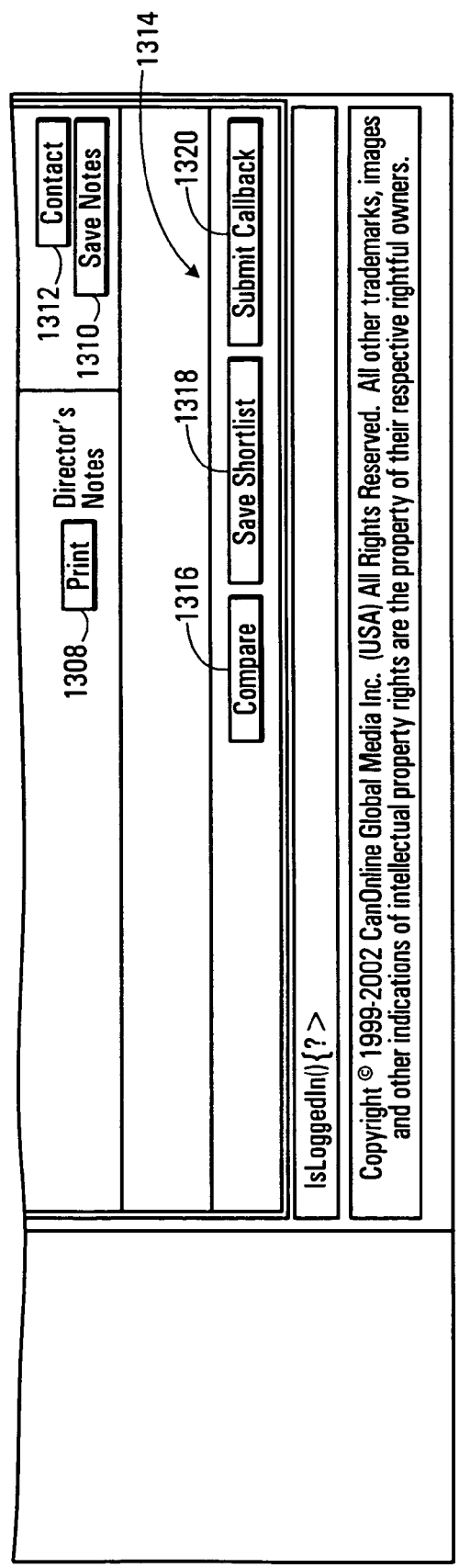
FIG. 71A is a continuation of FIG. 71.

FIGS. 71 and 71A

The display shown in FIG. 71 is entitled "casting first return" as shown generally at 1302, and provides a brief summary of the roll of the character 1304, the brief summary being the same as that shown in FIG. 70 at 1282 and that shown in FIG. 69 at1272, for example. It also shows the summaries 1284 for each performer, but includes a casting notes area shown generally at 1306 that allows the producer or director to add notes relating to the audition of the associated performer. As shown in FIG. 71A, the display also includes a print feature 1308 allowing printing of the summary and director added notes, a save function 1310 allowing the director to save the indicated notes and a contact agent function 1312 allowing the director to immediately contact the agent.

The display shown in FIG. 71 may continue for a number of pages, for example, and may terminate with a screen lower portion as shown generally at 1314 in FIG. 71A. This includes a compare function 1316 allowing the director to compare the summaries of two performers in the manner shown in connection with FIG. 41, for example, and further includes a save shortlist function 1318 that allows the director to save a shortlist of only those performers who have been accepted.

The display may also include a submit call back function 1320 that causes the performer summaries, including notes entered by the director, to be transmitted back to the casting director for subsequent transmission back to the performers agents and hence the performer.

The director may enter the casting room to use the displays and functions shown in connection with FIGS. 70, 71 and 71A many times to allow for first, second, third or any number of runs of casting call backs until a desired complement of performers has been agreed upon to perform in the production.

Figure 72:
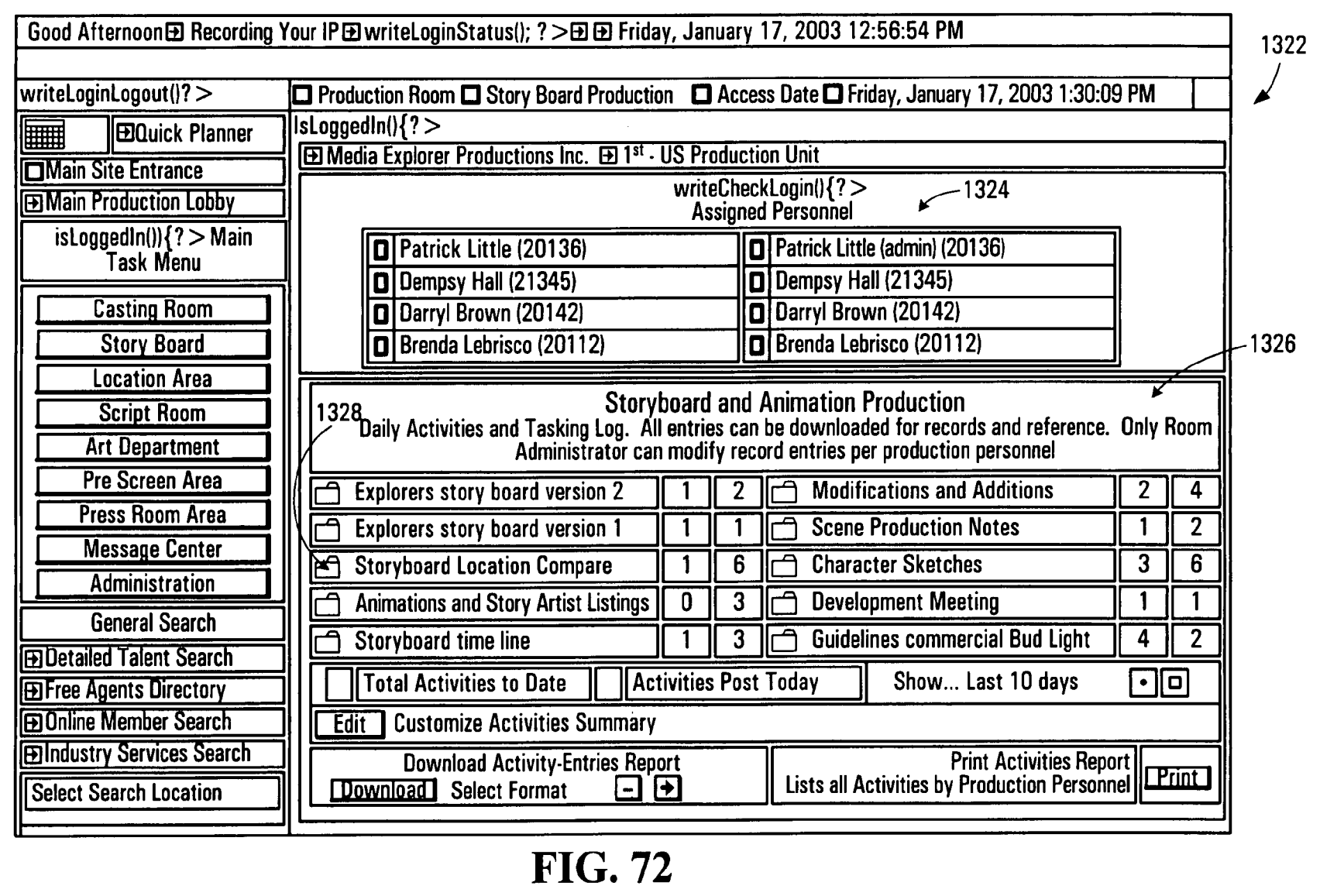

Referring back to FIG. 66, any designated member having access to the storyboard function 1192 may activate such function to cause an S-module that causes a display as shown at 1322 in FIG. 72 to be displayed at a communication appliance.

FIG. 72

The display shown in FIG. 72 includes an assigned personnel area 1324 that displays the names of personnel having access to the storyboard area of the website associated with the production. The storyboard main display 1322 also includes a summary area 1326 that displays activities associated with the storyboard function of the production. One of these activities includes a storyboard location compare function as shown generally at 1328 which when activated causes an S-module to be obtained from the management apparatus, the S-module causing a display as shown at 1330 in FIGS. 73A and 73B to be displayed at the communication appliance.

Figure 73A:
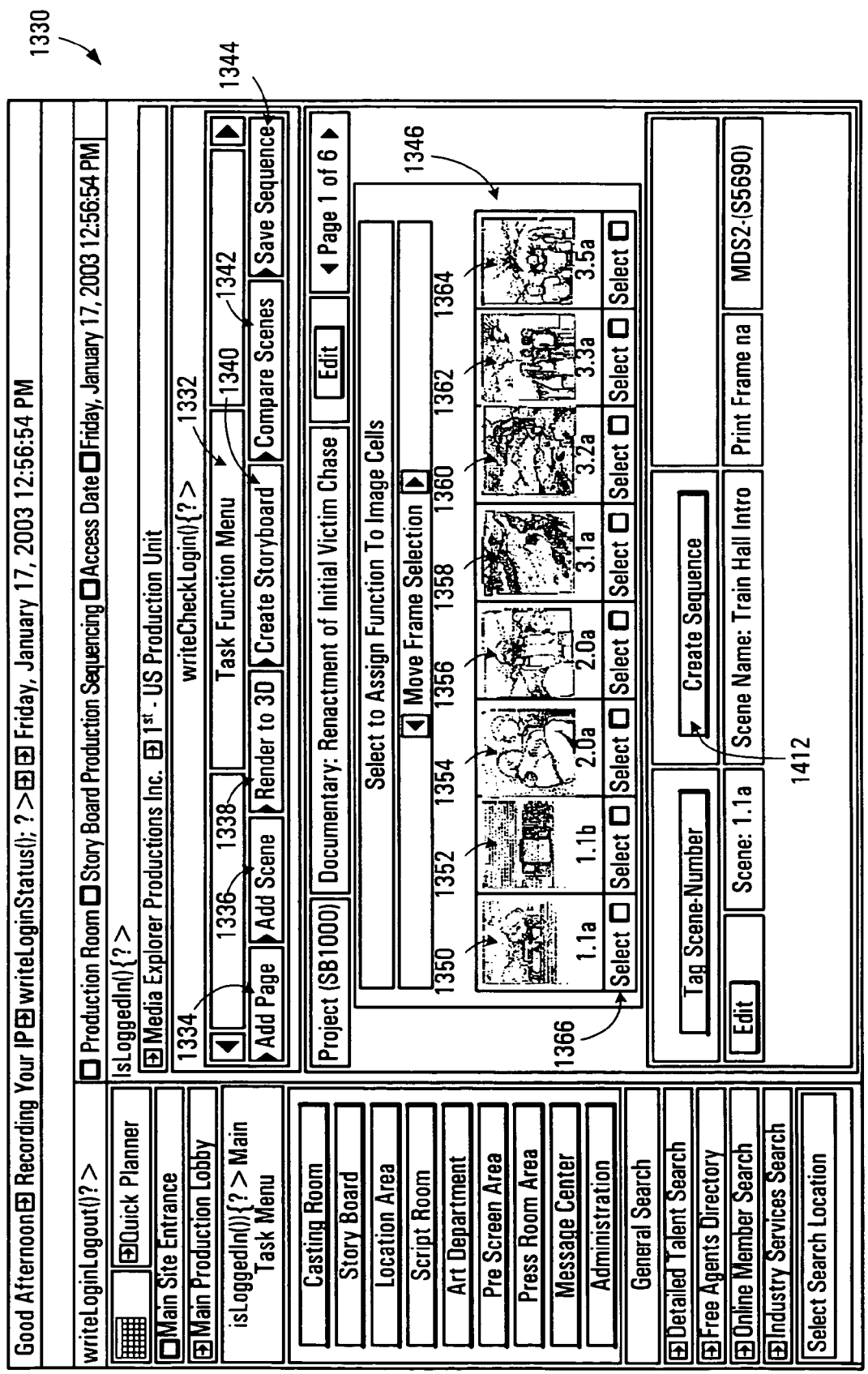
FIG. 73A is a screen shot of a display seen at any of the communication appliances showing markers to individual scenes of the production.
Figure 73B:
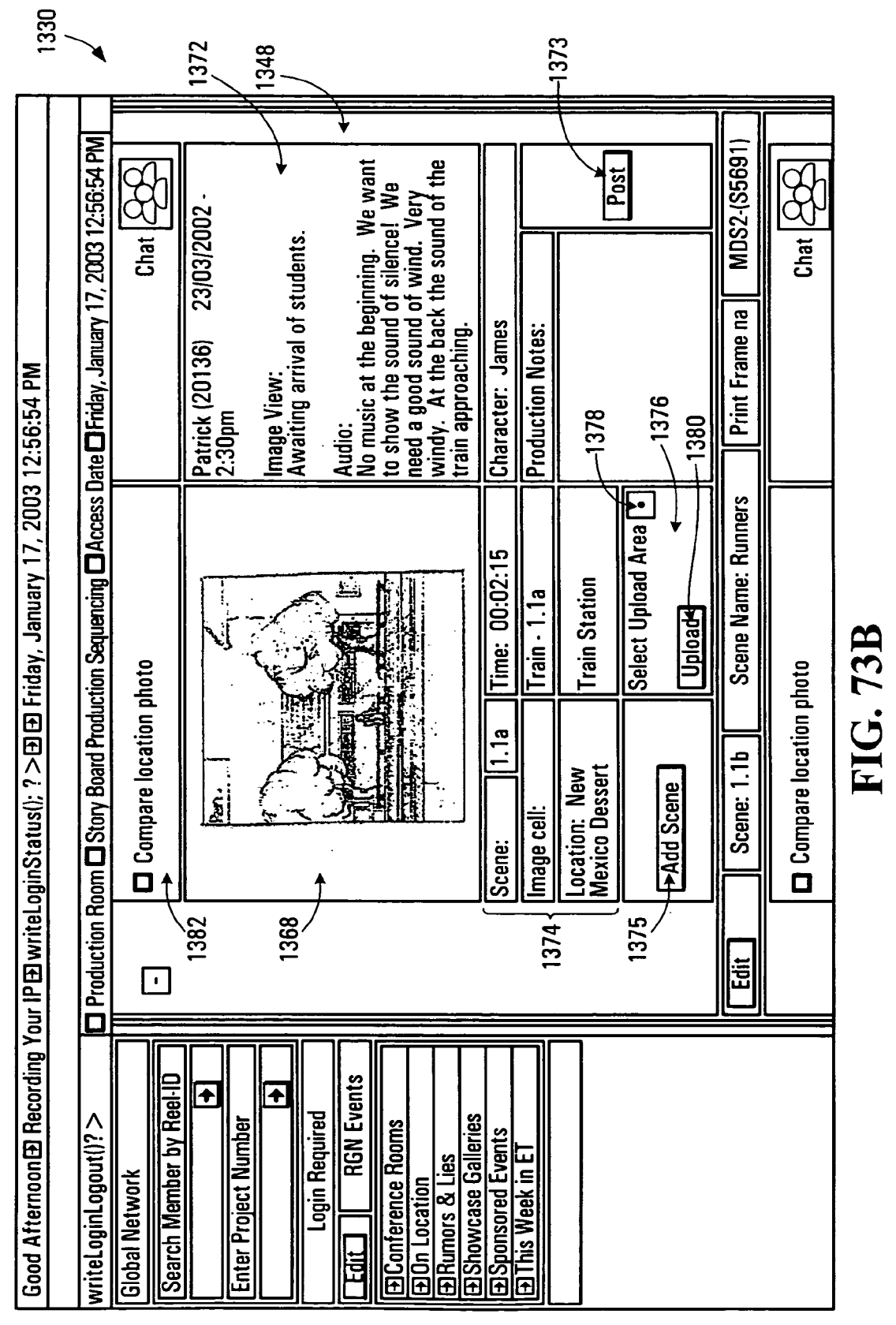

FIGS. 73A and 73B

Referring to FIGS. 73A and 73B, a task function menu is shown generally at 1332 and includes an add page function 1334 and add scene function 1336, a render to 3D function 1338, a create storyboard function 1340, a compare scenes function 1342 and a save sequence function 1344. Assuming the member has selected the compare scenes function 1342, a storyboard display view 1346 is shown followed by a storyboard detail panel 1348. The storyboard 1346 is seen as a succession of drawings 1350, 1352, 1354, 1356, 1358, 1360, 1362 and 1364, each identified by a respective number and each having a select feature only one of which is identified at 1366. Thus, the member may select an indicated storyboard drawing such as 1350 for viewing in detail. A detail view of the selected drawing 1350 is shown at 1368 in FIG. 73B and is associated with a detailed description of the scene to be based on the drawings and other information 1374 describing the scene.

Further textual information may be added to the area 1372 using a post function 1373. Initially, the image area 1368 and the text area 1372 and other information relating to the scene is blank, however, scene drawings may be uploaded by first requesting the addition of a scene using feature 1375 and then accessing an upload area 1376 where a location from which to upload a drawing for the storyboard may be identified by drop-down box 1378 and an upload button 1380 may be activated to load the drawing into the project. If a corresponding location photo is available, the member may activate a compare location photo feature 1382 that allows actual footage to be compared with the image 1368. Activating the compare location feature 1382 causes an S-module to be obtained from the management apparatus to cause a display as seen at 1383 in FIG. 73C to be displayed at the communication appliance.

FIG. 73C

Figure 73C:
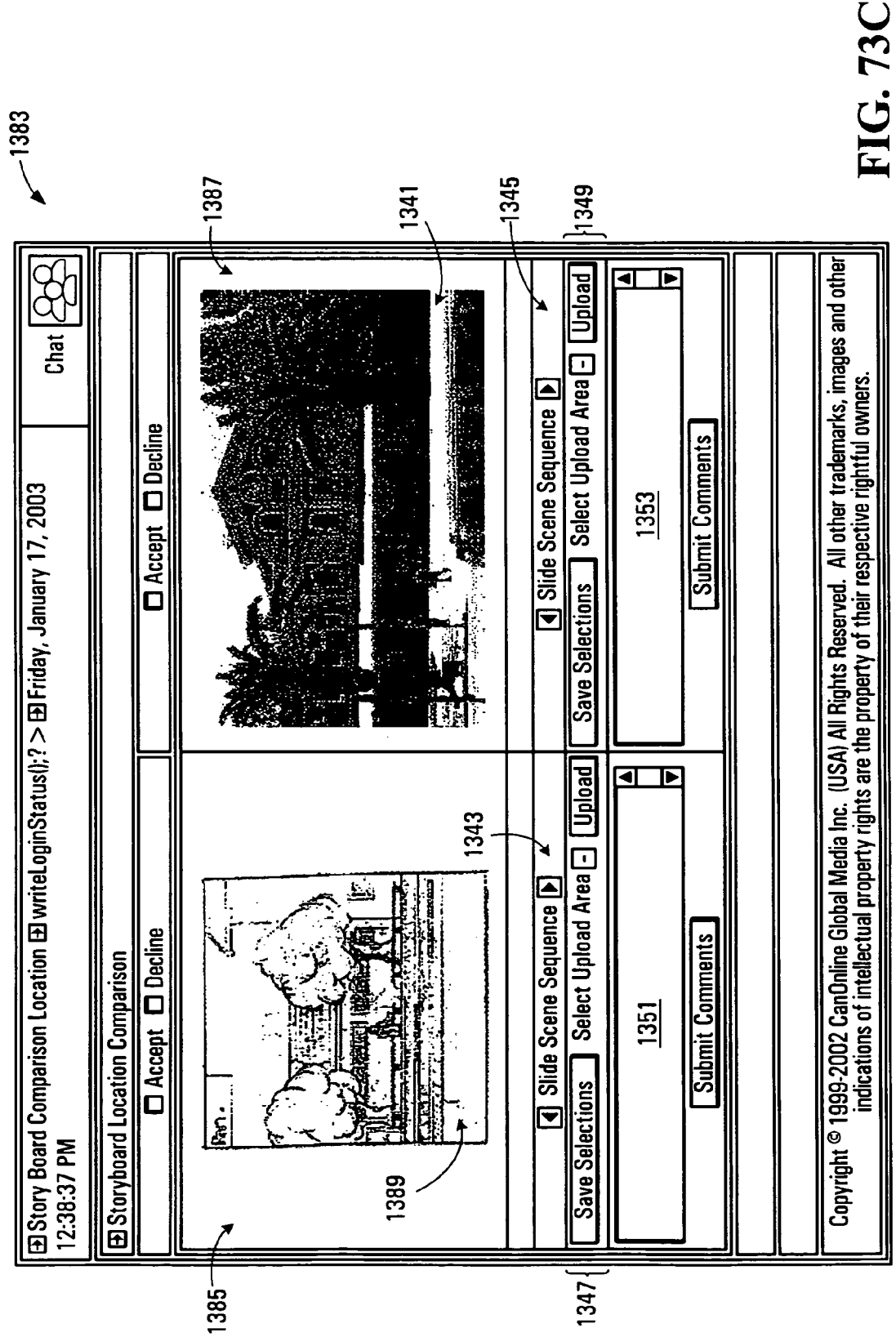
FIG. 73C is a screen shot of a storyboard comparison display seen at any of the communication appliances enabling an operator to compare storyboard scenes with actual footage scenes.

Referring to FIG. 73C, the display 1383 includes first and second vertical half portions 1385 and 1387 having areas 1389 and 1341 for displaying a storyboard frame and a photograph of the location depicted in the storyboard. Both half portions also include scene sequence controls 1343 and 1345, upload and save controls 1347 and 1349 for facilitating uploading of storyboard images and corresponding photos and comments areas 1351 and 1353 for receiving comments for the current storyboard image and photo respectively.

Figure 74:
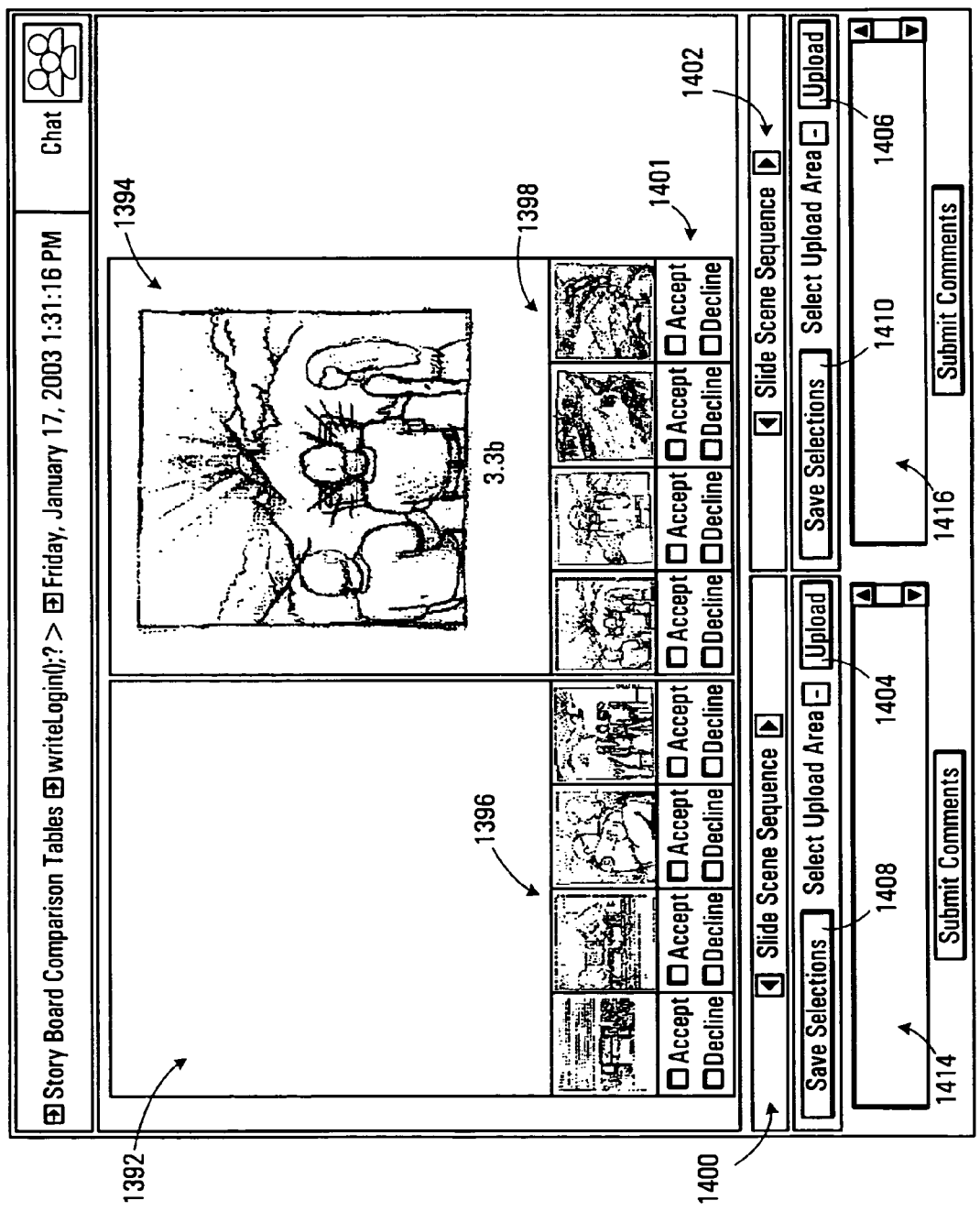
FIG. 74 is a screen shot of a display seen at any of the communication appliances showing a storyboard comparison feature.

Referring back to FIG. 73A, should the member select the compare scenes feature 1342, an S-module is obtained from the management apparatus to cause a display as shown at 1390 in FIG. 74 to appear at the communication appliance.

FIG. 74

The display shown in FIG. 74 includes a split screen area including a first area 1392 and a second area 1394. Beneath each area a series of thumbnail views 1396 and 1398 of storyboard scenes from the project is provided, each with its own forward and backward sequence controls 1400 and 1402, respectively, Thus, each area provides independent forward and backward traversing through the storyboard. In this way, separate scenes may be selected for comparison in the larger format shown in the areas 1392 and 1394 to allow a person compiling the storyboard to compare and select appropriate scenes. New scenes may be added by using the upload feature 1404 and 1406 associated with respective areas 1392 and 1394 and selections or individual images may be made using the accept and decline features indicated generally at1401. Once selections have been made, a save selections buttons 1408 and 1410 may be activated. The above feature allows two separate storyboards to be compared and produced.

Referring back to FIG. 73A, a create sequence function 1412 may be activated to cause the scenes of a particular version of the production to be shown in sequence so the storyboard writer can get a feel for the succession of scenes he has selected. Referring to FIG. 74, each of the areas associated with the different versions of the production may be terminated in respective areas 1414 and 1416 in which comments relating to each scene may be provided.

It will be appreciated that 3D renderings such as wire frames or shaded objects, for example, may be treated in the same way as storyboard images to allow for comparison and selection by the director.

Figure 75:
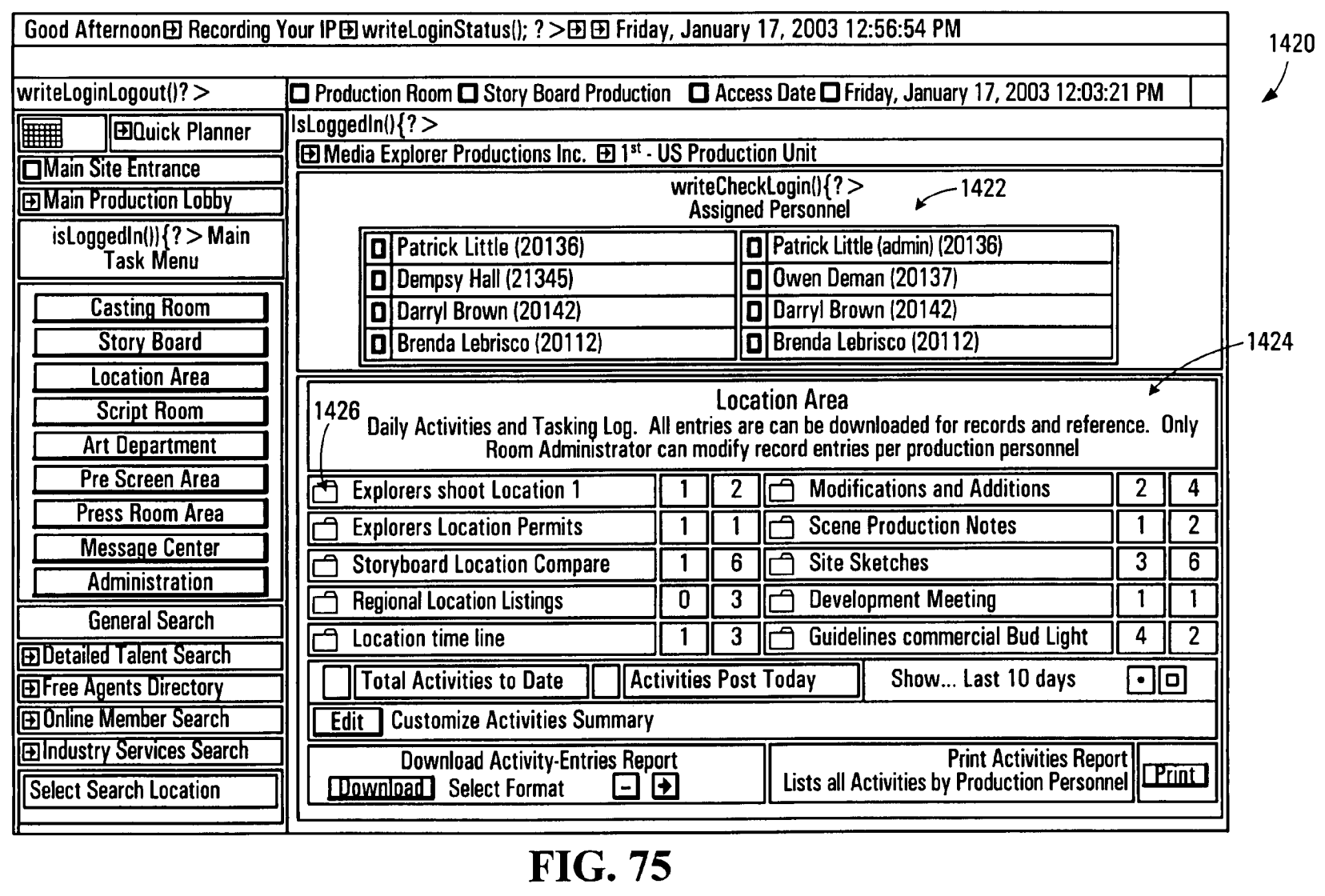

Referring back to FIG. 66, if an authorized member activates the location area function 1194, an S-module is obtained from the management apparatus to cause a display as shown at 1420 in FIG. 75 to be displayed at the communication appliance.

FIG. 75

The display shown in FIG. 75 is similar to that shown in FIG. 72 in that it indicates assigned personnel that have access to location information, as shown at 1422 and includes a location summary area 1424 that summarizes main categories of information relating to film shooting locations.

One of the features of the location area screen 1424 includes a function for accessing scenes shot at a first location, for example. This function is accessed by clicking on an icon 1426. Clicking on this icon causes an S-module that causes a display as shown at 1430 in FIG. 76 to be displayed.

FIG. 76

Figure 76:
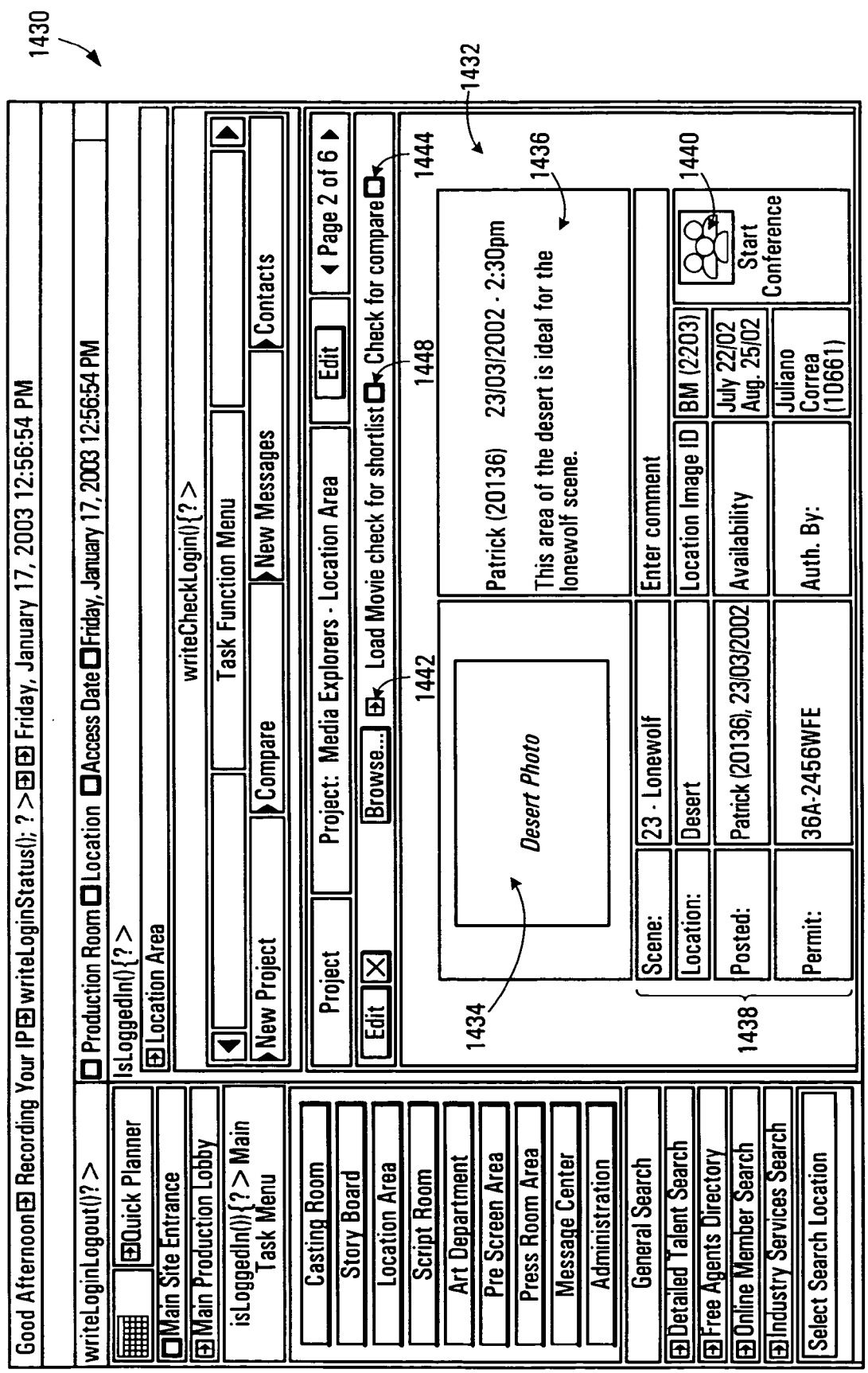
FIG. 76 is a screen shot showing a display seen at any of the communication appliances depicting a plurality of location summaries for the project.

The display shown in FIG. 76 includes a plurality of location summaries, one of which is shown at 1432, each having a link to video footage shown generally at 1434 and having a description area 1436 and a basic information area shown generally at 1438. A start conference function 1440 is also provided for initiating a conference function as described above in connection with the communications features initially described in connection with FIG. 55. Camera operators may capture video and load it up to the management apparatus using a load feature 1442 which effectively involves loading a digital video file from a location on the communication appliance up to the management apparatus using an unstructured data write request. The image seen in the area 1434 may simply be a first frame of a movie clip associated with the scene.

FIG. 77

A compare feature is provided as shown generally at 1444 in FIG. 76. The compare feature causes an S-module to be obtained from the management apparatus to cause a display as shown at 1446 in FIG. 77 to be displayed. This feature is similar to that described in connection with comparing storyboard images in connection with FIG. 74. The difference being that instead of storyboard images, different versions of the movie can be viewed.

Figure 77:
FIG. 77 is a screen shot of a comparison display seen at any of the communication appliances for comparing different versions of a film.

Referring back to FIG. 76, a shortlist feature 1448 is provided for showing a list of movie clips that have been shortlisted through acceptance or declination in the display shown at 1446 in FIG. 77.

Figure 78:
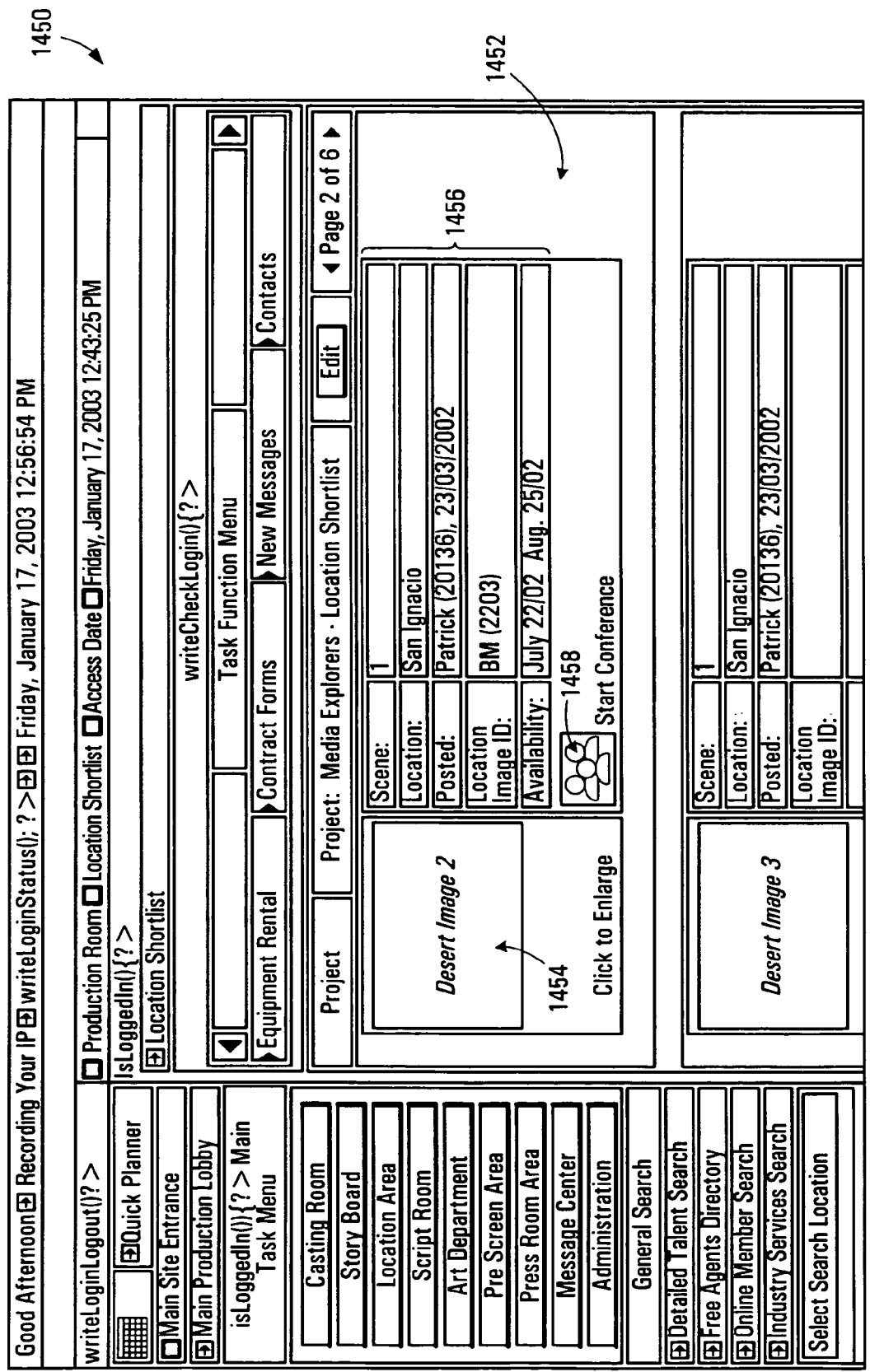
FIG. 78 is a screen shot of a display seen at any of the communication appliances showing a plurality of scene summaries of the project.

On activation of the shortlist feature 1448 in FIG. 76, an S-module is obtained from the management apparatus to cause a display as shown at 1450 in FIG. 78 to be displayed at the communication appliance.

FIG. 78

FIG. 78 depicts a plurality of scene summaries, one of which is shown at 1452 including an image 1454 associated with the scene and basic image information as shown generally at 1456. Each summary 1452 also includes a start conference link 1458 that allows the director to start a conference using the communications features described above between selected members to allow them to discuss and collaborate on the scene. In particular, each person involved in the conference can view the clip identified by area 1454 and can provide comments to each other attendee. In this way, everyone involved in selecting scenes shot at a particular location can collaborate to select the best scenes for the production.

Figure 79:
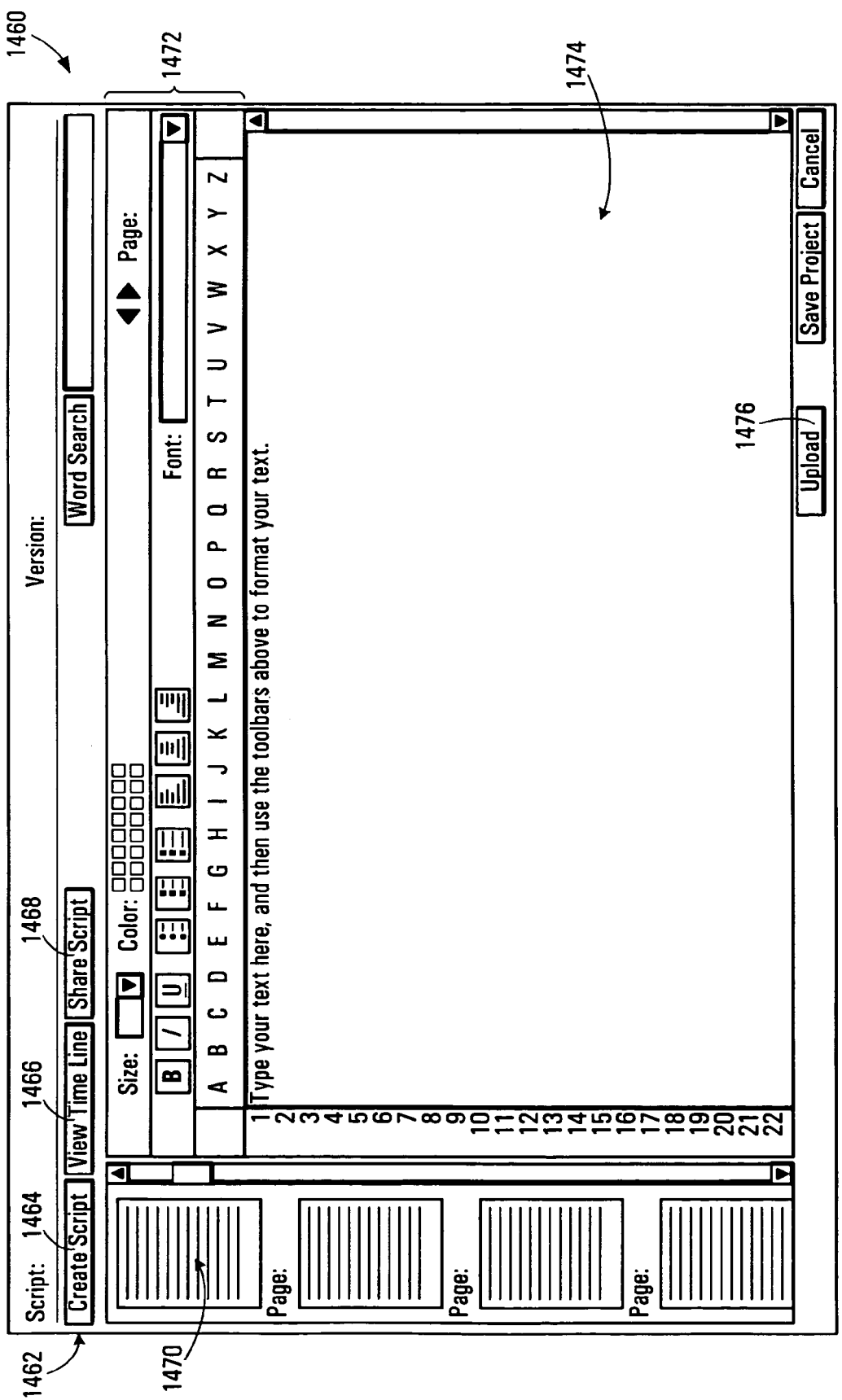
FIG. 79 is a screen shot of a script room display seen at any of the communication appliances for allowing a member to create and show a script with others.

Referring back to FIG. 66, if a member activates the script room icon 1196, an S-module is obtained from the management apparatus to cause a display as shown at 1460 in FIG. 79 to be displayed at the communication appliance.

FIG. 79

Referring to FIG. 79, the script room display 1460 includes a top menu 1462 that includes a create script function 1464, a view timeline function 1466 and a share script function 1468 for allowing a member to create and share a script with others and for easy reference to a timeline related to the production. Representations of pages of the script are shown generally at 1470 in a left-hand menu area to facilitate easy selection of pages to view. A word processing control area 1472 is provided for enabling basic word processing functions and a text input area is shown generally at 1474 for allowing the member to enter text relating to the script. Documents initially created in other word processing formats such as Microsoft Word™, for example, may be uploaded into the work area 1474 using an upload function 1476.

Figure 80:
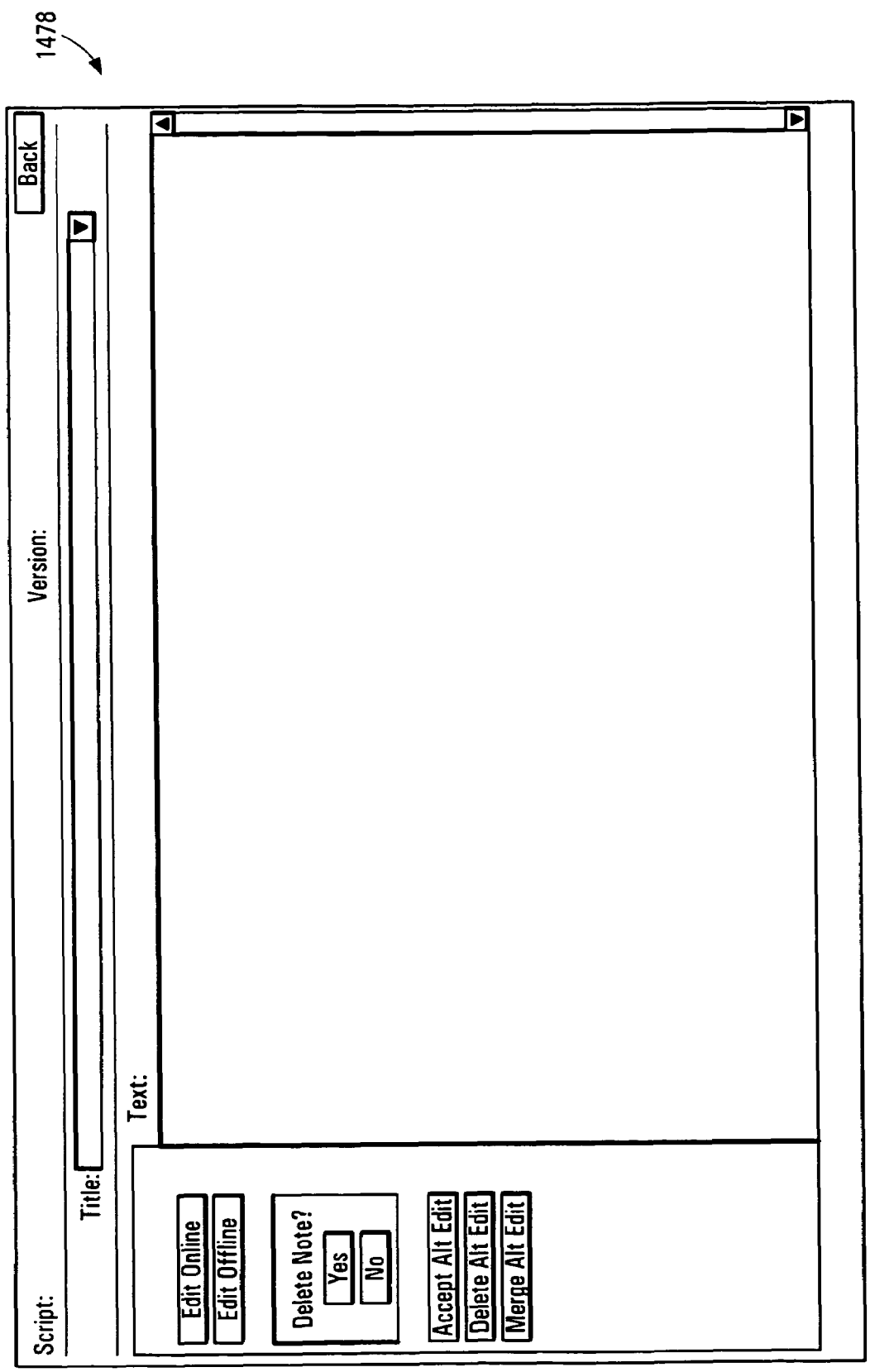
FIG. 80 is a screen shot of a text document sharing display seen at any of the communication appliances as an alternative to that shown in FIG. 63.

If the share script function 1468 is activated, a display as shown at 1478 in FIG. 80 is available to all members who have access to the script function.

FIG. 80

The display shown in FIG. 80 at 1478 functions in a manner similar to that disclosed in connection with FIG. 63 above.

Figure 81:
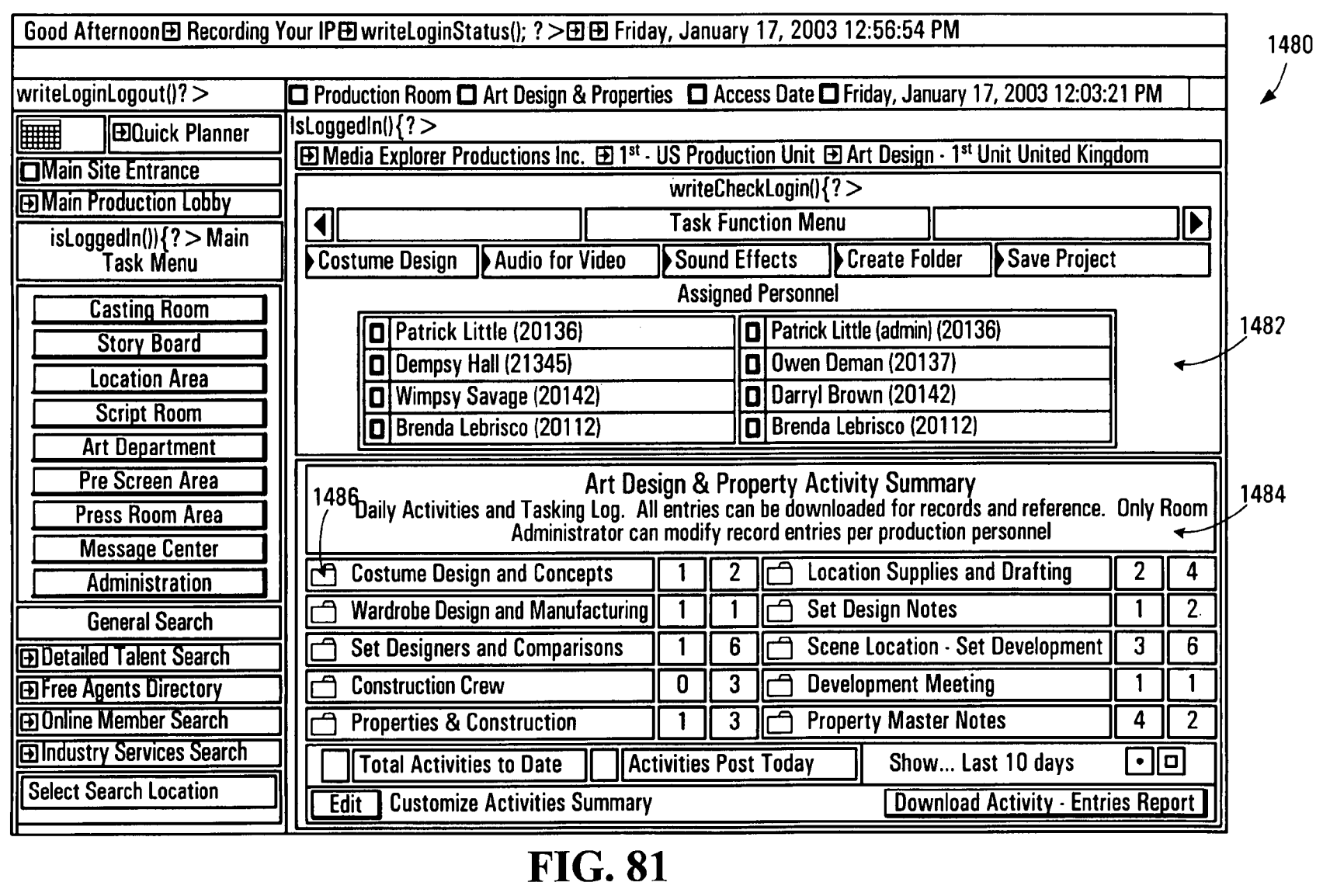

Referring back to FIG. 66, if the member selects the art department function 1198, an S-module is obtained from the management apparatus to cause a display as shown at 1480 in FIG. 81 to be displayed at the communication appliance.

FIG. 81

The display shown in FIG. 81 is similar to that shown in FIGS. 72 and 75 in that it includes an indication of assigned personnel as shown generally at 1482 and includes a summary of art design and properties shown generally at 1484. One of these activities includes costume design and concepts and this activity is associated with an icon 1486 which when activated causes an S-module to be obtained from the management apparatus to cause a display as shown at 1488 in FIG. 82 to be displayed at the communication appliance.

FIG. 82

Figure 82:
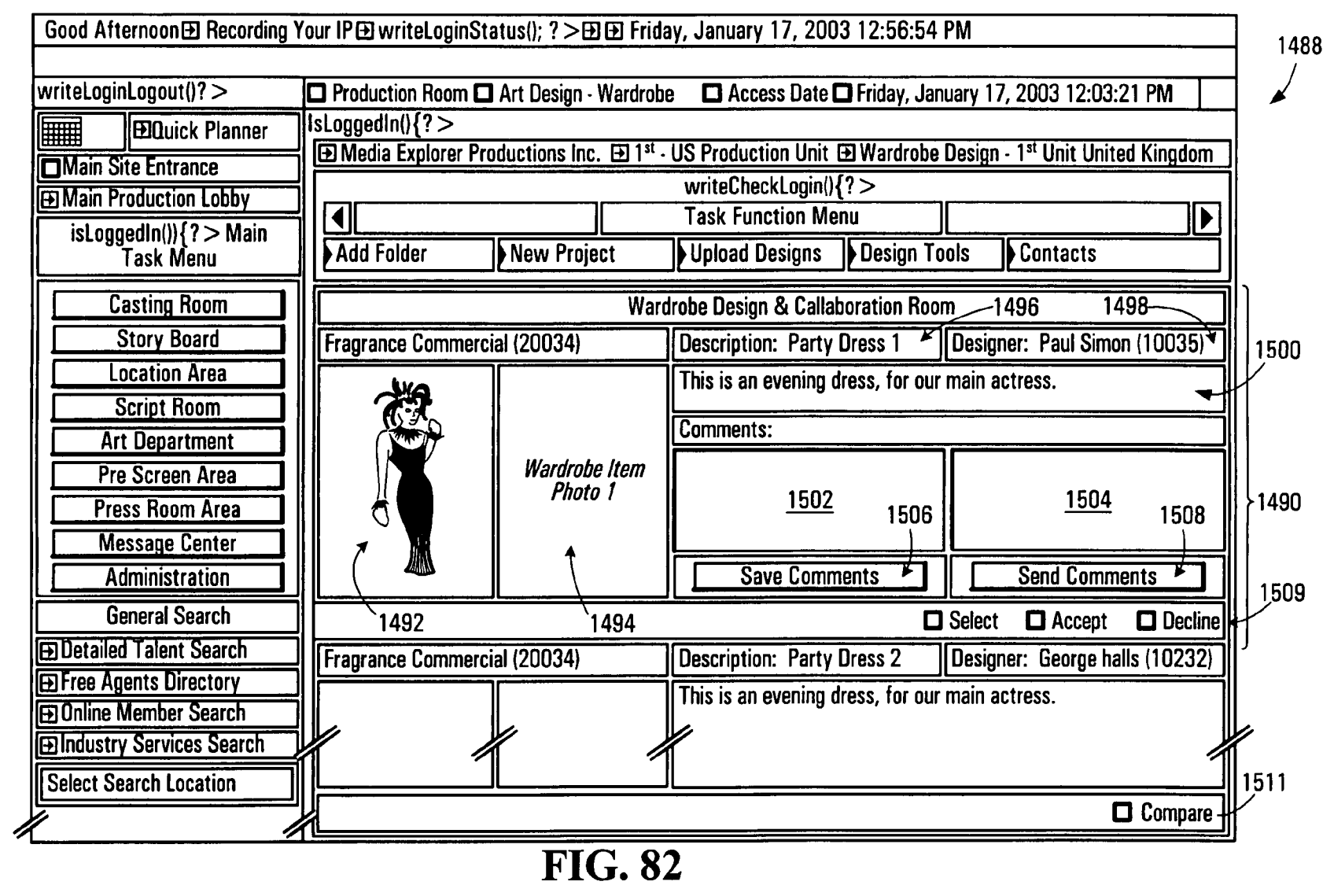

The display shown in FIG. 82 includes a plurality of wardrobe summaries, one of which is shown at 1490. The wardrobe summary includes an artist's rendering of a wardrobe item 1492 and includes a picture of a model wearing the wardrobe item 1494. It also includes a brief description 1496 and identification of the designer 1498. It also includes some brief notes 1500 relating to the type of wardrobe item and its use and includes a private comments area 1502 and a public comments area 1504. Private comments may be saved using a save feature associated with the summary 1506 and public comments may be sent using a send comments feature 1508 associated with the summary 1490. In effect, a plurality of different wardrobe items may be displayed using multiple pages, each allowing the director to compare the artist rendering of the wardrobe item with an actual picture of the wardrobe item and allowing for him to review various comments.

Still referring to FIG. 82, each of the wardrobe summaries 1490 includes select, accept and decline functions shown generally at 1509. The entire list of wardrobe summaries 1490 concludes with a compare function 1511. A viewer of the summaries 1490 may use the select function 1509 to select certain wardrobe summaries for comparison and then actuate the compare function 1511 to cause an S-module to be obtained from the management apparatus to cause a display as shown at 1513 in FIG. 83 to be seen at the communication appliance.

FIG. 83

Figure 83:
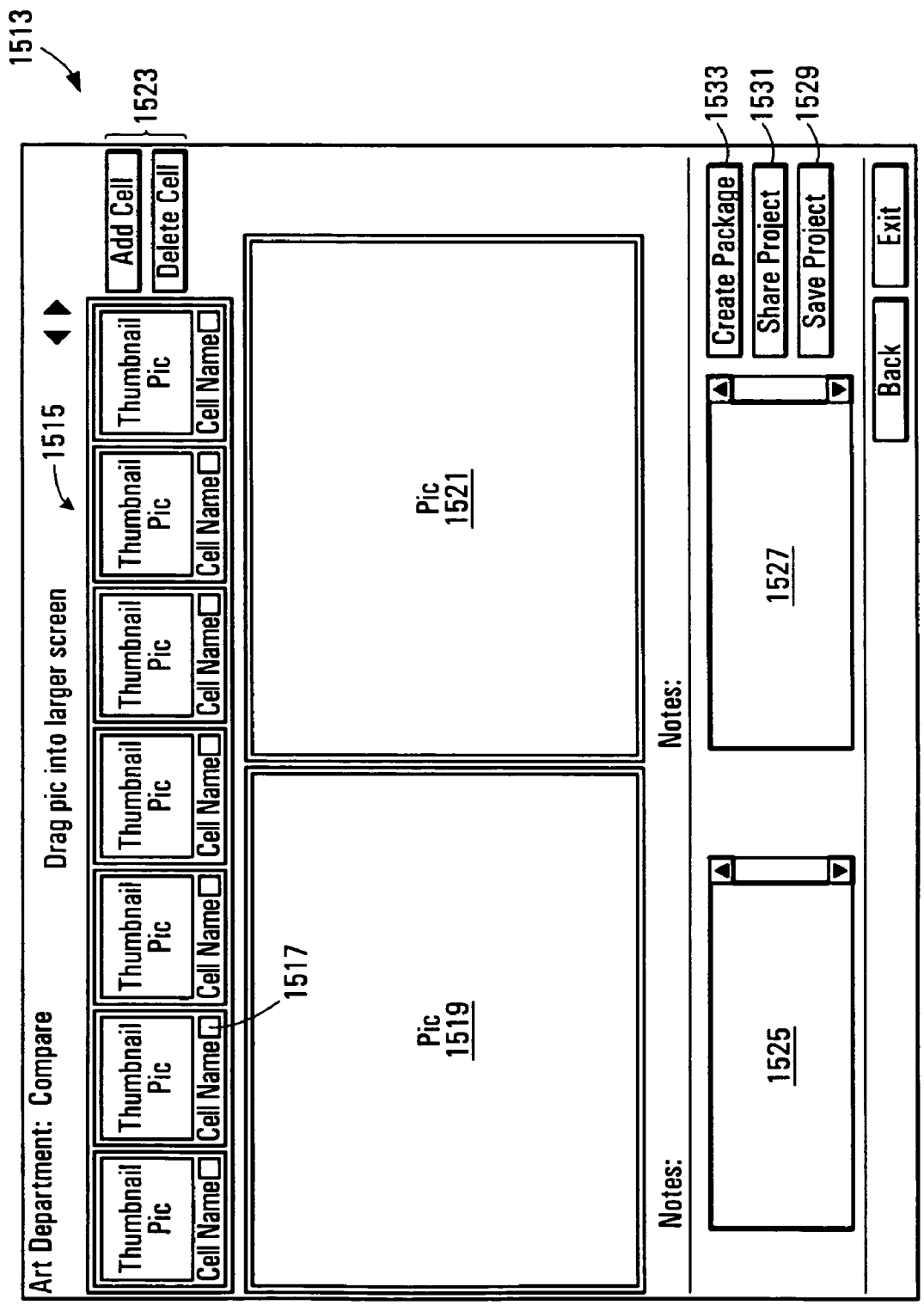
FIG. 83 is a screen shot of a display seen at any of the communication appliances showing artists' renderings for wardrobe that permits comparison of different artists' renderings.

Referring to FIG. 83, the display shown at 1513 includes a strip shown generally at 1515 of thumbnail views of the artist's renderings 1492 (FIG. 82) associated with respective wardrobe summaries 1490 (FIG. 82). All of the wardrobe summaries on which the select function shown generally at 1509 (FIG. 82) has been activated appear in respective cells of the strip 1515. Each cell is associated with a select function 1517 and any given cell can be selected or dragged into a first or second main viewing areas 1519 and 1521, respectively. The viewing areas 1519 and 1521 provide for comparison of pictures in the respective areas. Cells may be added or deleted from the strip 1515 using add and delete functions shown generally at 1523. Notes relating to the comparison may be entered in association with the respective areas 1519 and 1521, as indicated at 1525 and 1527, respectively.

The select functions associated with respective cells in the strip 1515 may be used to select particular wardrobe summaries for inclusion in a "package".

The display 1513 includes a save project function 1529 which when activated causes all of the wardrobe summaries that have been selected to be saved as a collection or project. The display 1513 further includes a share project function 1531 that provides a link to the communication centre to allow the member to share the selected wardrobe summaries with another party for collaboration, for example, on picking desirable summaries for inclusion in a package. The display 1513 further includes a create package function 1533 which when actuated causes an S-module to be obtained from the management apparatus to cause a display as shown in FIG. 35 to appear at the communication appliance to permit the member to send the project as a package to a desired recipient, as described in connection with FIG. 35.

Figure 84A:
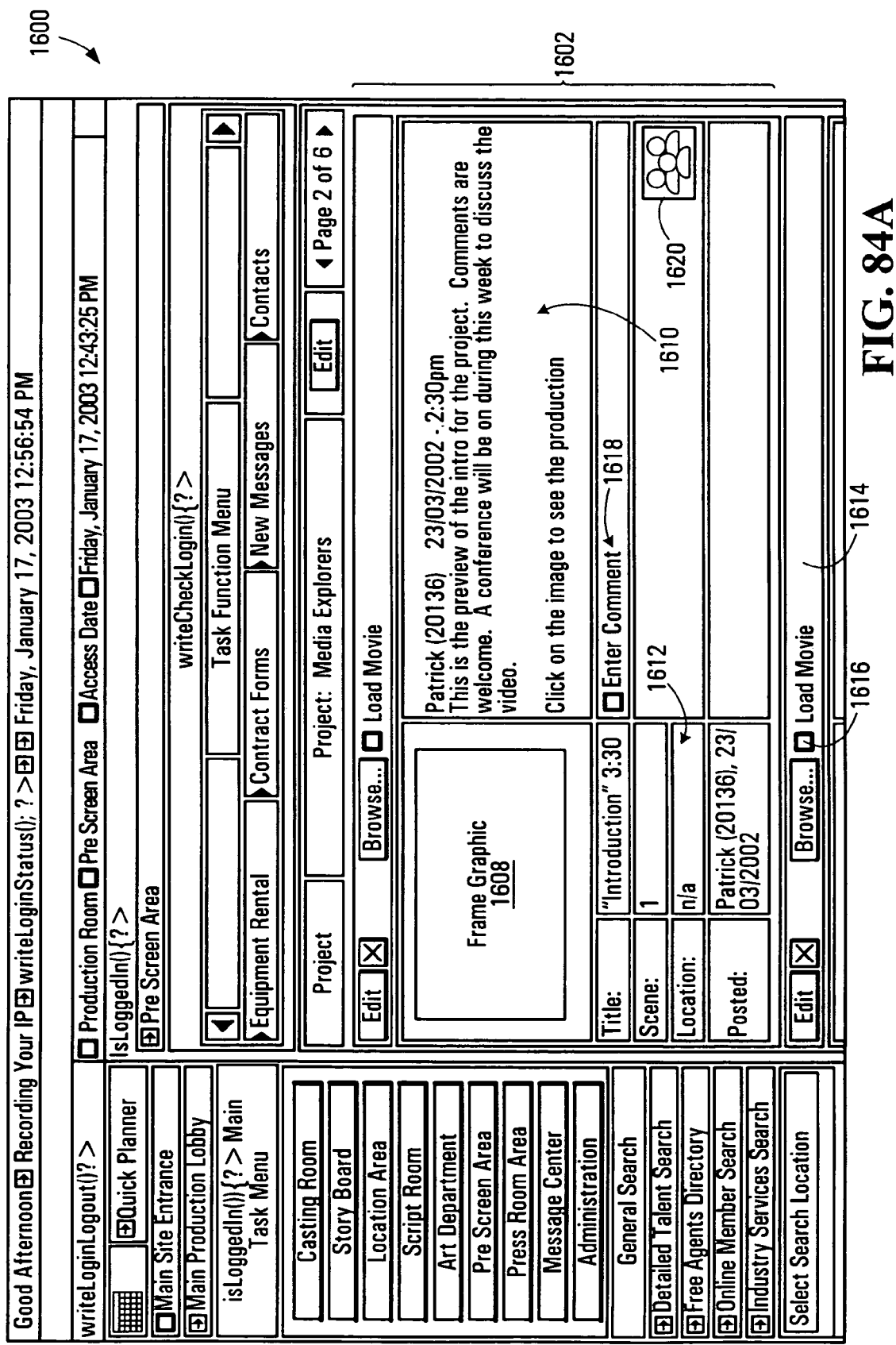
FIG. 84A is a screen shot of a display seen at any of the communication appliances providing a plurality of pre-screen movie clips associated with corresponding segments of the production.
Figure 84B:
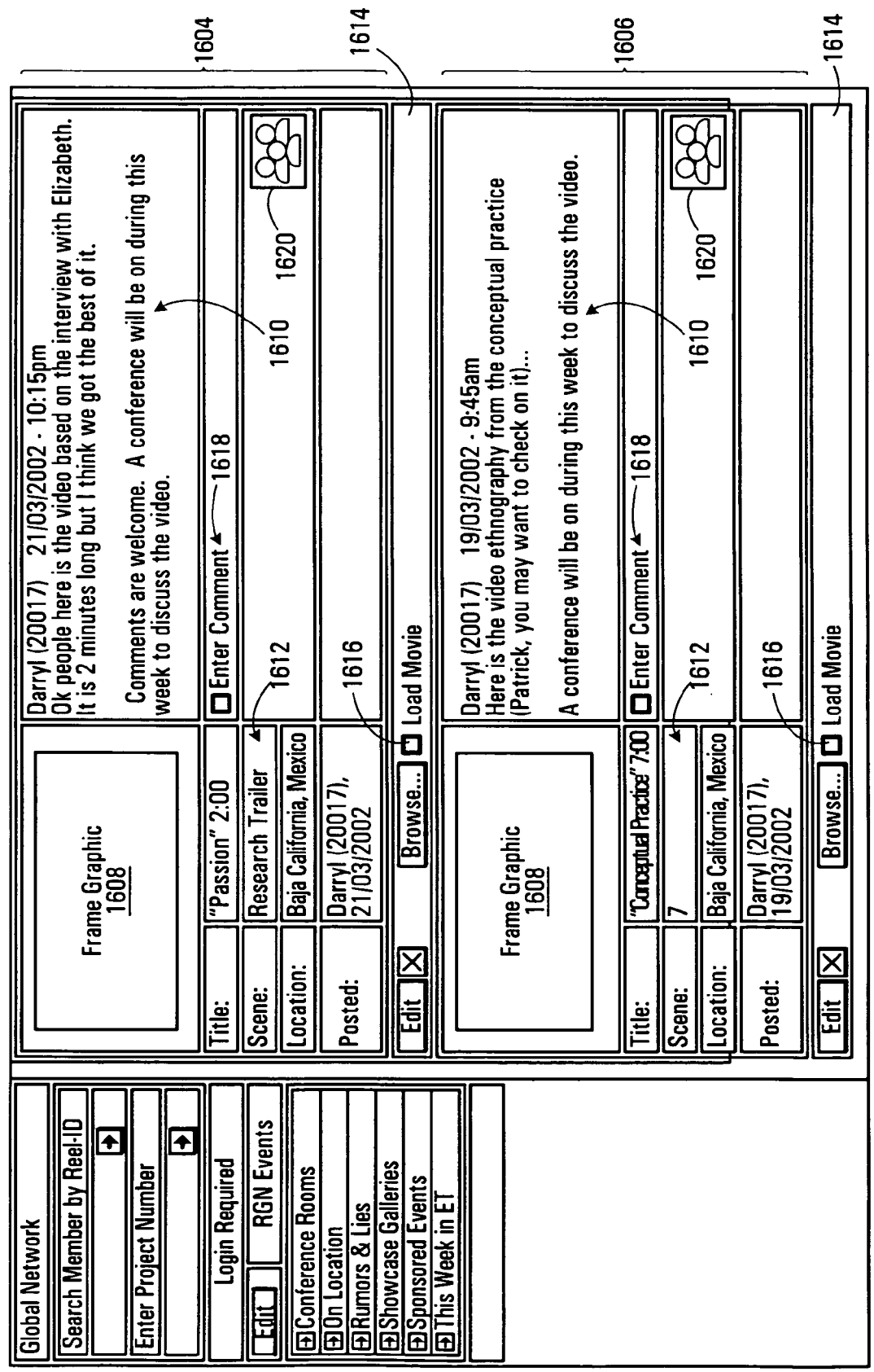
FIG. 84B is a continuation of FIG. 84A.

Referring back to FIG. 66, if the member clicks on the pre-screening area icon 1200, an S-module is obtained from the management apparatus to cause a display as shown at 1600 in FIGS. 84A and 84B.

FIGS. 84A and 84B

The display shown in FIGS. 84A and 84B includes a plurality of pre-screen movie clips 1602, 1604 and 1606, each associated with a corresponding segment of the production. Each one has an image area 1608 that shows an image of a first frame of the movie clip associated with the summary. Each one also includes a description area 1610 and each one includes an identification area 1612 identifying important information about the clip. Additional clips are added through the use of a loading menu 1614 which is provided after each clip for convenience. On selecting a load movie icon 1616 in the load movie menu, a corresponding browse function may be used to browse to a location at the communication appliance to permit a movie file to be uploaded to produce a summary of the type shown at 1602, 1604, 1606, for example. Each summary also has an enter comment function 1618 that allows the viewer to add comments that appear in area 1610 of the summaries. Each summary also includes a conference icon 1620 that opens a conference as described above to permit collaborators to discuss the clip.

Figure 85:
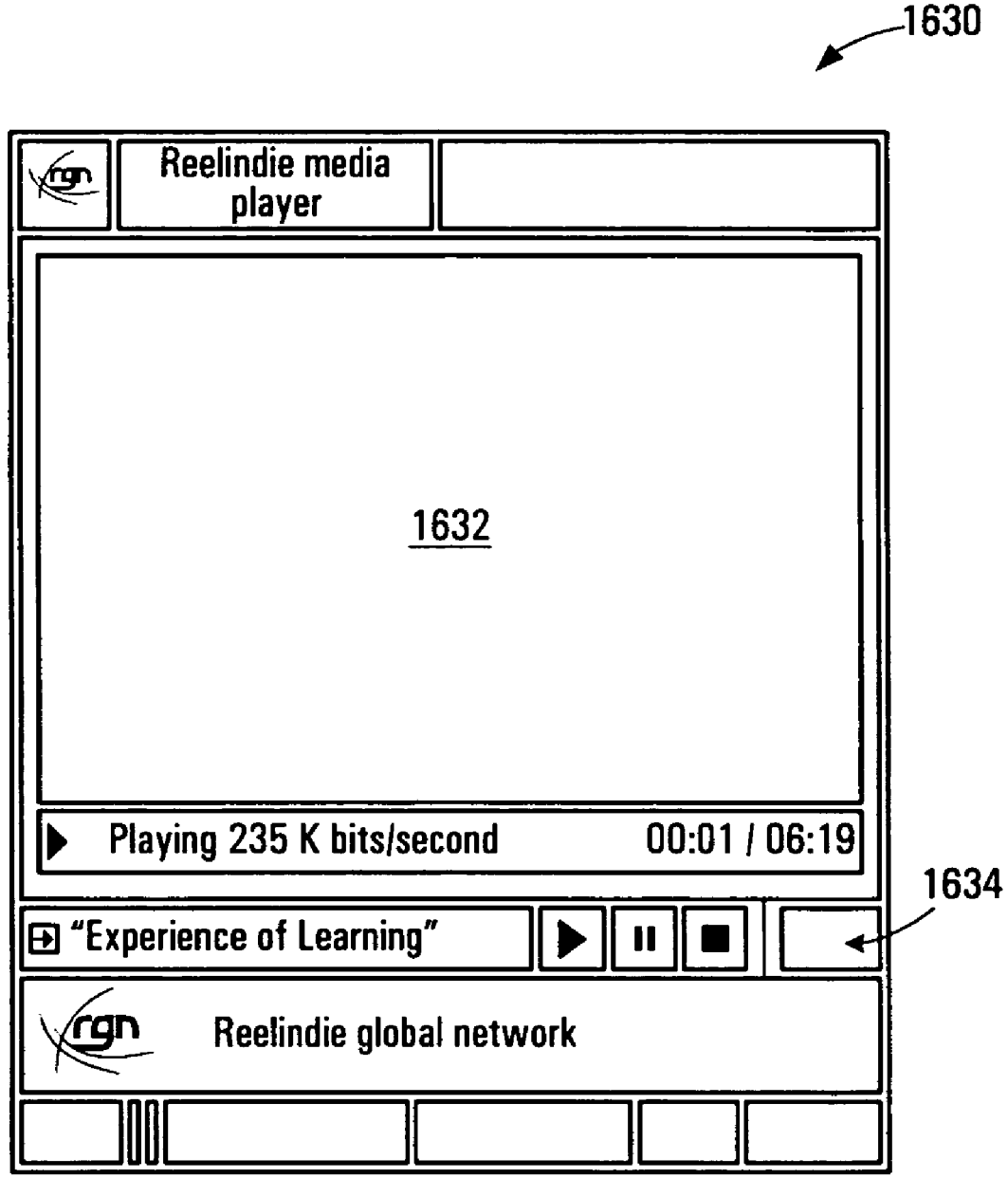
FIG. 85 is a screen shot of a display seen at any of the communication appliances depicting a movie player particularly useful for showing dalies for the production.

Clicking on the load movie icon 1616 initiates an instance of a movie player as seen generally at 1630 in FIG. 85.

FIG. 85

The movie player shown in FIG. 85 shows the movie in an area 1632 and provides transport and display controls shown generally at 1634. While the player is active, the conference feature may be simultaneously active to allow simultaneous viewing of the movie while at the same time conducting a conference call to discuss it. This is particularly useful for "dailies" which would allow daily location footage to be shot and at the end of the day loaded onto the system to allow a remote member such as a director who may be at another location to view the dailies to determine their effectiveness for the production.

Referring back to FIG. 66, if a member activates the press room area icon 1202, a display as shown at 1640 in FIG. 86.

FIG. 86

The display shown in FIG. 86 includes a press release area shown generally at 1642 for providing a summary of press release information relating to the production. For example, it may include a listing of press releases 1644, a list of special offers 1646, information relating to news and events 1648, a list of media contacts 1650, a list of commercial spots 1652 and press release responses 1654. Each of these items may be associated with a respective number generally shown at 1656 for indicating how many of the corresponding item have been issued or received. New press releases may be uploaded using an upload feature 1658, a post press release to selected parties and thus increments, the press release counter associated with press releases 1644.

Industry Services Directory

Figure 87:
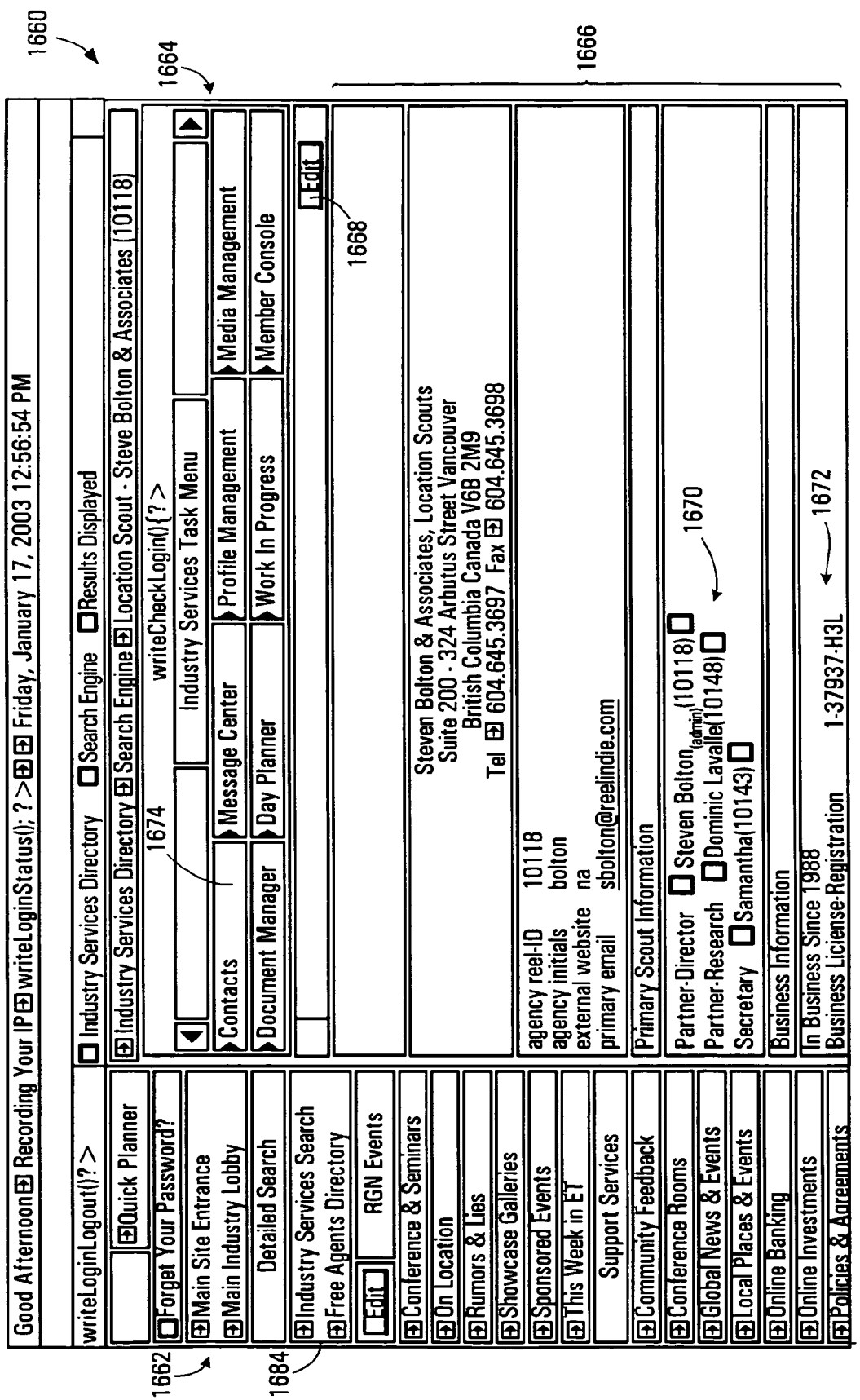
FIG. 87 is a screen shot of a display seen at any of the communication appliances depicting advertising for services in the film production industry.

Referring back to FIG. 7B, after logging on to the system, if the member activates the showcase link 159, an S-module is obtained from the management apparatus to cause a display as shown at 1660 in FIG. 87 to be displayed at the communication appliance.

FIG. 87

The display shown in FIG. 87 includes a side menu shown generally at 1662, similar to that described above. It further includes a top menu shown generally at 1664 and includes a work area shown generally at 1666. Normally upon first display of the display window shown at 1660, the work area 1666 is set to display a home page, which is a page associated with the entity with whom the ID and password use to logon is associated. In the example shown, this is "Stephen Bolton & Associates, Location Scouts", for example. This web page has an edit function 1668 that allows the member to enter information in fields such as primary scout information fields 1670 and business information fields 1672, for example, relating to the business of the entity.

The top menu has a contacts link 1674 which when activated causes a contact list as shown at 1676 in FIG. 88 to be displayed in the work area 1666.

Figure 88B:
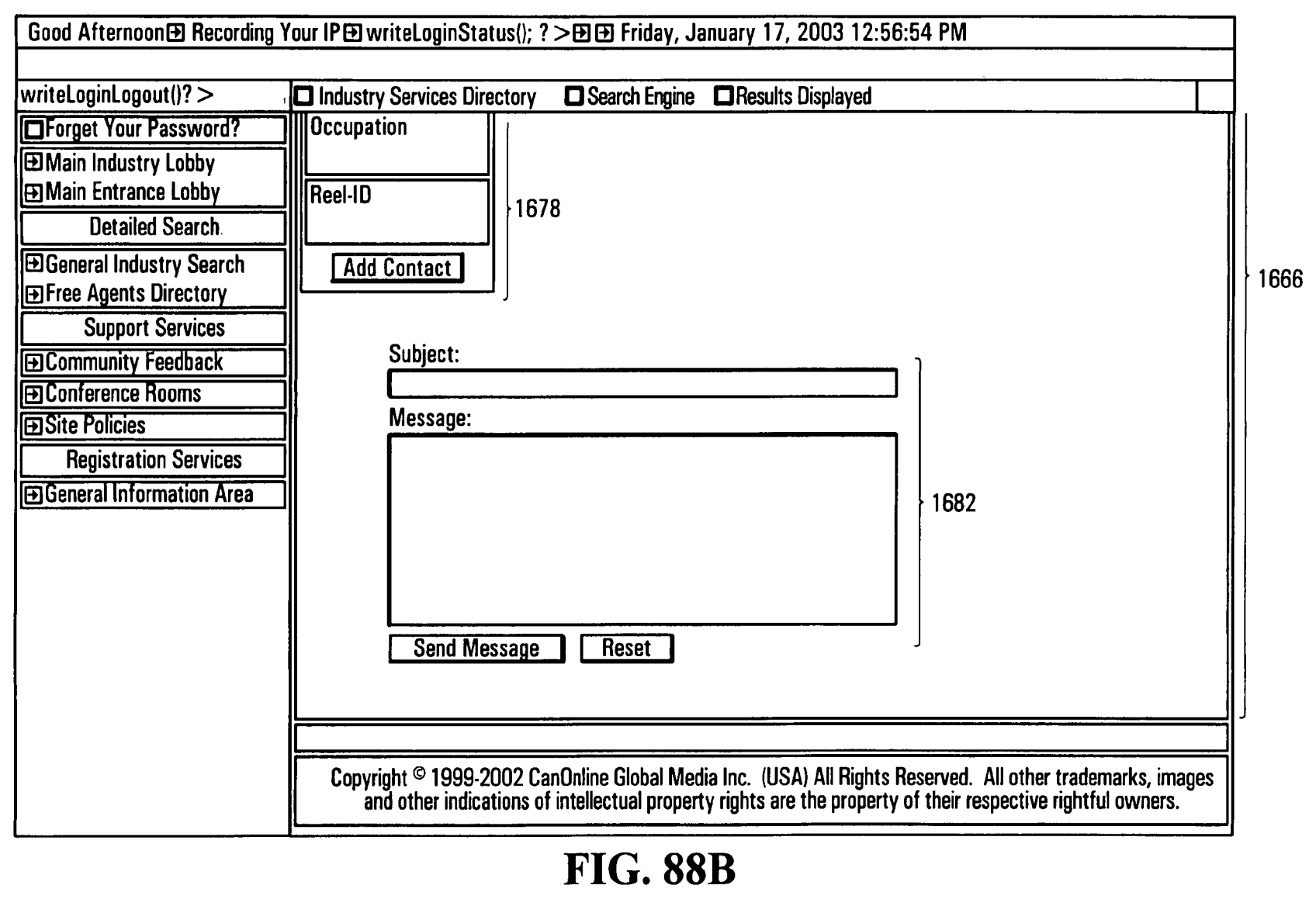

FIGS. 88A and 88B

The contact list shown in FIG. 88A may include the names and titles of various parties with whom the company Stephen Bolton & Associates works with in a work area 1666. This display 1676 includes provisions for adding and changing contacts as shown generally at 1678 and includes respective "include icons" 1680 for allowing a group of contacts to be selected, to whom email or other information may be sent. Referring to FIG. 88B, the work area 1666 may be terminated in a message area 1682 where subject and text of the message to be sent to the selected contacts may be entered.

Referring back to FIG. 87, the side menu 1672 includes a search link 1684 which when activated causes a search window (not shown) to appear in the work area 1666 (FIGS. 86A (88A) and 86B (88B)). The search window allows the member to enter search parameters and initiate a search through the industry services directory for service providers meeting the indicated search parameters. For example, if keywords "Houston" and "Location Scout" are entered into the search window and a search is initiated, a display as shown at 1686 in FIG. 89 may appear.

FIG. 89

Figure 89:
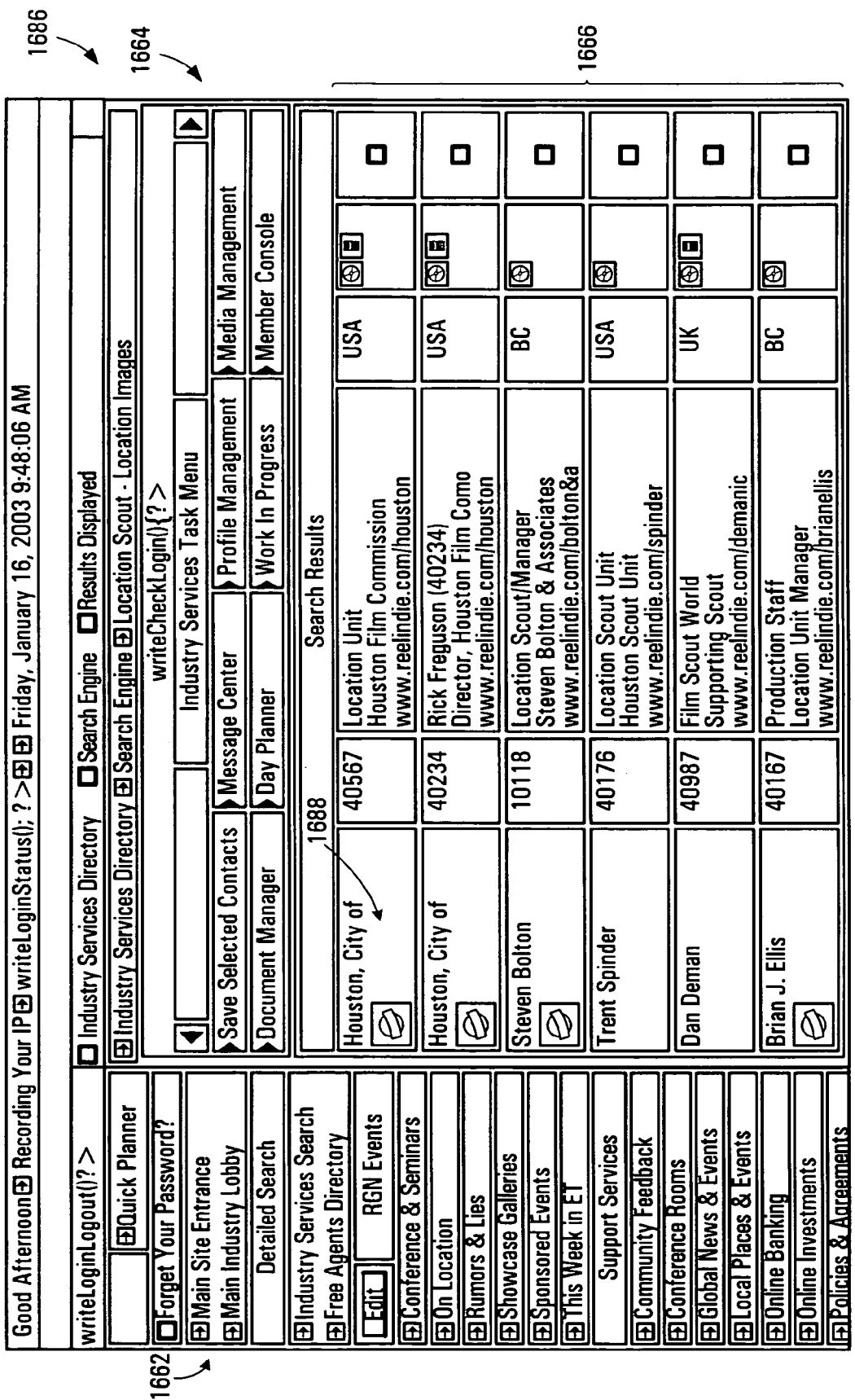
FIG. 89 is a screen shot of a display seen at any of the communication appliances, providing search results in response to a search engine feature on the display shown in FIG. 88B.

The display 1686 shown in FIG. 89 includes the top menu 1664 and the side menu 1662 and the work area 1666 is populated with a list of entities meeting the search criteria. Each of these entities is associated with a link such as shown at 1688 and when activated the link causes a detailed view of the search result entity to appear in the work area 1666 as shown in FIG. 90A.

Figure 90A:
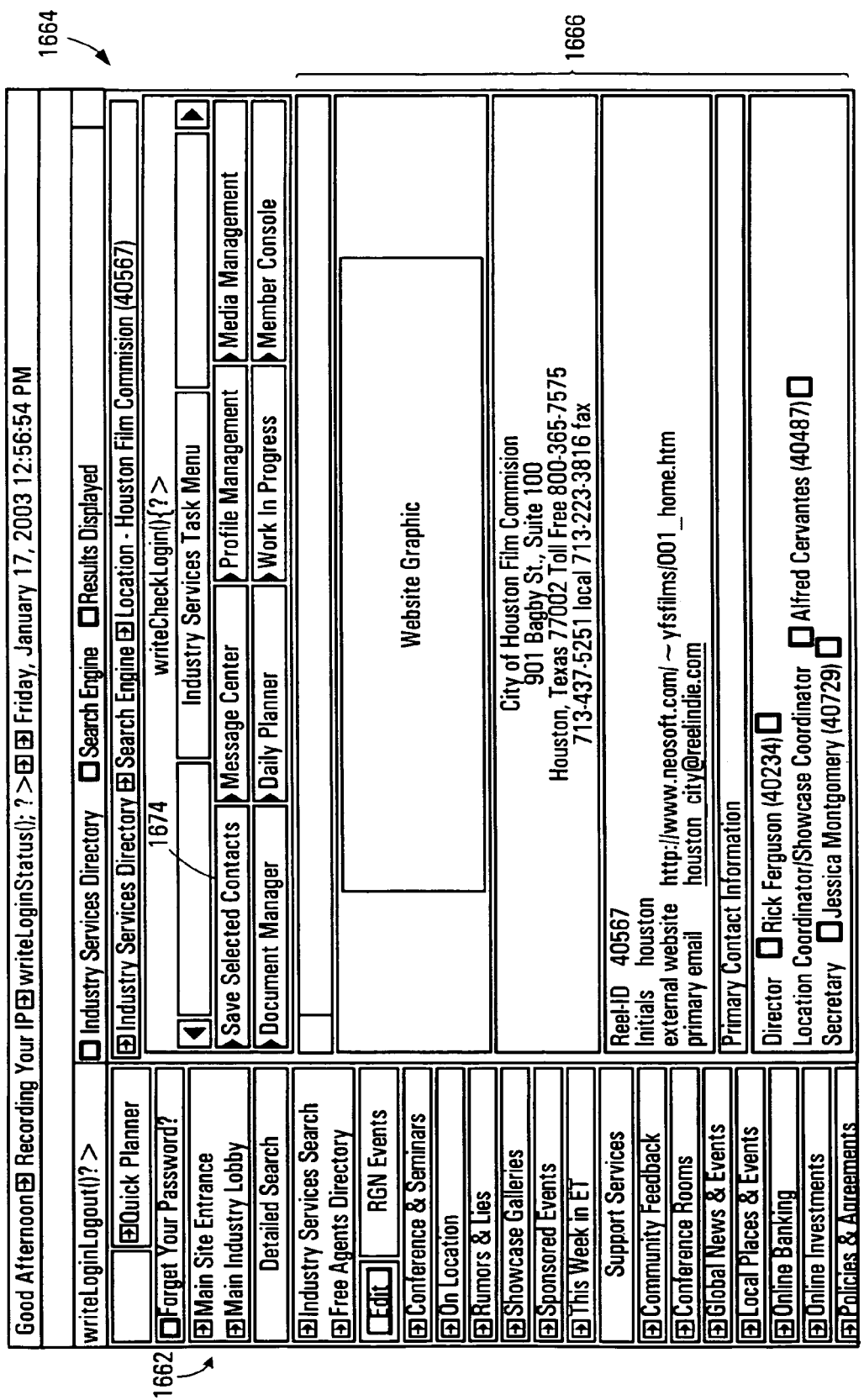
FIG. 90A is a screen shot of a display seen at any of the communication appliances, providing a profile of an entity found through the search display shown in FIG. 89.

FIGS. 90A and 90B

The information seen in the work area 1666 shown in 90FIGS. 88A (90A) and 88B (90B)) is effectively a website hosted by the selected entity and provides a profile of the entity. The profile includes a summary area 1690 that may include a plurality of links, one of which is shown at 1692, for example, that link to services provided by the service provider, in this case, location photos. Activating the location photo link 1692 causes the work area 1666 to be populated with a photo gallery of location photos as shown at 1694 in FIG. 91.

FIG. 91

Figure 91:
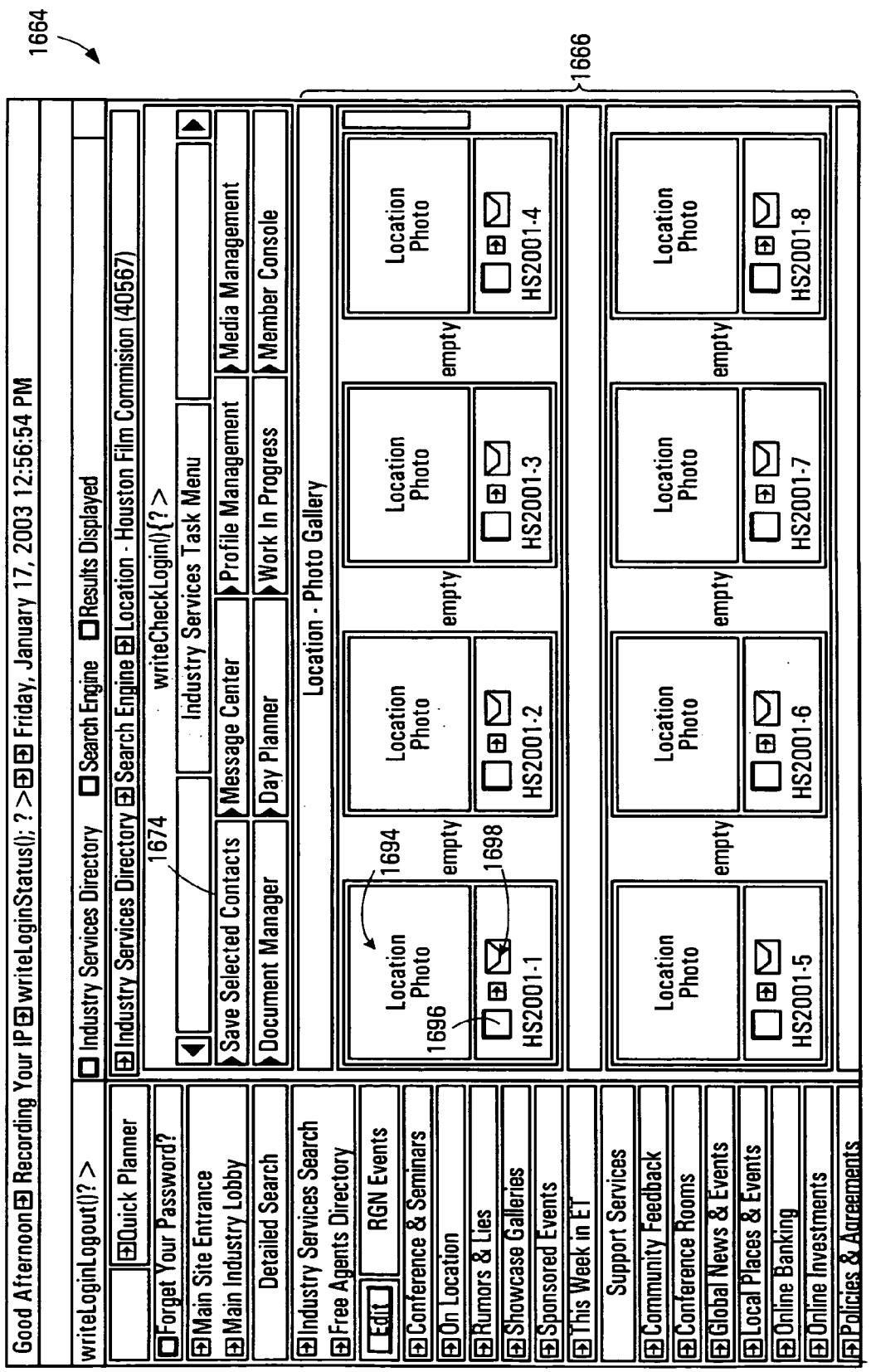
FIG. 91 is a screen shot of a display seen at any of the communication appliances depicting a photo gallery of entities meaning search criteria specified to a search engine function.

Referring to FIG. 91, each photo is associated with a select function 1696 and a send function 1698 allowing the individual photo to be selected and sent to a desired party. Activation of the send function 1698 invokes the communications features described above permitting the photo to be sent and conferences to be opened, including video conferences or audio conferences, for example.

Showcase Gallery

Figure 92A:
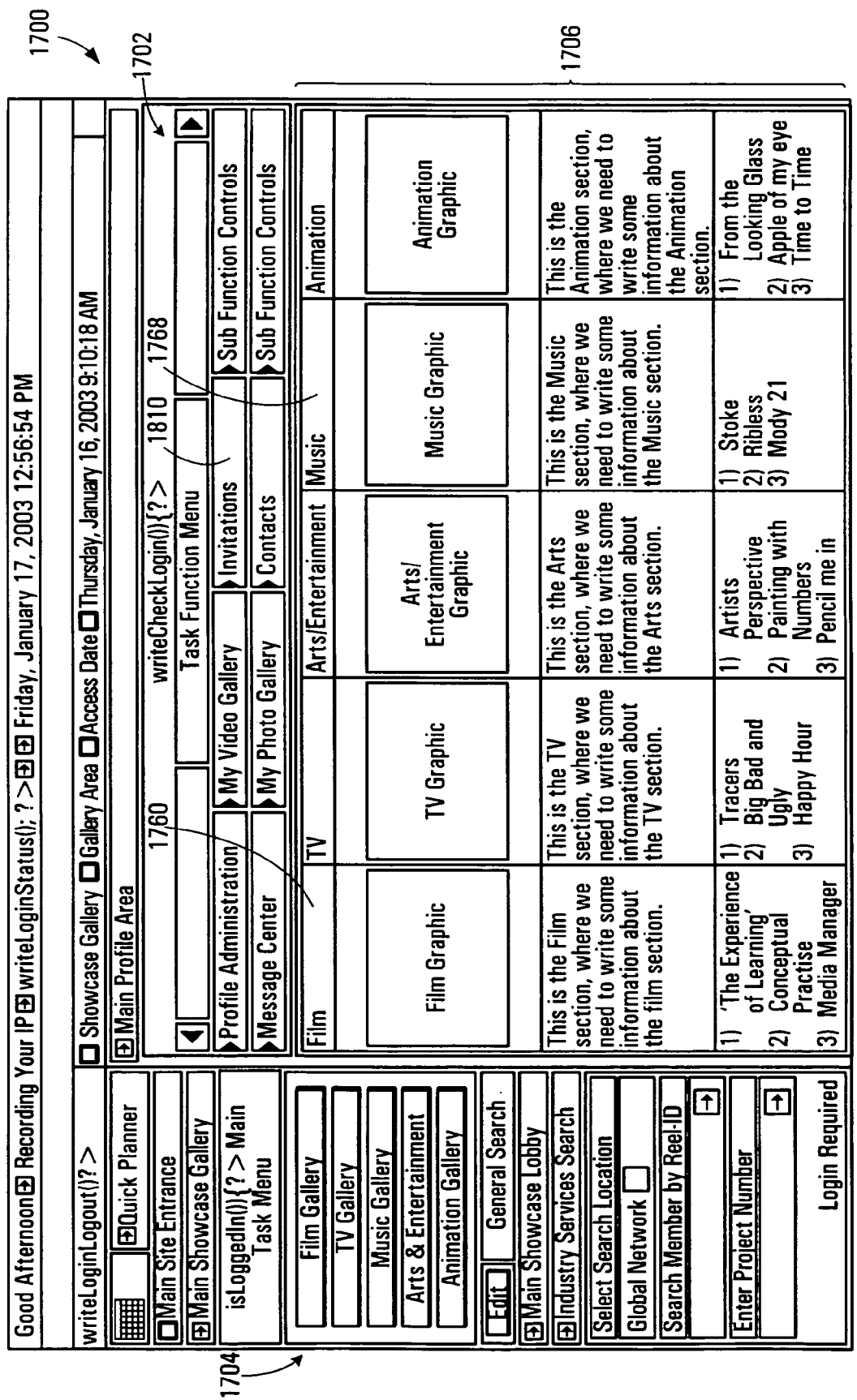
FIG. 92A is a screen shot of a display seen at any of the communication appliances providing access to multimedia collections including films, tv shows, arts and entertainment, pictures, music and animation for example.
Figure 92B:
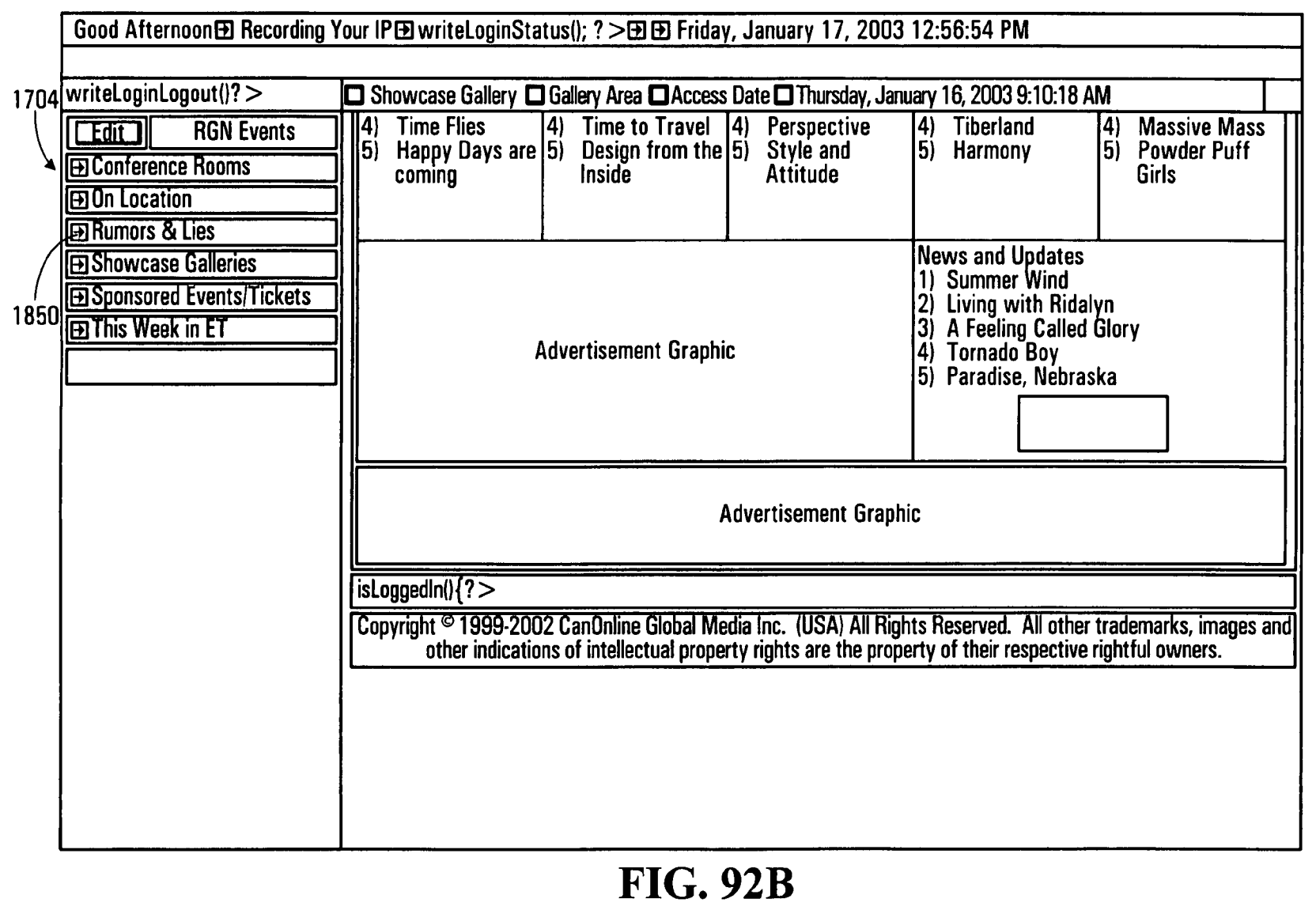

FIGS. 92A and 92B

Referring back to FIG. 7B, if after logging in the member selects the showcase icon 159, an S-module is obtained from the management apparatus to cause a display as shown at 1700 in FIG. 92A to be seen at the communication appliance. This display includes a top menu 1702, a side menu 1704 and a work area 1706. Generally, the showcase gallery provides access to multimedia collections including films, TV shows, arts and entertainment pictures, music, and animation, for example. The showcase gallery may have more than one level of access. A first level may be considered a public access level in which anyone registered with the management apparatus has the opportunity to view any of the multimedia files available. In this case, the top menu 1702 is not included in the display shown at 1704. A second level of access may be offered to specific members of the system in which case the top menu 1702 is provided. If the person or entity logged in has this second level of access, the entity has the option of uploading multimedia files for viewing by others according to the above-mentioned two levels of access.

A project can be assigned a member ID and password and, in this regard, the production company responsible for the project may register a new account for the project and thus the project receives an ID and password and thus the project becomes a registered entity on the system. Being a registered entity, the project becomes searchable through the industry services directory and receives a main profile website which is displayed in the work area 1706 as seen in FIG. 93.

FIG. 93

The display shown in FIG. 93 includes the top menu 1702 and the side menu 1704. The top menu 1702 includes a plurality of gallery links such as for videos or photos, for example. Activation of a video gallery link 1708 causes a display window as shown at 1710 to appear in the work area 1706 shown in FIG. 94.

FIG. 94

Figure 94:
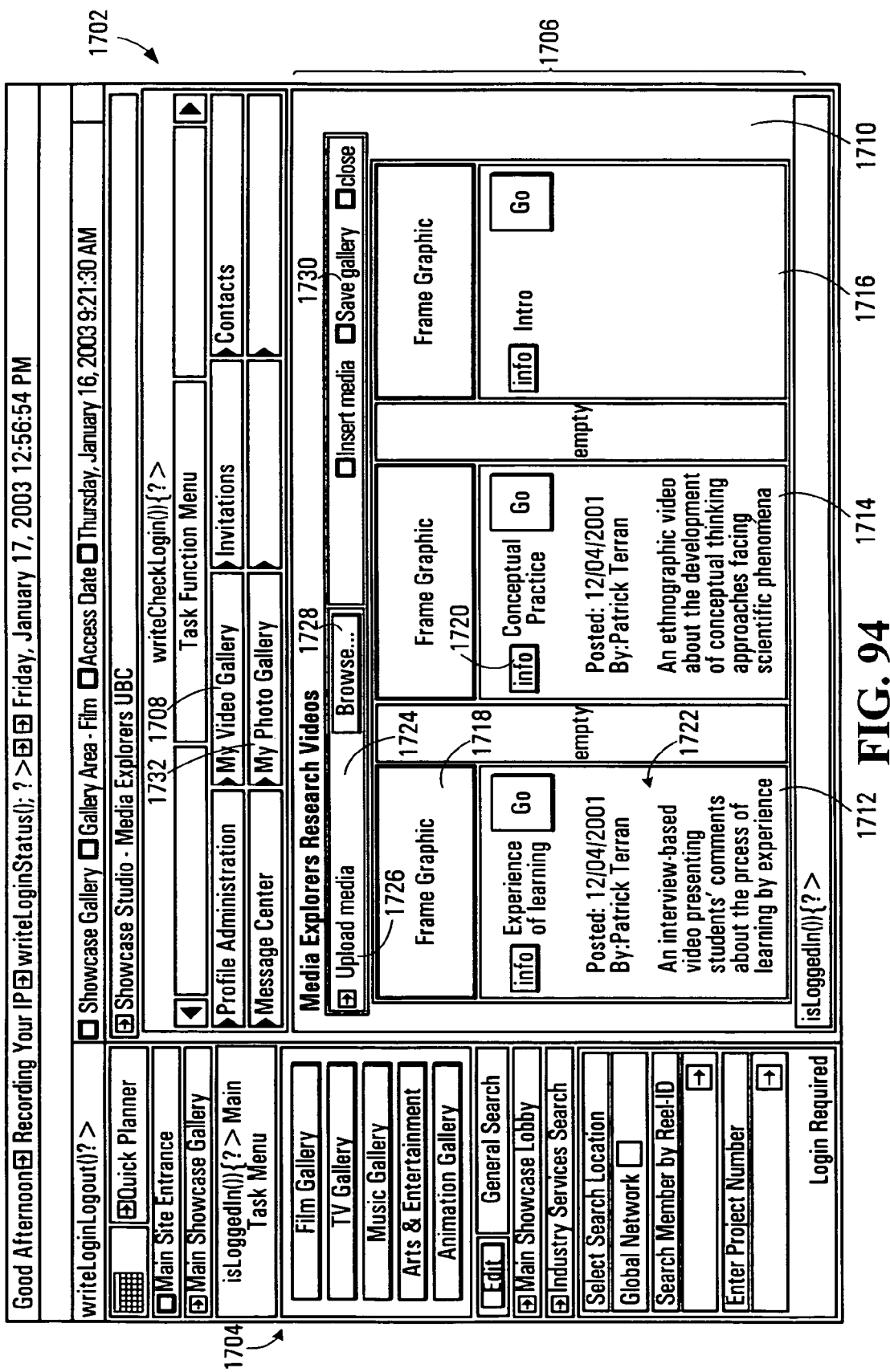

The display window shown in FIG. 94 includes a plurality of video clip panels 1712, 1714 and 1716, for example. Each video clip panel includes a frame 1718 depicting the first frame in the associated video clip and includes an info link 1720 which, when activated, allows the member to add information appearing in an area 1722 on the panel 1712.

The display window 1710 further includes an upload control panel 1724 including an upload link 1726 and a browse link 1728. Activation of the upload media link 1726 causes an S-module to be loaded from the management apparatus to the communication appliance that provides functions for uploading a video clip from the communication appliance to the file system in the management apparatus. The browse link 1728 allows the member to specify a directory and file to be uploaded. It will be appreciated that the display window 1710 includes a plurality of video clips referred to as a gallery. A collection of video clips can be added and then a save gallery link 1730 can be activated to cause the video clips to be saved as a gallery at the management apparatus so that when a member wishes to view the gallery presented by the entity, the collection of video clips is made available to the member.

While a collection of video clips is shown in the work area 1706 due to the activation of the video gallery link 1708, alternatively, photos may be seen instead in a manner similar to that shown in FIG. 94, where the member has activated a photo gallery link 1732, for example.

Figure 95:
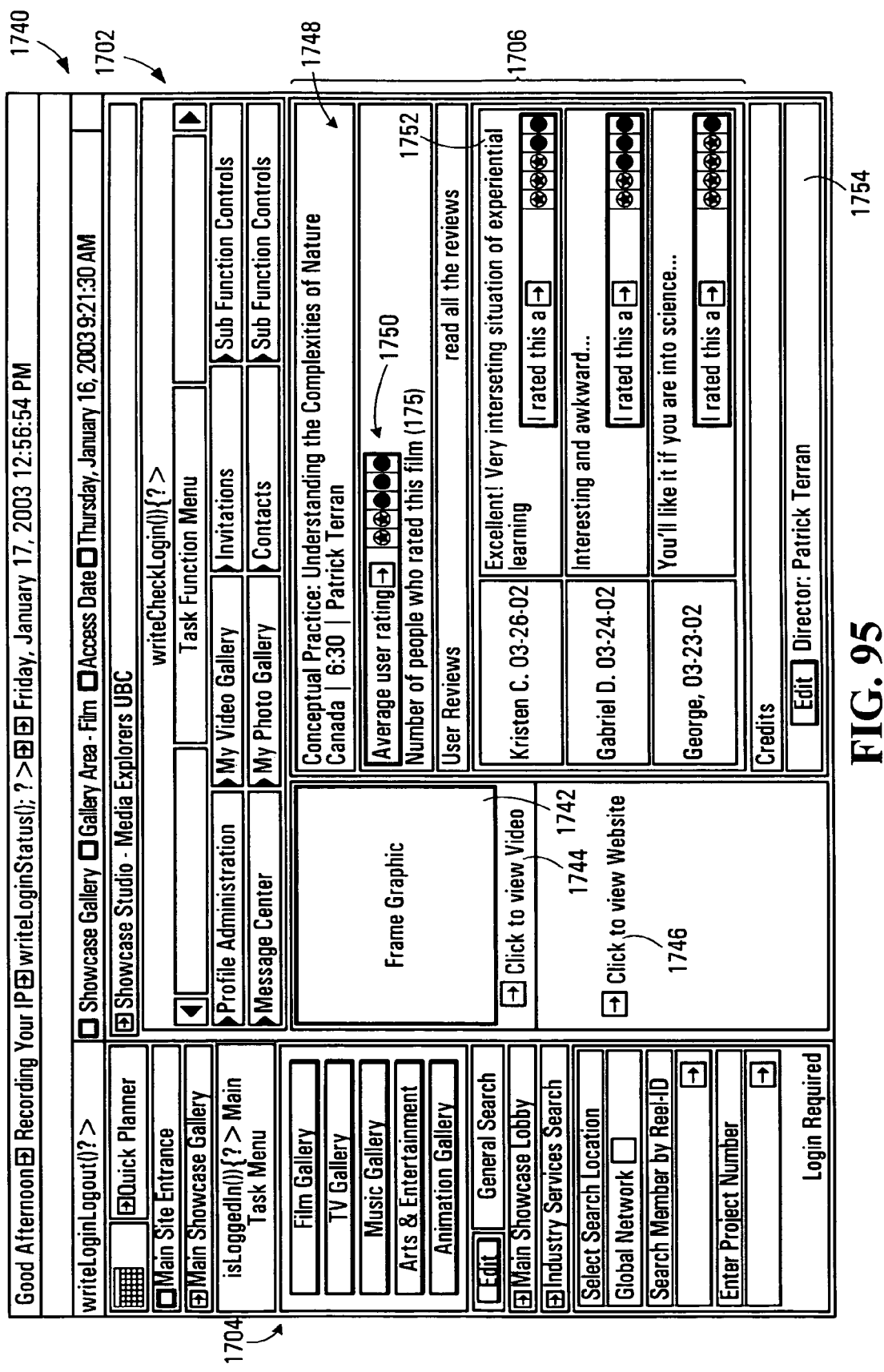

Referring to FIG. 94, information relating to a particular clip or photo may be entered or viewed by activating the info icon 1720 which causes a display as shown at 1740 in FIG. 95 to appear in the work area 1706 of the communication appliance.

FIG. 95

Referring to FIG. 95, this information includes an enlargement 1742 of the first frame of the video and a link 1744 which when activated causes the video to be played. It also includes a link 1746 to the website associated with the video and includes a review area shown generally at 1748 including an average member rating area 1750 and individual member reviews, one of which is shown at 1752, for example. It may include other information such as credits 1754, for example.

Figure 96:
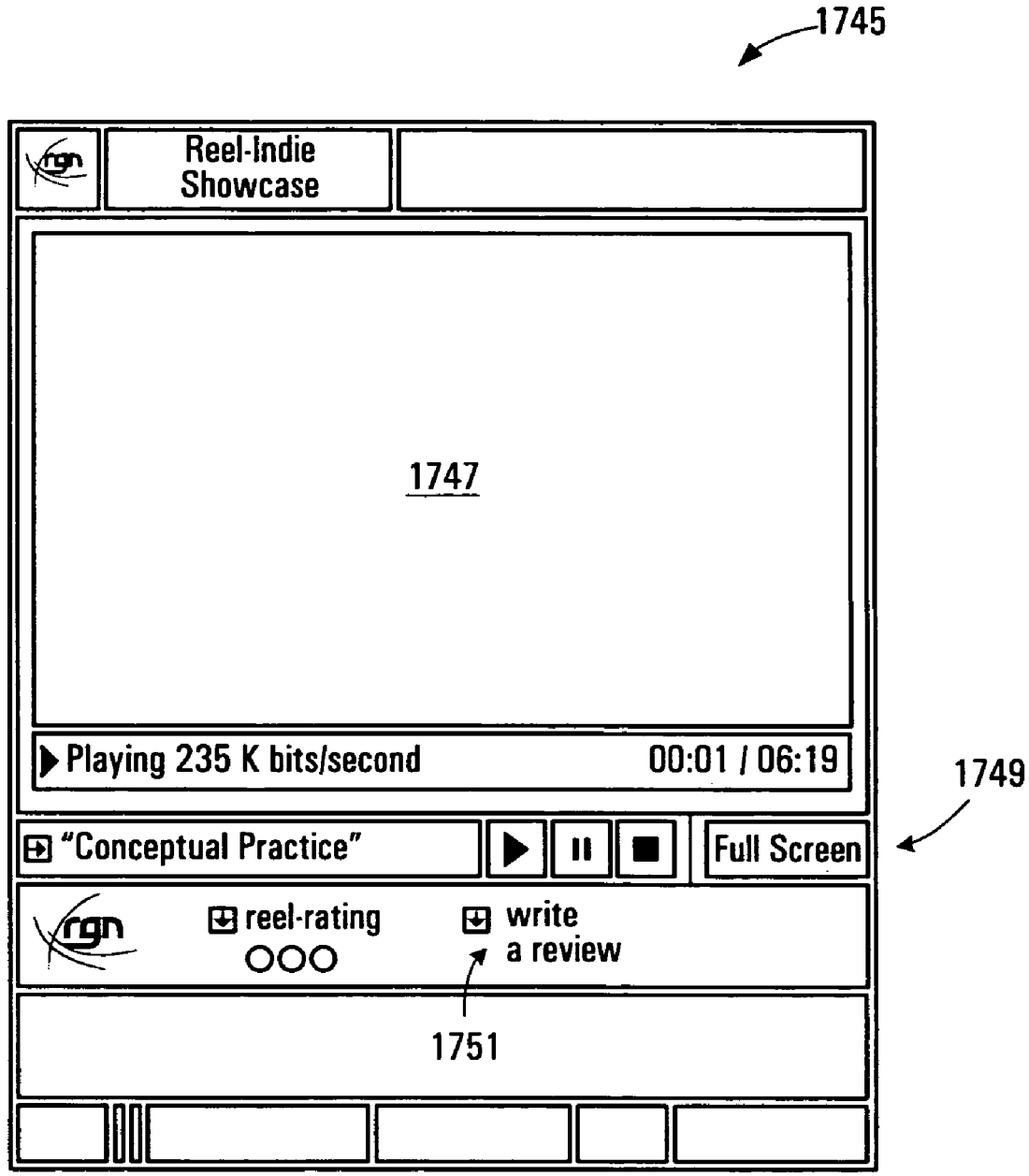

Activation of the link 1744 to review the video causes a video player as shown at 1745 in FIG. 96 to appear as an overlay panel at the communication appliance.

FIG. 96

Referring to FIG. 96, the player includes a viewing panel 1747, transport controls 1749 and a write review link 1751 that allows the member to write a review for the viewed video clip. The review appears in a member review area such as shown at 1752 (FIG. 95), along with other reviews provided by other viewers.

Figure 97:
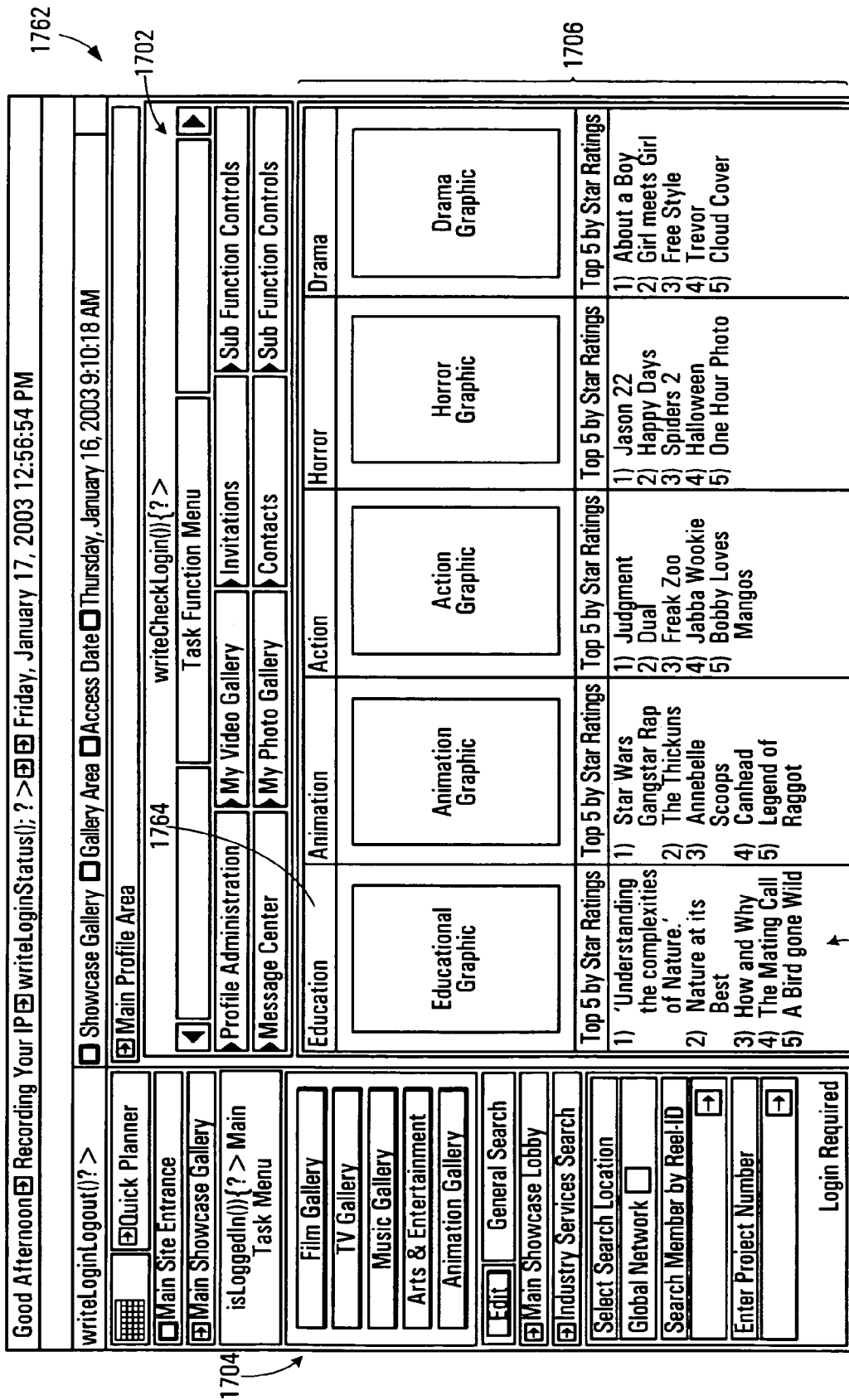

Referring back to FIG. 92A, if the member activates the film category 1760 of multimedia files, an S-module is obtained from the management apparatus to cause a display as shown at 1762 in FIG. 97 to be displayed at the communication appliance.

FIG. 97

The display shown in FIG. 97 includes the top menu 1702, the side menu 1704 and the work area 1706. In the work area a plurality of categories of multimedia files within the selected film category, for example, are shown, one of which is seen at 1764, relating to educational films, for example. Each category includes a listing of a plurality of productions as shown at 1766 and each production is associated with a hyperlink for directing the member to the display shown in FIG. 95, for example. Members entering FIG. 95 through this route, however, are not permitted to amend information relating to the video, rather they may only enter reviews after activation of the player shown in FIG. 96 and appropriate selection of the write a review link 1751.

Figure 98:
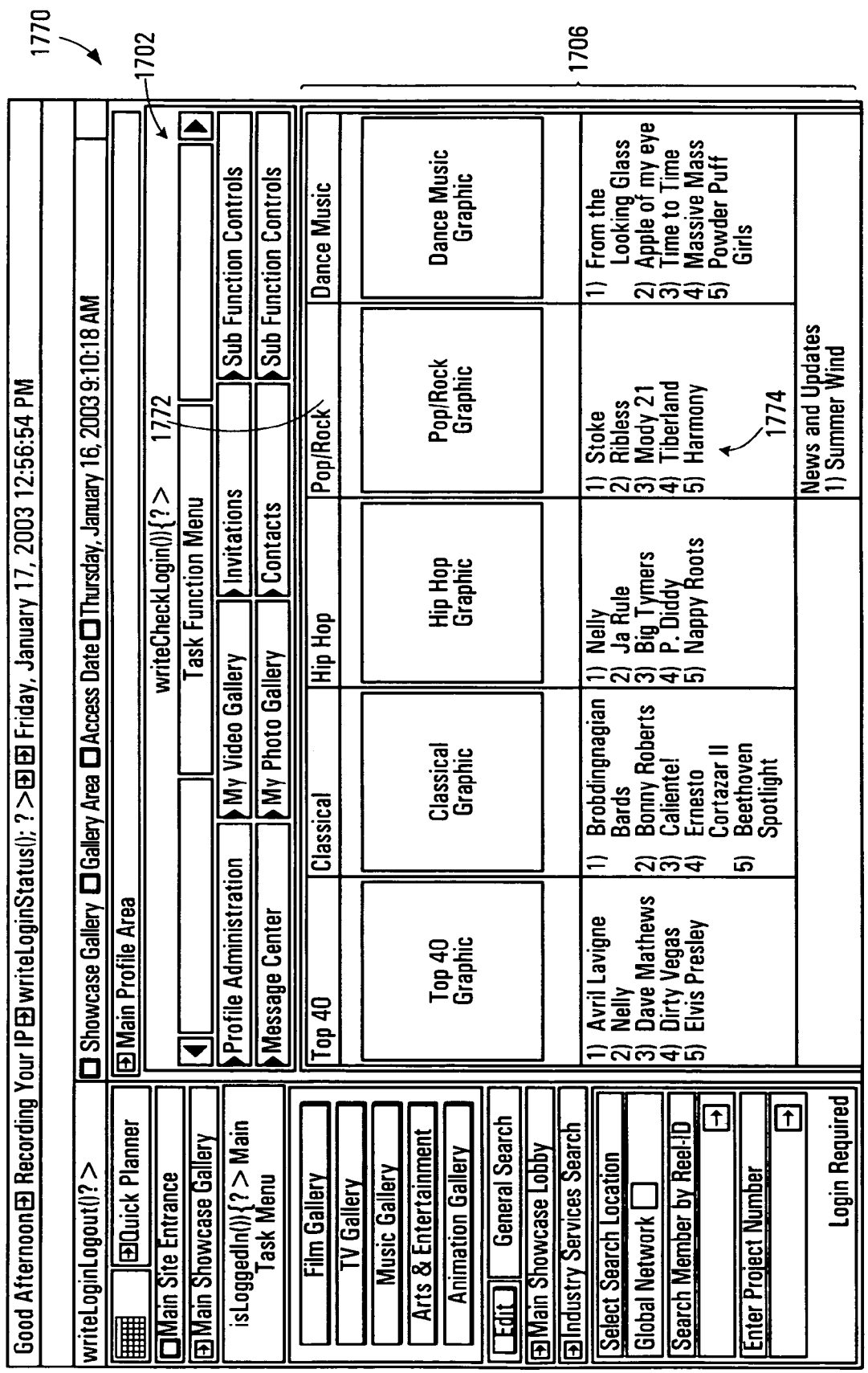

Referring back to FIG. 92A, if the member had selected the music category 1768, an S-module is obtained from the management apparatus to cause a display as shown at 1770 in FIG. 98 to be displayed.

FIG. 98

The display shown in FIG. 98 includes the work area 1706 and in this area a plurality of categories of music are provided, one of which is shown at 1772, relating to pop/rock music. In general, the information provided in connection with a music file is very similar to that provided in connection with a video file as described above in connection with FIG. 97, and includes links to specific audio files within the indicated category as shown at 1774. In a similar manner, television productions, photographs and animation may be made available to members.

Should a member click on one of the links to specific selections within the pop/rock category 1772, a display as shown at 1776 is provided in the display area 1706 as seen in 99FIGS. 97A (99A) and 97B (99B).

Figure 99A:
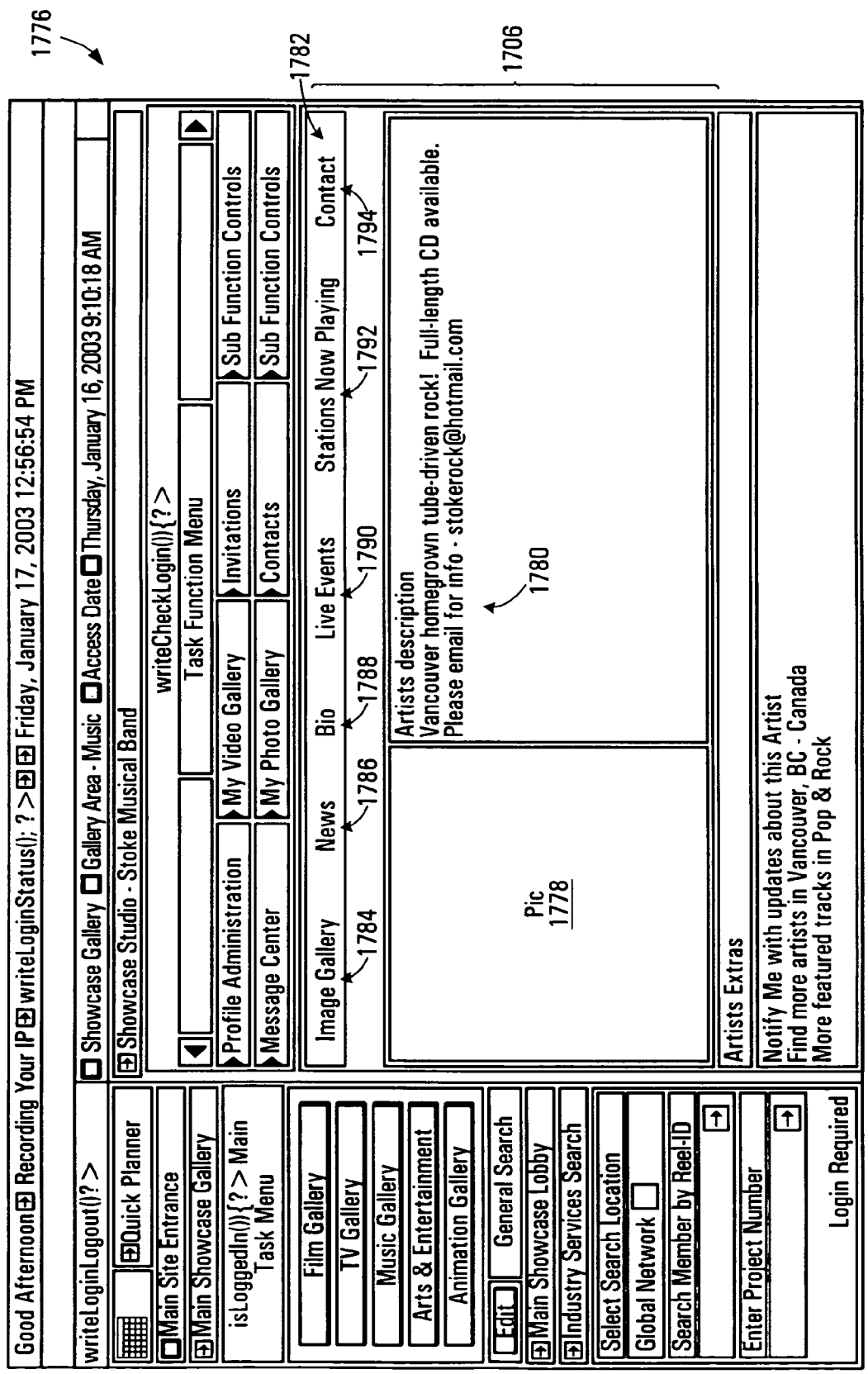
Figure 99B:
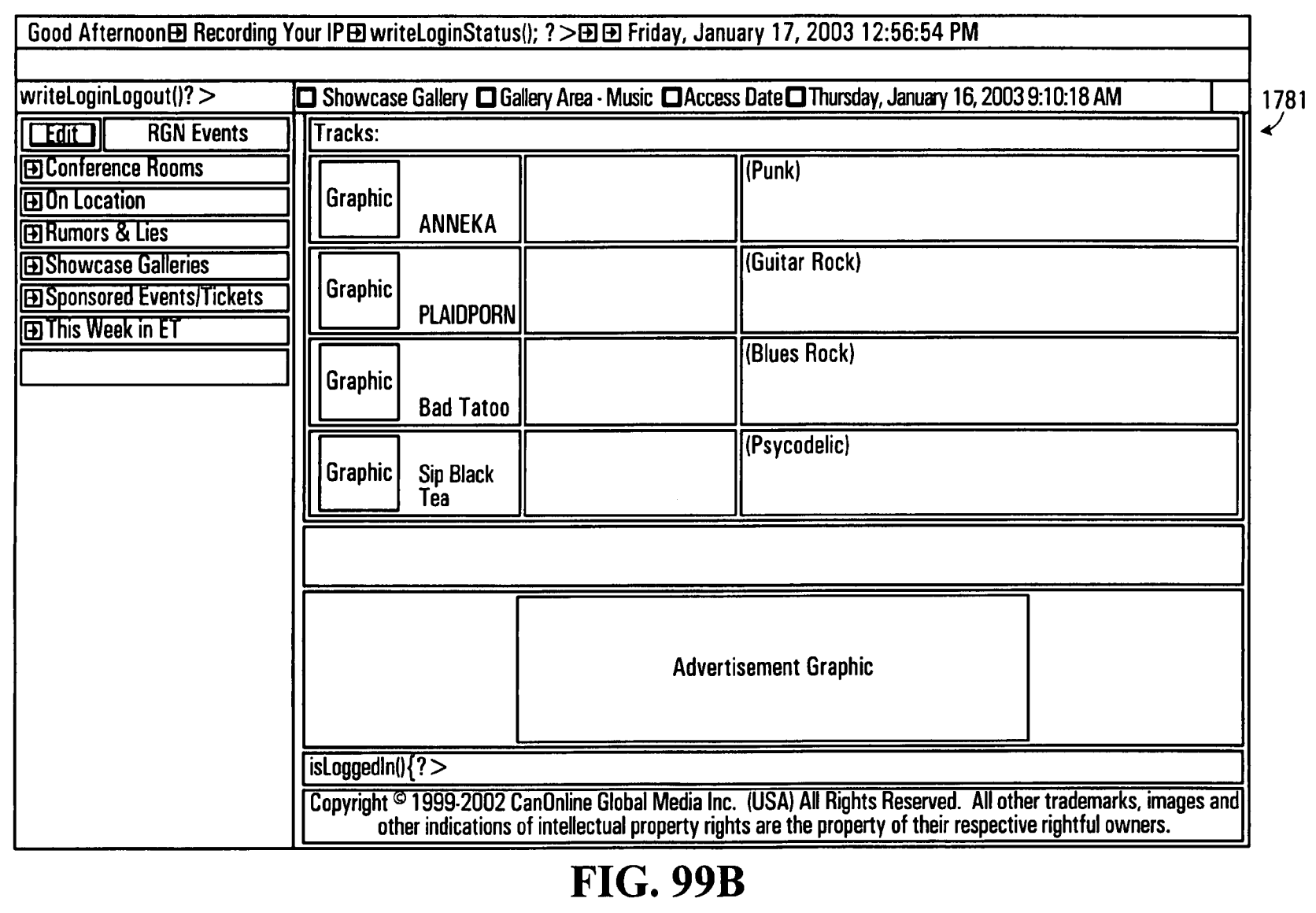

FIGS. 99A and 99B

The display shown in FIG. 99A includes a picture 1778, information about the selected artist 1780 and includes a further information area shown generally at 1782 with further links including an image gallery link 1784, a news link 1786, a bio link 1788, a live events link 1790, a station now playing link 1792 and a contact link 1794.

A listing of tracks may also be provided, one of which is shown at 1781 in FIG. 99B. Each of the tracks is associated with a link that causes an audio file associated with the track to be played.

Figure 100:
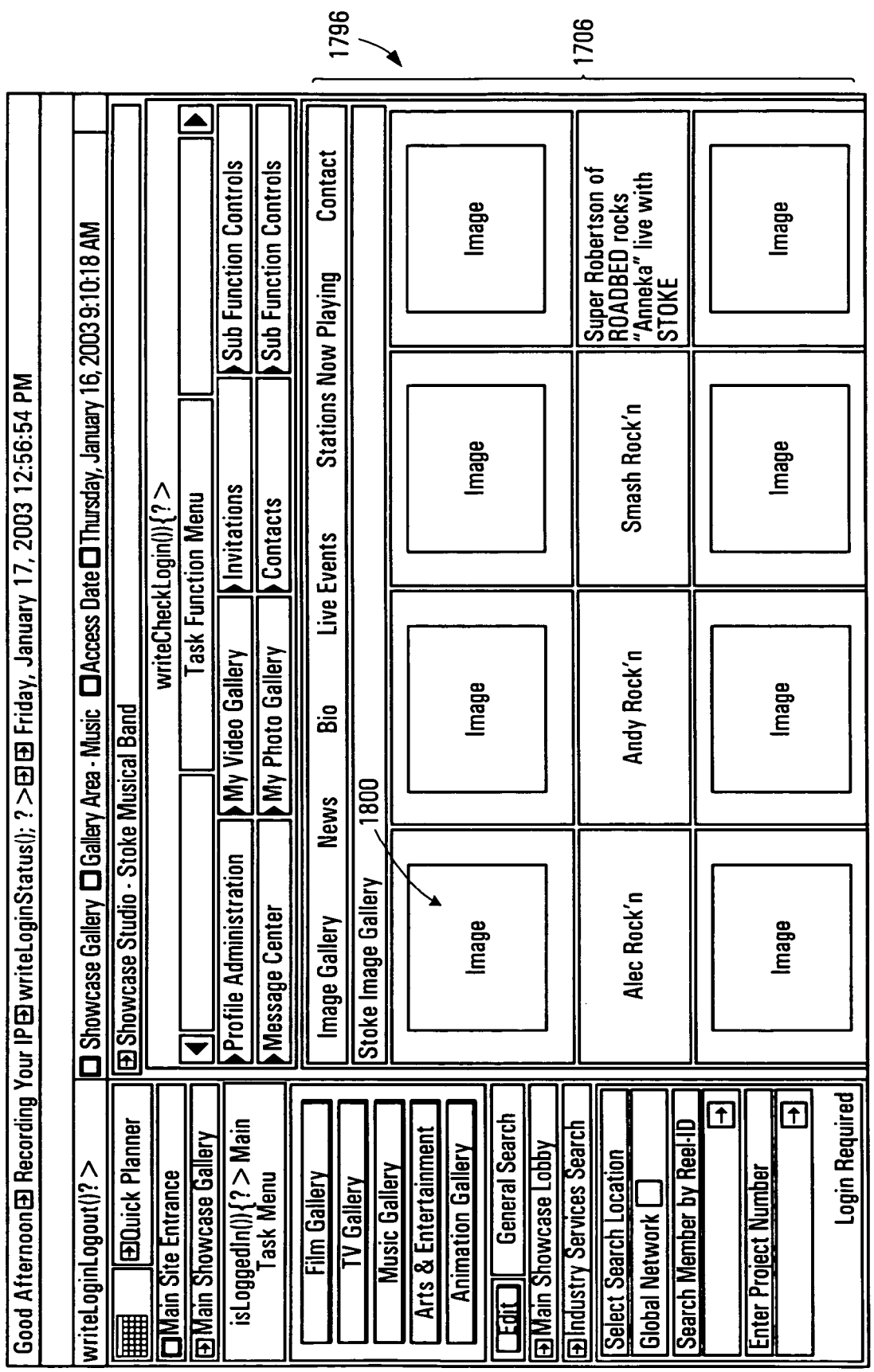

Activation of the image gallery link 1784 causes an S-module to be obtained to cause a display as shown at 1796 to be displayed in the work area 1706 as seen in FIG. 100.

FIG. 100

The display shown in FIG. 100 includes a plurality of images, one of which is shown at 1800 to be displayed.

Figure 101:
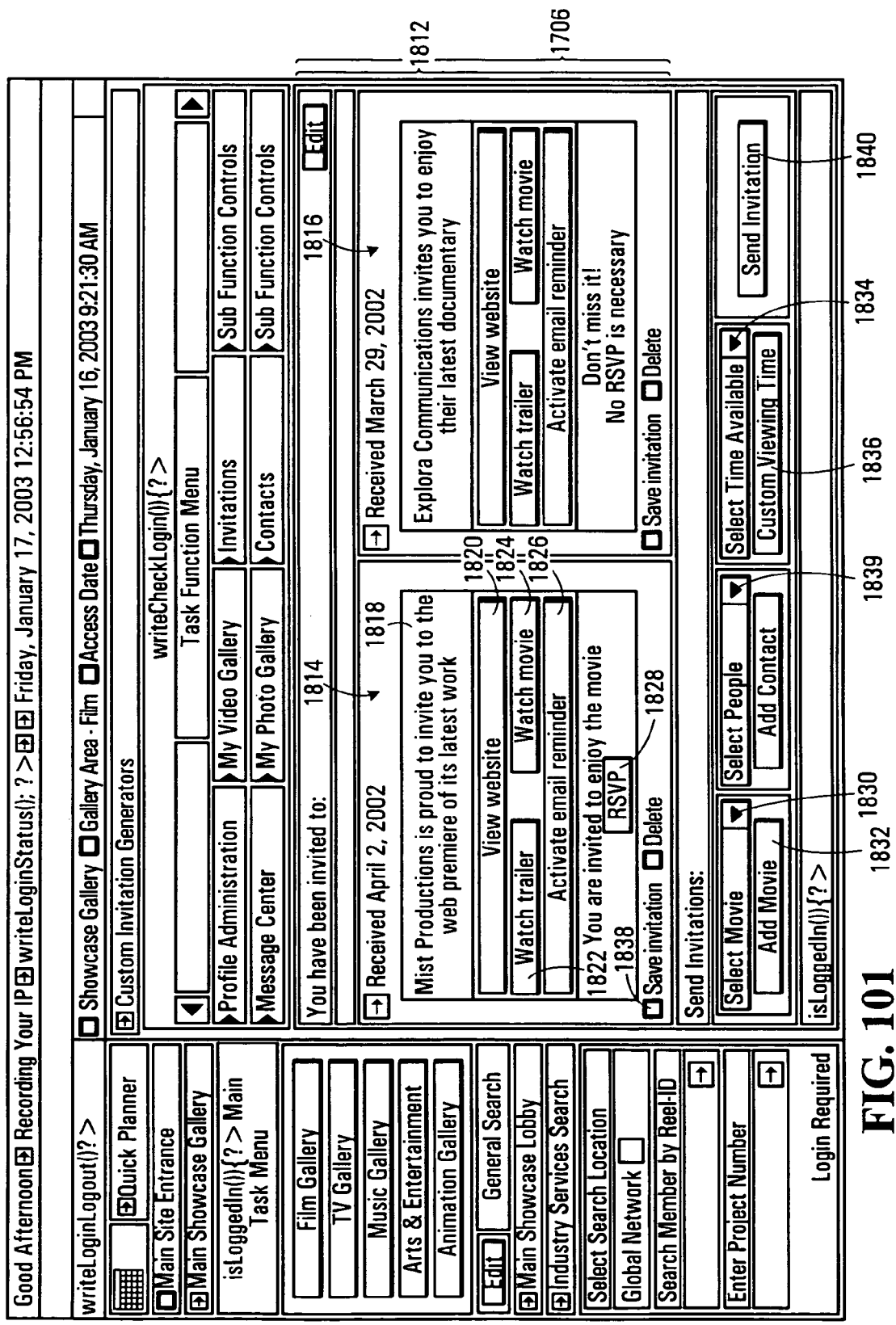

Referring back to FIG. 92A, a member may select an invitations link 1810 to cause an S-module to be obtained from the management apparatus to cause a display window as shown at 1812 to be displayed in the work area 1706, as seen in FIG. 101.

FIG. 101

The display 1812 shown in FIG. 101 includes a plurality of display windows, only two of which are shown at 1814 and 1816, for showing invitation templates that may be completed by the member to produce invitations for an event, for example. Each invitation template includes an identification of the multimedia presentation to which it relates 1818 and includes a plurality of links including a view website link 1820, a watch trailer link 1822, a watch movie link 1824 and an activate email reminder link 1826. The view website link 1820 will take a viewer to a website associated with the production indicated in area 1818. The watch trailer link 1822 will initiate a player such as shown in FIG. 96 to cause a trailer to be displayed for the member. Similarly, the watch movie link 1824 will cause the actual production identified in block 1818 to be presented in a player. The activate email reminder link 1826 allows the viewer to automatically receive a reminder at designated intervals before the event. An RSVP link 1828 is also provided to permit recipients of the invitation to respond. The template further includes a select movie dropdown menu 1830 allowing the person completing the template to select the movie corresponding to the one described in area 1818 and the template includes an add movie link 1832 allowing the member to add the selected movie to the invitation. The invitation template further includes a time selection dropdown menu 1834 providing for selection of times at which the production is available and it further includes a custom viewing time link 1836 that allows the member to specify a time not indicated in the dropdown menu 1834.

Still referring to FIG. 101, the invitation template includes a save invitation link 1838 that allows the invitation to be saved and 101includes a send invitation link 1840 allowing the member to send the invitation to recipients indicated through a select function 1839 that includes a dropdown menu for designating contacts as recipients.

Referring back to FIG. 92B, the side menu 1704 includes a fora link 1850 which when activated causes an S-module to be obtained from the management apparatus to cause a display window as shown at 1852 in FIG. 102 to be displayed in the work area 1706.

FIG. 102

The display shown in FIG. 102 includes category markers 1854 and 1856, for example, for indicating various fora categories. For example, a film forum category is shown at 1854 and includes a plurality of topics as shown at 1858 for which members have entered comments in a bulletin board fashion. One of these topics, for example, is entitled "Trends of Film Today" and includes a link 1860 which when activated causes an S-module to be obtained to cause a display as shown at 1862 in FIG. 103 to appear in the work area 1706.

FIG. 103

Figure 103:
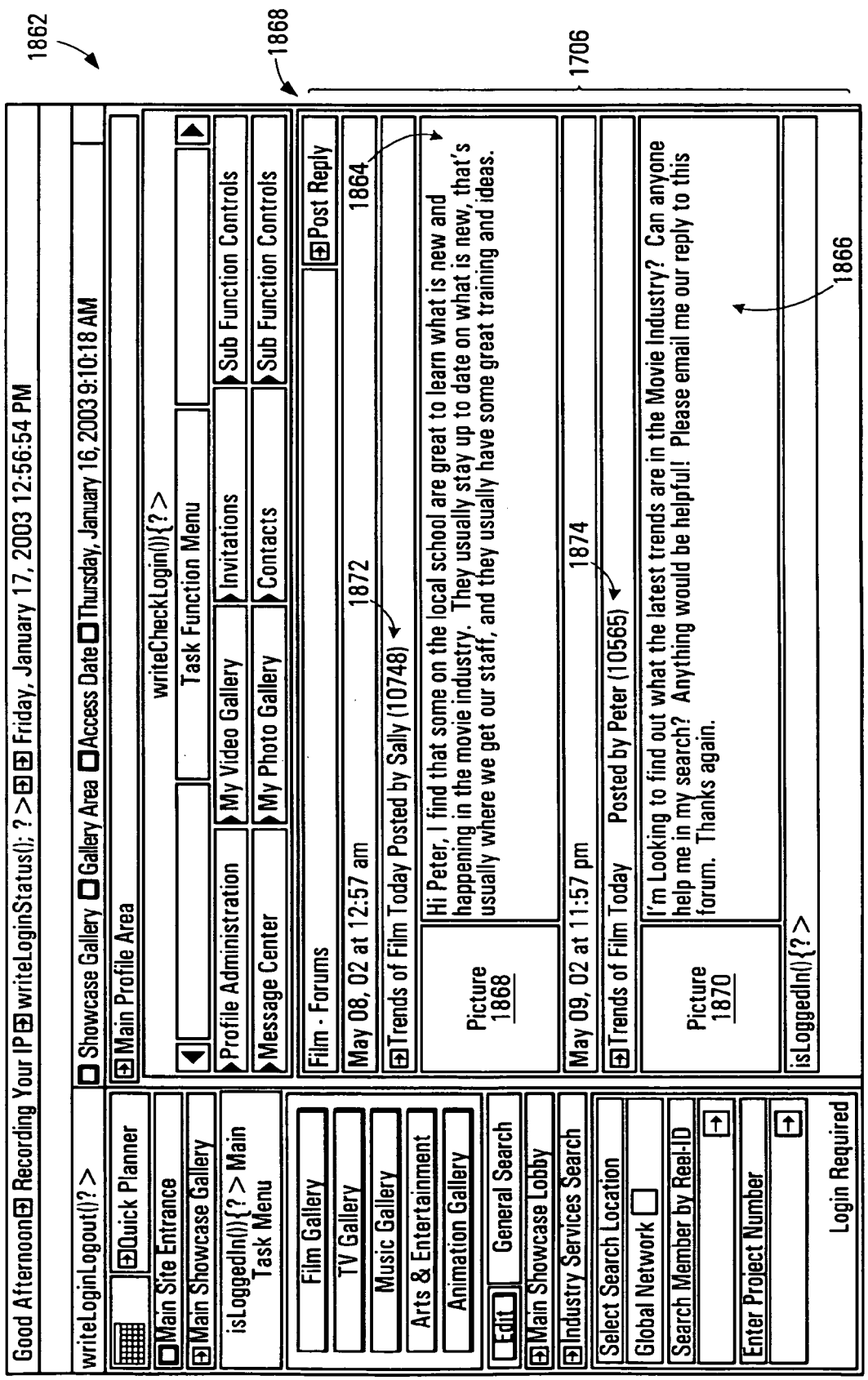

The display shown in FIG. 103 includes a plurality of comments, two of which are shown at 1864 and 1866, respectively, for members Sally and Peter, for example. Each comment includes a picture 1868 and 1870, for example, of the person posting the comment. These pictures are derived from the profiles associated with the corresponding person, as identified by their ID numbers as seen at 1872 and 1874, respectively.

Tickets

Referring back to FIG. 92A, a further category of multimedia files may include an events category (not shown) that allows a member to view certain events that may be available in various cities, for example. One type of events may includes sports events, for example. Many events require tickets and, in this regard, a further category may include a ticket category. The ticket category may have its own link (not shown), which when activated causes an S-module to be obtained from the management apparatus to cause a display as shown at 1880 in FIG. 104A and 104B to be displayed at the communication appliance.

FIGS. 104A and 104B

The display shown in FIGS. 104A and 104B may include a tickertape 1882 showing sports scores, for example. In addition, the display may include a sports game schedule such as shown at 1884, in this case relating to National Football League games. This display may include a listing of teams shown generally at 1886, for example, and each team may be associated with a link which when activated causes a further display window 1888 to appear on the display shown at 1880, this further display window providing a 360-degree (360 interactive panorama view of the stadium in which the selected team will be playing on the indicated date. Referring to FIG. 104B, a map such as shown at 1890 such as provided by an outside provider such as Map Quest, for example, may be provided and further details relating to the indicated event may be provided as seen at 1892, for example.

Referring back to FIG. 104A, if the member clicks on a date link 1894 associated with an event, an S-module is obtained from the management apparatus to cause a display as shown at 1896 in FIG. 105 to be seen at the communication appliance.

FIG. 105

The display shown in FIG. 105 includes a first panel 1898 showing a plan view of the stadium in which the event will be held. A further panel 1899 shows a 360° interactive panoramic view taken from a stage area 1900 of the stadium to allow a member to select a desired area of the stadium in which to sit. The plan view shown in panel 1898 may include a depiction of the various areas of the stadium and each area may be associated with a hyperlink, one of which is shown at 1902, for example, to link to a 360° interactive panoramic view of the stage area 1900 to allow the member to see exactly what he would see when seated in the indicated area as shown at 1904 in FIG. 106A.

FIGS. 106A and 106B

Referring to FIG. 106A, a further panel 1906 is provided with a written description of the area selected, seat numbers and the price for the indicated seats as seen at 1908.

Referring to FIGS. 106A and B, the display further includes an information panel 1910 and the map panel 1890 described above. The information panel includes details of ticket delivery, for example. Referring to FIG. 106B, the display concludes with a buy ticket link 1912, an add merchandise link 1914, an add food and beverages link 1916 and a cancel order link 1918. If the member selects the add merchandise link 1914, an S-module is obtained from the management apparatus to cause a display as shown at 1920 in FIG. 107 to be displayed at the communication appliance.

FIG. 107

The display shown in FIG. 107 includes a plurality of panels, one of which is shown at 1922, for depicting a picture and details and pricing of merchandise available in connection with the selected event. In addition, the display 1920 includes a shopping cart 1924 that lists details of the selected tickets as shown at 1926 and details of merchandise items as shown at 1928 and 1930, respectively, which have been selected for purchase. The cart panel 1924 further includes an add button 1932 that allows merchandise selected in one of the panels such as 1922 to be added to the cart 1924, includes a cancel button 1934 for cancelling items already added to the cart and includes a checkout button 1936 for linking to a checkout display. The display 1920 may further include advertising panels such as shown at 1938 and such panels may include links to the vendor associated with the advertising, for example.

On activation of the checkout link 1936, an S-module is obtained from the management apparatus to cause a display as shown at 1940 in FIG. 108 to be displayed at the communication appliance.

FIG. 108

The display shown in FIG. 108 includes a summary 1942 of the ticket purchase and all merchandise purchased and the delivery method and includes an indication 1944 that the tickets will be held for a period of time after which the tickets will be released and the order cancelled. 108Once the purchase summary 1942 has been reviewed and approved by the viewer, the viewer may activate a checkout function 1946 which causes an S-module to be obtained from the management apparatus to cause a display as shown at 1948 in FIG. 109 to be displayed at the communication appliance.

FIG. 109

The display shown in FIG. 109 includes a payment panel 1950 and further includes the map panel 1890 described above. The payment panel 1950 allows the member to enter credit card information and includes a submit payment function 1952 that causes a credit card verification and payment transaction to be posted to the credit card number identified in the panel 1950. If the payment is confirmed, an S-module is obtained from the management apparatus to cause a display as shown at 1954 in FIG. 110 to be seen at the communication appliance.

FIG. 110

The display shown in FIG. 110 includes a print panel 1956 to be seen in addition to the stadium map location 1890 described above. The print panel includes a print link 1958 which when activated causes an S-module to be obtained from the management apparatus to cause an overlay panel as seen at 1960 in FIG. 111 to be displayed at the communication appliance.

FIG. 111

The panel shown in FIG. 111 provides a representation of an actual ticket prepared based on the information selected by the member in the panels above. The panel includes a print link 1962 that causes an S-module to be obtained from the management apparatus to cause a page to be printed at a printer associated with the communication appliance, the page having a format as shown at 1964 in FIG. 112.

FIGS. 112A & 112B

The page shown in FIGS. 112A & 112B includes an image of the ticket 1966, an advertising panel shown generally at 1968, a plan view of the stadium as seen at 1970 including details of the location in the stadium and the ticket price, etc., as seen at 1972, in connection with the ticket image 1966. The print page also includes a listing of food and beverages purchased in accordance with the displays above as seen at 1974, and includes merchandise details including images of the merchandise 1976 relating to merchandise purchased by the member in accordance with the displays above. Actual images of the merchandise are provided and are consistent with the colour selections and configurations selected by the purchaser. An image of the map location 1890 is also printed on the page. A corporate logo such as shown at 1978 may also be displayed and a summary total and an indication of payment details may be provided as seen at 1980. Finally, a bar code 1982 and bar code number 1984 are also printed on the page, these entities matching corresponding entities on the ticket image as seen at 1986 and on the promo coupons as seen at 1988.

Planner Function

Certain Figures above, such as FIG. 40, include a view planner icon 746. Actuating this icon causes an S-module to be obtained from the management apparatus to cause a display as seen at 1990 in FIG. 113 to be displayed at the communication appliance.

FIG. 113

The display shown in FIG. 113 includes a top menu 1992 including a calendar function 1994, an events function 1996, a tasks function 1998, a contacts function 2000 and a sharing function 2002. Initially, the display 1990 indicates a display shown generally at 2004 which is the same display that would be produced if the calendar function 1994 is invoked. The calendar display 2004 includes a tabular representation of a calendar 2006, a linear representation 2008 of times during a day selected from the calendar 2006 and a list representation 2010 of the times seen at 2008. Beside the indicated times in the list representation 2010, a member may enter an identification of an appointment, for example. When such identification has been entered, a coloured indicator may appear against the corresponding time in the linear representation 2008.

Each entity registered on the system, has its own day planner. The day planner of a given entity may be accessed by one or more entities including the owner entity to allow more than one person to schedule appointments for another person. Thus, for example, an agent can specify appointments for a performer he represents, if the performer permits the agent access to such calendar.

The calendar seen in area 2004 has associated day view functions indicated at 2012, week view functions 2014 and month view functions 2016, for example. The day view function is shown at 2004.

FIG. 114

A week view function is shown at 2018 in FIG. 114. Different coloured icons 2020, 2022 and 2024 may be used to indicate free booked and multiple bookings, for example.

Referring back to FIG. 113, actuation of the events function 1996 causes an S-module to be obtained from the management apparatus to cause a display as shown at 2026 in FIG. 115 to appear at the communication appliance.

FIG. 115

In the display shown in FIG. 115, the taskbar 1992 is repeated and an event display as shown generally at 2028 is provided. The event display includes a first area 2030 for listing a title, time and date of an event. The display 2028 further includes a details area 2032 for listing details of an event selected from the area 2030. An event control area 2034 is also provided in the display 2028 and includes the name of the event or title as it appears in area 2030, but further includes control buttons 2036 for controlling the priority of the event for controlling reminders related to the event and for setting a coloured icon associated with the event. The control area 2034 further includes a details area 2038 which repeats the details seen in area 2032.

The display further includes a delete event icon 2031, an edit event icon 2033, an add event icon 2035 and an event history icon 2037. When the delete event icon is selected a currently selected event seen in the area 2030 is deleted. When the edit event icon is selected, control information associated with a currently selected event is copied to area 2030 and details of the event are shown in area 2032. The control area 2034 includes a sharing area 2040 including a contacts window 2042 and a participants window 2044 and control links 2046 for copying contacts from the contacts window 2042 into the participants window 2044 to indicate participants with whom the event is to be shared. The contacts window 2042 is populated with the member's contact list prepared as described above in connection with the communications functions. The display further includes cancel and save controls 2048 and 2050, the cancel control 2048 being used to cancel the event and the save control 2050 being used to save the event. Saving the event causes information relating thereto to be saved at the management apparatus in association with a member and causes the event to appear in the colour indicated in the control area 2036, on the calendar display shown at 2004 in FIG. 113.

The event history function 2037 causes an S-module to be obtained from the management apparatus to cause a display as shown at 2052 in FIG. 116 to be displayed at the communication appliance.

FIG. 116

The display shown in FIG. 116 includes the top menu 1992 and further includes a task history display area 2054 including a list area 2056 for listing various events that have occurred in the past. Date ranges are provided by input areas shown generally at 2058 and are made effective to perform a filtering of tasks by actuating a submit button 2060.

Referring back to FIG. 113, if the member actuates the tasks function 1998, an S-module is obtained from the management apparatus to cause a display as shown at 2062 in FIG. 117 to appear on the communication appliance.

FIG. 117

The display shown in FIG. 117 includes the top menu 1992 and further includes a list area 2064 for listing titles, times and dates of tasks. A details area 2066 is also provided to list details of a task selected from the list area 2064. The display further includes a delete task function 2068 for deleting a selected task. It also includes an edit task function 2070 that causes an edit panel 2072 to be produced to allow the member to enter details of the task including deadlines, priority indications, reminders, etc. Details of the task may be added at 2074. A participants control area is shown at 2076 to enable the member to select contacts from the members contacts list to appear among a participants list of participants who are to participate in the indicated task.

The display 2062 further includes an add task function 2078 which provides the same task entry panel 2072 and the display 2062 further includes a task history function 2080 that causes the management apparatus to download an S-module for causing a display as shown at 2082 in FIG. 118 to appear at the communication appliance (add number reference).

FIG. 118

The display shown in FIG. 118 includes the top menu 1992 and a task listing area 2084 for listing tasks within a date range specified by filter controls 2086.

Referring back to FIG. 113, actuation of the contacts function 2000 directs the management apparatus to transmit an S-module to the communication appliance to cause a display as shown at 2088 in FIG. 119 to appear at the communication appliance.

FIG. 119

The display shown in FIG. 119 includes the top menu 1992 and a contact list area 2090 for listing the name, company, title, email and work phone number of a contact. The display includes a group function 2092 which when activated causes an S-module to be obtained from the management apparatus to cause a display as shown at 2094 in FIG. 120 to appear at the communication appliance.

FIG. 120

The display shown in FIG. 120 includes the top menu 1992 and further includes a building area 2096 for building a group of contacts. The display further includes an add group function 2098, an edit group function 2100, a delete group function 2102. Actuation of the add group function 2098 causes a display window as shown at 2104 to appear on the display 2094, the new display including an entry box 2106 for adding a group name and a control function 2108 for adding or removing contacts from a group. After a group has been created, a save function 2110 is actuated to cause the group to be saved and the group name now appears in the group area 2096. In the event that a grope is to be edited, the member simply selects the group in area 2096 and then actuates the edit group function 2100 which causes the display as shown at 2104 to appear, with the name of the selected group appearing in the contact group name box 2106. Then, the control function 2108 may be used to add or delete members from the group.

Finally, a group may be deleted from the list shown in area 2096 by simply selecting the group and actuating the delete group function 2102.

In the event that new contacts are to be added, a contact function 2112 may be invoked. The contact function causes an S-module to be obtained from the management apparatus to cause a display as shown at 2114 in FIG. 121 to appear at the communication appliance.

FIG. 121

The display shown in FIG. 121 includes the top menu 1992, a name area 2116, an address area 2118, and an additional information area 2120. The name area includes a name field 2122, an email field 2124, a real ID field 2126 and an alternate email field 2128 for receiving information entered by the member to identify a particular contact. The address area includes work and home physical address fields shown generally at 2130 and includes telephone number fields shown generally at 2132. The additional information area includes mobile phone and pager fields 2134 and birthday and wedding anniversary fields 2136, and a notes field 2138 for holding information pertaining to these items, in connection with the person identified in the name area 2116. Once the required information has been added, a save function 2140 may be activated to save the contact. Alternatively, a clear function 2142 may be activated to clear the fields or a cancel function 2144 may be invoked to cancel the creation of the contact record.

Referring back to FIG. 113, actuation of the sharing function 2002 causes an S-module to be obtained from the management apparatus to cause a display as seen at 2146 in FIG. 122 to be displayed at the communication appliance.

FIG. 122

The display shown in FIG. 122 includes the top menu 1992 and includes a sharing control 2148, including a contact area 2150 and a share with area 2152 and controls 2154 for controlling the addition and deletion of contacts from the share with area 2152 to allow the member to define all those contacts with whom the calendar function invoked from the top menu 1992, is to be shared. Thus, it defines which members are able to see another member's day planner.

Remote CD Burning

Referring back to FIGS. 20, 21 and 22, it will be appreciated that after selecting photos and multimedia files and resume options, a "package" is created and sent to intended recipients. The contents of the package reside at the management apparatus 12 and thus may be retrieved by interested parties having access to the package.

The contents of the package may alternatively, or in addition be automatically or selectively copied and burned onto a compact disk (CD) or digital video disk (DVD). The burned disk may then be shipped to the performer, for example, or the performer may have it hand delivered. This allows performers who are not technically sophisticated or who do not have access to facilities for burning CDs or DVDs themselves to create promotional CDs and/or DVDs.

To facilitate this service, a disk order function may be added to one or all of the displays shown in FIGS. 20-22, for example, as shown in Broken outline at 2160 in FIG. 22. Actuation of this function may cause an S-module to be obtained from the management apparatus to cause a display as seen at 2162 in FIG. 123 to be seen at the communication appliance.

FIG. 123

Referring to FIG. 123, package, format, template and enhancement options may be provided in a first area 2164 to enable a member to determine available packages, formats, visual templates and music introductions, for example. A second area 2166 allows the member to select media files to be included on the disk. The media files may include photos, images, prints and media files. A third area 2168 allows the member to select the number of disks to be burned, whether the disks are to be full size or small disks and whether the disk is to be in a business card format. A fourth area 2170 allows the user to specify shipping details.

On actuation of a view packages function 2172 in the display shown in FIG. 123, an S-module is obtained from the management apparatus to cause a display as shown at 2174 in FIG. 124 to be displayed at the communication appliance.

FIG. 124

Referring to FIG. 124 a plurality of package options are provided in a tabular format to enable easy comparison between the various package options. The display shown in FIG. 124 may be an overlay screen that the member view temporarily while he/she decide which package to select.

FIG. 125

Referring back to FIG. 123, on actuation of a view format function 2176 an S-module is obtained from the management apparatus to cause a display as shown at 2178 in FIG. 125 to appear at the communication appliance. The display 2178 provides a summary of CD portfolio format options available to the member. The display may be closed after viewing by the member to reveal the display shown in FIG. 123 to permit the member to make an appropriate CD portfolio format selection.

FIG. 126

Referring back to FIG. 123, actuation of a view template function 2180 causes an S-module to be obtained from the management to cause a display 2182 as shown in FIG. 126 to appear at the communication appliance. The display shown in FIG. 126 includes template format views 2184 that show small version of various templates that may be selected by the member for defining a layout of the media files when the disk is played. The display 2182 also includes a large display area 2186 for showing the media files according to a selected template chosen from the templates shown in area 2184.

FIG. 127

Referring back to FIG. 123 in response to actuation of one of the media options in area 2166, an S-module is obtained from the management apparatus to cause a display as shown at 2188 in FIG. 127 to be displayed at the communication appliance. This display is similar to that shown in FIG. 33 and shows a plurality of thumbnail views of video clips, photos or image files, or alternatively shows text indicating audio files available from the file system at the management apparatus. This display 2188 further includes source controls shown generally at 2190 for allowing the member to indicate whether the files to be included on the disk are to come from the management apparatus, or are to be uploaded from a camera, for example. Thus, the member may use this display to select the media files that are to be included on the disk.

FIG. 128

Referring back to FIG. 123, actuation of a pricing function 2192 causes an S-module to be obtained from the management apparatus to cause a display as shown at 2194 in FIG. 128 to be displayed at the communication appliance. The display 2194 provides information about pricing for various media options including normal sized CD's, mini CD's and CD business cards.

Saving User Settings

FIG. 129

Referring to FIG. 129 a process for saving user settings such as those which define a background image on the display and those which set colours of text boxes for example is shown generally at 2200. Code for initiating the process is included in the library of files that is downloaded to the communication appliance in response to a successful login and the code that actually implements the process of saving the user settings is provided by a user settings S-module. A first block 2202 of code that initiates the user setting process directs the processor circuit at the communication appliance to monitor for actuation of a pre-designated key such as the F12 key on a keyboard at the communication appliance. In response to detecting actuation of the pre-designated key block 2204 directs the processor circuit to load the user settings S-module.

As seen at block 2206 the user settings S-module produces a display (not shown) at the communication appliance that prompts the member to make a selection to assign a picture file to be a background picture or to select a display style. When a picture assignment selection is made, a navigation screen (not shown) is displayed to allow the member to specify the path and filename of the picture file containing an image that the member desires to see as a background on the desktop display seen in FIG. 5. This background will appear behind all window panels.

If a desire to change the display style is selected, the member is provided with a plurality of display style options and is prompted to select a desired one.

Figure 5:
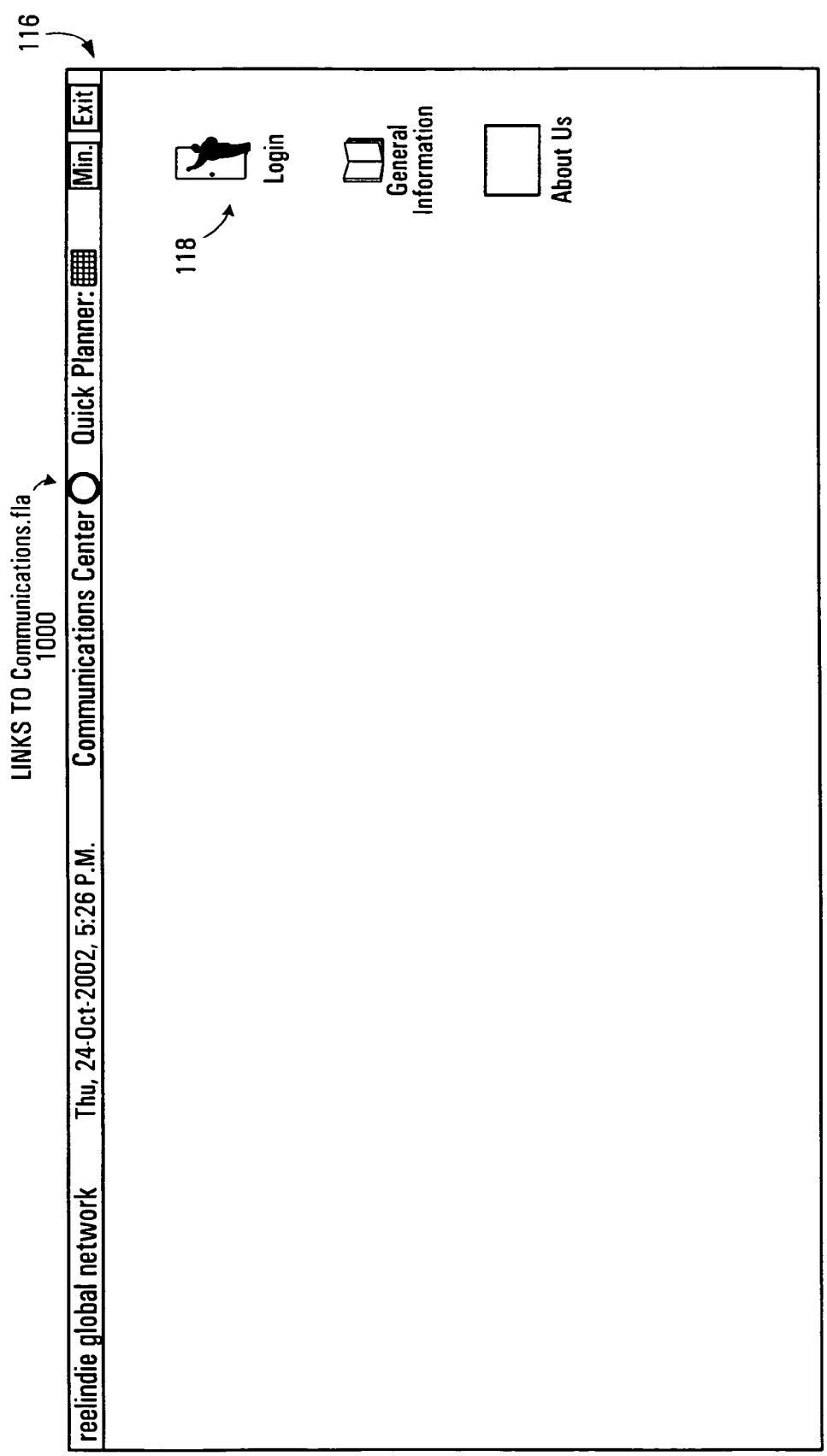
FIG. 5 is another exemplary Web page during the login procedure of FIG. 3.

The member may also change the locations of the icons one of which is shown at 118 in FIG. 5, of the right-hand side of the display.

Once selections have been made, as indicated at block 2208, the S-module creates a string containing the identity of the selected background picture, the identity of the selected display style and the positions of the icons. The string may have the format: backgroundimagefilename & desktopstyleid & icon1x-ycoordinates & . . . Iconnx-ycoordinates.

Then as seen at block 2210, the S-module then calls a save user settings method, causing the string to be sent to the management apparatus as a request to store structured data as described above. The save user settings method may have the form: global.commonManager.saveUserSettings(global.logininfo.ticket,_global.logininfo.re elid, save data)

The loginInfo ticket is that which was provided by the system at the time of successful login. The globa.loginInfo.reelid is the ID number of the member. The save data parameter is the string produced in the preceding step.

In response to the save user settings method, the string is stored at the management apparatus at a location defined by the loginInfo.ticket and loginInfo.rellid, i.e. the member's user id and password.

The user settings are re-sent back to the communication appliance each time the member successfully logs into the system, so that whenever the member logs into the system his/her preferred background and display settings are applied to the desktop display and windows produced by subsequently loaded S-modules.

While the invention has been described with respect to preferred embodiments, those skilled in the art will readily appreciate that various changes and/or modifications can be made to the invention without departing from the spirit or scope of the invention as defined by the appended claims.

What is claimed is:

1. A method of facilitating third party representation of an object, the method comprising: (a) maintaining a database of structured and unstructured data associated with a plurality of objects, said database being accessible through a computer; (b) facilitating communications between said computer and a first communications appliance having a first set of access criteria to permit an operator of the first communications appliance to create, modify or delete said structured and unstructured data for at least some of said objects; (c) facilitating communications between said computer and a second communications appliance having a second set of access criteria to permit an operator of the second communications appliance to group into a package said structured and unstructured data for at least some of said objects; and (d) facilitating communications between said computer and a third communications appliance having a third set of access criteria to permit said structured and unstructured data for at least some of said objects in said package to be presented to an operator at said third communications appliance, wherein facilitating communications between said computer and the second communications appliance comprises transmitting at least one remoting environment program module from a second group of program modules to the second communications appliance, said at least one remoting environment program module from said second group being operable to cause the second communications appliance to receive operator input to cause the second communications appliance to communicate with said computer to cause at least some of said structured and unstructured data associated with at least one object to be presented at the second communications appliance, wherein said at least one remoting environment communications module from said second group is operable to cause the second communications appliance to simultaneously display at least some of said unstructured data associated with at least two objects to permit operator-comparison of said unstructured data.

2. The method of claim 1 wherein said first, second and third sets of access criteria are different from each other.

3. The method of claim 1 wherein said first set of access criteria includes an identification identifying an operator of said first communications appliance as a first type of operator, wherein said second set of access criteria includes an identification identifying an operator of said second communications appliance as a second type of operator and wherein said third set of access criteria includes an identification identifying an operator of said third communications appliance as a third type of operator.

4. The method of claim 1 wherein facilitating communications between said computer and the first communications appliance comprises transmitting at least one remoting environment program module from a first group of program modules to the first communications appliance, said at least one remoting environment program module from said first group being operable to cause an object profile to be displayed at the first communications appliance and populated with structured and unstructured data from said database.

5. The method of claim 4 wherein said at least one remoting environment program module from said first group is operable to cause the first communications appliance to receive operator input and communicate said operator input to the computer to cause the computer to cause said structured and unstructured data at the database to be created, modified or deleted.

6. The method of claim 1 wherein simultaneously displaying at least some of said unstructured data comprises displaying thumbnail views of pictures defined by said unstructured data.

7. The method of claim 1 wherein said at least one remoting environment communications module from said second group is operable to cause the second communications appliance to receive operator input identifying structured and unstructured data associated with at least one object to be grouped into said package.

8. The method of claim 7 wherein said at least one remoting environment communications module from said second group is operable to cause the second communications appliance to receive and associate with said package an expiry time after which said package is no longer presentable at said third communications appliance.

9. The method of claim 1 wherein said at least one remoting environment communications module from said second group is operable to cause the second communications appliance to group identified structured and unstructured data associated with at least one object into said package.

10. The method of claim 9 wherein said at least one remoting environment communications module from said second group is operable to cause the second communications appliance to transmit an identification of structured and unstructured data in said package to the third communications appliance.

11. The method of claim 1 wherein facilitating communications between said computer and the third communications appliance comprises transmitting at least one remoting environment program module from a third group of program modules to the third communications appliance, said at least one remoting environment program module from said third group being operable to cause said third communications appliance to receive operator input to cause said third communications appliance to receive from said computer structured and unstructured data associated with said at least one object, in said package, and to cause said structured and unstructured data associated with said at least one object to be presented at the third communications appliance.

12. The method of claim 11 wherein said at least one remoting environment program module from the third group is operable to cause the third communications appliance to receive operator input identifying a list of requirements of a desired object and communicate said list of desired requirements to the computer for communication to the second communications appliance.

13. The method of claim 11 wherein said at least one remoting environment program module from the third group is operable to cause the third communications appliance to facilitate selection of structured and unstructured data from a plurality of different objects from a plurality of different packages.

14. The method of claim 13 further comprising associating an operator of the first communications appliance with an object and associating an operator of the second communications appliance with said object and notifying said operators of said first and second communications appliances of selection by an operator of said third communications appliance of the object with which they are associated.

15. The method of claim 1 wherein facilitating communications between said computer and the second communications appliance comprises transmitting at least one remoting environment program module from a second group of program modules to the second communications appliance, said at least one remoting environment program module from said second group being operable to cause the second communications appliance to communicate with the computer to receive and display at the second communications appliance an object profile populated with structured and unstructured data from said database.

16. The method of claim 15 wherein said at least one remoting environment program module from said second group is operable to cause the second communications appliance to receive operator input and communicate said operator input to the computer to cause the computer to cause said structured and unstructured data at the database to be created, modified or deleted.

17. An apparatus for facilitating third party representation of an object, the apparatus comprising: a) a computer having access to a database operable to store structured and unstructured data; (b) a first communications facility facilitating communications between said computer and a first communications appliance having a first set of database access criteria to permit said structured and unstructured data for at least some of said objects to be created, modified or deleted by an operator of said first communications appliance; (c) a second communications facility facilitating communications between said computer and a second communications appliance having a second set of access criteria to permit an operator of said second communications appliance to group said structured and unstructured data for at least some of said objects into a package; and (d) a third communications facility facilitating communications between said computer and a third communications appliance having a third set of access criteria to permit said structured and unstructured data for at least some of said objects in said package to be presented to an operator at said third communications appliance, wherein said computer has access to a second group of remoting environment program modules and wherein the second communications facility is operable to transmit at least one remoting environment program module from said second group of program modules to the second communications appliance, said at least one remoting environment program module from said second group being operable to cause the second communications appliance to receive operator input and communicate said operator input to said computer to cause the computer to cause at least some of said structured and unstructured data associated with at least one object identified by said operator input to be presented at the second communications appliance, wherein said at least one remoting environment communications module from said second group is operable to cause the second communications appliance to simultaneously display at least some of said unstructured data associated with at least two objects to permit operator-comparison of said unstructured data.

18. The apparatus of claim 17 wherein said first, second and third sets of access criteria are different from each other.

19. The apparatus of claim 17 wherein said first set of access criteria includes an identification identifying an operator of said first communications appliance as a first type of operator, wherein said second set of access criteria includes an identification identifying an operator of said second communications appliance as a second type of operator and wherein said third set of access criteria includes an identification identifying an operator of said third communications appliance as a third type of operator.

20. The apparatus of claim 17 wherein said computer is operable to access a first group of remoting environment program modules and wherein the first communications facility is operable to cause said computer to transmit at least one of said remoting environment program modules from said first group to the first communications appliance, said at least one remoting environment program module from said first group being operable to cause the first communications appliance to display an object profile populated with structured and unstructured data from said database.

21. The apparatus of claim 20 wherein said at least one remoting environment program module from said first group is operable to cause the first communications appliance to receive operator input and communicate said operator input to said computer to cause the computer to create, modify or delete said structured or unstructured data at the database.

22. The apparatus of claim 17 wherein said at least one remoting environment communications module from said second group is operable to cause the second communications appliance to display thumbnail views of pictures defined by said unstructured data.

23. The apparatus of claim 17 wherein said at least one remoting environment communications module from said second group is operable to cause the second communications appliance to receive operator input identifying structured and unstructured data associated with at least one object to be grouped into said package and to cause the second communications appliance to communicate said operator input to said computer.

24. The apparatus of claim 23 wherein said at least one remoting environment communications module is operable to cause the second communications appliance to group identified structured and unstructured data associated with at least one object into said package.

25. The apparatus of claim 24 wherein said at least one remoting environment communications module is operable to cause said package to be transmitted from the second communications appliance to said third communications appliance.

26. The apparatus of claim 23 wherein said at least one remoting environment communications module from said second group is operable to receive operator input specifying an expiry time after which said package is no longer presentable at said third communications appliance and to associate said expiry time with said package.

27. The apparatus of claim 17 wherein said computer is operable to access a third group of remoting environment program modules and wherein the third communications facility is operable to cause at least one remoting environment program module from said third group of program modules to be transmitted from said computer to the third communications appliance, said at least one remoting environment program module from said third group being operable to cause the third communications appliance to communicate with said database to cause said structured and unstructured data associated with said at least one object, in said package, to be presented at the third communications appliance.

28. The apparatus of claim 27 wherein said at least one remoting environment program module from the third group is operable to facilitate selection by an operator of the third communications appliance, of structured and unstructured data from a plurality of different objects from a plurality of different packages.

29. The apparatus of claim 28 wherein said computer is operable to associate an operator of the first communications appliance with an object and associate an operator of the second communications appliance with said object and notify said operators of said first and second communications appliances of selection by an operator of said third communications appliance of the object with which they are associated.

30. The apparatus of claim 17 wherein the third communications facility is operable to cause said computer to receive from the third communications appliance a list of requirements of at least one desired object and wherein the third communications facility is operable to cause said computer to communicate said list of requirements to the second communications appliance.

31. The apparatus of claim 17 wherein said computer is operable to access a second group of remoting environment program modules and wherein the second communications facility is operable to transmit at least one remoting environment program module from said second group of program modules to the second communications appliance, said at least one remoting environment program module from said second group being operable to cause an object profile to be displayed at the second communications appliance and populated with structured and unstructured data from said database.

32. The apparatus of claim 31 wherein said at least one remoting environment program module from said second group is operable to cause the second communications appliance to receive operator input and to communicate said operator input to said computer to cause said computer to create, modify or delete said structured and unstructured data associated with an object. communications appliance.

* * * * *